US010078442B2

(12) United States Patent
Bernstein et al.

(10) Patent No.: US 10,078,442 B2
(45) Date of Patent: Sep. 18, 2018

(54) DEVICE, METHOD, AND GRAPHICAL USER INTERFACE FOR DETERMINING WHETHER TO SCROLL OR SELECT CONTENT BASED ON AN INTENSITY THESHOLD

(71) Applicant: Apple Inc., Cupertino, CA (US)

(72) Inventors: Jeffrey Traer Bernstein, San Francisco, CA (US); Julian Missig, Redwood City, CA (US)

(73) Assignee: APPLE INC., Cupertino, CA (US)

( * ) Notice: Subject to any disclaimer, the term of this patent is extended or adjusted under 35 U.S.C. 154(b) by 685 days.

(21) Appl. No.: 14/608,985

(22) Filed: Jan. 29, 2015

(65) Prior Publication Data

US 2015/0143273 A1    May 21, 2015

Related U.S. Application Data

(63) Continuation of application No. PCT/US2013/069486, filed on Nov. 11, 2013.
(Continued)

(51) Int. Cl.
*G06F 3/0485* (2013.01)
*G06F 3/0488* (2013.01)
(Continued)

(52) U.S. Cl.
CPC ........ *G06F 3/04883* (2013.01); *G06F 3/0483* (2013.01); *G06F 3/0485* (2013.01);
(Continued)

(58) Field of Classification Search
None
See application file for complete search history.

(56) References Cited

U.S. PATENT DOCUMENTS 4,674,044 A    6/1987    Kalmus et al.
4,750,135 A    6/1988    Boilen
(Continued)

FOREIGN PATENT DOCUMENTS

AU    2016100649 A4    6/2016
CN    1658150          8/2005
(Continued)

OTHER PUBLICATIONS

Office Action, dated Aug. 27, 2015, received in Australian Patent Application No. 2013259614, which corresponds with U.S. Appl. No. 14/536,141, 4 pages.
(Continued)

*Primary Examiner* — Jennifer To
*Assistant Examiner* — Joseph R Burwell
(74) *Attorney, Agent, or Firm* — Morgan, Lewis & Bockius LLP

(57) ABSTRACT

An electronic device with a display, a touch-sensitive surface and one or more intensity sensors displays content. While a focus selector is over the content, the device detects a gesture on the touch-sensitive surface, the gesture including a first contact on the touch-sensitive surface and movement of the first contact across the touch-sensitive surface that corresponds to movement of the focus selector on the display. In response to detecting the gesture, when the contact has an intensity below a selection intensity threshold, the device scrolls the content on the display in accordance with the movement of the focus selector on the display without selecting the content. In response to detecting the gesture, when the contact has an intensity above the selection intensity threshold, the device selects at least a portion of the content in accordance with the movement of the focus selector over the content.

30 Claims, 96 Drawing Sheets

Related U.S. Application Data

(60) Provisional application No. 61/778,416, filed on Mar. 13, 2013, provisional application No. 61/747,278, filed on Dec. 29, 2012.

(51) Int. Cl.
*G06F 3/0484* (2013.01)
*G06F 3/0483* (2013.01)

(52) U.S. Cl.
CPC ........ *G06F 3/0488* (2013.01); *G06F 3/04842* (2013.01); *G06F 3/04845* (2013.01); *G06F 2203/04805* (2013.01)

(56) References Cited

U.S. PATENT DOCUMENTS

| | | |
|---|---|---|
| 4,864,520 A | 9/1989 | Setoguchi et al. |
| 4,903,201 A | 2/1990 | Wagner |
| 5,038,284 A | 8/1991 | Kramer |
| 5,077,665 A | 12/1991 | Silverman et al. |
| 5,101,353 A | 3/1992 | Lupien et al. |
| 5,136,501 A | 8/1992 | Silverman et al. |
| 5,184,120 A | 2/1993 | Schultz |
| 5,270,922 A | 12/1993 | Higgins |
| 5,297,031 A | 3/1994 | Gutterman et al. |
| 5,297,032 A | 3/1994 | Trojan et al. |
| 5,374,787 A | 12/1994 | Miller et al. |
| 5,428,730 A | 6/1995 | Baker et al. |
| 5,455,965 A | 10/1995 | Shaughnessy et al. |
| 5,463,722 A | 10/1995 | Venolia |
| 5,510,813 A | 4/1996 | Makinwa et al. |
| 5,555,354 A | 9/1996 | Strasnick et al. |
| 5,559,301 A | 9/1996 | Bryan, Jr. et al. |
| 5,590,265 A | 12/1996 | Nakazawa |
| 5,627,914 A | 5/1997 | Pagallo |
| 5,689,651 A | 11/1997 | Lozman |
| 5,695,400 A | 12/1997 | Fenell, Jr. et al. |
| 5,710,896 A | 1/1998 | Seidl |
| 5,717,438 A | 2/1998 | Kim et al. |
| 5,717,725 A | 2/1998 | Campana, Jr. |
| 5,719,796 A | 2/1998 | Chen |
| 5,727,165 A | 3/1998 | Ordish et al. |
| 5,774,877 A | 6/1998 | Patterson, Jr. et al. |
| 5,775,996 A | 7/1998 | Othmer et al. |
| 5,793,301 A | 8/1998 | Patterson, Jr. et al. |
| 5,793,360 A | 8/1998 | Fleck et al. |
| 5,793,377 A | 8/1998 | Moore |
| 5,797,002 A | 8/1998 | Patterson, Jr. et al. |
| 5,801,692 A | 9/1998 | Muzio et al. |
| 5,805,144 A | 9/1998 | Scholder et al. |
| 5,805,167 A | 9/1998 | Van Cruyningen |
| 5,809,267 A | 9/1998 | Moran et al. |
| 5,819,293 A | 10/1998 | Comer et al. |
| 5,820,463 A | 10/1998 | O'Callaghan |
| 5,825,352 A | 10/1998 | Bisset et al. |
| 5,844,560 A | 12/1998 | Crutcher et al. |
| 5,845,266 A | 12/1998 | Lupien et al. |
| 5,872,922 A | 2/1999 | Hogan et al. |
| 5,880,733 A | 3/1999 | Horvitz et al. |
| 5,910,882 A | 6/1999 | Burrell |
| 5,915,245 A | 6/1999 | Patterson, Jr. et al. |
| 5,924,082 A | 7/1999 | Silverman et al. |
| 5,924,083 A | 7/1999 | Silverman et al. |
| 5,946,647 A | 8/1999 | Miller et al. |
| 5,946,667 A | 8/1999 | Tull, Jr. et al. |
| 5,953,708 A | 9/1999 | Midorikawa et al. |
| 5,963,923 A | 10/1999 | Garber |
| 6,002,397 A | 12/1999 | Jaaskelainen, Jr. |
| 6,012,046 A | 1/2000 | Lupien et al. |
| 6,014,643 A | 1/2000 | Minton |
| 6,031,989 A | 2/2000 | Cordell |
| 6,035,287 A | 3/2000 | Stallaert et al. |
| 6,072,488 A | 6/2000 | Mcfarland |
| 6,088,019 A | 7/2000 | Rosenberg |
| 6,088,027 A | 7/2000 | Konar et al. |
| 6,098,051 A | 8/2000 | Lupien et al. |
| 6,111,575 A | 8/2000 | Martinez et al. |
| 6,115,043 A | 9/2000 | Levine et al. |
| 6,121,960 A | 9/2000 | Carroll et al. |
| 6,131,087 A | 10/2000 | Luke et al. |
| 6,134,535 A | 10/2000 | Belzberg |
| 6,180,894 B1 | 1/2001 | Chao et al. |
| 6,195,647 B1 | 2/2001 | Martyn et al. |
| 6,208,329 B1 | 3/2001 | Ballare |
| 6,208,340 B1 | 3/2001 | Amin et al. |
| 6,219,034 B1 | 4/2001 | Elbing et al. |
| 6,227,743 B1 | 5/2001 | Robb |
| 6,229,542 B1 | 5/2001 | Miller |
| 6,243,080 B1 | 6/2001 | Molne |
| 6,247,000 B1 | 6/2001 | Hawkins et al. |
| 6,252,594 B1 | 6/2001 | Xia et al. |
| 6,266,684 B1 | 7/2001 | Kraus et al. |
| 6,272,474 B1 | 8/2001 | Garcia |
| 6,278,982 B1 | 8/2001 | Korhammer et al. |
| 6,282,521 B1 | 8/2001 | Howorka |
| 6,323,846 B1 | 11/2001 | Westerman et al. |
| 6,347,997 B1 | 2/2002 | Armstrong |
| 6,377,940 B2 | 4/2002 | Tilfors et al. |
| 6,396,523 B1 | 5/2002 | Segal et al. |
| 6,396,962 B1 | 5/2002 | Haffey et al. |
| 6,400,303 B2 | 6/2002 | Armstrong |
| 6,405,180 B2 | 6/2002 | Tilfors et al. |
| 6,408,282 B1 | 6/2002 | Buist |
| 6,411,998 B1 | 6/2002 | Bryant et al. |
| 6,429,846 B2 | 8/2002 | Rosenberg et al. |
| 6,448,977 B1 | 9/2002 | Braun et al. |
| 6,456,778 B2 | 9/2002 | Armstrong |
| 6,459,424 B1 | 10/2002 | Resman |
| 6,459,442 B1 | 10/2002 | Edwards et al. |
| 6,469,691 B1 | 10/2002 | Armstrong |
| 6,470,078 B1 | 10/2002 | Armstrong |
| 6,489,975 B1 | 12/2002 | Patil et al. |
| 6,489,978 B1 | 12/2002 | Gong et al. |
| 6,504,527 B1 | 1/2003 | Armstrong |
| 6,512,530 B1 | 1/2003 | Rzepkowski et al. |
| 6,512,761 B1 | 1/2003 | Schuster et al. |
| 6,532,000 B2 | 3/2003 | Armstrong |
| 6,551,357 B1 | 4/2003 | Madduri |
| 6,559,831 B1 | 5/2003 | Armstrong |
| 6,563,487 B2 | 5/2003 | Martin et al. |
| 6,567,102 B2 | 5/2003 | Kung |
| 6,570,557 B1 | 5/2003 | Westerman et al. |
| 6,583,798 B1 | 6/2003 | Hoek et al. |
| 6,590,568 B1 | 7/2003 | Astala et al. |
| 6,659,861 B1 | 12/2003 | Faris et al. |
| 6,661,438 B1 | 12/2003 | Shiraishi et al. |
| 6,670,952 B2 | 12/2003 | Jaeger et al. |
| 6,677,932 B1 | 1/2004 | Westerman |
| 6,735,307 B1 | 5/2004 | Volckers |
| 6,750,890 B1 | 6/2004 | Sugimoto |
| 6,772,132 B1 | 8/2004 | Kemp, II et al. |
| 6,822,635 B2 | 11/2004 | Shahoian et al. |
| 6,831,666 B1 | 12/2004 | Kreis |
| 6,891,551 B2 | 5/2005 | Keely et al. |
| 6,904,405 B2 | 6/2005 | Suominen |
| 6,906,697 B2 | 6/2005 | Rosenberg |
| 6,919,927 B1 | 7/2005 | Hyodo |
| 6,954,899 B1 | 10/2005 | Anderson |
| 7,036,088 B2 | 4/2006 | Tunney |
| 7,058,146 B2 | 6/2006 | Paulraj et al. |
| 7,114,091 B2 | 9/2006 | Vrancic |
| 7,134,093 B2 | 11/2006 | Etgen et al. |
| 7,138,983 B2 | 11/2006 | Wakai et al. |
| 7,159,189 B2 | 1/2007 | Weingart et al. |
| 7,259,752 B1 | 8/2007 | Simmons |
| 7,312,791 B2 | 12/2007 | Hoshino et al. |
| 7,346,855 B2 | 3/2008 | Hellyar et al. |
| 7,380,218 B2 | 5/2008 | Rundell |
| 7,411,575 B2 | 8/2008 | Hill et al. |
| 7,441,204 B2 | 10/2008 | Thomson et al. |
| 7,461,026 B2 | 12/2008 | Schluetter |
| 7,479,949 B2 | 1/2009 | Jobs et al. |
| 7,492,720 B2 | 2/2009 | Pruthi et al. |
| 7,532,206 B2 | 5/2009 | Morrison et al. |

(56) References Cited

U.S. PATENT DOCUMENTS

| | | |
|---|---|---|
| 7,533,352 B2 | 5/2009 | Chew et al. |
| 7,552,397 B2 | 6/2009 | Holecek et al. |
| 7,577,167 B2 | 8/2009 | Kikuchi et al. |
| 7,577,530 B2 | 8/2009 | Vignalou-Marche |
| 7,581,186 B2 | 8/2009 | Dowdy et al. |
| 7,614,008 B2 | 11/2009 | Ording |
| 7,619,616 B2 | 11/2009 | Rimas Ribikauskas et al. |
| 7,629,966 B2 | 12/2009 | Anson |
| 7,633,076 B2 | 12/2009 | Huppi et al. |
| 7,653,883 B2 | 1/2010 | Hotelling et al. |
| 7,656,413 B2 | 2/2010 | Khan et al. |
| 7,657,849 B2 | 2/2010 | Chaudhri et al. |
| 7,663,607 B2 | 2/2010 | Hotelling et al. |
| 7,673,255 B2 | 3/2010 | Schechter et al. |
| 7,680,513 B2 | 3/2010 | Haitani et al. |
| 7,683,889 B2 | 3/2010 | Rimas-Ribikauskas et al. |
| 7,694,231 B2 | 4/2010 | Kocienda et al. |
| 7,694,236 B2 | 4/2010 | Gusmorino et al. |
| 7,739,604 B1 | 6/2010 | Lyons et al. |
| 7,743,348 B2 | 6/2010 | Robbins et al. |
| 7,752,115 B2 | 7/2010 | Schluetter |
| 7,757,185 B2 | 7/2010 | Paquette et al. |
| 7,760,187 B2 | 7/2010 | Kennedy |
| 7,787,026 B1 | 8/2010 | Flory et al. |
| 7,788,595 B2 | 8/2010 | Biwer et al. |
| 7,797,642 B1 | 9/2010 | Karam et al. |
| 7,801,796 B2 | 9/2010 | Friedman et al. |
| 7,801,950 B2 | 9/2010 | Eisenstadt et al. |
| 7,812,826 B2 | 10/2010 | Ording et al. |
| 7,817,568 B2 | 10/2010 | Paik et al. |
| 7,844,914 B2 | 11/2010 | Andre et al. |
| 7,880,728 B2 | 2/2011 | de los Reyes et al. |
| 7,890,862 B2 | 2/2011 | Kompe et al. |
| 7,903,090 B2 | 3/2011 | Soss et al. |
| 7,921,373 B2 | 4/2011 | Yamashita et al. |
| 7,952,566 B2 | 5/2011 | Poupyrev et al. |
| 7,956,847 B2 | 6/2011 | Christie |
| 7,957,762 B2 | 6/2011 | Herz et al. |
| 7,966,352 B2 | 6/2011 | Madan et al. |
| 7,973,778 B2 | 7/2011 | Chen |
| 8,001,189 B2 | 8/2011 | Nielsen et al. |
| 8,006,002 B2 | 8/2011 | Kalayjian et al. |
| 8,010,900 B2 | 8/2011 | Hart et al. |
| 8,020,028 B1 | 9/2011 | Luttter |
| 8,024,670 B1 | 9/2011 | Rahmation et al. |
| 8,040,142 B1 | 10/2011 | Bokma et al. |
| 8,046,712 B2 | 10/2011 | Landman et al. |
| 8,059,104 B2 | 11/2011 | Shahoian et al. |
| 8,106,856 B2 | 1/2012 | Matas et al. |
| 8,125,440 B2 | 2/2012 | Guyot-Sionnest et al. |
| 8,125,492 B1 | 2/2012 | Wainwright et al. |
| RE43,448 E | 6/2012 | Kimoto et al. |
| 8,209,628 B1 | 6/2012 | Davidson |
| 8,214,768 B2 | 7/2012 | Boule et al. |
| 8,239,784 B2 | 8/2012 | Hotelling et al. |
| 8,271,900 B2 | 9/2012 | Walizaka et al. |
| 8,279,180 B2 | 10/2012 | Hotelling et al. |
| 8,363,020 B2 | 1/2013 | Li et al. |
| 8,381,135 B2 | 2/2013 | Hotelling et al. |
| 8,390,583 B2 | 3/2013 | Forutanpour et al. |
| 8,423,089 B2 | 4/2013 | Song et al. |
| 8,438,504 B2 | 5/2013 | Cranfill et al. |
| 8,446,376 B2 | 5/2013 | Levy et al. |
| 8,453,057 B2 | 5/2013 | Stallings et al. |
| 8,456,431 B2 | 6/2013 | Victor |
| 8,466,889 B2 | 6/2013 | Tong et al. |
| 8,479,122 B2 | 7/2013 | Hotelling et al. |
| 8,482,535 B2 | 7/2013 | Pryor |
| 8,508,494 B2 | 8/2013 | Moore |
| 8,542,205 B1 | 9/2013 | Keller |
| 8,553,092 B2 | 10/2013 | Tezuka et al. |
| 8,581,870 B2 | 11/2013 | Bokma et al. |
| 8,587,542 B2 | 11/2013 | Moore |
| 8,593,415 B2 | 11/2013 | Han et al. |
| 8,593,420 B1 | 11/2013 | Buuck |
| 8,625,882 B2 | 1/2014 | Backlund et al. |
| 8,638,311 B2 | 1/2014 | Kang et al. |
| 8,665,227 B2 | 3/2014 | Gunawan |
| 8,669,945 B2 | 3/2014 | Coddington |
| 8,674,932 B2 | 3/2014 | Armstrong |
| 8,698,765 B1 | 4/2014 | Keller |
| 8,698,845 B2 | 4/2014 | Lemay |
| 8,717,305 B2 | 5/2014 | Williamson et al. |
| 8,743,069 B2 | 6/2014 | Morton et al. |
| 8,769,431 B1 | 7/2014 | Prasad |
| 8,773,389 B1 | 7/2014 | Freed |
| 8,788,964 B2 | 7/2014 | Shin et al. |
| 8,793,577 B2 | 7/2014 | Schellingerhout et al. |
| 8,799,816 B2 | 8/2014 | Wells et al. |
| 8,806,369 B2 | 8/2014 | Khoe et al. |
| 8,816,989 B2 | 8/2014 | Nicholson et al. |
| 8,854,316 B2 | 10/2014 | Shenfield |
| 8,872,729 B2 | 10/2014 | Lyons et al. |
| 8,872,773 B2 | 10/2014 | Mak et al. |
| 8,875,044 B2 | 10/2014 | Ozawa et al. |
| 8,881,062 B2 | 11/2014 | Kim et al. |
| 8,914,732 B2 | 12/2014 | Jun et al. |
| 8,952,987 B2 | 2/2015 | Momeyer et al. |
| 8,959,430 B1 | 2/2015 | Spivak et al. |
| 8,976,128 B2 | 3/2015 | Moore |
| 9,026,932 B1 | 5/2015 | Dixon |
| 9,030,419 B1 | 5/2015 | Freed |
| 9,030,436 B2 | 5/2015 | Ikeda |
| 9,046,999 B1 | 6/2015 | Teller et al. |
| 9,058,186 B2 | 6/2015 | Chaudhri |
| 9,063,563 B1 | 6/2015 | Gray et al. |
| 9,069,460 B2 | 6/2015 | Moore |
| 9,086,755 B2 | 7/2015 | Cho et al. |
| 9,092,058 B2 | 7/2015 | Kasahara et al. |
| 9,098,188 B2 | 8/2015 | Kim |
| 9,116,571 B2 | 8/2015 | Zeliff et al. |
| 9,122,364 B2 | 9/2015 | Kuwabara et al. |
| 9,146,914 B1 | 9/2015 | Dhaundiyal |
| 9,148,618 B2 | 9/2015 | Matas et al. |
| 9,164,779 B2 | 10/2015 | Brakensiek et al. |
| 9,170,607 B2 | 10/2015 | Bose et al. |
| 9,170,649 B2 | 10/2015 | Ronkainen |
| 9,218,105 B2 | 12/2015 | Mansson et al. |
| 9,244,562 B1 | 1/2016 | Rosenberg et al. |
| 9,244,576 B1 | 1/2016 | Vadagave et al. |
| 9,244,601 B2 | 1/2016 | Kim et al. |
| 9,246,487 B2 | 1/2016 | Casparian et al. |
| 9,262,002 B2 | 2/2016 | Momeyer et al. |
| 9,304,668 B2 | 4/2016 | Rezende et al. |
| 9,307,112 B2 | 4/2016 | Molgaard et al. |
| 9,349,552 B2 | 5/2016 | Huska et al. |
| 9,361,018 B2 | 6/2016 | Defazio et al. |
| 9,389,718 B1 | 7/2016 | Letourneur |
| 9,389,722 B2 | 7/2016 | Matsuki et al. |
| 9,400,581 B2 | 7/2016 | Bokma et al. |
| 9,405,367 B2 | 8/2016 | Jung et al. |
| 9,417,754 B2 | 8/2016 | Smith |
| 9,423,938 B1 | 8/2016 | Morris |
| 9,436,344 B2 | 9/2016 | Kuwabara et al. |
| 9,448,694 B2 | 9/2016 | Sharma et al. |
| 9,451,230 B1 | 9/2016 | Henderson et al. |
| 9,471,145 B2 | 10/2016 | Langlois et al. |
| 9,477,393 B2 | 10/2016 | Zambetti et al. |
| 9,542,013 B2 | 1/2017 | Dearman et al. |
| 9,547,525 B1 | 1/2017 | Trainor et al. |
| 9,569,093 B2 | 2/2017 | Lipman et al. |
| 9,600,114 B2 | 3/2017 | Milam et al. |
| 9,600,116 B2 | 3/2017 | Tao et al. |
| 9,612,741 B2 | 4/2017 | Brown et al. |
| 9,671,943 B2 | 6/2017 | Van der Velden |
| 9,733,716 B2 | 8/2017 | Shaffer |
| 9,760,241 B1 | 9/2017 | Lewbel |
| 2001/0024195 A1 | 9/2001 | Hayakawa et al. |
| 2001/0045965 A1 | 11/2001 | Orbanes et al. |
| 2002/0008691 A1 | 1/2002 | Hanajima et al. |
| 2002/0015024 A1 | 2/2002 | Westerman et al. |
| 2002/0015064 A1 | 2/2002 | Robotham et al. |
| 2002/0023038 A1 | 2/2002 | Fritsch et al. |
| 2002/0026321 A1 | 2/2002 | Faris et al. |

(56) References Cited

U.S. PATENT DOCUMENTS

| | | |
|---|---|---|
| 2002/0027957 A1 | 3/2002 | Paulraj et al. |
| 2002/0035534 A1 | 3/2002 | Buist et al. |
| 2002/0055899 A1 | 5/2002 | Williams |
| 2002/0073016 A1 | 6/2002 | Furbush et al. |
| 2002/0075289 A1 | 6/2002 | Hatori et al. |
| 2002/0077117 A1 | 6/2002 | Cloutier et al. |
| 2002/0107748 A1 | 8/2002 | Boies et al. |
| 2002/0109678 A1 | 8/2002 | Marmolin et al. |
| 2002/0120837 A1 | 8/2002 | Maxemchuk et al. |
| 2002/0138401 A1 | 9/2002 | Allen et al. |
| 2002/0140680 A1 | 10/2002 | Lu |
| 2002/0140740 A1 | 10/2002 | Chen |
| 2002/0149609 A1 | 10/2002 | Suzuki et al. |
| 2002/0149630 A1 | 10/2002 | Kitainik et al. |
| 2002/0161687 A1 | 10/2002 | Serkin et al. |
| 2002/0161693 A1 | 10/2002 | Greenwalk |
| 2002/0178102 A1 | 11/2002 | Scheinberg et al. |
| 2002/0180763 A1 | 12/2002 | Kung |
| 2002/0186257 A1 | 12/2002 | Cadiz et al. |
| 2003/0001869 A1 | 1/2003 | Nissen |
| 2003/0074413 A1 | 4/2003 | Nielsen et al. |
| 2003/0086496 A1 | 5/2003 | Zhang et al. |
| 2003/0112269 A1 | 6/2003 | Lentz et al. |
| 2003/0117440 A1 | 6/2003 | Hellyar et al. |
| 2003/0119562 A1 | 6/2003 | Kokubo |
| 2003/0122779 A1 | 7/2003 | Martin et al. |
| 2003/0151589 A1 | 8/2003 | Bensen et al. |
| 2003/0177154 A1 | 9/2003 | Vrancic |
| 2003/0184574 A1 | 10/2003 | Phillips et al. |
| 2003/0189552 A1 | 10/2003 | Chuang et al. |
| 2003/0189647 A1 | 10/2003 | Kang |
| 2003/0206169 A1 | 11/2003 | Springer et al. |
| 2003/0222915 A1 | 12/2003 | Marion et al. |
| 2004/0021643 A1 | 2/2004 | Hoshino et al. |
| 2004/0025112 A1 | 2/2004 | Chasen et al. |
| 2004/0056849 A1 | 3/2004 | Lohbihler et al. |
| 2004/0085328 A1 | 5/2004 | Maruyama et al. |
| 2004/0108995 A1 | 6/2004 | Hoshino et al. |
| 2004/0138849 A1 | 7/2004 | Schmidt et al. |
| 2004/0150631 A1 | 8/2004 | Fleck et al. |
| 2004/0150644 A1 | 8/2004 | Kincaid et al. |
| 2004/0155908 A1 | 8/2004 | Wagner |
| 2004/0174398 A1 | 9/2004 | Luke et al. |
| 2004/0174399 A1 | 9/2004 | Wu et al. |
| 2004/0219969 A1 | 11/2004 | Casey et al. |
| 2004/0267877 A1 | 12/2004 | Shiparo et al. |
| 2005/0012723 A1 | 1/2005 | Pallakoff |
| 2005/0022138 A1 | 1/2005 | Tunney |
| 2005/0039141 A1 | 2/2005 | Burke et al. |
| 2005/0073961 A1 | 4/2005 | Paik et al. |
| 2005/0091604 A1 | 4/2005 | Davis |
| 2005/0110769 A1 | 5/2005 | DaCosta et al. |
| 2005/0114785 A1 | 5/2005 | Finnigan et al. |
| 2005/0125742 A1 | 6/2005 | Grotjohn et al. |
| 2005/0134578 A1 | 6/2005 | Chambers et al. |
| 2005/0177798 A1 | 8/2005 | Thomson et al. |
| 2005/0183017 A1 | 8/2005 | Cain |
| 2005/0183035 A1 | 8/2005 | Ringel et al. |
| 2005/0184973 A1 | 8/2005 | Lum et al. |
| 2005/0190059 A1 | 9/2005 | Wehrenberg |
| 2005/0190280 A1 | 9/2005 | Haas et al. |
| 2005/0204295 A1 | 9/2005 | Voorhees et al. |
| 2005/0223338 A1 | 10/2005 | Partanen |
| 2005/0229112 A1 | 10/2005 | Clay et al. |
| 2005/0289476 A1 | 12/2005 | Tokkonen |
| 2006/0017692 A1 | 1/2006 | Wehrenberg et al. |
| 2006/0022955 A1 | 2/2006 | Kennedy |
| 2006/0022956 A1 | 2/2006 | Lengeling et al. |
| 2006/0026535 A1 | 2/2006 | Hotelling et al. |
| 2006/0026536 A1 | 2/2006 | Hotelling et al. |
| 2006/0031776 A1 | 2/2006 | Glein et al. |
| 2006/0033724 A1 | 2/2006 | Chaudhri et al. |
| 2006/0036971 A1 | 2/2006 | Mendel et al. |
| 2006/0041846 A1 | 2/2006 | Masselle et al. |
| 2006/0055662 A1 | 3/2006 | Rimas-Ribikauskas et al. |
| 2006/0059436 A1 | 3/2006 | Nurmi |
| 2006/0067677 A1 | 3/2006 | Tokiwa et al. |
| 2006/0101347 A1 | 5/2006 | Runov et al. |
| 2006/0107226 A1 | 5/2006 | Matthews et al. |
| 2006/0109252 A1 | 5/2006 | Kolmykov-Zotov et al. |
| 2006/0109256 A1 | 5/2006 | Grant et al. |
| 2006/0119586 A1 | 6/2006 | Grant et al. |
| 2006/0132455 A1 | 6/2006 | Rimas-Ribikauskas et al. |
| 2006/0132456 A1 | 6/2006 | Anson |
| 2006/0132457 A1 | 6/2006 | Rimas-Ribikauskas et al. |
| 2006/0136834 A1 | 6/2006 | Cao et al. |
| 2006/0136845 A1 | 6/2006 | Rimas-Ribikauskas et al. |
| 2006/0161861 A1 | 7/2006 | Holecek et al. |
| 2006/0161868 A1 | 7/2006 | Van et al. |
| 2006/0161870 A1 | 7/2006 | Hotelling et al. |
| 2006/0190834 A1 | 8/2006 | Marcjan |
| 2006/0195438 A1* | 8/2006 | Galuten ............ G06F 17/30011 |
| 2006/0197753 A1 | 9/2006 | Hotelling |
| 2006/0212812 A1 | 9/2006 | Simmons et al. |
| 2006/0213754 A1 | 9/2006 | Jarrett et al. |
| 2006/0224986 A1 | 10/2006 | Lindsay et al. |
| 2006/0224989 A1 | 10/2006 | Pettiross et al. |
| 2006/0233248 A1 | 10/2006 | Rynderman et al. |
| 2006/0242602 A1 | 10/2006 | Schechter et al. |
| 2006/0265653 A1 | 11/2006 | Paasonen et al. |
| 2006/0274042 A1 | 12/2006 | Krah et al. |
| 2006/0274086 A1 | 12/2006 | Forstall et al. |
| 2006/0277469 A1 | 12/2006 | Chaudhri et al. |
| 2006/0282778 A1 | 12/2006 | Barsness et al. |
| 2006/0284858 A1 | 12/2006 | Rekimoto |
| 2006/0290681 A1 | 12/2006 | Ho et al. |
| 2007/0004451 A1 | 1/2007 | Anderson |
| 2007/0004461 A1 | 1/2007 | Bathina et al. |
| 2007/0024595 A1 | 2/2007 | Baker et al. |
| 2007/0024646 A1 | 2/2007 | Saarinen et al. |
| 2007/0070066 A1 | 3/2007 | Bakhash |
| 2007/0080953 A1 | 4/2007 | Lii |
| 2007/0113681 A1 | 5/2007 | Nishimura et al. |
| 2007/0115264 A1 | 5/2007 | Yu et al. |
| 2007/0120835 A1 | 5/2007 | Sato |
| 2007/0124699 A1 | 5/2007 | Michaels |
| 2007/0128899 A1 | 6/2007 | Mayer |
| 2007/0152959 A1 | 7/2007 | Peters |
| 2007/0152980 A1 | 7/2007 | Kocienda et al. |
| 2007/0157089 A1 | 7/2007 | Van Os et al. |
| 2007/0157173 A1 | 7/2007 | Klein et al. |
| 2007/0168369 A1 | 7/2007 | Bruns |
| 2007/0168890 A1 | 7/2007 | Zhao et al. |
| 2007/0176904 A1 | 8/2007 | Russo |
| 2007/0182999 A1 | 8/2007 | Anthony et al. |
| 2007/0186178 A1 | 8/2007 | Schiller |
| 2007/0220445 A1 | 9/2007 | Yach et al. |
| 2007/0222768 A1 | 9/2007 | Geurts et al. |
| 2007/0226327 A1 | 9/2007 | Redpath |
| 2007/0229455 A1 | 10/2007 | Martin et al. |
| 2007/0229464 A1 | 10/2007 | Hotelling et al. |
| 2007/0236450 A1 | 10/2007 | Colgate et al. |
| 2007/0236477 A1 | 10/2007 | Ryu et al. |
| 2007/0245241 A1 | 10/2007 | Bertram et al. |
| 2007/0245249 A1 | 10/2007 | Weisberg |
| 2007/0257821 A1 | 11/2007 | Son et al. |
| 2007/0262964 A1 | 11/2007 | Zotov et al. |
| 2007/0270186 A1 | 11/2007 | Gulliksson et al. |
| 2007/0294295 A1 | 12/2007 | Finkelstein et al. |
| 2007/0294639 A1 | 12/2007 | Van Berkel et al. |
| 2007/0296333 A1 | 12/2007 | Kim et al. |
| 2007/0299923 A1* | 12/2007 | Skelly ............... G06Q 10/107 709/206 |
| 2008/0001924 A1 | 1/2008 | de los Reyes et al. |
| 2008/0024459 A1 | 1/2008 | Poupyrev et al. |
| 2008/0034306 A1 | 2/2008 | Ording |
| 2008/0034331 A1 | 2/2008 | Josephsoon et al. |
| 2008/0036743 A1 | 2/2008 | Westerman et al. |
| 2008/0051989 A1 | 2/2008 | Welsh |
| 2008/0052945 A1 | 3/2008 | Matas et al. |
| 2008/0066010 A1 | 3/2008 | Brodersen et al. |
| 2008/0094367 A1 | 4/2008 | Van De Ven et al. |
| 2008/0094368 A1 | 4/2008 | Ording et al. |
| 2008/0094398 A1 | 4/2008 | NG et al. |

(56) References Cited

U.S. PATENT DOCUMENTS

| | | |
|---|---|---|
| 2008/0106523 A1 | 5/2008 | Conrad |
| 2008/0109753 A1 | 5/2008 | Karstens |
| 2008/0136790 A1 | 6/2008 | Hio |
| 2008/0155415 A1 | 6/2008 | Yoon et al. |
| 2008/0163119 A1 | 7/2008 | Kim et al. |
| 2008/0165144 A1 | 7/2008 | Forstall et al. |
| 2008/0165152 A1 | 7/2008 | Forstall et al. |
| 2008/0168379 A1 | 7/2008 | Forstall et al. |
| 2008/0168395 A1 | 7/2008 | Ording et al. |
| 2008/0168401 A1 | 7/2008 | Boule et al. |
| 2008/0168403 A1 | 7/2008 | Westerman et al. |
| 2008/0168404 A1 | 7/2008 | Ording |
| 2008/0202824 A1 | 8/2008 | Philipp et al. |
| 2008/0204424 A1 | 8/2008 | Jin et al. |
| 2008/0204427 A1 | 8/2008 | Heesemans et al. |
| 2008/0211959 A1 | 9/2008 | Balram et al. |
| 2008/0219493 A1 | 9/2008 | Tadmor |
| 2008/0222545 A1 | 9/2008 | Lemay et al. |
| 2008/0222569 A1 | 9/2008 | Champion et al. |
| 2008/0244448 A1 | 10/2008 | Goering et al. |
| 2008/0259046 A1 | 10/2008 | Carsanaro |
| 2008/0263452 A1 | 10/2008 | Tomkins |
| 2008/0270910 A1 | 10/2008 | Lukasik et al. |
| 2008/0284866 A1 | 11/2008 | Mizutani |
| 2008/0294984 A1 | 11/2008 | Ramsay et al. |
| 2008/0297475 A1 | 12/2008 | Woolf et al. |
| 2008/0303799 A1 | 12/2008 | Schwesig et al. |
| 2008/0307335 A1 | 12/2008 | Chaudhri et al. |
| 2008/0307351 A1 | 12/2008 | Louch et al. |
| 2008/0307359 A1 | 12/2008 | Louch et al. |
| 2008/0307360 A1 | 12/2008 | Chaudhri et al. |
| 2008/0316183 A1 | 12/2008 | Westerman et al. |
| 2008/0317378 A1 | 12/2008 | Steinberg et al. |
| 2008/0320391 A1 | 12/2008 | Lemay et al. |
| 2008/0320419 A1 | 12/2008 | Matas et al. |
| 2009/0002392 A1 | 1/2009 | Hou et al. |
| 2009/0007017 A1 | 1/2009 | Anzures et al. |
| 2009/0036108 A1 | 2/2009 | Cho |
| 2009/0037846 A1 | 2/2009 | Spalink et al. |
| 2009/0046110 A1 | 2/2009 | Sadler et al. |
| 2009/0051667 A1 | 2/2009 | Park et al. |
| 2009/0058828 A1 | 3/2009 | Jiang et al. |
| 2009/0061837 A1 | 3/2009 | Chaudhri et al. |
| 2009/0066668 A1 | 3/2009 | Kim et al. |
| 2009/0073118 A1 | 3/2009 | Yamaji et al. |
| 2009/0083665 A1 | 3/2009 | Anttila et al. |
| 2009/0085878 A1 | 4/2009 | Heubel et al. |
| 2009/0085881 A1 | 4/2009 | Keam |
| 2009/0085886 A1 | 4/2009 | Huang et al. |
| 2009/0089293 A1 | 4/2009 | Garritano et al. |
| 2009/0094562 A1 | 4/2009 | Jeong et al. |
| 2009/0100343 A1 | 4/2009 | Lee et al. |
| 2009/0102804 A1 | 4/2009 | Wong et al. |
| 2009/0102805 A1 | 4/2009 | Meijer et al. |
| 2009/0140985 A1 | 6/2009 | Liu |
| 2009/0158198 A1 | 6/2009 | Hayter et al. |
| 2009/0160793 A1 | 6/2009 | Rekimoto |
| 2009/0160814 A1 | 6/2009 | Li et al. |
| 2009/0167507 A1 | 7/2009 | Maenpaa |
| 2009/0167508 A1 | 7/2009 | Fadell et al. |
| 2009/0167509 A1 | 7/2009 | Fadell et al. |
| 2009/0167704 A1 | 7/2009 | Terlizzi et al. |
| 2009/0167728 A1 | 7/2009 | Geaghan et al. |
| 2009/0169061 A1 | 7/2009 | Anderson et al. |
| 2009/0187824 A1 | 7/2009 | Hinckley et al. |
| 2009/0197635 A1 | 8/2009 | Kim et al. |
| 2009/0198767 A1 | 8/2009 | Jakobson et al. |
| 2009/0219294 A1 | 9/2009 | Young et al. |
| 2009/0225037 A1 | 9/2009 | Williamson et al. |
| 2009/0228842 A1 | 9/2009 | Westerman et al. |
| 2009/0237374 A1 | 9/2009 | Li et al. |
| 2009/0247112 A1 | 10/2009 | Lundy et al. |
| 2009/0247230 A1 | 10/2009 | Lundy et al. |
| 2009/0256947 A1 | 10/2009 | Ciurea et al. |
| 2009/0259975 A1 | 10/2009 | Asai et al. |
| 2009/0267906 A1 | 10/2009 | Schroderus |
| 2009/0276730 A1 | 11/2009 | Aybes et al. |
| 2009/0280860 A1 | 11/2009 | Dahlke |
| 2009/0282360 A1 | 11/2009 | Park et al. |
| 2009/0288032 A1 | 11/2009 | Chang et al. |
| 2009/0293007 A1 | 11/2009 | Duarte et al. |
| 2009/0293009 A1 | 11/2009 | Meserth et al. |
| 2009/0303187 A1 | 12/2009 | Pallakoff |
| 2009/0307633 A1 | 12/2009 | Haughay, Jr. et al. |
| 2009/0322893 A1 | 12/2009 | Stallings et al. |
| 2010/0007926 A1 | 1/2010 | Imaizumi et al. |
| 2010/0011304 A1 | 1/2010 | Van Os |
| 2010/0013613 A1 | 1/2010 | Weston |
| 2010/0013777 A1 | 1/2010 | Baudisch et al. |
| 2010/0017710 A1 | 1/2010 | Kim et al. |
| 2010/0023858 A1 | 1/2010 | Ryu et al. |
| 2010/0026640 A1 | 2/2010 | Kim et al. |
| 2010/0026647 A1 | 2/2010 | Abe et al. |
| 2010/0039446 A1 | 2/2010 | Hillis et al. |
| 2010/0044121 A1 | 2/2010 | Simon et al. |
| 2010/0057235 A1 | 3/2010 | Wang et al. |
| 2010/0058231 A1 | 3/2010 | Duarte et al. |
| 2010/0070908 A1 | 3/2010 | Mori et al. |
| 2010/0073329 A1 | 3/2010 | Raman et al. |
| 2010/0083116 A1 | 4/2010 | Akifusa et al. |
| 2010/0085302 A1 | 4/2010 | Fairweather et al. |
| 2010/0085314 A1 | 4/2010 | Kwok |
| 2010/0085317 A1 | 4/2010 | Park et al. |
| 2010/0088596 A1 | 4/2010 | Griffin et al. |
| 2010/0088628 A1 | 4/2010 | Flygh et al. |
| 2010/0088639 A1 | 4/2010 | Yach et al. |
| 2010/0090988 A1 | 4/2010 | Park |
| 2010/0110082 A1 | 5/2010 | Myrick et al. |
| 2010/0111434 A1 | 5/2010 | Madden |
| 2010/0125816 A1 | 5/2010 | Bezos |
| 2010/0127983 A1 | 5/2010 | Irani et al. |
| 2010/0128002 A1 | 5/2010 | Stacy et al. |
| 2010/0138776 A1 | 6/2010 | Korhonen |
| 2010/0148999 A1 | 6/2010 | Casparian et al. |
| 2010/0149096 A1 | 6/2010 | Migos et al. |
| 2010/0153879 A1 | 6/2010 | Rimas-Ribikauskas et al. |
| 2010/0156812 A1 | 6/2010 | Stallings et al. |
| 2010/0156813 A1 | 6/2010 | Duarte et al. |
| 2010/0156818 A1 | 6/2010 | Burrough et al. |
| 2010/0156823 A1 | 6/2010 | Paleczny et al. |
| 2010/0156825 A1 | 6/2010 | Sohn et al. |
| 2010/0175023 A1 | 7/2010 | Gatlin et al. |
| 2010/0180225 A1 | 7/2010 | Chiba et al. |
| 2010/0194693 A1 | 8/2010 | Selin et al. |
| 2010/0199227 A1 | 8/2010 | Xiao et al. |
| 2010/0211872 A1 | 8/2010 | Rolston et al. |
| 2010/0214239 A1 | 8/2010 | Wu |
| 2010/0214257 A1 | 8/2010 | Wussler et al. |
| 2010/0225604 A1 | 9/2010 | Homma et al. |
| 2010/0228644 A1 | 9/2010 | Schluetter |
| 2010/0231534 A1 | 9/2010 | Chaudhri et al. |
| 2010/0235726 A1 | 9/2010 | Ording et al. |
| 2010/0235735 A1 | 9/2010 | Ording et al. |
| 2010/0235746 A1 | 9/2010 | Anzures |
| 2010/0251168 A1 | 9/2010 | Fujita et al. |
| 2010/0269039 A1 | 10/2010 | Pahlavan et al. |
| 2010/0271312 A1 | 10/2010 | Alameh et al. |
| 2010/0271500 A1 | 10/2010 | Park et al. |
| 2010/0277419 A1 | 11/2010 | Ganey et al. |
| 2010/0277496 A1 | 11/2010 | Kawanishi et al. |
| 2010/0281379 A1 | 11/2010 | Meaney et al. |
| 2010/0281385 A1 | 11/2010 | Meaney et al. |
| 2010/0289807 A1 | 11/2010 | Yu et al. |
| 2010/0299597 A1 | 11/2010 | Shin et al. |
| 2010/0302177 A1 | 12/2010 | Kim et al. |
| 2010/0302179 A1 | 12/2010 | Ahn et al. |
| 2010/0306702 A1 | 12/2010 | Warner |
| 2010/0308983 A1 | 12/2010 | Conte et al. |
| 2010/0309147 A1 | 12/2010 | Fleizach et al. |
| 2010/0313124 A1 | 12/2010 | Privault et al. |
| 2010/0313156 A1 | 12/2010 | Louch et al. |
| 2010/0313158 A1 | 12/2010 | Lee et al. |
| 2010/0313166 A1 | 12/2010 | Nakayama et al. |
| 2010/0315417 A1 | 12/2010 | Cho et al. |

(56) References Cited

U.S. PATENT DOCUMENTS

| | | |
|---|---|---|
| 2010/0315438 A1 | 12/2010 | Horodezky et al. |
| 2010/0321301 A1 | 12/2010 | Casparian et al. |
| 2010/0325578 A1 | 12/2010 | Mital et al. |
| 2011/0010626 A1 | 1/2011 | Fino et al. |
| 2011/0018695 A1 | 1/2011 | Bells et al. |
| 2011/0035145 A1 | 2/2011 | Yamasaki |
| 2011/0035662 A1 | 2/2011 | King et al. |
| 2011/0043652 A1 | 2/2011 | King et al. |
| 2011/0050576 A1 | 3/2011 | Forutanpour et al. |
| 2011/0050588 A1 | 3/2011 | Li et al. |
| 2011/0050591 A1 | 3/2011 | Kim et al. |
| 2011/0050594 A1 | 3/2011 | Kim et al. |
| 2011/0050629 A1 | 3/2011 | Homma et al. |
| 2011/0050630 A1 | 3/2011 | Ikeda |
| 2011/0050653 A1 | 3/2011 | Miyazawa et al. |
| 2011/0054837 A1 | 3/2011 | Ikeda |
| 2011/0055135 A1 | 3/2011 | Dawson et al. |
| 2011/0055741 A1 | 3/2011 | Jeon et al. |
| 2011/0057903 A1 | 3/2011 | Yamano et al. |
| 2011/0061029 A1 | 3/2011 | Yeh et al. |
| 2011/0063248 A1 | 3/2011 | Yoon |
| 2011/0069012 A1 | 3/2011 | Martensson |
| 2011/0069016 A1 | 3/2011 | Victor |
| 2011/0074697 A1 | 3/2011 | Rapp et al. |
| 2011/0080350 A1 | 4/2011 | Almalki et al. |
| 2011/0084910 A1 | 4/2011 | Almalki et al. |
| 2011/0087982 A1 | 4/2011 | McCann et al. |
| 2011/0087983 A1 | 4/2011 | Shim |
| 2011/0093815 A1 | 4/2011 | Gobeil |
| 2011/0093817 A1 | 4/2011 | Song et al. |
| 2011/0096174 A1 | 4/2011 | King et al. |
| 2011/0107272 A1 | 5/2011 | Aguilar |
| 2011/0115721 A1 | 5/2011 | Li et al. |
| 2011/0116716 A1 | 5/2011 | Kwon et al. |
| 2011/0122087 A1 | 5/2011 | Jang et al. |
| 2011/0126139 A1 | 5/2011 | Jeong et al. |
| 2011/0138295 A1 | 6/2011 | Momchilov et al. |
| 2011/0141031 A1 | 6/2011 | McCullough et al. |
| 2011/0141052 A1 | 6/2011 | Bernstein et al. |
| 2011/0144777 A1 | 6/2011 | Firkins et al. |
| 2011/0145068 A1 | 6/2011 | King et al. |
| 2011/0145752 A1 | 6/2011 | Fagans |
| 2011/0145753 A1 | 6/2011 | Prakash |
| 2011/0145764 A1 | 6/2011 | Higuchi et al. |
| 2011/0149138 A1 | 6/2011 | Watkins |
| 2011/0163971 A1 | 7/2011 | Wagner et al. |
| 2011/0164042 A1 | 7/2011 | Chaudhri |
| 2011/0167058 A1 | 7/2011 | Van Os |
| 2011/0167339 A1 | 7/2011 | Lemay |
| 2011/0167369 A1* | 7/2011 | van Os ............... G06F 3/0483 715/769 |
| 2011/0167382 A1 | 7/2011 | Van Os |
| 2011/0169765 A1 | 7/2011 | Aono |
| 2011/0175830 A1 | 7/2011 | Miyazawa et al. |
| 2011/0179368 A1 | 7/2011 | King et al. |
| 2011/0179381 A1 | 7/2011 | King |
| 2011/0181538 A1 | 7/2011 | Aono |
| 2011/0185299 A1 | 7/2011 | Hinckley et al. |
| 2011/0185300 A1 | 7/2011 | Hinckley et al. |
| 2011/0185316 A1 | 7/2011 | Reid et al. |
| 2011/0193788 A1 | 8/2011 | King et al. |
| 2011/0193809 A1 | 8/2011 | Walley et al. |
| 2011/0193881 A1 | 8/2011 | Rydenhag |
| 2011/0197160 A1 | 8/2011 | Kim et al. |
| 2011/0201387 A1 | 8/2011 | Paek et al. |
| 2011/0202834 A1 | 8/2011 | Mandryk et al. |
| 2011/0202853 A1 | 8/2011 | Mujkic |
| 2011/0202872 A1 | 8/2011 | Park |
| 2011/0202879 A1 | 8/2011 | Stovicek et al. |
| 2011/0205163 A1 | 8/2011 | Hinckley et al. |
| 2011/0209088 A1 | 8/2011 | Hinckley et al. |
| 2011/0209093 A1 | 8/2011 | Hinckley et al. |
| 2011/0209097 A1 | 8/2011 | Hinckley et al. |
| 2011/0209099 A1 | 8/2011 | Hinckley et al. |
| 2011/0209104 A1 | 8/2011 | Hinckley et al. |
| 2011/0210931 A1 | 9/2011 | Shai |
| 2011/0215914 A1 | 9/2011 | Edwards |
| 2011/0221684 A1 | 9/2011 | Rydenhag |
| 2011/0221776 A1 | 9/2011 | Shimotani et al. |
| 2011/0231789 A1 | 9/2011 | Bukurak et al. |
| 2011/0238690 A1 | 9/2011 | Arrasvouri et al. |
| 2011/0239110 A1 | 9/2011 | Garrett et al. |
| 2011/0242029 A1 | 10/2011 | Kasahara et al. |
| 2011/0246877 A1 | 10/2011 | Kwak et al. |
| 2011/0248916 A1 | 10/2011 | Griffin et al. |
| 2011/0248948 A1 | 10/2011 | Griffin et al. |
| 2011/0252346 A1 | 10/2011 | Chaudhri |
| 2011/0252357 A1 | 10/2011 | Chaudhri |
| 2011/0252362 A1 | 10/2011 | Cho et al. |
| 2011/0252376 A1 | 10/2011 | Chaudhri et al. |
| 2011/0258537 A1 | 10/2011 | Rives et al. |
| 2011/0258582 A1 | 10/2011 | Bang |
| 2011/0263298 A1 | 10/2011 | Park |
| 2011/0267530 A1 | 11/2011 | Chun |
| 2011/0279380 A1 | 11/2011 | Weber et al. |
| 2011/0279381 A1 | 11/2011 | Tong et al. |
| 2011/0279395 A1 | 11/2011 | Kuwabara et al. |
| 2011/0279852 A1 | 11/2011 | Oda et al. |
| 2011/0285656 A1 | 11/2011 | Yaksick et al. |
| 2011/0285659 A1 | 11/2011 | Kuwabara et al. |
| 2011/0291945 A1 | 12/2011 | Ewing, Jr. et al. |
| 2011/0291951 A1 | 12/2011 | Tong |
| 2011/0296333 A1 | 12/2011 | Bateman et al. |
| 2011/0296334 A1 | 12/2011 | Ryu et al. |
| 2011/0296351 A1 | 12/2011 | Ewing, Jr. et al. |
| 2011/0304559 A1 | 12/2011 | Pasquero |
| 2011/0304577 A1 | 12/2011 | Brown et al. |
| 2011/0307778 A1 | 12/2011 | Tsai et al. |
| 2011/0310049 A1 | 12/2011 | Homma et al. |
| 2012/0005622 A1 | 1/2012 | Park et al. |
| 2012/0011437 A1 | 1/2012 | James et al. |
| 2012/0013541 A1 | 1/2012 | Boka et al. |
| 2012/0013542 A1 | 1/2012 | Shenfield |
| 2012/0019448 A1 | 1/2012 | Pitkanen et al. |
| 2012/0026110 A1 | 2/2012 | Yamano |
| 2012/0036441 A1 | 2/2012 | Basir et al. |
| 2012/0036556 A1 | 2/2012 | LeBeau et al. |
| 2012/0038580 A1 | 2/2012 | Sasaki |
| 2012/0044153 A1 | 2/2012 | Arrasvouri et al. |
| 2012/0056837 A1 | 3/2012 | Park et al. |
| 2012/0056848 A1 | 3/2012 | Yamano et al. |
| 2012/0062564 A1 | 3/2012 | Miyashita et al. |
| 2012/0062604 A1 | 3/2012 | Lobo |
| 2012/0062732 A1 | 3/2012 | Marman et al. |
| 2012/0066630 A1 | 3/2012 | Kim et al. |
| 2012/0066648 A1 | 3/2012 | Rolleston et al. |
| 2012/0081375 A1 | 4/2012 | Robert et al. |
| 2012/0084689 A1 | 4/2012 | Ledet et al. |
| 2012/0084713 A1 | 4/2012 | Desai et al. |
| 2012/0089932 A1 | 4/2012 | Kano et al. |
| 2012/0089942 A1* | 4/2012 | Gammon ............... G06F 3/048 715/784 |
| 2012/0089951 A1 | 4/2012 | Cassidy |
| 2012/0092355 A1 | 4/2012 | Yamamoto et al. |
| 2012/0096393 A1 | 4/2012 | Shim et al. |
| 2012/0096400 A1 | 4/2012 | Cho |
| 2012/0098780 A1 | 4/2012 | Fujisawa et al. |
| 2012/0102437 A1 | 4/2012 | Worley et al. |
| 2012/0105358 A1 | 5/2012 | Momeyer et al. |
| 2012/0105367 A1 | 5/2012 | Son et al. |
| 2012/0106852 A1 | 5/2012 | Khawand et al. |
| 2012/0113007 A1 | 5/2012 | Koch et al. |
| 2012/0113023 A1 | 5/2012 | Koch et al. |
| 2012/0126962 A1 | 5/2012 | Ujii et al. |
| 2012/0131495 A1 | 5/2012 | Goossens et al. |
| 2012/0139864 A1 | 6/2012 | Sleeman et al. |
| 2012/0146945 A1 | 6/2012 | Miyazawa et al. |
| 2012/0147052 A1 | 6/2012 | Homma et al. |
| 2012/0154328 A1 | 6/2012 | Kono |
| 2012/0154329 A1 | 6/2012 | Shinozaki |
| 2012/0159380 A1 | 6/2012 | Kocienda et al. |
| 2012/0169646 A1 | 7/2012 | Berkes et al. |
| 2012/0169716 A1 | 7/2012 | Mihara |
| 2012/0176403 A1 | 7/2012 | Cha et al. |

(56) References Cited

U.S. PATENT DOCUMENTS

| | | |
|---|---|---|
| 2012/0179967 A1 | 7/2012 | Hayes |
| 2012/0182226 A1 | 7/2012 | Tuli |
| 2012/0183271 A1 | 7/2012 | Forutanpour et al. |
| 2012/0206393 A1 | 8/2012 | Hillis et al. |
| 2012/0216114 A1 | 8/2012 | Privault et al. |
| 2012/0216139 A1 | 8/2012 | Ording et al. |
| 2012/0216143 A1 | 8/2012 | Shiplacoff et al. |
| 2012/0218203 A1 | 8/2012 | Kanki |
| 2012/0218304 A1 | 8/2012 | Anzures et al. |
| 2012/0235912 A1 | 9/2012 | Laubach |
| 2012/0240044 A1 | 9/2012 | Johnson et al. |
| 2012/0249575 A1 | 10/2012 | Krolczyk et al. |
| 2012/0249853 A1 | 10/2012 | Krolczyk et al. |
| 2012/0256846 A1 | 10/2012 | Mak |
| 2012/0256847 A1 | 10/2012 | Mak et al. |
| 2012/0256857 A1 | 10/2012 | Mak |
| 2012/0257071 A1 | 10/2012 | Prentice |
| 2012/0260220 A1 | 10/2012 | Griffin |
| 2012/0274591 A1 | 11/2012 | Rimas-Ribikauskas et al. |
| 2012/0274662 A1 | 11/2012 | Kim et al. |
| 2012/0284673 A1 | 11/2012 | Lamb et al. |
| 2012/0293449 A1 | 11/2012 | Dietz |
| 2012/0293551 A1 | 11/2012 | Momeyer et al. |
| 2012/0297041 A1 | 11/2012 | Momchilov |
| 2012/0299859 A1 | 11/2012 | Kinoshita |
| 2012/0304108 A1 | 11/2012 | Jarrett et al. |
| 2012/0304132 A1 | 11/2012 | Sareen et al. |
| 2012/0304133 A1 | 11/2012 | Nan et al. |
| 2012/0306748 A1 | 12/2012 | Fleizach et al. |
| 2012/0306764 A1 | 12/2012 | Kamibeppu |
| 2012/0306765 A1 | 12/2012 | Moore |
| 2012/0306766 A1 | 12/2012 | Moore |
| 2012/0306772 A1 | 12/2012 | Tan et al. |
| 2012/0306778 A1 | 12/2012 | Wheeldreyer et al. |
| 2012/0306927 A1 | 12/2012 | Lee et al. |
| 2012/0311429 A1 | 12/2012 | Decker et al. |
| 2012/0311437 A1 | 12/2012 | Weeldreyer et al. |
| 2012/0311498 A1 | 12/2012 | Kluttz et al. |
| 2013/0002561 A1 | 1/2013 | Wakasa |
| 2013/0016042 A1 | 1/2013 | Makinen et al. |
| 2013/0016122 A1 | 1/2013 | Bhatt et al. |
| 2013/0019158 A1 | 1/2013 | Watanabe |
| 2013/0019174 A1 | 1/2013 | Gil et al. |
| 2013/0031514 A1 | 1/2013 | Gabbert |
| 2013/0036386 A1 | 2/2013 | Park et al. |
| 2013/0044062 A1 | 2/2013 | Bose et al. |
| 2013/0047100 A1 | 2/2013 | Kroeger et al. |
| 2013/0050131 A1 | 2/2013 | Lee et al. |
| 2013/0050143 A1 | 2/2013 | Kim et al. |
| 2013/0061172 A1 | 3/2013 | Huang et al. |
| 2013/0063389 A1 | 3/2013 | Moore |
| 2013/0067383 A1 | 3/2013 | Kataoka et al. |
| 2013/0067513 A1 | 3/2013 | Takami |
| 2013/0067527 A1 | 3/2013 | Ashbook et al. |
| 2013/0074003 A1 | 3/2013 | Dolenc |
| 2013/0077804 A1 | 3/2013 | Glebe et al. |
| 2013/0080923 A1 | 3/2013 | Anzures et al. |
| 2013/0082824 A1 | 4/2013 | Colley |
| 2013/0086056 A1 | 4/2013 | Dyor et al. |
| 2013/0093691 A1 | 4/2013 | Moosavi |
| 2013/0093764 A1 | 4/2013 | Andersson et al. |
| 2013/0097520 A1 | 4/2013 | Lewin et al. |
| 2013/0097521 A1 | 4/2013 | Lewin et al. |
| 2013/0097534 A1 | 4/2013 | Lewin et al. |
| 2013/0097539 A1 | 4/2013 | Mansson et al. |
| 2013/0097556 A1 | 4/2013 | Louch |
| 2013/0097564 A1 | 4/2013 | Kermoian et al. |
| 2013/0106766 A1 | 5/2013 | Yilmaz et al. |
| 2013/0111398 A1 | 5/2013 | Lu et al. |
| 2013/0113715 A1 | 5/2013 | Grant et al. |
| 2013/0113720 A1 | 5/2013 | Van Eerd et al. |
| 2013/0120278 A1 | 5/2013 | Cantrell |
| 2013/0120295 A1 | 5/2013 | Kim et al. |
| 2013/0120306 A1 | 5/2013 | Furukawa |
| 2013/0135243 A1 | 5/2013 | Hirsch et al. |
| 2013/0135499 A1 | 5/2013 | Song |
| 2013/0141364 A1 | 6/2013 | Lynn et al. |
| 2013/0141396 A1 | 6/2013 | Lynn et al. |
| 2013/0145313 A1 | 6/2013 | Roh et al. |
| 2013/0154948 A1 | 6/2013 | Schediwy et al. |
| 2013/0154959 A1 | 6/2013 | Lindsay et al. |
| 2013/0155018 A1 | 6/2013 | Dagdeviren |
| 2013/0159893 A1 | 6/2013 | Lewis et al. |
| 2013/0162603 A1 | 6/2013 | Peng et al. |
| 2013/0162667 A1 | 6/2013 | Eskolin et al. |
| 2013/0169549 A1 | 7/2013 | Seymour et al. |
| 2013/0174049 A1 | 7/2013 | Townsend et al. |
| 2013/0174089 A1 | 7/2013 | KI |
| 2013/0174094 A1 | 7/2013 | Heo et al. |
| 2013/0174179 A1 | 7/2013 | Park et al. |
| 2013/0179840 A1 | 7/2013 | Fisher et al. |
| 2013/0191791 A1 | 7/2013 | Rydenhag et al. |
| 2013/0194217 A1 | 8/2013 | Lee et al. |
| 2013/0198690 A1 | 8/2013 | Barsoum et al. |
| 2013/0212515 A1 | 8/2013 | Eleftheriou |
| 2013/0212541 A1 | 8/2013 | Dolenc et al. |
| 2013/0215079 A1 | 8/2013 | Johnson et al. |
| 2013/0222274 A1 | 8/2013 | Mori et al. |
| 2013/0222671 A1 | 8/2013 | Tseng et al. |
| 2013/0227419 A1 | 8/2013 | Lee et al. |
| 2013/0227450 A1 | 8/2013 | Na et al. |
| 2013/0232402 A1 | 9/2013 | Lu et al. |
| 2013/0232445 A1 | 9/2013 | Ording et al. |
| 2013/0234929 A1 | 9/2013 | Libin |
| 2013/0239057 A1 | 9/2013 | Ubillos et al. |
| 2013/0249814 A1 | 9/2013 | Zeng |
| 2013/0257793 A1 | 10/2013 | Zeliff et al. |
| 2013/0257817 A1 | 10/2013 | Yliaho |
| 2013/0265246 A1 | 10/2013 | Tae |
| 2013/0268875 A1 | 10/2013 | Han et al. |
| 2013/0278520 A1 | 10/2013 | Weng et al. |
| 2013/0305184 A1 | 11/2013 | Kim et al. |
| 2013/0307792 A1 | 11/2013 | Andres et al. |
| 2013/0321340 A1 | 12/2013 | Seo et al. |
| 2013/0321457 A1 | 12/2013 | Bauermeister et al. |
| 2013/0325342 A1 | 12/2013 | Pylappan et al. |
| 2013/0326420 A1 | 12/2013 | Liu et al. |
| 2013/0326421 A1 | 12/2013 | Jo |
| 2013/0328770 A1 | 12/2013 | Parham |
| 2013/0332836 A1 | 12/2013 | Cho |
| 2013/0332892 A1 | 12/2013 | Matsuki |
| 2013/0339909 A1 | 12/2013 | Ha |
| 2014/0002355 A1 | 1/2014 | Lee et al. |
| 2014/0002374 A1 | 1/2014 | Hunt et al. |
| 2014/0002386 A1 | 1/2014 | Rosenberg et al. |
| 2014/0026098 A1 | 1/2014 | Gilman |
| 2014/0028571 A1 | 1/2014 | St. Clair |
| 2014/0028601 A1 | 1/2014 | Moore |
| 2014/0049491 A1 | 2/2014 | Nagar et al. |
| 2014/0055367 A1 | 2/2014 | Dearman et al. |
| 2014/0055377 A1 | 2/2014 | Kim |
| 2014/0059460 A1 | 2/2014 | Ho |
| 2014/0059485 A1 | 2/2014 | Lehrian et al. |
| 2014/0063316 A1 | 3/2014 | Lee et al. |
| 2014/0063541 A1 | 3/2014 | Yamazaki |
| 2014/0072281 A1 | 3/2014 | Cho et al. |
| 2014/0072283 A1 | 3/2014 | Cho et al. |
| 2014/0078318 A1 | 3/2014 | Alameh |
| 2014/0078343 A1 | 3/2014 | Dai et al. |
| 2014/0082536 A1 | 3/2014 | Costa et al. |
| 2014/0092025 A1 | 4/2014 | Pala et al. |
| 2014/0092030 A1 | 4/2014 | Van der Velden |
| 2014/0108936 A1 | 4/2014 | Khosropour et al. |
| 2014/0109016 A1 | 4/2014 | Ouyang et al. |
| 2014/0111456 A1 | 4/2014 | Kashiwa et al. |
| 2014/0111670 A1 | 4/2014 | Lord et al. |
| 2014/0118268 A1 | 5/2014 | Kuscher |
| 2014/0139471 A1 | 5/2014 | Matsuki |
| 2014/0152581 A1 | 6/2014 | Case et al. |
| 2014/0157203 A1 | 6/2014 | Jeon et al. |
| 2014/0160063 A1 | 6/2014 | Yairi et al. |
| 2014/0160073 A1 | 6/2014 | Matsuki |
| 2014/0164955 A1 | 6/2014 | Thiruvidam et al. |
| 2014/0164966 A1 | 6/2014 | Kim et al. |

(56) References Cited

U.S. PATENT DOCUMENTS

| | | |
|---|---|---|
| 2014/0165006 A1 | 6/2014 | Chaudhri et al. |
| 2014/0168093 A1 | 6/2014 | Lawrence |
| 2014/0168153 A1 | 6/2014 | Deichmann et al. |
| 2014/0173517 A1 | 6/2014 | Chaudhri |
| 2014/0184526 A1 | 7/2014 | Cho |
| 2014/0201660 A1 | 7/2014 | Clausen et al. |
| 2014/0208271 A1 | 7/2014 | Bell et al. |
| 2014/0210753 A1 | 7/2014 | Lee et al. |
| 2014/0210758 A1 | 7/2014 | Park et al. |
| 2014/0210760 A1 | 7/2014 | Aberg et al. |
| 2014/0210798 A1 | 7/2014 | Wilson |
| 2014/0229888 A1 | 8/2014 | Ko et al. |
| 2014/0237408 A1 | 8/2014 | Ohlsson et al. |
| 2014/0245202 A1 | 8/2014 | Yoon et al. |
| 2014/0245367 A1 | 8/2014 | Sasaki et al. |
| 2014/0267114 A1 | 9/2014 | Lisseman et al. |
| 2014/0267135 A1 | 9/2014 | Chhabra |
| 2014/0267362 A1 | 9/2014 | Kocienda et al. |
| 2014/0282084 A1 | 9/2014 | Murarka et al. |
| 2014/0282214 A1 | 9/2014 | Shirzadi et al. |
| 2014/0300569 A1 | 10/2014 | Matsuki et al. |
| 2014/0304651 A1 | 10/2014 | Johansson et al. |
| 2014/0306897 A1 | 10/2014 | Cueto |
| 2014/0306899 A1 | 10/2014 | Hicks |
| 2014/0310638 A1 | 10/2014 | Lee et al. |
| 2014/0313130 A1 | 10/2014 | Yamano et al. |
| 2014/0333551 A1 | 11/2014 | Kim et al. |
| 2014/0333561 A1 | 11/2014 | Bull et al. |
| 2014/0344765 A1 | 11/2014 | Hicks et al. |
| 2014/0354845 A1 | 12/2014 | Molgaard et al. |
| 2014/0354850 A1 | 12/2014 | Kosaka et al. |
| 2014/0359438 A1 | 12/2014 | Matsuki |
| 2014/0359528 A1 | 12/2014 | Murata |
| 2014/0365945 A1 | 12/2014 | Karunamuni et al. |
| 2014/0380247 A1 | 12/2014 | Tecarro et al. |
| 2015/0015763 A1 | 1/2015 | Lee et al. |
| 2015/0020036 A1 | 1/2015 | Kim et al. |
| 2015/0026584 A1 | 1/2015 | Kobayakov et al. |
| 2015/0026592 A1 | 1/2015 | Mohammed et al. |
| 2015/0029149 A1 | 1/2015 | Andersson et al. |
| 2015/0033184 A1 | 1/2015 | Kim et al. |
| 2015/0042588 A1 | 2/2015 | Park |
| 2015/0046876 A1 | 2/2015 | Goldenberg |
| 2015/0049033 A1 | 2/2015 | Kim et al. |
| 2015/0058723 A1 | 2/2015 | Cieplinski et al. |
| 2015/0062046 A1 | 3/2015 | Cho et al. |
| 2015/0062052 A1 | 3/2015 | Bernstein et al. |
| 2015/0062068 A1 | 3/2015 | Shih et al. |
| 2015/0067495 A1 | 3/2015 | Bernstein et al. |
| 2015/0067496 A1 | 3/2015 | Missig et al. |
| 2015/0067497 A1 | 3/2015 | Cieplinski et al. |
| 2015/0067513 A1 | 3/2015 | Zambetti et al. |
| 2015/0067519 A1 | 3/2015 | Missig et al. |
| 2015/0067534 A1 | 3/2015 | Choi et al. |
| 2015/0067559 A1 | 3/2015 | Missig et al. |
| 2015/0067560 A1 | 3/2015 | Cieplinski et al. |
| 2015/0067563 A1 | 3/2015 | Bernstein et al. |
| 2015/0067596 A1 | 3/2015 | Brown et al. |
| 2015/0067601 A1 | 3/2015 | Bernstein et al. |
| 2015/0067602 A1 | 3/2015 | Bernstein et al. |
| 2015/0067605 A1 | 3/2015 | Zambetti et al. |
| 2015/0071547 A1 | 3/2015 | Keating et al. |
| 2015/0116205 A1 | 4/2015 | Westerman et al. |
| 2015/0121218 A1 | 4/2015 | Kim et al. |
| 2015/0121225 A1 | 4/2015 | Somasundaram et al. |
| 2015/0128092 A1 | 5/2015 | Lee et al. |
| 2015/0135109 A1 | 5/2015 | Zambetti et al. |
| 2015/0138126 A1 | 5/2015 | Westerman |
| 2015/0138155 A1 | 5/2015 | Bernstein et al. |
| 2015/0139605 A1 | 5/2015 | Wiklof |
| 2015/0143284 A1 | 5/2015 | Bennett et al. |
| 2015/0149899 A1 | 5/2015 | Bernstein et al. |
| 2015/0149964 A1 | 5/2015 | Bernstein et al. |
| 2015/0149967 A1 | 5/2015 | Bernstein et al. |
| 2015/0153897 A1 | 6/2015 | Huang et al. |
| 2015/0153929 A1 | 6/2015 | Bernstein et al. |
| 2015/0160729 A1 | 6/2015 | Nakagawa |
| 2015/0185840 A1 | 7/2015 | Golyshko et al. |
| 2015/0193099 A1 | 7/2015 | Murphy |
| 2015/0193951 A1 | 7/2015 | Lee et al. |
| 2015/0205495 A1 | 7/2015 | Koide et al. |
| 2015/0234446 A1 | 8/2015 | Nathan et al. |
| 2015/0234493 A1 | 8/2015 | Parivar et al. |
| 2015/0253866 A1 | 9/2015 | Amm et al. |
| 2015/0268786 A1 | 9/2015 | Kitada |
| 2015/0268813 A1 | 9/2015 | Bos |
| 2015/0321607 A1 | 11/2015 | Cho et al. |
| 2015/0332107 A1 | 11/2015 | Paniaras |
| 2015/0378519 A1 | 11/2015 | Brown et al. |
| 2015/0378982 A1 | 12/2015 | McKenzie et al. |
| 2015/0381931 A1 | 12/2015 | Uhma et al. |
| 2016/0004393 A1 | 1/2016 | Faaborg et al. |
| 2016/0004427 A1 | 1/2016 | Zambetti et al. |
| 2016/0004428 A1 | 1/2016 | Bernstein et al. |
| 2016/0004429 A1 | 1/2016 | Bernstein et al. |
| 2016/0004430 A1 | 1/2016 | Missig et al. |
| 2016/0004431 A1 | 1/2016 | Bernstein et al. |
| 2016/0004432 A1 | 1/2016 | Bernstein et al. |
| 2016/0011771 A1 | 1/2016 | Cieplinski |
| 2016/0019718 A1 | 1/2016 | Mukkamala et al. |
| 2016/0021511 A1 | 1/2016 | Jin et al. |
| 2016/0041750 A1 | 2/2016 | Cieplinski et al. |
| 2016/0048326 A1 | 2/2016 | Kim et al. |
| 2016/0062466 A1 | 3/2016 | Moussette et al. |
| 2016/0062619 A1 | 3/2016 | Reeve et al. |
| 2016/0070401 A1 | 3/2016 | Kim et al. |
| 2016/0132139 A1 | 5/2016 | Du et al. |
| 2016/0188181 A1 | 6/2016 | Smith |
| 2016/0196028 A1 | 7/2016 | Kenney et al. |
| 2016/0210025 A1 | 7/2016 | Bernstein et al. |
| 2016/0224220 A1 | 8/2016 | Ganguly |
| 2016/0259412 A1 | 9/2016 | Flint et al. |
| 2016/0259413 A1 | 9/2016 | Anzures et al. |
| 2016/0259495 A1 | 9/2016 | Butcher et al. |
| 2016/0259496 A1 | 9/2016 | Butcher et al. |
| 2016/0259497 A1 | 9/2016 | Foss et al. |
| 2016/0259498 A1 | 9/2016 | Foss et al. |
| 2016/0259499 A1 | 9/2016 | Kocienda et al. |
| 2016/0259516 A1 | 9/2016 | Kudurshian et al. |
| 2016/0259517 A1 | 9/2016 | Butcher et al. |
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0259536 A1 | 9/2016 | Kudurshian et al. |
| 2016/0259548 A1 | 9/2016 | Ma |
| 2016/0274686 A1 | 9/2016 | Ruiz et al. |
| 2016/0274728 A1 | 9/2016 | Luo et al. |
| 2016/0274761 A1 | 9/2016 | Ruiz et al. |
| 2016/0283054 A1 | 9/2016 | Suzuki |
| 2016/0320906 A1 | 11/2016 | Bokma et al. |
| 2016/0334960 A1 | 11/2016 | Brown et al. |
| 2016/0357305 A1 | 12/2016 | Wells et al. |
| 2016/0357368 A1 | 12/2016 | Federighi et al. |
| 2016/0357389 A1 | 12/2016 | Dakin et al. |
| 2016/0357390 A1 | 12/2016 | Federighi et al. |
| 2016/0357404 A1 | 12/2016 | Alonso Ruiz et al. |
| 2016/0360116 A1 | 12/2016 | Penha et al. |
| 2017/0045981 A1 | 2/2017 | Karunamuni et al. |
| 2017/0046039 A1 | 2/2017 | Karunamuni et al. |
| 2017/0046058 A1 | 2/2017 | Karunamuni et al. |
| 2017/0046059 A1 | 2/2017 | Karunamuni et al. |
| 2017/0046060 A1 | 2/2017 | Karunamuni et al. |
| 2017/0075520 A1 | 3/2017 | Bauer et al. |
| 2017/0075562 A1 | 3/2017 | Bauer et al. |
| 2017/0075563 A1 | 3/2017 | Bauer et al. |
| 2017/0109011 A1 | 4/2017 | Jiang |
| 2017/0139565 A1 | 5/2017 | Choi |
| 2018/0024681 A1 | 1/2018 | Bernstein et al. |

FOREIGN PATENT DOCUMENTS

| | | |
|---|---|---|
| CN | 1661556 | 8/2005 |
| CN | 1808362 A | 7/2006 |

(56) References Cited

FOREIGN PATENT DOCUMENTS

| | | |
|---|---|---|
| CN | 1955906 | 5/2007 |
| CN | 101102573 | 1/2008 |
| CN | 101118469 A | 2/2008 |
| CN | 101202866 A | 6/2008 |
| CN | 101222704 A | 7/2008 |
| CN | 201107762 | 8/2008 |
| CN | 101320303 A | 12/2008 |
| CN | 100524183 | 8/2009 |
| CN | 101593077 A | 12/2009 |
| CN | 101727268 | 6/2010 |
| CN | 101809526 A | 8/2010 |
| CN | 102004593 A | 4/2011 |
| CN | 102037435 | 4/2011 |
| CN | 102099776 | 6/2011 |
| CN | 102112946 A | 6/2011 |
| CN | 102160021 A | 8/2011 |
| CN | 102349038 A | 2/2012 |
| CN | 102385478 A | 3/2012 |
| CN | 102438092 A | 5/2012 |
| CN | 102483677 A | 5/2012 |
| CN | 102646013 A | 8/2012 |
| CN | 102662573 A | 9/2012 |
| CN | 102841677 A | 12/2012 |
| CN | 103097992 A | 5/2013 |
| DE | 100 59 906 A1 | 6/2002 |
| DE | 21 2009 000 073 | 2/2011 |
| DE | 20 2009 018 283 | 8/2011 |
| DE | 11 2009 001 276 | 1/2012 |
| DE | 11 2009 001 281 | 1/2012 |
| EP | 0 388 162 A2 | 3/1990 |
| EP | 0 859 307 A1 | 3/1998 |
| EP | 0 880 090 A2 | 11/1998 |
| EP | 1 028 583 A1 | 8/2000 |
| EP | 1 067 471 A1 | 1/2001 |
| EP | 1406150 A1 | 4/2004 |
| EP | 1 571 549 A2 | 2/2005 |
| EP | 1 562 105 A2 | 8/2005 |
| EP | 1 568 966 A2 | 8/2005 |
| EP | 1 640 855 A2 | 3/2006 |
| EP | 1 674 977 A2 | 6/2006 |
| EP | 1 882 902 A1 | 1/2008 |
| EP | 2 000 896 A2 | 12/2008 |
| EP | 2 017 701 A1 | 1/2009 |
| EP | 2 028 583 A2 | 2/2009 |
| EP | 2 141 574 A2 | 1/2010 |
| EP | 2 175 357 A1 | 4/2010 |
| EP | 2 196 893 A2 | 6/2010 |
| EP | 2 214 087 A1 | 8/2010 |
| EP | 2 226 715 A2 | 9/2010 |
| EP | 2 286 324 | 2/2011 |
| EP | 2 286 325 | 2/2011 |
| EP | 2 299 351 A2 | 3/2011 |
| EP | 2 302 496 A1 | 3/2011 |
| EP | 2 375 309 A1 | 10/2011 |
| EP | 2 375 314 A1 | 10/2011 |
| EP | 2 386 935 A1 | 11/2011 |
| EP | 2 407 868 A1 | 1/2012 |
| EP | 2 420 924 A2 | 2/2012 |
| EP | 2 426 580 A2 | 3/2012 |
| EP | 2 447 818 A1 | 5/2012 |
| EP | 2 527 966 A2 | 11/2012 |
| EP | 2 530 677 A2 | 12/2012 |
| EP | 2 541 376 A1 | 1/2013 |
| EP | 2 555 500 A1 | 2/2013 |
| EP | 2 568 359 A2 | 3/2013 |
| EP | 2 615 535 A1 | 7/2013 |
| EP | 2 631 737 A1 | 8/2013 |
| EP | 2 674 846 A2 | 12/2013 |
| EP | 2 733 578 A2 | 5/2014 |
| EP | 2 808 764 A1 | 12/2014 |
| EP | 2 809 058 A1 | 12/2014 |
| EP | 2 813 938 A1 | 12/2014 |
| GB | 2 350 991 | 12/2000 |
| GB | 2 366 630 A | 3/2002 |
| GB | 2 402 105 A | 12/2004 |
| GB | 2 492 709 A | 11/2009 |
| GB | 2 473 389 | 3/2011 |
| GB | 2 474 153 | 4/2011 |
| JP | 58-182746 | 10/1983 |
| JP | H06-161647 A | 6/1994 |
| JP | H07-98769 A | 4/1995 |
| JP | H07-151512 A | 6/1995 |
| JP | H08-227341 A | 9/1996 |
| JP | H09-269883 A | 10/1997 |
| JP | H09-330175 A | 12/1997 |
| JP | H11-203044 A | 7/1999 |
| JP | 2000-148348 A | 5/2000 |
| JP | 2001-202192 A | 7/2001 |
| JP | 2002-041023 A | 2/2002 |
| JP | 2002-149312 A | 5/2002 |
| JP | 2002-268867 A | 9/2002 |
| JP | 2002-286489 | 10/2002 |
| JP | 2003-084744 A | 3/2003 |
| JP | 2003-157131 A | 5/2003 |
| JP | 2003-186597 A | 7/2003 |
| JP | 2004-054861 A | 2/2004 |
| JP | 2004-062648 A | 2/2004 |
| JP | 2004-070492 A | 3/2004 |
| JP | 2004-086733 A | 3/2004 |
| JP | 2004-152169 A | 5/2004 |
| JP | 2005-031786 A | 2/2005 |
| JP | 2005-070777 A | 3/2005 |
| JP | 2005-092386 A | 4/2005 |
| JP | 2005-135106 A | 5/2005 |
| JP | 2005-157842 A | 6/2005 |
| JP | 2005-196810 A | 7/2005 |
| JP | 2005-222553 A | 8/2005 |
| JP | 2005-309933 A | 11/2005 |
| JP | 2006-185443 A | 7/2006 |
| JP | 2007-116384 A | 5/2007 |
| JP | 2007-517462 A | 6/2007 |
| JP | 2007-264808 A | 10/2007 |
| JP | 2008-009759 A | 1/2008 |
| JP | 2008-015890 A | 1/2008 |
| JP | 2008-017373 A | 1/2008 |
| JP | 2008-033739 A | 2/2008 |
| JP | 2008-076818 A | 4/2008 |
| JP | 2008-076853 A | 4/2008 |
| JP | 2008-516348 A | 5/2008 |
| JP | 2008-146453 A | 6/2008 |
| JP | 2008-537615 | 9/2008 |
| JP | 2008 305174 A | 12/2008 |
| JP | 2009-500761 A | 1/2009 |
| JP | 2009-211704 A | 9/2009 |
| JP | 2009-217543 A | 9/2009 |
| JP | 2009-217815 A | 9/2009 |
| JP | 2010-009321 A | 1/2010 |
| JP | 2010-503130 A | 1/2010 |
| JP | 2010-055274 A | 3/2010 |
| JP | 2010-097353 A | 4/2010 |
| JP | 2010-146507 A | 7/2010 |
| JP | 2010-152716 A | 7/2010 |
| JP | 2010-176174 A | 8/2010 |
| JP | 2010-176337 A | 8/2010 |
| JP | 2010-181934 A | 8/2010 |
| JP | 2010-541071 A | 12/2010 |
| JP | 2011-501307 A | 1/2011 |
| JP | 2011-048666 A | 3/2011 |
| JP | 2011-048686 A | 3/2011 |
| JP | 2011-048762 A | 3/2011 |
| JP | 2011-048832 A | 3/2011 |
| JP | 2011-053831 A | 3/2011 |
| JP | 2011-053972 A | 3/2011 |
| JP | 2011-053973 A | 3/2011 |
| JP | 2011-053974 A | 3/2011 |
| JP | 2011-059821 A | 3/2011 |
| JP | 2011-070342 A | 4/2011 |
| JP | 2011-100290 A | 5/2011 |
| JP | 2011-107823 A | 6/2011 |
| JP | 2011-123773 A | 6/2011 |
| JP | 2011-141868 A | 7/2011 |
| JP | 2011 192179 A | 9/2011 |
| JP | 2011-192215 A | 9/2011 |
| JP | 2011-242386 A | 12/2011 |

(56) References Cited

FOREIGN PATENT DOCUMENTS

| | | |
|---|---|---|
| JP | 2011-253556 A | 12/2011 |
| JP | 2011-257941 A | 12/2011 |
| JP | 2011-530101 A | 12/2011 |
| JP | 2012-027940 A | 2/2012 |
| JP | 2012-043266 A | 3/2012 |
| JP | 2012-043267 A | 3/2012 |
| JP | 2012-053754 | 3/2012 |
| JP | 2012-053926 A | 3/2012 |
| JP | 2012-073873 A | 4/2012 |
| JP | 2012-509605 A | 4/2012 |
| JP | 2012-093820 A | 5/2012 |
| JP | 2012-123564 A | 6/2012 |
| JP | 2012-128825 A | 7/2012 |
| JP | 2013-030050 A | 2/2013 |
| JP | 2013-058149 A | 3/2013 |
| JP | 2013-080521 A | 5/2013 |
| JP | 2013-529339 A | 7/2013 |
| JP | 2013-542488 A | 11/2013 |
| JP | 2014-130567 A | 7/2014 |
| JP | 2014-140112 A | 7/2014 |
| JP | 2014-519109 A | 8/2014 |
| JP | 2015-153420 A | 8/2015 |
| KR | 2006-0071353 A | 6/2006 |
| KR | 2008-0045143 A | 4/2008 |
| KR | 2008-0054346 A | 6/2008 |
| KR | 2008-0078108 A | 8/2008 |
| KR | 2010-0010302 | 2/2010 |
| KR | 2010-0023637 | 3/2010 |
| KR | 2010-0034608 | 4/2010 |
| KR | 2010 0046087 | 6/2010 |
| KR | 2010 0133246 A | 12/2010 |
| KR | 2011 0086501 A | 7/2011 |
| KR | 20120103670 A | 9/2012 |
| KR | 2013 0099647 A | 9/2013 |
| KR | 2014 0016495 A | 2/2014 |
| KR | 2014 0043760 A | 4/2014 |
| KR | 2014 0079110 A | 6/2014 |
| KR | 20150021977 A | 3/2015 |
| WO | WO 90/10910 A1 | 9/1990 |
| WO | WO 90/11571 A1 | 10/1990 |
| WO | WO 91/14231 A1 | 9/1991 |
| WO | WO 95/26005 A1 | 9/1995 |
| WO | WO 98/49639 A1 | 11/1998 |
| WO | WO 99/19821 A1 | 4/1999 |
| WO | WO 99/30259 A1 | 6/1999 |
| WO | WO 99/53424 A1 | 10/1999 |
| WO | WO 00/11587 A1 | 3/2000 |
| WO | WO 00/50974 A2 | 8/2000 |
| WO | WO 00/52619 A1 | 9/2000 |
| WO | WO 00/62187 A2 | 10/2000 |
| WO | WO 00/65510 A1 | 11/2000 |
| WO | WO 01/16830 A1 | 3/2001 |
| WO | WO 01/16852 A2 | 3/2001 |
| WO | WO 01/22263 A2 | 3/2001 |
| WO | WO 01/22315 A2 | 3/2001 |
| WO | WO 01/88808 A1 | 11/2001 |
| WO | WO 00/62187 A3 | 12/2001 |
| WO | WO 01/22263 A3 | 1/2002 |
| WO | WO 01/22315 A3 | 1/2002 |
| WO | WO 02/07032 A1 | 1/2002 |
| WO | WO 02/15461 A2 | 2/2002 |
| WO | WO 01/16852 A8 | 6/2002 |
| WO | WO 2005/106637 A2 | 11/2005 |
| WO | WO 2006/013485 A2 | 2/2006 |
| WO | WO 2006/073020 A1 | 7/2006 |
| WO | WO 2006/094308 A2 | 9/2006 |
| WO | WO 2007/121557 A1 | 11/2007 |
| WO | WO 2008/030976 A2 | 3/2008 |
| WO | WO 2006/043209 A1 | 4/2008 |
| WO | WO 2008/064142 A2 | 5/2008 |
| WO | WO 2009/059062 A2 | 5/2009 |
| WO | WO 2009/143075 A2 | 11/2009 |
| WO | WO 2009/143076 A2 | 11/2009 |
| WO | WO 2009/143294 A2 | 11/2009 |
| WO | WO 2009/148781 A2 | 12/2009 |
| WO | WO 2009/155981 A1 | 12/2009 |
| WO | WO 2009/158549 A2 | 12/2009 |
| WO | WO 2010/013876 A1 | 2/2010 |
| WO | WO 2010/090010 A1 | 8/2010 |
| WO | WO 2010/122813 A1 | 10/2010 |
| WO | WO 2011/024389 A1 | 3/2011 |
| WO | WO 2011/024465 A1 | 3/2011 |
| WO | WO 2011/093045 A1 | 8/2011 |
| WO | WO 2011/105009 A1 | 9/2011 |
| WO | WO 2011/108190 A1 | 9/2011 |
| WO | WO 2011/114630 A1 | 9/2011 |
| WO | WO 2011/115187 A1 | 9/2011 |
| WO | WO 2011/121375 A1 | 10/2011 |
| WO | WO 2012/021417 A1 | 2/2012 |
| WO | WO 2012/037664 | 3/2012 |
| WO | WO 2012/096804 A2 | 7/2012 |
| WO | WO 2012/108213 A1 | 8/2012 |
| WO | WO 2012/114760 A1 | 8/2012 |
| WO | WO 2012/150540 A2 | 11/2012 |
| WO | WO 2013/169299 A1 | 11/2013 |
| WO | WO 2013/169300 A1 | 11/2013 |
| WO | WO 2013/169845 A1 | 11/2013 |
| WO | WO 2013/169849 A2 | 11/2013 |
| WO | WO 2013/169851 A2 | 11/2013 |
| WO | WO 2013/169853 A1 | 11/2013 |
| WO | WO 2013/169854 A2 | 11/2013 |
| WO | WO 2013/169870 A1 | 11/2013 |
| WO | WO 2013/169875 A2 | 11/2013 |
| WO | WO 2013/169877 A2 | 11/2013 |
| WO | WO 2013/169882 A2 | 11/2013 |
| WO | WO 2013/173838 A2 | 11/2013 |
| WO | WO 2014/105275 A1 | 7/2014 |
| WO | WO 2014/105276 A1 | 7/2014 |
| WO | WO 2014/105277 A1 | 7/2014 |
| WO | WO 2014/105278 A1 | 7/2014 |
| WO | WO 2014/105279 A1 | 7/2014 |
| WO | WO 2014/129655 A1 | 8/2014 |
| WO | WO 2014/149473 A1 | 9/2014 |
| WO | WO 2014/200733 A1 | 12/2014 |
| WO | WO 2016/200584 A2 | 12/2016 |

OTHER PUBLICATIONS

Office Action, dated Aug. 10, 2015, received in Australian Patent Application No. 2013259637, which corresponds with U.S. Appl. No. 14/536,203, 3 pages.

Office Action, dated Aug. 18, 2015, received in Australian Patent Application No. 2013259642, which corresponds with U.S. Appl. No. 14/536,291, 3 pages.

Agarwal, "How to Copy and Paste Text on Windows Phone 8," Guiding Tech, http://web.archive.org/web20130709204246/http://www.guidingtech.com/20280/copy-paste-text-windows-phone-8/, Jul. 9, 2013, 10 pages.

Alzona, "Full Screen Maximization with RightZoom," http://www.brighhub.com/computing/mac-platform/articles/31024.aspx>, Mar. 31, 2009, 6 pages.

Apple Inc., "iPhone User Guide for iPhone and iPhone 3G," http://manuals.info.apple.com/en_US/iPhone_User_Guide.pdf, Jul. 11, 2008, 154 pages.

Ask.MetaFilter, "Enable Screen Resize?" ask. Metafilter.com, Jan. 29, 2006, http://ask.metafilter.com/31720/Enable-screen-resize, 4 pages.

Awduche et al., "Synchronized Broadcast in Cellular Networks," 2nd Telecommunications R&D Conference in Massachusetts, Mar. 1996, 12 pages.

Azundris, "A Fire in the Sky," http://web.archive.org/web/20140722062639/http://blog.azundrix.com/archives/168-A-fire-in-the-sky.html, Jul. 22, 2014, 8 pages.

CrackBerry Forums, Windows 8 Bezel Control and Gestures, http://wwwforums.crackberry.com/blackberry-playbook-f222/windows-8-bezel-control-gestures-705129/, Mar. 1, 2012, 8 pages.

Crook, "Microsoft Patenting Multi-Screen, Milti-Touch Gesures," http://techcrunch.com/2011/08/25/microsoft-awarded-patents-for-multi-screen-multi-touch-gestures/, Aug. 25, 2011, 8 pages.

(56) References Cited

OTHER PUBLICATIONS cvil.ly—a design blog, Interesting Touch Interactions on Windows 8, http://cvil.ly/2011/06/04/interesting-touch-interactions-on-windows-8/, Jun. 4, 2011, 3 pages.
Deeter, "DigiStamp Signs Strategic Partnership with European Trust Center EuroSignCard to Safeguard Monetary Transactions in Financial Sector," http://proquest.umi.com/, Mar. 14, 2001, 2 pages.
Dilger, "Inside Apple's iPad: Multitasking," Appleinsider.com, <http://www.appleinsider.com/articles/10/02/18/inside_apples_ipad_multitasking.html>, Feb. 17, 2010, 3 pages.
Fahey, "The iPad Blows Up iPhone Apps Read Good," Kotaku http://kotaku.com/5458316/the-ipad-blows-up-iphone-apps-rel-good, Jan. 27, 2010, 3 pages.
Fehily, "Visual QuickStart Guide: Microsoft Windows 7," Peachpit Press, 9 pages.
Fenlon, "The Case for Bezel Touch Gestures on Apple's iPad," http://www.tested.com/tech/tablets/3104-the case-for-bezel-touch-gestures-on-apples-ipad/, Nov. 2, 2011, 6 pages.
Flowplayer, "Slowmotion: Flowplayer," https://web.archive.org/web/20150226191526/http://flash.flowplayer.org/plugins/streaming/slowmotion.html, Feb. 26, 2015, 4 pages.
Gorman, "Hands-on With Immersion HD Integrator Hi-Fi Haptics," http://www.engadget.com/2012/02/23/hands-on-with-immersion-hd-integrator-hi-fi-haptics/?utm_medium=referral&utm_source=pulsenews, Feb. 23, 2012, 10 pages.
Harris, "Windows 8 Consumer Preview: Product Demo," https://www.youtube.com/watch?feature=[;auer-embedded&v=jDYAQmQ-phX8, Feb. 28, 2012, 3 pages.
HTC, "HTC One (M7)," Wikipedia, the free encyclopedia, https://en.wikipedia.org/wiki/HTC_One_(M7), Mar. 2013, 20 pages.
HTC, "User Manual—PDA Phone—HTC_P3050 Touch," http://web.archive.org/web/20101228223033/http://www.comparecellular.com, Nov. 2, 2007, 154 pages.
IBM et al., "Pressure-Sensitive Icons", IBM, US, Jun. 1, 1990, 3 pages.
ICIMS Recruiting Software, "Blackberry Playbook Review," http://www.tested.com/tech.tablets/5749-blackberry-playbook-review/, 2015, 11 pages.
Jade et al., "Apple's iPhone 4.0 to Support Multitasking via Expose-like Interface," AppleInsider.com, Mar. 31, 2010, 4 pages.
Jade et al., "Apple's iPhone 4.0 Software to Deliver Multitasking Support," AppleSider.com, Mar. 11, 2010, 3 pages.
Kishore, "Make the OS X Maximize Button Work like Windows," http://www.switchingtomac.com/making-the-switch/make-the-os-x-maximize-buttom-work-like-windows/, May 5, 2009, 11 pages.
MacRumors, "Fit to Screen Button Poll for Mac / Windows Users," http://forums.macrumors.com/showthread.php?t=615215>, Dec. 11, 2008, 15 pages.
MacRumors, "Window, Fit to Screen?," http://forums.macrumors.com/showthread.php?t=439783>, Feb. 22, 2008, 5 pages.
McRitchie, "Internet Explorer Right-Click Menus," http://web.archive.org/web-201405020/http:/dmcritchie.mvps.org/ie/rightie6.htm, May 2, 2014, 10 pages.
MetaFilter Network Inc., "Enable Screen Resize?", http://ask.metafilter.com/31720/Enable-screen-resize>, Jan. 29, 2006, 4 pages.
Mick, "iPhone OS 4.0 Will Bring True Multitasking This Summer", Daily Tech, http:///www.dailytech.com/report+iphone+os+40+will+bring+true+multitasking+this+summer/article 17878.htm>, Mar. 11, 2010, 3 pages.
Moth, "Share Code—Write Code Once for Both Mobile and Desktop Apps," MSDN Magazine, Jul. 2007, http://msdn.microsoft.com/en-us/magazine/cc163387.aspx, 8 pages.
Newman, "Sprint's HTC EVO 4G: 5 Killer Features," pcworld, http://www.pcworld.com/article/192286/sprints_htc_evo_4g_5_killer_features. html, Mar. 24, 2010, 3 pages.
Nickinson, "Review: The New HTC Sense Interface on Android Phones," Android Central, Feb. 22, 2010, http://www.androidcentral.com/review-new-htc-sense-android-phone, 10 pages.
Nilsson, "Design Guidelines for Mobile Applications," SINTEF ICT, Jun. 2008, 73 pages.

Nilsson et al., "Design Patterns for User Interface for Mobile Applications," Advances in Engineering Software, Elsevier Science, Oxford, GB vol. 40, No. 12, Dec. 1, 2009, 11 pages.
Pallenberg, "Wow, the new iPad had gestures." https://plus.google.com/+SaschaPallenberg/posts/aaJtJogu8ac, Mar. 7, 2012, 2 pages.
Pradeep, "Android App Development—Microsoft Awarded With Patents on Gestures Supported on Windows 8," http://mspoweruser.com/microsoft-awarded-with-patents-on-gestures-supported-on-windows-8/, Aug. 25, 2011, 16 pages.
Reiger, "Effective Design for Multiple Screen Sizes," mobiForge, http://mobiforge.com/designing/story/effective-design-multiple-screen-sizes, Jan. 2009, 12 pages.
Robertson et al., "The Task Gallery: A 3D Window Manager," Redmond, WA, Sep. 12, 1999, 8 pages.
Savov, "HTC Enhances Sense with Leap and Friend Stream (updated with video)," Engadget, http://www.engadget.com/2010/02/16/htc-enhances-sense-with-leap-and-friend-stream/, Feb. 16, 2010, 4 pages.
Seffah et al., Multi-devices "Multiple" User Interfaces: Development Models and Research Opportunities, The Journal of Systems Software, www.sciencedirect.com, Dec. 25, 2003, 14 pages.
Siracusa, "Antacid Tablet," http://arstechnica.com/staff/2010/01/antacid-tablet/>, Jan. 1, 2010, 3 pages.
Sony, "Sony Xperia Z1", Wikipedia, the free encyclopedia, https://en.wikipedia.org/wiki/Sony_Xperia_Z1, Sep. 2013, 10 pages.
Tidwell, "Designing Interfaces," O'Reilly Media, Inc., USA, Nov. 2005, 348 pages.
Viana et al., "Xmobile: A MB-UID Environment for Semi-Automatic Generation of Adaptive Applications for Mobile Devices," The Journal of Systems and Software, www.sciencedirect.com, Jun. 9, 2007, 13 pages.
Windows, "Stupid Geek Tricks: Tile or Cascade Multiple Windows in Windows 7," How to Geek, Feb. 18, 2010, 3 pages.
YouTube, "Blackberry Playbook bezel interation," https://www.youtube.com/watch?v=YGkzFqnOwXI, Jan. 10, 2011, 2 pages.
Office Action, dated May 22, 2012, received in U.S. Appl. No. 12/888,381 (5274), 18 pages.
Final Office Action, dated Nov. 19, 2012, received in U.S. Appl. No. 12/888,381(5274), 14 pages.
Office Action, dated Dec. 10, 2013, received in U.S. Appl. No. 12/888,381 (5274), 13 pages.
Notice of Allowance, dated Oct. 21, 2014, received in U.S. Appl. No. 12/888,381 (5274), 8 pages.
Notice of Allowance, dated Feb. 17, 2015, received in U.S. Appl. No. 12/888,381 (5274), 5 pages.
Notice of Allowance (corrected), dated Apr. 9, 2015, received in U.S. Appl. No. 12/888,381 (5274), 2 pages.
Office Action, dated Aug. 8, 2013, received in Australian Patent Application No. 2010350740 (5274AU), 3 pages.
Office Action, dated Aug. 28, 2012, received in Chinese Patent Application No. 201010602688.2 (5274CN), which corresponds with U.S. Appl. No. 12/888,381, 6 pages.
Office Action, dated May 24, 2013, received in Chinese Patent Application No. 201010602688.2(5274CN), which corresponds with U.S. Appl. No. 12/888,381, 7 pages.
Office Action, dated Aug. 6, 2013, received in European Patent Application No. 10760867.1 (5274EP), which corresponds with U.S. Appl. No. 12/888,381, 4 pages.
Office Action, dated Dec. 6, 2013, received in Japanese Patent Application No. 2013-503722 (5274JP), which corresponds with U.S. Appl. No. 12/888,381, 2 pages.
Office Action, dated Nov. 29, 2013, received in Korean Patent Application No. 2012-7029281 (5274KR), which corresponds with U.S. Appl. No. 12/888,381, 4 pages.
Office Action, dated May 10, 2012, received in U.S. Appl. No. 12/888,382 (5315), 9 pages.
Final Office Action, dated Nov. 15, 2012, received in U.S. Appl. No. 12/888,382 (5315), 11 pages.
Office Action, dated Dec. 10, 2013, received in U.S. Appl. No. 12/888,382 (5315), 12 pages.
Notice of Allowance, dated Oct. 31, 2014, received in U.S. Appl. No. 12/888,382 (5315), 5 pages.
Notice of Allowance, dated Feb. 13, 2015, received in U.S. Appl. No. 12/888,382 (5315), 6 pages.

(56) References Cited

OTHER PUBLICATIONS

Office Action, dated May 17, 2012, received in U.S. Appl. No. 12/888,384 (5316), 15 pages.
Final Office Action, dated Nov. 7, 2012, received in U.S. Appl. No. 12/888,384 (5316), 14 pages.
Office Action, dated May 16, 2012, received in U.S. Appl. No. 12/888,386 (5317), 12 pages.
Final Office Action, dated Nov. 8, 2012, received in U.S. Appl. No. 12/888,386 (5317), 13 pages.
Office Action, dated Jan. 23, 2013, received in U.S. Appl. No. 12/888,389 (5318), 11 pages.
Final Office Action, dated Sep. 12, 2013, received in U.S. Appl. No. 12/888,389 (5318), 10 pages.
Notice of Allowance, dated Sep. 8, 2014, received in U.S. Appl. No. 12/888,389 (5318), 13 pages.
Notice of Allowance, dated Feb. 11, 2015, received in U.S. Appl. No. 12/888,389 (5318), 13 pages.
Notice of Allowance, dated Jun. 15, 2012, received in U.S. Appl. No. 12/888,391 (5319), 23 pages.
Office Action, dated Jun. 28, 2013, received in U.S. Appl. No. 13/077,524 (5324), 17 pages.
Office Action, dated Apr. 4, 2013, received in U.S. Appl. No. 12/789,426 (5324), 8 pages.
Office Action, dated Feb. 12, 2014, received in U.S. Appl. No. 13/077,524 (5324), 13 pages.
Notice of Allowance, dated May 27, 2015, received in U.S. Appl. No. 13/077,524 (5324), 9 pages.
Notice of Allowance, dated Sep. 15, 2015, received in U.S. Appl. No. 13/077,524 (5324), 9 pages.
Office Action, dated Mar. 19, 2013, received in U.S. Appl. No. 13/333,909 (5369), 18 pages.
Final Office Action, dated Dec. 5, 2013, received in U.S. Appl. No. 13/333,909 (5369), 24 pages.
Notice of Allowance, dated Mar. 31, 2014, received in U.S. Appl. No. 13/333,909 (5369). 20 pages.
Office Action, dated Dec. 18, 2015, received in Australian Patent Application No. 2013368440 (5839AU), which corresponds with U.S. Appl. No. 14/536,426, 3 pages.
Office Action, dated Apr. 5, 2016, received in Korean Patent Application No. 10-2015-7018851 (5839KR), which corresponds with U.S. Appl. No. 14/536,426, 7 pages.
Office Action, dated Dec. 17, 2015, received in U.S. Appl. No. 14/536,426 (5842), 28 pages.
Office Action, dated Nov. 18, 2015, received in Australian Patent Application No. 2015101231 (5842AU01), which corresponds with U.S. Appl. No. 14/536,426, 3 pages.
Office Action, dated Mar. 4, 2016, received in Japanese Patent Application No. 2015-511644 (5842JP), which corresponds with U.S. Appl. No. 14/536,426, 3 pages.
Office Action, dated Feb. 1, 2016, received in Australian Patent Application No. 2013368441 (5845AU), which corresponds with U.S. Appl. No. 14/608,926, 3 pages.
Notice of Allowance, dated Mar. 30, 2016, received in Australian Patent Application No. 2013368441 (5845AU), which corresponds with U.S. Appl. No. 14/608,926, 1 page.
Office Action, dated Apr. 21, 2016, received in European Patent Application No. 13795392.3 (5845EP), which corresponds with U.S. Appl. No. 14/608,926, 6 pages.
Office Action, dated Mar. 14, 2016, received in Japanese Patent Application No. 2015-549392 (5845JP), which corresponds with U.S. Appl. No. 14/608,926, 4 pages.
Office Action, dated Nov. 12, 2015, received in European Patent Application No. 13724102.2 (5846EP), which corresponds with U.S. Appl. No. 14/536,646, 6 pages.
Office Action, dated Feb. 29, 2016, received in Japanese Patent Application No. 2015-511645 (5846JP), which corresponds with U.S. Appl. No. 14/536,646, 5 pages.
Office Action, dated Jan. 7, 2016, received in European Patent Application No. 13726053.5 (5847EP), which corresponds with U.S. Appl. No. 14/536,141, 10 pages.
Office Action, dated Feb. 29, 2016, received in Japanese Patent Application No. 2015-511646 (5847JP), which corresponds with U.S. Appl. No. 14/536,141, 3 pages.
Office Action, dated Jan. 29, 2016, received in Australian Patent Application No. 2013368443 (5848AU), which corresponds with U.S. Appl. No. 14/536,141, 3 pages.
Notice of Allowance, dated Mar. 11, 2016, received in Australian Patent Application No. 2013368443 (5848AU), which corresponds with U.S. Appl. No. 14/536,141, 2 pages.
Office Action, dated Apr. 5, 2016, received in Korean Patent Application No. 10-20157018448 (5848KR), which corresponds with U.S. Appl. No. 14/536,141, 6 pages.
Office Action, dated Nov. 11, 2015, received in European Patent Application No. 13724104.8 (5850EP), which corresponds with U.S. Appl. No. 14/536,203, 5 pages.
Office Action, dated Feb. 15, 2016, received in Japanese Patent Application No. 2015-511650 (5850JP), which corresponds with U.S. Appl. No. 14/536,203, 5 pages.
Office Action, dated Dec. 4, 2015, received in Korean Patent Application No. 2014-7034520 (5850KR), which corresponds with U.S. Appl. No. 14/536,203, 4 pages.
Office Action, dated Jan. 29, 2016, received in Japanese Patent Application No. 2015-511652 (5853JP), which corresponds with U.S. Appl. No. 14/536,267, 3 pages.
Office Action, dated Dec. 4, 2015, received in Korean Patent Application No. 2014-7034530 (5853KR), which corresponds with U.S. Appl. No. 14/536,267, 3 pages.
Office Action, dated Jan. 7, 2016, received in European Patent Application No. 13724107.1 (5854EP), which corresponds with U.S. Appl. No. 14/052,515, 11 pages.
Office Action, dated Mar. 8, 2016, received in Japanese Patent Application No. 2015-511655 (5854JP), which corresponds with U.S. Appl. No. 14/536,291, 4 pages.
Office Action, dated Jan. 15, 2016, received in Australian Patent Application No. 2013368445 (5855AU), which corresponds with U.S. Appl. No. 14/608,985, 3 pages.
Office Action, dated Nov. 23, 2015, received in U.S. Appl. No. 14/183,316 (5860), 17 pages.
Office Action, dated Jul. 7, 2015, received in U.S. Appl. No. 14/183,347 (5861), 14 pages.
Final Office Action, dated Dec. 18, 2015, received in U.S. Appl. No. 14/183,347 (5861), 6 pages.
Notice of Allowance, dated Apr. 6, 2016, received in U.S. Appl. No. 14/183,347 (5861), 7 pages.
Notice of Allowance (corrected), dated Apr. 19, 2016, received in U.S. Appl. No. 14/183,347 (5861), 3 pages.
Office Action, dated Mar. 31, 2016, received in U.S. Appl. No. 14/864,737 (7246), 17 pages.
Certificate of Grant, dated Apr. 7, 2016, received in Australian Patent Application No. 2016100293 (7246AU), which corresponds with U.S. Appl. No. 14/864,737, 1 page.
Office Action, dated Apr. 5, 2016, received in Danish Patent Application No. 201500577 (7246DK), which corresponds with U.S. Appl. No. 14/864,737, 7 pages.
Certificate of Grant, dated Mar. 24, 2016, received in Australian Patent Application No. 2016100254 (7247AU), which corresponds with U.S. Appl. No. 14/866,981, 1 page.
Office Action, dated Mar. 18, 2016, received in Danish Patent Application No. 201500575 (7247DK), which corresponds with U.S. Appl. No. 14/866,981, 9 pages.
Certificate of Grant, dated Mar. 24, 2016, received in Australian Patent Application No. 2016100251 (7265AU), which corresponds with U.S. Appl. No. 14/866,159, 1 page.
Office Action, dated Mar. 9, 2016, received in Danish Patent Application No. 201500574 (7265DK), which corresponds with U.S. Appl. No. 14/866,159, 11 pages.
Certificate of Grant, dated Mar. 24, 2016, received in Australian Patnet Application No. 2016100247 (7267AU), which corresponds with U.S. Appl. No. 14/868,078, 1 page.
Office Action, dated Mar. 30, 2016, received in Danish Patent Application No. 201500588 (7267DK), which corresponds with U.S. Appl. No. 14/868,078, 9 pages.

(56) References Cited

OTHER PUBLICATIONS

Office Action, Apr. 4, 2016, received in Danish Patent Application No. 201500582 (7270DK), which corresponds with U.S. Appl. No. 14/863,432, 10 pages.
Office Action, dated Mar. 22, 2016, received in Danish Patent Application No. 201500576 (7294DK), which corresponds with U.S. Appl. No. 14/866,989, 10 pages.
Office Action, dated Mar. 28, 2016, received in U.S. Appl. No. 14/869,899 (7309), 17 pages.
Office Action, dated Feb. 3, 2016, received in Danish Patent Application No. 201500592 (7309DK), which corresponds with U.S. Appl. No. 14/869,899, 9 pages.
Office Action, dated Mar. 4, 2016, received in U.S. Appl. No. 14/866,992 (7310), 30 pages.
Office Action, dated Mar. 18, 2016, received in Danish Patent Application No. 201500593 (7310DK), which corresponds with U.S. Appl. No. 14/866,992, 10 pages.
Office Action, dated Nov. 30, 2015, received in U.S. Appl. No. 14/845,217 (7314), 24 pages.
Final Office Action, dated Apr. 22, 2016, received in U.S. Appl. No. 14/845,217 (7314), 36 pages.
Office Action, dated Feb. 3, 2016, received in U.S. Appl. No. 14/856,517 (7317), 36 pages.
Office Action, dated Feb. 11, 2016, received in U.S. Appl. No. 14/856,519 (7318), 34 pages.
Office Action, dated Feb. 1, 2016, received in U.S. Appl. No. 14/857,645 (7321), 15 pages.
Office Action, dated Jan. 25, 2016, received in U.S. Appl. No. 14,864,580 (7330), 29 pages.
Office Action, dated Apr. 8, 2016, received in Danish Patent Application No. 201500584 (7330DK), which corresponds with U.S. Appl. No. 14/864,580, 9 pages.
Office Action, dated Apr. 19, 2016, received in U.S. Appl. No. 14/864,627 (7332), 9 pages.
Office Action, dated Apr. 8, 2016, received in Danish Patent Application No. 201500585 (7332DK), which corresponds with U.S. Appl. No. 14/864,627, 9 pages.
Office Action, dated Mar. 29, 2016, received in U.S. Appl. No. 14/866,361 (7334), 22 pages.
Certificate of Grant, dated Apr. 21, 2016, received in Australia Patent Application No. 2016100292 (7334AU), which corresponds with U.S. Appl. No. 14/866,361, 1 page.
Office Action, dated Apr. 7, 2016, received in Danish Patent Application No. 201500579 (7334DK), which corresponds with U.S. Appl. No. 14/866,361, 10 pages.
Office Action, dated Mar. 22, 2016, received in Danish Patent Application No. 201500587 (7335DK), which corresponds with U.S. Appl. No. 14/866,987, 8 pages.
Office Action, dated Apr. 1, 2016, received in Danish Patent Application No. 201500589 (7336DK), which corresponds with U.S. Appl. No. 14/866,989, 8 pages.
Office Action, dated Apr. 11, 2016, received in U.S. Appl. No. 14/871,236 (7337), 23 pages.
Office Action, dated Apr. 8, 2016, received in Danish Patent Application No. 201500595 (7337DK), which corresponds with U.S. Appl. No. 14/871,236, 12 pages.
Office Action, dated Apr. 6, 2016, received in Danish Patent Application No. 201500596 (7339DK), which corresponds with U.S. Appl. No. 14/870,882, 7 pages.
Office Action, dated Apr. 7, 2016, received in Danish Patent Application No. 201500597 (7341DK), which corresponds with U.S. Appl. No. 14/871,227, 7 pages.
Office Action, dated Apr. 18, 2016, received in Danish Patent Application No. 201500601 (7342DK), which corresponds with U.S. Appl. No. 14/871,336, 8 pages.
Notice of Allowance, dated Apr. 18, 2016, received in Danish Patent Application No. 201500600 (73430K), which corresponds with U.S. Appl. No. 14/871,462, 7 pages.
Office Action, dated Apr. 29, 2016, received in U.S. Appl. No. 14/867,823 (7334), 28 pages.
Office Action, dated Mar. 18, 2016, received in Danish Patent Application No. 201500594 (7344DK), which corresponds with U.S. Appl. No. 14/867,823, 10 pages.
Office Action, dated Mar. 21, 2016, received in Danish Patent Application No. 201500598 (7345DK), which corresponds with U.S. Appl. No. 14/867,892, 9 pages.
Certificate of Grant, dated Mar. 24, 2016, received in Australian Patent Application No. 20161002253 (7352AU), which corresponds with U.S. Appl. No. 14/867,990, 1 page.
Office Action, dated Mar. 18, 2016, received in Danish Patent Application No. 201500581 (7352DK), which corresponds with U.S. Appl. No. 14/867,990, 9 pages.
International Search Report and Written Opinion, dated Dec. 10, 2010, received in International Patent Application No. PCT/US2010/050057, which corresponds with U.S. Appl. No. 12/888,381, 9 pages.
International Preliminary Report on Patentability, dated Oct. 9, 2012, received in International Patent Application No. PCT/US2010/050057, which corresponds with U.S. Appl. No. 12/888,381, 6 pages.
Extended European Search Report, dated Nov. 6, 2015, received in European Patent Application No. 15183980.0, which corresponds with U.S. Appl. No. 14/536,426, 7 pages.
International Preliminary Report on Patentability, dated Jun. 30, 2015, received in International Patent Application No. PCT/US2013/069479, which corresponds with U.S. Appl. No. 14/608,926, 11 pages.
International Search Report and Written Opinion, dated Apr. 25, 2016, received in International Patent Application No. PCT/US2016/018758, which corresponds with U.S. Appl. No. 14/866,159, 15 pages.
Angelov, "Sponsor Flip Wall With Jquery & CSS", Tutorialzine. N. p., Mar. 24, 2010. Web. http://tutorialzine.com/2010/03/sponsor-wall-slip-jquery-css/, Mar. 24, 2010, 8 pages.
Anonymous, "Nokia 808 PureView screenshots", retrieved from Internet; no URL, Nov. 12, 2012, 8 pages.
Anonymous, "Nokia 808 PureView User Guide," http://download-fds.webapps.microsoft.com/supportFiles/phones/files/pdf_guides/devices/808/Nokia_808_UG_en_APAC.pdf, Jan. 1, 2012, 144 pages.
Anonymous, "Notifications, Android 4.4 and Lower", Android Developers, https://developer.android.com/design/patterns/notifications_k.html, May 24, 2015, 9 pages.
b-log—betriebsraum weblog, "Extremely Efficient Menu Selection: Marking Menus for the Flash Platform," http://www.betriebsraum.de/blog/2009/12/11/extremely-efficient-menu-selection-marking-for-the-flash-platform, Dec. 11, 2009, 9 pages.
Bolluyt, "5 Apple Watch Revelations from Apple's New WatchKit", http://www.cheatsheet.com/tecnology/5-apple-watch-revelations-from-apples-new-watchkit.html/?a=viewall, Nov. 22, 2014, 3 pages.
Clark, "Global Moxie, Touch Means a Renaissance for Radial Menus," http://globalmoxie.com/blog/radial-menus-for-touch-ui~print.shtml, Jul. 17, 2012, 7 pages.
Cohen, Cinemagraphs are Animated Gifs for Adults, http://www.tubefilter.com/2011/07/10/cinemagraph, Jul. 10, 2011, 3 pages.
Drinkwater, "Glossary: Pre/Post Alarm Image Buffer," http://www.networkwebcams.com/ip-camera-learning-center/2008/07/17/glossary-prepost-alarm-image-buffer/, Jul. 17, 2008, 1 page.
Dzyre, "10 Android Notification Features You Can Fiddle With", http://www.hongkiat.com/blog/android-notification-features, Mar. 10, 2014, 10 pages.
Elliot, "Mac System 7", YouTube. Web. Mar. 8, 2017, http://www.youtube.com/watch?v=XLv22hfuuik, Aug. 3, 2011, 1 page.
Farshad, "SageThumbs-Preview and Convert Pictures From Windows Context Menu", https://web.addictivetips.com/windows-tips/sagethumbs-preview-and-convert-photos-from-windows-context-menu, Aug. 8, 2011, 5 pages.
Flaherty, "Is Apple Watch's Pressure-Sensitive Screen A Bigger Deal Than the Gadget Itself?", http://www.wired.com/2014/09/apple-watchs-pressure-sensitive-screen-bigger-deal-gadget, Sep. 15, 2014, 3 pages.
Flixel, "Cinemagraph Pro for Mac", https://flixel.com/products/mac/cinemagraph-pro, 2014, 7 pages.

(56) References Cited

OTHER PUBLICATIONS

Gardner, "Recenz—Recent Apps in One Tap", You Tube, https://www.youtube.com/watch?v-qailSHRgsTo, May 15, 2015, 1 page.
Gonzalo et al., "Zliding: Fluid Zooming and Sliding for High Precision Parameter Manipulation", Department of Computer Science, University of Toronto, Seattle, Washington, Oct. 23, 2005, 10 pages.
Grant, "Android's Notification Center", https://www.objc.io/issues/11-android/android-notifications, Apr. 30, 2014, 26 pages.
iPodHacks 142: "Water Ripple Effects on the Home and Lock Screen: AquaBoard Cydia Tweak Review", YouTube, https://www.youtube.comwatch?v-Auu_uRaYHJs, Sep. 24, 2012, 3 pages.
Kaaresoja, "Snap-Crackle-Pop: Tactile Feedback for Mobile Touch Screens," Nokia Research Center, Helsinki, Finland, Proceedings of Eurohaptics vol. 2006, Jul. 3, 2006, 2 pages.
Kiener, "Force Touch on iPhone", https://www.youtube.com/watch?v=CEMmnsU5fC8, Aug. 4, 2015, 4 pages.
Kost, "LR3-Deselect All Images But One", Julieanne Kost's Blog, blogs.adobe.com/jkost/2011/12/lr3-deselect-all-images-but-one.html, Dec. 22, 2011, 1 page.
Kronfli, "HTC Zoe Comes to Google Play, Here's Everything You Need to Know," Know Your Mobile, http://www.knowyourmobile.com/htc/htc-one/19550/what-htc-zoe, Aug. 14, 2014, 5 pages.
Kumar, "How to Enable Ripple Effect on Lock Screen of Galaxy S2", YouTube, http, http://www.youtube.com/watch?v+B9-4M5abLXA, Feb. 12, 2013, 3 pages.
Kurdi, "XnView Shell Extension: A Powerful Image Utility Inside the Context Menu", http://www.freewaregenius.com/xnview-shell-extension-a-powerful-image-utility-inside-the-context-menu, Jul. 30, 2008, 4 pages.
Laurie, "The Power of the Right Click," http://vlaurie.com/right-click/customize-context-menu.html, 2002-2016, 3 pages.
Matthew, "How to Preview Photos and Images From Right-Click Context Menue in Windows [Tip]", https://dottech.org/159009/add-image-preview-in-windows-context-menu-tip, Jul. 4, 2014, 5 pages.
Microsoft, "Lumia—How to Personalize Your Start Screen", https://www.youtube.com/watch?v=6GI5Z3TrSEs, Nov. 11, 2014, 3 pages.
Microsoft, "Use Radial Menus to Display Commands in OneNote for Windows 8," https://support.office.com/en-us/article/Use-radial-menues-to-display-OneNote-commands-Od75f03f-cde7-493a-a8a0b2ed6f99fbe2, 2016, 5 pages.
Mitroff, "Google Android 5.0 Lollipop," http://www.cnet.com/products/google-android-5-0-lollipop, Mar. 12, 2015, 5 pages.
Mohr, "Do Not Disturb—The iPhone Feature You Should Be Using", http.www.wonderoftech.com/do-not-disturb-iphone, Jul. 14, 2014, 30 pages.
Nacca, "NiLS Lock Screen Notifications / Floating Panel— Review", https://www.youtube.com/watch?v=McT4QnS9TDY, Feb. 3, 2014, 4 pages.
Nikon, "Scene Recognition System and Advanced SRS," http://www.nikonusa.com/en.Learn-and-Explore/Article/ftlzi4rr/Scene-Recognition-System.html, Jul. 22, 2015, 2 pages.
Phonebuff, "How To Pair Bluetooth On The iPhone", https://www.youtube.com/watch?v=LudNwEar9A8, Feb. 8, 2012, 3 pages.
PoliceOne.com, "COBAN Technologies Pre-Event Buffer & Fail Safe Feature," http://www.policeone.com/police-products/police-technology/mobile-computures/videos/5955587-COBAN-Technologies-Pre-Event, Nov. 11, 2010, 2 pages.
"Quickly Preview Songs in Windows Media Player 12 in Windows 7," Quickly Preview Songs in Windows Media Player 12 in Windows 7. How-to Geek, Apr. 28, 2010, Web. May 8, 2010, http://web.archive.org/web/20100502013134/http://www.howtogeek.com/howto/16157/quickly-preview-songs-in-windows-media-center-12-in-windows-7>, 6 pages.
Sony, "Intelligent Scene Recognition," https://www.sony-asia.com/article/252999/section/product/product/dsc-t77, downloaded on May 20, 2016, 5 pages.
Stross, "Wearing a Badge, and a Video Camera," The New York Times, http://www.nytimes.com/2013/04/07/business/wearable-video-cameras-for-police-offers.html? R=0, Apr. 6, 2013, 4 pages.
Taser, "Taser Axon Body Camera User Manual," https://www.taser.com/images/support/downloads/product-resourses/axon_body_product_manual.pdf, Oct. 1, 2013, 24 pages.
VGJFeliz, "How to Master Android Lollipop Notifications in Four Minutes!", https://www.youtube.com/watch?v=S-zBRG7GJgs, Feb. 8, 2015, 5 pages.
Wikipedia, "AirDrop,", Wikipedia, the free encyclopedia, http://en.wikipedia.org/wiki/AirDrop, May 17, 2016, 5 pages.
Wikipedia, "Cinemagraph," Wikipedia, the free encyclopedia, http://en.wikipedia.org/wiki/Cinemagraph, Last Modified Mar. 16, 2016, 2 pages.
Wikipedia, "Context Menu," Wikipedia, the free encyclopedia https://en.wikipedia.org/wiki/Context menu, Last Modified May 15, 2016, 4 pages.
Wikipedia, "Context Menu," Wikipedia, the free encyclopedia http://en.wikipedia.org/wiki/Mobile_ad_hoc_network, May 20, 2016, 4 pages.
Wikipedia, "Pie Menu," Wikipedia, the free encyclopedia, http://en.wikipedia.org/wiki/Pie_menu, Last Modified Jun. 4, 2016, 3 pages.
Wikipedia, "Quick Look," from Wikipedia, the free encyclopedia, https;//en.wikipedia.org/wiki/Quick_Look, Last Modified Jan. 15, 2016, 3 pages.
Office Action, dated Mar. 15, 2017, received in U.S. Appl. No. 14/535,671 (5448), 13 pages.
Office Action, dated Oct. 18, 2016, received in Australian Patent Application No. 2013368440 (5839AU), which corresponds with U.S. Appl. No. 14/536,426, 3 pages.
Notice of Allowance, dated Dec. 20, 2016, received in Australian Patent Application No. 2013368440 (5839AU), which corresponds with U.S. Appl. No. 14/536,426, 3 pages.
Office Action, dated Jul. 21, 2016, received in European Patent Application No. 13795391.5 (5839EP), which corresponds with U.S. Appl. No. 14/536,426, 9 pages.
Office Action, dated Sep. 13, 2016, received in Japanese Patent Application No. 2015-547948 (5839JP), which corresponds with U.S. Appl. No. 14/536,426, 5 pages.
Office Action, dated Feb. 24, 2017, received in Korean Patent Application No. 10-2015-7018851 (5839KR), which corresponds with U.S. Appl. No. 14/536,426, 3 pages.
Final Office Action, dated May 6, 2016, received in U.S. Appl. No. 14/536,426 (5842), 23 pages.
Notice of Allowance, dated May 23, 2016, received in Australian Patent Application No. 2013259606 (5842AU), which corresponds with U.S. Appl. No. 14/536,426, 3 pages.
Certificate of Grant, dated Sep. 15, 2016, received in Australian Patent Australian Patent Application No. 2013259606 (5842AU), which corresponds with U.S. Appl. No. 14/536,426, 1 page.
Decision to Grant, dated Jul. 14, 2016, received in European Patent Application No. 13724100.6 (5842EP), which corresponds with U.S. Appl. No. 14/536,426, 1 page.
Letters Patent, dated Aug. 10, 2016, received in European Patent Application No. 13724100.6 (5842EP), which corresponds with U.S. Appl. No. 14/536,426, 1 page.
Office Action, dated Jan. 20, 2017, received in European Patent Application No. 15183980.0 (5842EP01), which corresponds with U.S. Appl. No. 14/536,426, 5 pages.
Office Action, dated Feb. 6, 2017, received in Japanese Patent Application No. 2015-511644 (5842JP), which corresponds with U.S. Appl. No. 14/536,426, 6 pages.
Office Action, dated Mar. 9, 2017, received in U.S. Appl. No. 14/536,464 (5843), 21 pages.
Certificate of Grant, dated Jul. 29, 2016, received in Australian Patent Application No. 2013368441 (5845AU), which corresponds with U.S. Appl. No. 14/608,926, 1 page.
Office Action, dated Jan. 3, 2017, received in Australian Patent Application No. 2016201451 (5845AU01), which corresponds with U.S. Appl. No. 14/608,926, 3 pages.
Office Action, dated May 6, 2016, received in European Patent Application No. 13795392.3 (5845EP), which corresponds with U.S. Appl. No. 14/608,926, 6 pages.

(56) References Cited

OTHER PUBLICATIONS

Office Action, dated Nov. 11, 2016, received in European Patent Application No. 13795392.3 (5845EP), which corresponds with U.S. Appl. No. 14/608,926, 6 pages.
Notice of Allowance, dated Jan. 17, 2017, received in Japanese Patent Application No. 2015-549392 (5845JP), which corresponds with U.S. Appl. No. 14/608,926, 2 pages.
Patent, dated Feb. 17, 2017, received in Japanese Patent Application No. 2015-549392 (5845JP), which corresponds with U.S. Appl. No. 14/608,926, 3 pages.
Office Action, dated May 12, 2016, received in Korean Patent Application No. 10-2015-7018853, (5845KR), which corresponds with U.S. Appl. No. 14/608,926, 4 pages.
Office Action, dated May 31, 2016, received in Australian Patent Application No. 2013259613 (5846AU), which corresponds with U.S. Appl. No. 14/536,646, 4 pages.
Notice of Allowance, dated Jul. 5, 2016, received in Australian Patent Application No. 2013259613 (5846AU), which corresponds with U.S. Appl. No. 14/536,646, 3 pages.
Office Action, dated Dec. 1, 2016, received in Chinese Patent Application No. 2013800362059 (5846CN), which corresponds with U.S. Appl. No. 14/536,646, 3 pages.
Office Action, dated May 31, 2016, received in European Patent Application No. 13724102.2 (5846EP), which corresponds with U.S. Appl. No. 14/536,646, 5 pages.
Notice of Allowance, dated Jan. 4, 2017, received in European Patent Application No. 13724102.2 (5846EP), which corresponds with U.S. Appl. No. 14/536,646, 5 pages.
Notice of Allowance, dated Dec. 22, 2016, received in Japanese Patent Application No. 2015-511645 (5846JP), which corresponds with U.S. Appl. No. 14/536,646, 2 pages.
Office Action, dated Mar. 3, 2017, received in Chinese Patent Application No. 201380035893.7 (5847CN), which corresponds with U.S. Appl. No. 14/536,646, 8 pages.
Notice of Allowance, dated Aug. 15, 2016, received in Australian Patent Application No. 2013259614 (5847AU), which corresponds with U.S. Appl. No. 14/536,141, 1 page.
Office Action, dated Aug. 31, 2016, received in European Patent Application No. 13726053.5 (5847EP), which corresponds with U.S. Appl. No. 14/536,141, 10 pages.
Office Action, dated Oct. 25, 2016, received in Japanese Patent Application No. 2015-511646 (5847JP), which corresponds with U.S. Appl. No. 14/536,141, 6 pages.
Office Action, dated Dec. 8, 2016, received in U.S. Appl. No. 14/608,942 (5848), 9 pages.
Certificate of Grant, dated Jul. 7, 2016, received in Australian Patent Application No. 2013368443 (5848AU), which corresponds with U.S. Appl. No. 14/536,141, 3 pages.
Office Action, dated Oct. 7, 2016, received in European Patent Application No. 13798464.7 (5848EP), which corresponds with U.S. Appl. No. 14/608,942, 7 pages.
Office Action, dated Jul. 4, 2016, received in Japanese Patent Application No. 2015-549393, (5848JP) which corresponds with U.S. Appl. No. 14/536,141, 4 pages.
Office Action, dated Feb. 24, 2017, received in Korean Patent Application No. 2015-7018448 (5848KR), which corresponds with U.S. Appl. No. 14/536,141, 4 pages.
Office Action, dated Aug. 1, 2016, received in U.S. Appl. No. 14/536,203 (5850), 14 pages.
Notice of Allowance, dated Feb. 1, 2017, received in U.S. Appl. No. 14/536,203 (5850), 9 pages.
Notice of Allowance, dated Jun. 15, 2016, received in Australian Patent Application No. 2013259630 (5850AU), which corresponds with U.S. Appl. No. 14/536,203, 3 pages.
Certificate of Grant, dated Oct. 21, 2016, received in Australian Patent Application No. 2013259630 (5850AU), which corresponds with U.S. Appl. No. 14/536,203, 3 pages.
Office Action, dated May 31, 2016, received in European Patent Application No. 13724104.8 (5850EP), which corresponds with U.S. Appl. No. 14/536,203, 5 pages.

Notice of Allowance, dated Aug. 5, 2016, received in Japanese Patent Application No. 2015-511650 (5850JP), which corresponds with U.S. Appl. No. 14/536,203, 4 pages.
Certificate of Patent, dated Sep. 9, 2016, received in Japanese Patent Application No. 2015-511650 (5850JP), which corresponds with U.S. Appl. No. 14/536,203, 3 pages.
Notice of Allowance, dated Sep. 1, 2016, received in Korean Patent Application No. 2014-7034520 (5850KR), which corresponds with U.S. Appl. No. 14/536,203, 5 pages.
Office Action, dated Feb. 6, 2017, received in Korean Patent Application No. 2016-7033834 (5850KR01), which corresponds with U.S. Appl. No. 14/536,203, 4 pages.
Office Action, dated Jul. 22, 2016, received in European Office Action No. 13798465.4 (5851EP), which corresponds with U.S. Appl. No. 14/608,965, 8 pages.
Office Action, dated Oct. 20, 2016, received in U.S. Appl. No. 14/536,247 (5852), 10 pages.
Final Office Action, dated Mar. 24, 2017, received in U.S. Appl. No. 14/536,247 (5852), 14 pages.
Office Action, dated Mar. 24, 2017, received in U.S. Appl. No. 14/536,267 (5853), 12 pages.
Notice of Allowance, dated Jun. 28, 2016, received in Australian Patent Application No. 2013259637 (5853AU), which corresponds with U.S. Appl. No. 14/536,267, 3 pages.
Certificate of Grant, dated Oct. 21, 2016, received in Australian Patent Application No. 2013259637 (5853AU), which corresponds with U.S. Appl. No. 14/536,267, 3 pages.
Office Action, dated Dec. 9, 2016, received in Chinese Patent Application No. 2016120601564130 (5853CN), which corresponds with U.S. Appl. No. 14/536,267, 4 pages.
Notice of Allowance, dated Sep. 26, 2016, received in Japanese Patent Application No. 2015-511652 (5853JP), which corresponds with U.S. Appl. No. 14/536,267, 5 pages.
Office Action, dated Mar. 3, 2017, received in Japanese Patent Application No. 2016-125839 (5853JP01), which corresponds with U.S. Appl. No. 14/536,267, 6 pages.
Notice of Allowance, dated Sep. 1, 2016, received in Korean Patent Application No. 2014-7034530 (5853KR), which corresponds with U.S. Appl. No. 14/536,267, 3 pages.
Office Action, dated Jan. 5, 2017, received in Korean Patent Application No. 2016-7029533 (5853KR01), which corresponds with U.S. Appl. No. 14/536,267, 2 pages.
Office Action, dated Jul. 25, 2016, received in Australian Patent Application No. 2013259642 (5854AU), which corresponds with U.S. Appl. No. 14/536,291, 3 pages.
Office Action, dated Aug. 10, 2016, received in Australian Patent Application No. 2013259642 (5854AU), which corresponds with U.S. Appl. No. 14/536,291, 4 pages.
Innovation Patent, dated Sep. 1, 2016, received in Australian Patent Application No. 2016101481 (5854AU02), which corresponds with U.S. Appl. No. 14/536,291, 1 page.
Office Action, dated Sep. 29, 2016, received in Australian Patent Application No. 2016101481 (5854AU02), which corresponds with U.S. Appl. No. 14/536,291, 3 pages.
Office Action, dated Aug. 22, 2016, received in European Patent Application No. 13724107.1 (5854EP), which corresponds with U.S. Appl. No. 14/536,291, 7 pages.
Final Office Action, dated Dec. 22, 2016, received in Japanese Patent Application No. 2015-511655 (5854JP), which corresponds with U.S. Appl. No. 14/536,291, 3 pages.
Notice of Allowance, dated Jan. 18, 2017, received in Australian Patent Application No. 2013368445 (5855AU), which corresponds with U.S. Appl. No. 14/608,985, 3 pages.
Office Action, dated Jul. 25, 2016, received in European Patent Application No. 13811032.5 (5855EP), which corresponds with U.S. Appl. No. 14/608,985, 8 pages.
Office Action, dated Feb. 27, 2017, received in European Patent Application No. 13811032.5 (5855EP), which corresponds with U.S. Appl. No. 14/608,985, 6 pages.
Office Action, dated Apr. 25, 2016, received in Japanese Patent Application No. 2015-550384 (5855JP), which corresponds with U.S. Appl. No. 14/608,985, 4 pages.

(56) References Cited

OTHER PUBLICATIONS

Notice of Allowance, dated Jan. 24, 2017, received in Japanese Patent Application No. 2015-550384 (5855JP), which corresponds with U.S. Appl. No. 14/608,985, 5 pages.
Patent, dated Feb. 24, 2017, received in Japanese Patent Application No. 2015550384 (5855JP), which corresponds with U.S. Appl. No. 14/608,985, 2 pages.
Office Action, dated Nov. 4, 2016, received in Korean Patent Application No. 10-2015-7019984 (5855KR), which corresponds with U.S. Appl. No. 14/608,985, 8 pages.
Office Action, dated Mar. 24, 2017, received in U.S. Appl. No. 14/609,006 (5856), 13 pages.
Office Action, dated Jan. 19, 2017, received in U.S. Appl. No. 14/609,042 (5859), 12 pages.
Notice of Allowance, dated Feb. 27, 2017, received in U.S. Appl. No. 14/864,737 (7246), 9 pages.
Notice of Allowance, dated Jul. 1, 2016, received in Chinese Patent Application No. 201620214376.7 (7246CN01), which corresponds with U.S. Appl. No. 14/864,737, 3 pages.
Patent, dated Aug. 3, 2016, received in Chinese Patent Application No. 201620214376.7 (7246CN01), which corresponds with U.S. Appl. No. 14/864,737, 5 pages.
Certificate of Registration, dated Jun. 20, 2016, received in German Patent Application No. 202016001845.1 (7246DE), which corresponds with U.S. Appl. No. 14/864,737, 3 pages.
Office Action and Search Report, dated Apr. 5, 2016, received in Danish Patent Application No. 201500577 (7246DK), which corresponds with U.S. Appl. No. 14/864,737, 7 pages.
Intention to Grant, dated Aug. 2, 2016, received in Danish Patent Application No. 201500577 (7246DK), which corresponds with U.S. Appl. No. 14/864,737, 2 pages.
Office Action, dated Jun. 27, 2016, received in U.S. Appl. No. 14/866,981 (7247), 22 pages.
Notice of Allowance, dated Oct. 24, 2016, received in U.S. Appl. No. 14/866,981 (7247), 7 pages.
Notice of Allowance, dated Feb. 10, 2017, received in U.S. Appl. No. 14/866,981 (7247), 5 pages.
Office Action, dated May 10, 2016, received in Australian Patent Application No. 2016100254 (7247AU), which corresponds with U.S. Appl. No. 14/866,981, 6 pages.
Patent, dated Nov. 2, 2016, received in Australian Patent Application No. 2016100254 (7247AU), which corresponds with U.S. Appl. No. 14/866,981, 1 page.
Notice of Allowance, dated Jul. 27, 2016, received in Chinese Patent Application No. 201620176169.7 (7247CN01), which corresponds with U.S. Appl. No. 14/866,981, 3 pages.
Patent, dated Sep. 28, 2016, received in Chinese Patent Application No. 201620176169.7 (7247CN01), which corresponds with U.S. Appl. No. 14/866,981, 4 pages.
Certificate of Registration, dated Jun. 20, 2016, received in German Patent Application No. 202016001514.2 (7247DE), which corresponds with U.S. Appl. No. 14/864,737, 3 pages.
Office Action and Search Report, dated Mar. 18, 2016, received in Danish Patent Application No. 201500575 (7247DK), which corresponds with U.S. Appl. No. 14/866,981, 9 pages.
Office Action, dated Dec. 5, 2016, received in Danish Patent Application No. 201500575 (7247DK), which corresponds with U.S. Appl. No. 14/866,981, 3 pages.
Office Action, dated May 19, 2016, received in Australian Patent Application No. 2016100251 (7265AU), which corresponds with U.S. Appl. No. 14/866,159, 5 pages.
Office Action, dated Jul. 5, 2016, received in Chinese Patent Application No. 201620186008.6 (7265CN01), which corresponds with U.S. Appl. No. 14/866,159, 3 pages.
Certificate of Registration, dated Jun. 16, 2016, received in German Patent No. 202016001483.9 (7265DE), which corresponds with U.S. Appl. No. 14/866,159, 3 pages.
Office Action (Search Report), dated Mar. 9, 2016, received in Danish Patent Application No. 201500574 (7265DK), which corresponds with U.S. Appl. No. 14/866,159, 11 pages.
Office Action, dated Sep. 27, 2016, received in Danish Patent Application No. 201500574 (7265DK), which corresponds with U.S. Appl. No. 14/866,159, 4 pages.
Office Action, dated Mar. 14, 2017, received in Danish Patent Application No. 201500574 (7265DK), which corresponds with U.S. Appl. No. 14/866,159, 5 pages.
Innovation (Unexamined) Patent, dated Aug. 4, 2016, received in Australian Patent Application No. 2016101201 (7267AU01), which corresponds with U.S. Appl. No. 14/686,078, 1 page.
Office Action, dated Oct. 12, 2016, received in Australian Patent Application No. 2016101201 (7267AU01), which corresponds with U.S. Appl. No. 14/686,078, 3 pages.
Notice of Allowance, dated Oct. 1, 2016, received in Chinese Patent Application No. 201620175847.8 (7267CN01), which corresponds with U.S. Appl. No. 14/686,078, 1 page.
Certificate of Registration, dated Jun. 30, 2016, received in German Patent Application No. 20201600156.9 (7267DE), which corresponds with U.S. Appl. No. 14/868,078, 3 pages.
Office Action (Search Report), dated Mar. 30, 2016, received in Danish Patent Application No. 201500588 (7267DK), which corresponds with U.S. Appl. No. 14/868,078, 9 pages.
Office Action, dated Sep. 2, 2016, received in Danish Patent Application No. 201500588 (7267DK), which corresponds with U.S. Appl. No. 14/868,078, 4 pages.
Notice of Allowance, dated Jan. 30, 2017, received in received in Danish Patent Application No. 201500588 (7267DK), which corresponds with U.S. Appl. No. 14/868,078, 2 pages.
Office Action, dated May 9, 2016, received in U.S. Appl. No. 14/863,432 (7270), 26 pages.
Notice of Allowance, dated Nov. 14, 2016, received in U.S. Appl. No. 14/863,432 (7270), 7 pages.
Office Action, dated Aug. 19, 2016, received in Australian Patent Application No. 2016100647 (7270AU), which corresponds with U.S. Appl. No. 14/863,432, 5 pages.
Notice of Allowance, dated Jan. 12, 2017, received in Chinese Patent Application No. 201620470063.8 (7270CN01), which corresponds with U.S. Appl. No. 14/863,432, 1 page.
Office Action (Search Report), dated Apr. 4, 2016, received in Danish Patent Application No. 201500582 (7270DK), which corresponds with U.S. Appl. No. 14/863,432, 10 pages.
Office Action and Additional Search Report, dated Oct. 7, 2016, received in Danish Patent Application No. 201500582 (7270DK), which corresponds with U.S. Appl. No. 14/863,432, 6 pages.
Office Action, dated Oct. 13, 2016, received in U.S. Appl. No. 14/866,511 (7294), 27 pages.
Final Office Action, dated Jan. 27, 2017, received in U.S. Appl. No. 14/866,511 (7294), 26 pages.
Patent, dated Aug. 8, 2016, received in Australian Patent Application 2016100653 (7294AU), corresponds with U.S. Appl. No. 14/866,511, 1 page.
Notice of Allowance, dated Jan. 12, 2017, received in Chinese Patent Application No. 201620470281.1 (7294CN01), which corresponds with U.S. Appl. No. 14/866,511, 1 page.
Office Action and Search Report, dated Mar. 22, 2016, received in Danish Patent Application No. 201500576 (7294DK), which corresponds with U.S. Appl. No. 14/866,511, 10 pages.
Intention to Grant, dated Jun. 8, 2016, received in Danish Patent Application No. 201500576 (7294DK), which corresponds with U.S. Appl. No. 14/866,511, 2 pages.
Grant, dated Aug. 26, 2016, received in Danish Patent Application No. 201500576 (7294DK), which corresponds with U.S. Appl. No. 14/866,511, 2 pages.
Patent, dated Jan. 23, 2017, received in Danish Patent Application No. 201500576 (7294DK), which corresponds with U.S. Appl. No. 14/866,511, 3 pages.
Office Action, dated May 10, 2016, received in U.S. Appl. No. 14/866,489 (7298), 15 pages.
Final Office Action, dated Sep. 16, 2016, received in U.S. Appl. No. 14/866,489 (7298), 24 pages.
Office Action, dated Jun. 28, 2016, received in U.S. Appl. No. 14/869,899 (7309), 5 pages.
Final Office Action, dated Sep. 2, 2016, received in U.S. Appl. No. 14/869,899 (7309), 22 pages.

(56) References Cited

OTHER PUBLICATIONS

Notice of Allowance, dated Feb. 28, 2017, received in U.S. Appl. No. 14/869,899 (7309), 9 pages.
Innovation (Unexamined) Patent, dated Aug. 25, 2016, received in Australian Patent Application No. 2016101438 (7309AU), which corresponds with U.S. Appl. No. 14/869,899, 1 page.
Certificate of Examination, dated Oct. 11, 2016, received in Australian Patent Application No. 2016101438 (7309AU), which corresponds with U.S. Appl. No. 14/869,899, 1 page.
Office Action (Search Report), dated Feb. 3, 2016, received in Danish Patent Application No. 201500592 (7309DK), which corresponds with U.S. Appl. No. 14/869,899, 9 pages.
Office Action, dated Oct. 7, 2016, received in Danish Patent Application No. 201500592 (7309DK), which corresponds with U.S. Appl. No. 14/869,899, 6 pages.
Office Action, dated Nov. 22, 2016, received in Danish Patent Application No. 201670594 (7309DK01), which corresponds with U.S. Appl. No. 14/869,899, 9 pages.
Final Office Action, dated Jul. 29, 2016, received in U.S. Appl. No. 14/866,992 (7310), 35 pages.
Innovation Patent, dated Sep. 22, 2016, received in Australian Patent Application No. 2016101418 (7310AU), which corresponds with U.S. Appl. No. 14/866,992, 1 page.
Office Action, dated Nov. 22, 2016, received in Australian Patent Application No. 2016101418 (7310AU), which corresponds with U.S. Appl. No. 14/866,992, 7 pages.
Office Action, dated Feb. 7, 2017, received in Australian Patent Application No. 2016101418 (7310AU), which corresponds with U.S. Appl. No. 14/866,992, 5 pages.
Office Action (Search Report), dated Mar. 18, 2016, received in Danish Patent Application No. 201500593 (7310DK), which corresponds with U.S. Appl. No. 14/866,992, 10 pages.
Office Action, dated Jun. 27, 2016, received in Danish Patent Application No. 201500593 (7310DK), which corresponds with U.S. Appl. No. 14/866,992, 7 pages.
Office Action, dated Feb. 6, 2017, received in Danish Patent Application No. 201500593 (7310DK), which corresponds with U.S. Appl. No. 14/866,992, 4 pages.
Notice of Allowance, dated Aug. 26, 2016, received in U.S. Appl. No. 14/845,217 (7314), 5 pages.
Notice of Allowance, dated Jan. 4, 2017, received in U.S. Appl. No. 14/845,217 (7314), 5 pages.
Final Office Action, dated Jul. 13, 2016, received in U.S. Appl. No. 14/856,517 (7317), 30 pages.
Final Office Action, dated Jul. 15, 2016, received in U.S. Appl. No. 14/856,519 (7318), 31 pages.
Final Office Action, dated Jun. 16, 2016, received in U.S. Appl. No. 14/857,645 (7321), 12 pages.
Notice of Allowance, dated Oct. 24, 2016, received in U.S. Appl. No. 14/857,645 (7321), 6 pages.
Notice of Allowance, dated May 23, 2016, received in U.S. Appl. No. 14/864,580 (7330), 9 pages.
Notice of Allowance, dated Aug. 4, 2016, received in U.S. Appl. No. 14/864,580 (7330), 9 pages.
Notice of Allowance, dated Dec. 28, 2016, received in U.S. Appl. No. 14/864,580 (7330), 8 pages.
Office Action, dated Aug. 19, 2016, received in Australian Patent Application No. 2016100648 (7330AU), which corresponds with U.S. Appl. No. 14/864,580, 6 pages.
Notice of Allowance, dated Nov. 8, 2016, received in Chinese Patent Application No. 201620470247.4 (7330CN01), which corresponds with U.S. Appl. No. 14/864,580, 3 pages.
Certificate of Registration, dated Oct. 14, 2016, received in German Patent Application No. 20201600003234.9 (7330DE), which corresponds with U.S. Appl. No. 14/864,580, 3 pages.
Office Action, dated Oct. 7, 2016, received in Danish Patent Application No. 201500584 (7330DK), which corresponds with U.S. Appl. No. 14/864,580, 3 pages.
Notice of Allowance, dated Nov. 23, 2016, received in U.S. Appl. No. 14/864,601 (7331), 12 pages.
Notice of Allowance, dated Jan. 31, 2017, received in U.S. Appl. No. 14/864,627 (7332), 7 pages.
Office Action, dated Oct. 7, 2016, received in Danish Patent Application No. 201500585 (7332DK), which corresponds with U.S. Appl. No. 14/864,627, 3 pages.
Notice of Allowance, dated Jul. 19, 2016, received in U.S. Appl. No. 14/866,361 (7334), 8 pages.
Office Action, dated Jun. 10, 2016, received in Australian Patent Application No. 2016100292 (7334AU), which corresponds with U.S. Appl. No. 14/866,361, 4 pages.
Certificate of Examination, dated Dec. 8, 2016, received in Australian Patent Application No. 2016100292 (7334AU), which corresponds with U.S. Appl. No. 14/866,361, 1 page.
Notice of Allowance/Grant, dated Jul. 1, 2016, received in Chinese Patent Application No. 201620251706.X (7334CN01), which corresponds with U.S. Appl. No. 14/866,361, 3 pages.
Letters Patent, dated Aug. 3, 2016, received in Chinese Patent Application No. 201620251706.X (7334CN01), which corresponds with U.S. Appl. No. 14/866,361, 3 pages.
Certificate of Registration, dated Jun. 24, 2016, received in German Patent Application No. 202016001819.2 (7334DE), which corresponds with U.S. Appl. No. 14/866,361, 3 pages.
Office Action, dated Oct. 28, 2016, received in Danish Patent Application No. 201500579 (7334DK), which corresponds with U.S. Appl. No. 14/866,361, 3 pages.
Patent, dated Aug. 8, 2016, received in Australian Patent Application No. 2016100649 (7335AU), which corresponds with U.S. Appl. No. 14/866,987, 1 page.
Office Action, dated Oct. 19, 2016, received in Chinese Patent Application No. 2016201470246.X (7335CN01), which corresponds with U.S. Appl. No. 14/866,987, 4 pages.
Patent, dated Sep. 19, 2016, received in German Patent Application No. 202016002908.9 (7335DE), which corresponds with U.S. Appl. No. 14/866,987, 3 pages.
Intention to Grant, dated Jun. 10, 2016, received in Danish Patent Application No. 201500587 (7335DK), which corresponds with U.S. Appl. No. 14/866,987, 2 pages.
Notice of Allowance, dated Nov. 1, 2016, received in Danish Patent Application No. 201500587 (7335DK), which corresponds with U.S. Appl. No. 14/866,987, 2 pages.
Office Action and Search Report, dated Sep. 9, 2016, received in Danish Patent Application No. 201670463 (7335DK01), which corresponds with U.S. Appl. No. 14/866,987, 7 pages.
Notice of Allowance, dated Jan. 31, 2017, received in Danish Patent Application No. 201670463 (7335DK01), which corresponds with U.S. Appl. No. 14/866,987, 3 pages.
Certificate of Exam, dated Jul. 21, 2016, received in Australian Patent Application No. 2016100652 (7336AU), which corresponds with U.S. Appl. No. 14/866,989, 1 page.
Intention to Grant, dated Jun. 10, 2016, received in Danish Patent Application No. 201500589 (7336DK), which corresponds with U.S. Appl. No. 14/866,989, 2 pages.
Notice of Allowance, dated Nov. 1, 2016, received in Danish Patent Application No. 201500589 (7336DK), which corresponds with U.S. Appl. No. 14/866,989, 2 pages.
Office Action, dated Jun. 28, 2016, received in U.S. Appl. No. 14/871,236 (7337), 21 pages.
Final Office Action, dated Nov. 4, 2016, received in U.S. Appl. No. 14/871,236 (7337), 24 pages.
Notice of Allowance, dated Feb. 28, 2017, received in U.S. Appl. No. 14/871,236 (7337), 9 pages.
Innovation (Unexamined) Patent, dated Aug. 25, 2016, received in Australian Patent Application No. 2016101433 (7337AU), which corresponds with U.S. Appl. No. 14/871,236, 1 page.
Office Action, dated Oct. 14, 2016, received in Australian Patent Application No. 2016101433 (7337AU), which corresponds with U.S. Appl. No. 14/871,236, 3 pages.
Office Action and Search Report, dated May 26, 2016, received in Danish Patent Application No. 201500595 (7337DK), which corresponds with U.S. Appl. No. 14/871,236, 14 pages.
Office Action and Additional Search Report, dated Sep. 30, 2016, received in Danish Patent Application No. 201500595 (7337DK), which corresponds with U.S. Appl. No. 14/871,236, 10 pages.

(56) References Cited

OTHER PUBLICATIONS

Innovation (Unexamined) Patent, dated Aug. 25, 2016, received in Australian Patent Application No. 2016101436 (7339AU), which corresponds with U.S. Appl. No. 14/871,236, 1 pages.
Office Action, dated Oct. 31, 2016, received in Australian Patent Application No. 2016101438 (7339AU), which corresponds with U.S. Appl. No. 14/871,236, 6 pages.
Office Action and Search Report, dated Jun. 9, 2016, received in Danish Patent Application No. 201500596 (7339DK), which corresponds with U.S. Appl. No. 14/870,882, 9 pages.
Office Action, dated Oct. 17, 2016, received in Australian Patent Application No. 2016203040 (7341AU), which corresponds with U.S. Appl. No. 14/871,227, 7 pages.
Office Action, dated Oct. 18, 2016, received in Australian Patent Application No. 2016101431 (7341AU01), which corresponds with U.S. Appl. No. 14/871,227, 3 pages.
Grant, dated Jun. 21, 2016, received in Danish Patent Application No. 201500597 (7341DK), which corresponds with U.S. Appl. No. 14/871,227, 2 pages.
Patent, dated Sep. 26, 2016, received in Danish Patent Application No. 201500597 (7341DK), which corresponds with U.S. Appl. No. 14/871,227, 7 pages.
Office Action, dated Oct. 14, 2016, received in Australian Patent Application No. 2016101437 (7342AU), which corresponds with U.S. Appl. No. 14/871,336, 2 pages.
Office Action, dated Oct. 18, 2016, received in Danish Patent Application No. 201500601 (7342DK), which corresponds with U.S. Appl. No. 14/871,336, 3 pages.
Innovation Patent, dated Aug. 25, 2016, received in Australian Patent Application No. 2016101435 (7343AU), which corresponds with U.S. Appl. No. 14/871,462, 1 page.
Office Action, dated Oct. 4, 2016, received in Australian Patent Application No. 2016101435 (7343AU), which corresponds with U.S. Appl. No. 14/871,462, 3 pages.
Office Action, dated Oct. 4, 2016, received in Australian Patent Application No. 2016231505 (7343AU01), which corresponds with U.S. Appl. No. 14/871,462, 3 pages.
Grant, dated Aug. 30, 2016, received in Danish Patent Application No. 201500600 (7343DK), which corresponds with U.S. Appl. No. 14/871,462, 2 pages.
Office Action, dated Mar. 13, 2017, received in Japanese Patent Application No. 2016-183289 (7343JP), which corresponds with U.S. Appl. No. 14/871,462, 5 pages.
Final Office Action, dated Sep. 28, 2016, received in U.S. Appl. No. 14/867,823 (7344), 31 pages.
Office Action, dated Sep. 7, 2016, received in Danish Patent Application No. 201500594 (7344DK), which corresponds with U.S. Appl. No. 14/867,823, 4 pages.
Office Action, dated May 10, 2016, received in U.S. Appl. No. 14/867,892 (7345), 28 pages.
Final Office Action, dated Nov. 2, 2016, received in U.S. Appl. No. 14/867,892 (7345), 48 pages.
Office Action, Sep. 14, 2016, received in Danish Patent Application No. 201500598 (73450K), which corresponds with U.S. Appl. No. 14/867,892, 4 pages.
Office Action, dated Mar. 1, 2017, received in U.S. Appl. No. 14/869,855 (7347), 14 pages.
Office Action, dated Feb. 9, 2017, received in U.S. Appl. No. 14/869,873 (7348), 17 pages.
Office Action, dated May 23, 2016, received in Australian Patent Application No. 2016100253 (7352AU), which corresponds with U.S. Appl. No. 14/867,990, 5 pages.
Office Action, dated Jul. 5, 2016, received in Chinese Patent Application No. 201620176221.9 (7352CN01), which corresponds with U.S. Appl. No. 14/867,990, 4 pages.
Office Action, dated Oct. 25, 2016, received in Chinese Patent Application No. 201620176221.9 (7352CN01), which corresponds with U.S. Appl. No. 14/867,990, 7 pages.
Certificate of Registration, dated Jun. 16, 2016, received in German Patent No. 202016001489.8 (7352DE), which corresponds with U.S. Appl. No. 14/867,990, 3 pages.
Office Action, dated Sep. 26, 2016, received in Danish Patent Application No. 201500581 (7352DK), which corresponds with U.S. Appl. No. 14/867,990, 5 pages.
Office Action, dated Nov. 25, 2016, received in U.S. Appl. No. 15/081,771 (7398), 17 pages.
Office Action, dated Jan. 20, 2017, received in U.S. Appl. No. 15/231,745 (7403), 21 pages.
Office Action and Search Report, dated Oct. 17, 2016, received in Danish Patent Application No. 201670587 (7403DK), which corresponds with U.S. Appl. No. 15/231,745, 9 pages.
Office Action (Search Report), dated Dec. 14, 2016, received in Danish Patent Application No. 201670590 (7403DK01), which corresponds with U.S. Appl. No. 15/231,745, 9 pages.
Office Action (Search Report), dated Nov. 10, 2016, received in Danish Patent Application No. 201670591 (7403DK02), which corresponds with U.S. Appl. No. 15/231,745, 12 pages.
Office Action and Search Report, dated Oct. 26, 2016, received in Danish Patent Application No. 201670592 (7403DK03), which corresponds with U.S. Appl. No. 15/231,745, 8 pages.
Office Action, dated Jan. 5, 2017, received in Danish Patent Application No. 201670592 (7403DK03), which corresponds with U.S. Appl. No. 15/231,745, 3 pages.
Office Action and Search Report, dated Oct. 12, 2016, received in Danish Patent Application No. 201670593 (7403DK04), which corresponds with U.S. Appl. No. 15/231,745, 7 pages.
Extended European Search Report, dated Oct. 7, 2016, received in European Patent Application No. 16177863.4, which corresponds with U.S. Appl. No. 14/536,267, 12 pages.
Extended European Search Report, dated Mar. 15, 2017, received in European Patent Application No. 17153418.3, which corresponds with U.S. Appl. No. 14/536,648, 7 pages.
International Search Report and Written Opinion, dated Oct. 14, 2016, received in International Patent Application No. PCT/US2016/020697, which corresponds with U.S. Appl. No. 14/866,981, 21 pages.
International Search Report and Written Opinion, dated Jul. 21, 2016, received in International Patent Application No. PCT/US2016/019913, which corresponds with U.S. Appl. No. 14/868,078, 16 pages.
International Search Report and Written Opinion, dated Oct. 31, 2016, received in International Patent Application No. PCT/US2016/033578, which corresponds with U.S. Appl. No. 14/863,432, 36 pages.
International Search Report and Written Opinion, dated Nov. 14, 2016, received in International Patent Application No. PCT/US2016/033541, which corresponds with U.S. Appl. No. 14/866,511, 29 pages.
International Search Report and Written Opinion, dated Aug. 29, 2016, received in International Patent Application No. PCT/US2016/021400, which corresponds with U.S. Appl. No. 14/869,899, 48 pages.
International Search Report and Written Opinion, dated Jan. 12, 2017, received in International Patent No. PCT/US2016/046419, which corresponds with U.S. Appl. No. 14/866,992, 23 pages.
International Search Report and Written Opinion, dated Dec. 15, 2016, received in International Patent Application No. PCT/US2016/046403, which corresponds with U.S. Appl. No. 15/009,661, 17 pages.
International Search Report and Written Opinion, dated Feb. 27, 2017, received in International Patent Application No. PCT/US2016/046407, which corresponds with U.S. Appl. No. 15/009,688, 30 pages.
Extended European Search Report, dated Dec. 21, 2016, received in European Patent Application No. 16189790.5, which corresponds with U.S. Appl. No. 14/871,462, 8 pages.
International Search Report and Written Opinion, dated Jan. 3, 2017, received in International Patent Application No. PCT/US2016/046214, which corresponds with U.S. Appl. No. 15/231,745, 25 pages.

(56) References Cited

OTHER PUBLICATIONS

Office Action, dated Jul. 15, 2015, received in Australian Patent Application No. 2013259606, which corresponds with U.S. Appl. No. 14/536,426, 3 pages.
Office Action, dated Jul. 17, 2015, received in Australian Patent Application No. 2013259613, which corresponds with U.S. Appl. No. 14/536,646, 5 pages.
Office Action, dated Jul. 9, 2015, received in Australian Patent Application No. 2013259630, which corresponds with U.S. Appl. No. 14/536,203, 3 pages.
International Preliminary Report on Patentability, dated Jun. 30, 2015, received in International Patent Application No. PCT/US2013/069472, which corresponds with U.S. Appl. No. 14/608,895, 18 pages.
International Preliminary Report on Patentability, dated Jun. 30, 2015, received in International Application No. PCT/2013/069483, which corresponds to U.S. Appl. No. 14/608,942, 13 pages.
International Preliminary Report on Patentability, dated Jun. 30, 2015, received in International Patent Application No. PCT/US2013/069484, which corresponds with U.S. Appl. No. 14/608,965, 12 pages.
International Preliminary Report on Patentability, dated Jun. 30, 2015, received in International Patent Application No. PCT/US2013/069486, which corresponds with U.S. Appl. No. 14/608,985, 19 pages.
International Preliminary Report on Patentability, dated Jun. 30, 2015, received in International Patent Application No. PCT/US2013/069489, which corresponds with U.S. Appl. No. 14/609,006, 10 pages.
Sood, "MultitaskingGestures", http://cydia.saurik.com/package/org.thebigboxx.multitaskinggestures/, Mar. 3, 2014, 2 pages.
YouTube, "Multitasking Gestures: Zephyr Like Gestures on iOS", https://www.youtube.com/watch?v=Jcod-f7Lw0I, Jan. 27, 2014, 3 pages.
Office Action, dated Jul. 26, 2017, received in U.S. Appl. No. 14/536,235 (5840), 14 pages.
Office action, dated Aug. 3, 2017, received in U.S. Appl. No. 14/536,426 (5842), 10 pages.
Office Action, dated Aug. 21, 2017, received in European Patent Application No. 15183980.0 (5842EP01), which corresponds with U.S. Appl. No. 14/536,426, 3 pages.
Final Office Action, dated Aug. 25, 2017, received in U.S. Appl. No. 14/536,464 (5843), 30 pages.
Office Action, dated Jul. 4, 2017, received in European Patent Application No. 13795392.3 (5845EP), which corresponds with U.S. Appl. No. 14/608,926, 4 pages.
Patent, dated Jun. 30, 2017, received in Korean Patent Application No. 2015-7018853 (5845KR), which corresponds with U.S. Appl. No. 14/608,926, 3 pages.
Office Action, dated Jul. 21, 2017, received in Australian Patent Application No. 2016262773 (5847AU01), which corresponds with U.S. Appl. No. 14/536,141, 3 pages.
Patent, dated Jul. 28, 2017, received in Japanese Patent Application No. 2015-511646 (5847JP), which corresponds with U.S. Appl. No. 14/536,141, 3 pages.
Office Action, dated Jul. 17, 2017, received in U.S. Appl. No. 14/536,166 (5849), 19 pages.
Office Action, dated Jul. 21, 2017, received in Australian Patent Application No. 2016216658 (5854AU01), which corresponds with U.S. Appl. No. 14/536,291, 3 pages.
Office Action, dated Jul. 21, 2017, received in Australian Patent Application No. 2016247194 (5858AU), which corresponds with U.S. Appl. No. 14/536,648, 3 pages.
Patent, dated Jul. 28, 2017, received in Japanese Patent Application No. 2016-558331 (7246JP), which corresponds with U.S. Appl. No. 14/864,737, 3 pages.
Grant, dated Jul. 21, 2017, received in Dutch Patent Application No. 2016801 (7270NL), which corresponds with U.S. Appl. No. 14/871,227, 8 pages.
Notice of Allowance, dated Jul. 14, 2017, received in Japanese Patent Application No. 2016558214 (7294JP), which corresponds with U.S. Appl. No. 14/866,511, 5 pages.
Office Action, dated Jul. 31, 2017, received in Japanese Patent Application No. 2017126445 (7335JP01), which corresponds with U.S. Appl. No. 14/866,987, 6 pages.
Office Action, dated Aug. 4, 2017, received in Japanese Patent Application No. 2016-533201 (7341JP), which corresponds with U.S. Appl. No. 14/871,227, 6 pages.
Final Office Action, dated Aug. 18, 2017, received in U.S. Appl. No. 14/869,873 (7348), 20 pages.
Office Action, dated Jul. 27, 2017, received in Australian Patent Application No. 2017100535 (7430AU), which corresponds with U.S. Appl. No. 15/272,341, 4 pages.
Office Action, dated Aug. 4, 2017, received in Danish Patent Application No. 201770377 (7479DK), 9 pages.
Office Action, dated Aug. 30, 2017, received in U.S. Appl. No. 15/655,749 (7506), 22 pages.
Search Report, dated Jun. 22, 2017, received in Dutch Patent Application No. 2016375, which corresponds with U.S. Appl. No. 14/866,981, 17 pages.
Extended European Search Report, dated Jul. 25, 2017, received in European Patent Application No. 17171972.7, which corresponds with U.S. Appl. No. 14/870,882, 12 pages.
Extended European Search Report, dated Jul. 25, 2017, received in European Patent Application No. 17172266.3, which corresponds with U.S. Appl. No. 14/871,336, 9 pages.
Bautisa, "Microsoft Mathematics Tutorial 7—The lnk Input", <URL:http://mathandmultimedia.com/2012/05/23/microsoft-math-tutorial-7-ink>, May 23, 2012, 3 pages.
Davidson, et al., "Extending 2D Object Arrangement with Pressure-Sensitive Layering Cues", Proceedings of the 21st Annual ACM Symposium on User Interface Software and Technology, Oct. 19, 2008, 4 pages.
Dinwiddie, et al., "Combined-User Interface for Computers, Television, Video Recorders, and Telephone, Etc", IP.com Journal, Aug. 1, 1990, 3 Pages.
Forlines, et al., "Glimpse: a Novel Input Model for Multi-level Devices", Chi '05 Extended Abstracts on Human Factors in Computing Systems, Apr. 2, 2005, 4 pages.
Harrison, "Stylus-Based Interface with Full Mouse Emulation", IBM Technical Disclosure Bulletin, vol. 34, No. 10B, Mar. 1, 1992, 3 pages.
Kaaresoja, et al., "Snap-Crackle-Pop: Tactile Feedback for Mobile Touch Screens", Proceedings of Eurohaptics vol. 2006, Jul. 3, 2006, 2 pages.
Minsky, "Computational Haptics The *Sandpaper* System for Synthesizing Texture for a Force-Feedback Display," Massachusetts Institute of Technology, Jun. 1978, 217 pages.
O'Hara, et al., "Pressure-Sensitive Icons", IP.com Journal, Jun. 1, 1990, 2 Pages.
Quinn, et al., "Zoofing! Faster List Selections with Pressure-Zoom-Flick-Scrolling", Proceedings of the 21st Annual Conference of the Australian Computer-Human Interaction Special Interest Group on Design, Nov. 23, 2009, ACM Press, vol. 411, 8 pages.
Rekimoto, et al., "PreSense: Interaction Techniques for Finger Sensing Input Devices", Proceedings of the 16th Annual ACM Symposium on User Interface Software and Technology, Nov. 30, 2003, 10 pages.
Rekimoto, et al., "PreSensell: Bi-directional Touch and Pressure Sensing Interactions with Tactile Feedback", Conference on Human Factors in Computing Systems Archive, ACM, Apr. 22, 2006, 6 pages.
Song, et al., "Grips and Gestures on a Multi-Touch Pen," The ACM CHI Conference on Human Factors in Computing Systems, <URL:research.microsoft.com/pubs/.../gripsandgenstures%20mtpen-chi201>, May 7-12, 2011, 10 pages.
International Search Report and Written Opinion dated May 26, 2014, received in International Application No. PCT/US2013/040053, which corresponds to U.S. Appl. No. 14/535,671, 32 pages.
International Preliminary Report on Patentability dated Nov. 20, 2014, received in International Application No. PCT/US2013/040053, which corresponds to U.S. Appl. No. 14/535,671, 26 pages.

(56) References Cited

OTHER PUBLICATIONS

Invitation to Pay Additional Fees dated Feb. 10, 2014, received in International Application No. PCT/US2013/069472, which corresponds to U.S. Appl. No. 14/608,895, 6 pages.
International Search Report and Written Opinion dated Apr. 7, 2014, received in International Application No. PCT/US2013/069472, which corresponds to U.S. Appl. No. 14/608,895, 24 pages.
International Search Report and Written Opinion dated Aug. 7, 2013, received in International Application No. PCT/US2013/040054, which corresponds to U.S. Appl. No. 14/536,235, 12 pages.
International Preliminary Report on Patentability dated Nov. 20, 2014, received in International Application No. PCT/US2013/040054, which corresponds to U.S. Appl. No. 14/536,235, 11 pages.
International Search Report and Written Opinion dated Aug. 7, 2013, received in International Application No. PCT/US2013/040056, which corresponds to U.S. Appl. No. 14/536,367, 12 pages.
International Preliminary Report on Patentability dated Nov. 20, 2014, received in International Application No. PCT/US2013/040056, which corresponds to U.S. Appl. No. 14/536,367, 11 pages.
International Search Report and Written Opinion dated Aug. 6, 2013, received in International Application No. PCT/US2013/040058, which corresponds to U.S. Appl. No. 14/536,426, 12 pages.
International Preliminary Report on Patentability dated Nov. 20, 2014, received in International Application No. PCT/US2013/040058, which corresponds to U.S. Appl. No. 14/536,426, 11 pages.
Invitation to Pay Additional Fees dated Sep. 25, 2013, received in International Application No. PCT/US2013/040061, which corresponds to U.S. Appl. No. 14/536,464, 6 pages.
International Search Report and Written Opinion dated Feb. 5, 2014, received in International Application No. PCT/US2013/040061, which corresponds to U.S. Appl. No. 14/536,464, 30 pages.
International Preliminary Report on Patentability dated Nov. 20, 2014, received in International Application No. PCT/US2013/040061, which corresponds to U.S. Appl. No. 14/536,464, 26 pages.
Invitation to Pay Additional Fees dated Oct. 8, 2013, received in International Application No. PCT/US2013/040067, which corresponds to U.S. Appl. No. 14/536,644, 8 pages.
International Search Report and Written Opinion dated May 8, 2014, received in International Application No. PCT/US2013/040067, which corresponds to U.S. Appl. No. 14/536,644, 45 pages.
International Preliminary Report on Patentability dated Nov. 20, 2014, received in International Application No. PCT/US2013/040067, which corresponds to U.S. Appl. No. 14/536,644, 36 pages.
International Search Report and Written Opinion dated Mar. 12, 2014, received in International Application No. PCT/US2013/069479, 14 pages.
International Search Report and Written Opinion dated Aug. 7, 2013, received in International Application No. PCT/US2013/040070, which corresponds to U.S. Appl. No. 14/535,646, 12 pages.
International Preliminary Report on Patentability dated Nov. 20, 2014, received in International Application No. PCT/US2013/040070, which corresponds to U.S. Appl. No. 14/535,646, 10 pages.
Invitation to Pay Additional Fees dated Oct. 28, 2013, received in International Application No. PCT/US2013/040072, which corresponds to U.S. Appl. No. 14/536,141, 7 pages.
International Search Report and Written Opinion dated Apr. 7, 2014, received in International Application No. PCT/US2013/040072, which corresponds to U.S. Appl. No. 14/536,141, 38 pages.
International Preliminary Report on Patentability dated Nov. 20, 2014, received in International Application No. PCT/US2013/040072, which corresponds to U.S. Appl. No. 14/536,141, 32 pages.
Invitation to Pay Additional Fees dated Feb. 14, 2014, received in International Application No. PCT/US2013/069483, 7 pages.
International Search Report and Written Opinion dated Apr. 7, 2014, received in International Application No. PCT/US2013/069483, 18 pages.
Invitation to Pay Additional Fees dated Oct. 28, 2013, received in International Application No. PCT/US2013/040087, which corresponds to U.S. Appl. No. 14/536,166, 8 pages.
International Search Report and Written Opinion dated Mar. 3, 2014, received in International Application No. PCT/US2013/040087, which corresponds to U.S. Appl. No. 14/536,166, 35 pages.
International Preliminary Report on Patentability dated Nov. 20, 2014, received in International Application No. PCT/2013/040087, which corresponds to U.S. Appl. No. 14/536,166, 29 pages.
International Search Report and Written Opinion dated Aug. 7, 2013, received in International Application No. PCT/US2013/040093, which corresponds to U.S. Appl. No. 14/536,203, 11 pages.
International Preliminary Report on Patentability dated Nov. 20, 2014, received in International Application No. PCT/2013040093, which corresponds to U.S. Appl. No. 14,536,203, 9 pages.
Invitation to Pay Additional Fees dated Apr. 17, 2014, received in International Application No. PCT/US2013/069484, 7 pages.
International Search Report and Written Opinion dated Jul. 9, 2014, received in International Application No. PCT/US2013/069484, 17 pages.
Invitation to Pay Additional Fees dated Sep. 25, 2013, received in International Application No. PCT/US2013/040098, which corresponds to U.S. Appl. No. 14/536,247, 8 pages.
International Search Report and Written Opinion dated Feb. 5, 2014, received in International Application No. PCT/US2013/040098, which corresponds to U.S. Appl. No. 14/536,247, 35 pages.
International Preliminary Report on Patentability dated Nov. 20, 2014, received in International Application No. PCT/2013/040098, which corresponds to U.S. Appl. No. 14/536,247, 27 pages.
Invitation to Pay Additional Fees dated Aug. 7, 2013, received in International Application No. PCT/US2013/040101, which corresponds to U.S. Appl. No. 14/536,267, 7 pages.
International Search Report and Written Opinion dated Jan. 27, 2014, received in International Application No. PCT/US2013/040101, 30 pages.
International Preliminary Report on Patentability dated Nov. 20, 2014, received in International Application No. PCT/2013/040101, which corresponds to U.S. Appl. No. 14/536,267, 24 pages.
Invitation to Pay Additional Fees dated Aug. 7, 2013, received in International Application No. PCT/US2013/040108, which corresponds to U.S. Appl. No. 14/536,291, 6 pages.
International Search Report and Written Opinion dated Jan. 8, 2014, received in International Application No. PCT/US2013/040108, 30 pages.
International Preliminary Report on Patentability dated Nov. 20, 2014, received in International Application No. PCT/2013/040108, which corresponds to U.S. Appl. No. 14/536,291, 25 pages.
Invitation to Pay Additional Fees dated Apr. 1, 2014, received in International Application No. PCT/US2013/069486, 7 pages.
International Search Report and Written Opinion dated Jun. 2, 2014, received in International Application No. PCT/US2013/069486, 7 pages.
International Search Report and Written Opinion dated Mar. 6, 2014, received in International Application No. PCT/US2013/069489, 12 pages.
International Search Report and Written Opinion dated Sep. 30, 2014, received in International Application No. PCT/US2014/047303, 10 pages.
Brownlee, "Android 5.0 Lollipop Feature Review!", https//www.youtube.com/watch?v=pEDQ1z1-PvU, Oct. 27, 2014, 5 pages.
Google-Chrome, "Android 5.0 Lollipop", http://androidlover.net/android-os/android-5-0-lollipop/android-5-0-lollipop-recent-apps-card-google-search.html, Oct. 19, 2014, 10 pages.
iPhoneOperator, "Wasser Liveeffekt fur Homescreen & Lockscreen—Aquaboard (Cydia)", http://www.youtube.com/watch?v=fG9YMF-mB0Q, Sep. 22, 2012, 3 pages.
YouTube, "How to Master Android Lollipop Notifications in Four Minutes!", Video Gadgets Journal (VGJFelix), https://www.youtube.com/watch?v=S-zBRG7GGJgs, Feb. 8, 2015, 4 pages.
Office Action, dated Jun. 29, 2017, received in U.S. Appl. No. 14/608,895 (5839), 30 pages.
Patent, dated May 12, 2017, received in Japanese Patent Application No. 2015-547948 (5839JP), which corresponds with U.S. Appl. No. 14/536,426, 3 pages.

(56) References Cited

OTHER PUBLICATIONS

Patent, dated May 26, 2017, received in Korean Patent Application No. 2015-7018851 (5839KR), which corresponds with U.S. Appl. No. 14/536,426, 3 pages.
Office Action, dated Apr. 5, 2017, received in U.S. Appl. No. 14/536,367 (5841), 16 pages.
Office Action, dated May 15, 2017, received in Australian Patent Application No. 2016216580 (5842AU02), which corresponds with U.S. Appl. No. 14/536,426, 3 pages.
Office Action, dated May 4, 2017, received in Chinese Patent Application No. 201380068414.1 (5845CN), which corresponds with U.S. Appl. No. 14/608,926, 5 pages.
Notice of Allowance, dated Mar. 31, 2017, received in Korean Patent Application No. 2015-7018853 (5845KR), which corresponds with U.S. Appl. No. 14/608,926, 4 pages.
Patent, dated May 26, 2017, received in European Patent Application No. 13724102.2 (5846EP), which corresponds with U.S. Appl. No. 14/536,646, 1 page.
Office Action, dated Apr. 3, 2017, received in U.S. Appl. No. 14/536,141 (5847), 11 pages.
Notice of Allowance, dated Jun. 30, 2017, received in Japanese Patent Application No. 2015-511646 (5847JP), which corresponds with U.S. Appl. No. 14/536,141, 5 pages.
Notice of Allowance, dated May 12, 2017, received in U.S. Appl. No. 14/608,942 (5848), 10 pages.
Office Action, dated Mar. 29, 2017, received in Australian patent Application No. 2016201303 (5848AU01), which corresponds with U.S. Appl. No. 14/608,942, 3 pages.
Office Action, dated Jun. 16, 2017, received in Chinese Patent Application No. 201380068295.X (5848CN), which corresponds with U.S. Appl. No. 14/608,942, 6 pages.
Notice of Allowance, dated May 12, 2017, received in Japanese Patent Application No. 2015-549393, (5848JP) which corresponds with U.S. Appl. No. 14/608,942, 5 pages.
Patent, dated Jun. 16, 2017, received in Japanese Patent Application No. 2015-549393, (5848JP) which corresponds with U.S. Appl. No. 14/608,942, 3 pages.
Office Action, dated Jul. 4, 2017, received in Australian Patent Application No. 2016238917 (5850AU01), which corresponds with U.S. Appl. No. 14/536,203, 5 pages.
Office Action, dated Jun. 23, 2017, received in Japanese Patent Application No. 2016173113 (5850JP01), which corresponds with U.S. Appl. No. 14/536,203, 5 pages.
Office Action, dated Mar. 24, 2017, received in Australian Patent Application No. 2016204411 (5853AU01), which corresponds with U.S. Appl. No. 14/536,267, 3 pages.
Office Action, dated Apr. 7, 2017, received in U.S. Appl. No. 14/536,291 (5854), 11 pages.
Office Action, dated Mar. 23, 2017, received in European Patent Application No. 13724107.1 (5854EP), which corresponds with U.S. Appl. No. 14/536,291, 8 pages.
Patent, dated May 18, 2017, received in Australian Patent Application No. 2013368445 (5855AU), which corresponds with U.S. Appl. No. 14/608,985, 1 page.
Office Action, dated May 19, 2017, received in Chinese Patent Application No. 201380068399.0 (5855CN), which corresponds with U.S. Appl. No. 14/608,985, 5 pages.
Office Action, dated Apr. 19, 2017, received in U.S. Appl. No. 14/536,296 (5857), 12 pages.
Notice of Allowance, dated Jul. 10, 2017, received in U.S. Appl. No. 14/609,042 (5859), 8 pages.
Notice of Allowance, dated Jun. 19, 2017, received in U.S. Appl. No. 14/864,737 (7246), 8 pages.
Office Action, dated May 15, 2017, received in Japanese Patent Application No. 2016-558331 (7246JP), which corresponds with U.S. Appl. No. 14/864,737, 5 pages.
Notice of Allowance, dated Jun. 23, 2017, received in Japanese Patent Application No. 2016-558331 (7246JP), which corresponds with U.S. Appl. No. 14/864,737, 5 pages.
Office Action, dated Jul. 7, 2017, received in Danish Patent Application No. 201500575 (7247DK), 4 pages.
Office Action, dated Jul. 6, 2017, received in Danish Patent Application No. 201500574 (7265DK), which corresponds with U.S. Appl. No. 14/866,159, 3 pages.
Notice of Allowance, dated May 2, 2017, received in received in Danish Patent Application No. 201500588 (7267DK), which corresponds with U.S. Appl. No. 14/868,078, 2 pages.
Notice of Allowance, dated Apr. 27, 2017, received in U.S. Appl. No. 14/863,432 (7270), 7 pages.
Office Action, dated Jun. 12, 2017, received in Danish Patent Application No. 201500582 (7270DK), which corresponds with U.S. Appl. No. 14/863,432, 5 pages.
Office Action, dated Jun. 9, 2017, received in Japanese Patent Application No. 2016558214 (7294JP), which corresponds with U.S. Appl. No. 14/866,511, 6 pages.
Notice of Allowance, dated Apr. 27, 2017, received in U.S. Appl. No. 14/866,489 (7298), 27 pages.
Notice of Allowncc, dated Jul. 6, 2017, received in U.S. Appl. No. 14/866,489 (7298), 12 pages.
Office Action, dated Jul. 3, 2017, received in Danish Patent Application No. 201500592 (7309DK), which corresponds with U.S. Appl. No. 14/869,899, 5 pages.
Office Action, dated Apr. 13, 2017, received in U.S. Appl. No. 14/866,992 (7310), 34 pages.
Office Action, dated May 2, 2017, received in U.S. Appl. No. 14/856,517 (7317), 34 pages.
Office Action, dated May 18, 2017, received in U.S. Appl. No. 14/856,519 (7318), 35 pages.
Office Action, dated Jun. 9, 2017, received in U.S. Appl. No. 14/856,520 (7319), 36 pages.
Office Action, dated Jun. 30, 2017, received in U.S. Appl. No. 14/856,522 (7320), 22 pages.
Notice of Allowance, dated Jun. 16, 2017, received in in U.S. Appl. No. 14/857,645 (7321), 5 pages.
Office Action, dated Mar. 31, 2017, received in U.S. Appl. No. 14/857,700 (7324), 14 pages.
Office Action, dated May 5, 2017, received in Danish Patent Application No. 201500584 (7330DK), which corresponds with U.S. Appl. No. 14/864,580, 3 pages.
Notice of Allowance, dated Apr. 20, 2017, received in U.S. Appl. No. 14/864,601 (7331), 13 pages.
Office Action, dated May 4, 2017, received in Danish Patent Application No. 201500585 (7332DK), which corresponds with U.S. Appl. No. 14/864,627, 4 pages.
Office Action, dated Jun. 15, 2017, received in Danish Patent Application No. 201500579 (7334DK), which corresponds with U.S. Appl. No. 14/866,361, 2 pages.
Patent, dated May 3, 2017, received in Chinese Patent Application No. 2016201470246.X (7335CN01), which corresponds with U.S. Appl. No. 14/866,987, 2 pages.
Office Action, dated Apr. 19, 2017, received in Danish Patent Application No. 201670463 (7335DK01), which corresponds with U.S. Appl. No. 14/866,987, 3 pages.
Office Action, dated Jun. 16, 2017, received in Japanese Patent Application No. 2016-233450 (7336JP), which corresponds with U.S. Appl. No. 14/866,989, 6 pages.
Office Action, dated Jun. 15, 2017, received in Danish Patent Application No. 201500595 (73370K), which corresponds with U.S. Appl. No. 14/871,236, 4 pages.
Office Action, dated Apr. 13, 2017, received in Australian Patent Application No. 2016101431 (7341AU01), which corresponds with U.S. Appl. No. 14/871,227, 4 pages.
Office Action, dated Mar. 24, 2017, received in Japanese Patent Application No. 2016-533201 (7341JP), which corresponds with U.S. Appl. No. 14/871,227, 6 pages.
Office Action, dated Apr. 11, 2017, received in Australian Patent Application No. 2016101437 (7342AU), which corresponds with U.S. Appl. No. 14/871,336, 4 pages.
Notice of Allowance, dated Mar. 23, 2017, received in Danish Patent Application No. 201500601 (7342DK), which corresponds with U.S. Appl. No. 14/871,336, 2 pages.

(56) References Cited

OTHER PUBLICATIONS

Office Action, dated Apr. 20, 2017, received in Chinese Patent Application No. 201621044346.2 (7343CN01), which corresponds with U.S. Appl. No. 14/871,462, 3 pages.
Office Action, dated May 11, 2017, received in U.S. Appl. No. 14/867,823 (7344), 42 pages.
Office Action, dated May 15, 2017, received in Danish Patent Application No. 201500594 (7344DK), which corresponds with U.S. Appl. No. 14/867,823, 4 pages.
Office Action, dated Jul. 6, 2017, received in U.S. Appl. No. 14/867,892 (7345), 55 pages.
Office Action, dated May 4, 2017, received in Danish Patent Application No. 201500598 (7345DK), which corresponds with U.S. Appl. No. 14/867,892, 4 pages.
Office Action, dated May 3, 2017, received in Danish Patent Application No. 201500581 (7352DK), which corresponds with U.S. Appl. No. 14/867,990, 5 pages.
Final Office Action, dated Jun. 2, 2017, received in U.S. Appl. No. 15/081,771 (7398), 17 pages.
Final Office Action, dated May 1, 2017, received in U.S. Appl. No. 15/136,782 (7399), 18 pages.
Office Action, dated May 23, 2017, received in Danish Patent Application No. 201770190 (7399DK), which corresponds with U.S. Appl. No. 15/136,782, 7 pages.
Office Action, dated Jun. 29, 2017, received in Danish Patent Application No. 201670587 (7403DK), which corresponds with U.S. Appl. No. 15/231,745, 4 pages.
Office Action, dated Jul. 6, 2017, received in Danish Patent Application No. 201670590 (7403DK01), which corresponds with U.S. Appl. No. 15/231,745, 3 pages.
Search Report, dated Apr. 13, 2017, received in Dutch Patent Application No. 2016452, which corresponds with U.S. Appl. No. 14/864,737, 22 pages.
Search Report, dated Jun. 19, 2017, received in Dutch Patent Application No. 2016377, which corresponds with U.S. Appl. No. 14/866,159, 13 pages.
Search Report, dated Apr. 13, 2017, received in Dutch Patent Application No. 2016376, which corresponds with U.S. Appl. No. 14/868,078, 15 pages.
Search Report, dated Apr. 18, 2017, received in Dutch Patent Application No. 2016801, which corresponds with U.S. Appl. No. 14/863,432, 34 pages.
Extended European Search Report, dated Jun. 22, 2017, received in European Patent Application No. 16189421.7, which corresponds with U.S. Appl. No. 14/866,987, 7 pages.
Extended European Search Report, dated Jun. 8, 2017, received in European Patent Application No. 16189425.8, which corresponds with U.S. Appl. No. 14/866,989, 8 pages.
Anonymous, "Google Android 5.0 Release Date, Specs and Editors Hands on Review—CNET", http://www.cnet.com/products/google-an-android-5-0-lollipop/, Mar. 12, 2015, 10 pages.
YouTube, "Recentz—Recent Apps in a Tap", https://www.youtube.com/watch?v=qailSHRgsTo, May 15, 2015, 1 page.
Certificate of Grant, dated Apr. 29, 2017, received in Australian Patent Application No. 2013368440 (5839AU), which corresponds with U.S. Appl. No. 14/536,426, 3 pages.
Office Action, dated Sep. 19, 2017, received in Chinese Patent Application No. 201380035982.1 (5842CN), which corresponds with U.S. Appl. No. 14/536,426, 5 pages.
Office Action, dated Sep. 20, 2017, received in Chinese Patent Application No. 201510566550.4 (5842CN01), which corresponds with U.S. Appl. No. 14/536,426, 11 pages.
Office Action, dated Sep. 25, 2017, received in U.S. Appl. No. 14/536,644 (5844), 29 pages.
Office Action, dated Aug. 22, 2017, received in Korean Patent Application No. 2017-7018250 (5845KR01), which corresponds with U.S. Appl. No. 14/608,926, 2 pages.
Notice of Allowance, dated Sep. 20, 2017, received in U.S. Appl. No. 14/536,141 (5847), 10 pages.
Office Action, dated Sep. 13, 2017, received in European Patent Application No. 16177863.4 (5853EP01), which corresponds with U.S. Appl. No. 14/536,267, 6 pages.
Notice of Allowance, dated Sep. 1, 2017, received in Korean Patent Application No. 2016-7029533 (5853KR01), which corresponds with U.S. Appl. No. 14/536,267, 4 pages.
Notice of Allowance, dated Sep. 19, 2017, received in Chinese Patent Application No. 201380068399.0 (5855CN), which corresponds with U.S. Appl. No. 14/608,985, 3 pages.
Office Action, dated Sep. 19, 2017, received in Korean Patent Application No. 2015-7019984 (5855KR), which corresponds with U.S. Appl. No. 14/608,985, 4 pages.
Final Office Action, dated Sep. 21, 2017, received in U.S. Appl. No. 14/609,006 (5856), 17 pages.
Patent, dated Jul. 12, 2017, received in Dutch Patent Application No. 2016452 (7246NL), which corresponds with U.S. Appl. No. 14/864,737, 2 pages.
Patent, dated Sep. 7, 2017, received in Dutch Patent Application No. 2016377 (7265NL), which corresponds with U.S. Appl. No. 14/866,159, 4 pages.
Notice of Allowance, dated Sep. 1, 2017, received in Korean Patent Application No. 2016229421 (7267AU02), which corresponds with U.S. Appl. No. 14/868,078, 3 pages.
Patent, dated Sep. 11, 2017, received in Danish Patent Application No. 201500588 (7267DK), which corresponds with U.S. Appl. No. 14/868,078, 5 pages.
Patent, dated Jul. 12, 2017, received in Dutch Patent Application No. 2016376 (7267NL), which corresponds with U.S. Appl. No. 14/868,078, 2 pages.
Notice of Allowance, dated Sep. 18, 2017, received in U.S. Appl. No. 14/863,432 (7270), 8 pages.
Patent, dated Aug. 18, 2017, received in Japanese Patent Application No. 2016558214 (7294JP), which corresponds with U.S. Appl. No. 14/866,511, 3 pages.
Office Action, dated Sep. 5, 2017, received in Danish Patent Application No. 201500593 (7310DK), which corresponds with U.S. Appl. No. 14/866,992, 6 pages.
Office Action, dated Sep. 22, 2017, received in Japanese Patent Application No. 2017-029201 (7322JP), which corresponds with U.S. Appl. No. 14/857,636 8 pages.
Notice of Allowance, dated Sep. 22, 2017, received in Japanese Patent Application No. 2016-233449 (7335JP), which corresponds with U.S. Appl. No. 14/866,987, 5 pages.
Office Action, dated Sep. 1, 2017, received in U.S. Appl. No. 14/870,754 (7338), 22 pages.
Office Action, dated Sep. 1, 2017, received in U.S. Appl. No. 14/870,988 (7340), 14 pages.
Office Action, dated Aug. 29, 2017, received in Korean Patent Application No. 2017-7014536 (7398KR), which corresponds with U.S. Appl. No. 15/081,771, 5 pages.
Notice of Allowance, dated Jul. 6, 2017, received in U.S. Appl. No. 15/231,745 (7403), 18 pages.
Extended European Search Report, dated Sep. 11, 2017, received in European Patent Application No. 17163309.2, which corresponds with U.S. Appl. No. 14/866,987, 8 pages.
MacKenzie et al., "The Tactile Touchpad", Chi '97 Extended Abstracts on Human Factors in Computing Systems Looking to the Future, Chi '97, Mar. 22, 1997, 5 pages.
VisioGuy, "Getting a Handle on Selecting and Subselecting Visio Shapes", http://www.visguy.com/2009/10/13/getting-a-handle-on-selecting-and-subselecting-visio-shapes/, Oct. 13, 2009, 18 pages.
YouTube, "Android Lollipop Lock-Screen Notification Tips", https://www.youtube.com/watch?v=LZTxHBOwzIU, Nov. 13, 2014, 3 pages.
YouTube, "HTC One Favorite Camera Features", http://www.youtube.com/watch?v=sUYHfcjI4RU, Apr. 28, 2013, 3 pages.
Office Action, dated Nov. 30, 2017, received in U.S. Appl. No. 14/535,671 (5448), 21 pages.
Final Office Action, dated Feb. 22, 2018, received in U.S. Appl. No. 14/608,895 (5839), 20 pages.
Office Action, dated Nov. 6, 2017, received in Chinese Patent Application No. 201380068493.6 (5839CN), which corresponds with U.S. Appl. No. 14/608,895, 5 pages.

(56) References Cited

OTHER PUBLICATIONS

Final Office Action, dated Feb. 26, 2018, received in U.S. Appl. No. 14/536,235 (5840), 13 pages.
Notice of Allowance, dated Nov. 30, 2017, received in U.S. Appl. No. 14/536,367 (5841), 9 pages.
Certificate of Grant, dated Nov. 10, 2017, received in Hong Kong Patent Application No. 15107535.0 (5842HK), which corresponds with U.S. Appl. No. 14/536,426, 2 pages.
Notice of Allowance, dated Dec. 8, 2017, received in Japanese Patent Application No. 2015-511644 (5842JP), which corresponds with U.S. Appl. No. 14/536,426, 6 pages.
Patent, dated Jan. 12, 2018, received in Japanese Patent Application No. 2015-511644 (5842JP), which corresponds with U.S. Appl. No. 14/536,426, 3 pages.
Office Action, dated Feb. 12, 2018, received in U.S. Appl. No. 14/536,464 (5843), 33 pages.
Office Action, dated Oct. 19, 2017, received in U.S. Appl. No. 14/608,926 (5845), 14 pages.
Notice of Acceptance, dated Dec. 20, 2017, received in Australian Patent Application No. 2016201451 (5845AU01), which corresponds with U.S. Appl. No. 14/608,926, 3 pages.
Notice of Allowance, dated Feb. 8, 2018, received in Chinese Patent Application No. 201380068414.1 (5845CN), which corresponds with U.S. Appl. No. 14/608,926, 2 pages.
Oral Summons, dated Feb. 13, 2017, received in European Patent Application No. 13795392.3 (5845EP), which corresponds with U.S. Appl. No. 14/608,926, 11 pages.
Notice of Allowance, dated Dec. 29, 2017, received in Korean Patent Application No. 2017-7018250 (5845KR01), which corresponds with U.S. Appl. No. 14/608,926, 3 pages.
Notice of Allowance, dated Oct. 9, 2017, received in Chinese Patent Application No. 2013800362059 (5846CN), which corresponds with U.S. Appl. No. 14/536,646, 3 pages.
Office Action, dated Oct. 19, 2017, received in U.S. Appl. No. 14/536,646 (5846), 21 pages.
Office Action, dated Feb. 2, 2018, received in Chinese Patent Application No. 201380035893.7 (5847CN), which corresponds with U.S. Appl. No. 14/536,141, 5 pages.
Office Action, dated Oct. 25, 2017, received in Chinese Patent Application No. 201380035977.0 (5850CN), which corresponds with U.S. Appl. No. 14/536,203, 5 pages.
Office Action, dated Dec. 6, 2017, received in European Patent Application No. 13724104.8 (5850EP), which corresponds with U.S. Appl. No. 14/536,203, 9 pages.
Notice of Allowance, dated Jan. 12, 2018, received in Japanese Patent Application No. 2016173113 (5850JP01), which corresponds with U.S. Appl. No. 14/536,203, 5 pages.
Notice of Allowance, dated Oct. 30, 2017, received in Korean Patent Application No. 2016-7033834 (5850KR01), which corresponds with U.S. Appl. No. 14/536,203, 5 pages.
Patent, dated Jan. 23, 2018, received in Korean Patent Application No. 2016-7033834 (5850KR01), which corresponds with U.S. Appl. No. 14/536,203, 4 pages.
Office Action, dated Oct. 20, 2017, received in U.S. Appl. No. 14/608,965 (5851), 14 pages.
Office action, dated Oct. 11, 2017, received in Chinese Patent Application No. 201380074060.1 (5851CN), which corresponds with U.S. Appl. No. 14/608,965, 5 pages.
Notice of Allowance, dated Nov. 22, 2017, received in U.S. Appl. No. 14/536,247 (5852), 6 pages.
Notice of Allowance, dated Nov. 9, 2017, received in U.S. Appl. No. 14/536,267 (5853), 8 pages.
Notice of Allowance, dated Jan. 29, 2018, received in Chinese Patent Application No. 201380035968.1 (5853CN), which corresponds with U.S. Appl. No. 14/536,267, 3 pages.
Office Action, dated Jan. 25, 2018, received in European Patent Application No. 13724106.3 (5853EP), which corresponds with U.S. Appl. No. 14/536,267, 5 pages.
Notice of Allowance, dated Nov. 17, 2017, received in Japanese Patent Application No. 2016-125839 (5853JP01), which corresponds with U.S. Appl. No. 14/536,267, 5 pages.
Patent, dated Dec. 1, 2017, received in Korean Patent Application No. 2016-7029533 (5853KR01), which corresponds with U.S. Appl. No. 14/536,267, 2 pages.
Notice of Allowance, dated Dec. 1, 2017, received in U.S. Appl. No. 14/536,291 (5854), 19 pages.
Office Action, dated Oct. 23, 2017, received in Chinese Patent Application No. 201380035986.X (5854CN), which corresponds with U.S. Appl. No. 14/536,291, 9 pages.
Patent, dated Dec. 8, 2017, received in Chinese Patent Application No. 201380068399.0 (5855CN), which corresponds with U.S. Appl. No. 14/608,985, 4 pages.
Summons, dated Oct. 6, 2017, received in European Patent Application No. 13811032.5 (5855EP), which corresponds with U.S. Appl. No. 14/608,985, 6 pages.
Patent, dated Dec. 19, 2017, received in Korean Patent Application No. 2015-7019984 (5855KR), which corresponds with U.S. Appl. No. 14/608,985, 3 pages.
Final Office Action, dated Nov. 2, 2017, received in U.S. Appl. No. 14/536,296 (5857), 13 pages.
Office Action, dated Nov. 1, 2017, received in U.S. Appl. No. 14/536,648 (5858), 22 pages.
Office Action, dated Feb. 14, 2018, received in Korean Patent Application No. 2017-7030129 (7246KR), which corresponds with U.S. Appl. No. 14/864,737, 17 pages.
Patent, Nov. 16, 2017, received in Dutch Patent Application No. 2016375 (7247NL), which corresponds with U.S. Appl. No. 14/866,981, 2 pages.
Office Action, dated Dec. 15, 2017, received in U.S. Appl. No. 14/866,159 (7265), 35 pages.
Office Action, dated Jan. 10, 2018, received in Danish Patent Application No. 201500574 (7265DK), which corresponds with U.S. Appl. No. 14/866,159, 2 pages.
Office Action, dated Oct. 6, 2017, received in U.S. Appl. No. 14/868,078 (7267), 40 pages.
Certificate of Grant, dated Jan. 3, 2018, received in Australian Patent Application No. 2016229421 (7267AU02), which corresponds with U.S. Appl. No. 14/868,078, 1 page.
Notice of Allowance, dated Oct. 4, 2017, received in U.S. Appl. No. 14/866,511 (7294), 37 pages.
Office Action, dated Nov. 24, 2017, received in European Patent Application No. 16727900.9 (7294EP), which corresponds with U.S. Appl. No. 14/866,511, 5 pages.
Office Action, dated Jan. 29, 2018, received in Danish Patent Application No. 201500592 (7309DK), which corresponds with U.S. Appl. No. 14/869,899, 2 pages.
Office Action, dated Dec. 14, 2017, received in Danish Patent Application No. 201670594 (7309DK01), which corresponds with U.S. Appl. No. 14/869,899, 3 pages.
Final Office Action, dated Oct. 3, 2017, received in U.S. Appl. No. 14/866,992 (7310), 37 pages.
Office Action, dated Jan. 29, 2018, received in U.S. Appl. No. 14/866,992 (7310), 44 pages.
Office Action, dated Jan. 19, 2018, received in Australian Patent Application No. 201761478 (7310AU02), which corresponds with U.S. Appl. No. 14/866,992, 6 pages.
Office Action, dated Feb. 12, 2018, received in U.S. Appl. No. 15/009,661 (7311), 36 pages.
Office Action, dated Jan. 18, 2018, received in U.S. Appl. No. 15/009,676 (7312), 21 Pages.
Final Office Action, dated Oct. 4, 2017, received in U.S. Appl. No. 14/856,517 (7317), 33 pages.
Final Office Action, dated Nov. 15, 2017, received in U.S. Appl. No. 14/856,519 (7318), 31 pages.
Notice of Allowance, dated Jan. 31, 2018, received in U.S. Appl. No. 14/856,519 (7318), 9 pages.
Notice of Allowance, dated Feb. 9, 2018, received in U.S. Appl. No. 14/856,522 (7320), 9 pages.
Office Action, dated Nov. 30, 2017, received in U.S. Appl. No. 14/857,636 (7322), 19 pages.

(56) References Cited

OTHER PUBLICATIONS

Office Action, dated Jan. 17, 2018, received in Australian Patent Application No. 2017202816 (7322AU), which corresponds with U.S. Appl. No. 14/857,636, 3 pages.
Office Action, dated Dec. 1, 2017, received in U.S. Appl. No. 14/857,663 (7323), 15 pages.
Final Office Action, dated Oct. 11, 2017, received in U.S. Appl. No. 14/857,700 (7324), 13 pages.
Notice of Allowance, dated Feb. 12, 2018, received in U.S. Appl. No. 14/857,700 (7324), 13 pages.
Office Action, dated Dec. 15, 2017, received in Danish Patent Application No. 201500584 (7330DK), which corresponds with U.S. Appl. No. 14/864,580, 4 pages.
Office Action, dated Dec. 15, 2017, received in Danish Patent Application No. 201500585 (7332DK), which corresponds with U.S. Appl. No. 14/864,627, 5 pages.
Office Action, dated Jan. 4, 2018, received in Danish Patent Application No. 201500579 (7334DK), which corresponds with U.S. Appl. No. 14/866,361, 2 pages.
Office Action, dated Jan. 22, 2018, received in U.S. Appl. No. 14/866,987 (7335), 22 pages.
Notice of Allowance, dated Sep. 29, 2017, received in Danish Patent Application No. 201670463 (7335DK01), which corresponds with U.S. Appl. No. 14/866,987, 2 pages.
Patent, dated Nov. 6, 2017, received in Danish Patent Application No. 201670463 (7335DK01), which corresponds with U.S. Appl. No. 14/866,987, 6 pages.
Patent, dated Oct. 27, 2017, received in Japanese Patent Application No. 2016-233449 (7335JP), which corresponds with U.S. Appl. No. 14/866,987, 3 pages.
Office Action, dated Nov. 29, 2017, received in U.S. Appl. No. 14/866,989 (7336), 31 pages.
Notice of Allowance, dated Feb. 5, 2018, received in Japanese Patent Application No. 2016-233450 (7336JP), which corresponds with U.S. Appl. No. 14/866,989, 5 pages.
Office Action, dated Jan. 29, 2018, received in Danish Patent Application No. 201500595 (7337DK), which corresponds with U.S. Appl. No. 14/871,236, 2 pages.
Office Action, dated Nov. 14, 2017, received in U.S. Appl. No. 14/870,882 (7339), 25 pages.
Notice of Allowance, dated Oct. 31, 2017, received in Danish Patent Application No. 201500596 (7339DK), which corresponds with U.S. Appl. No. 14/870,882, 2 pages.
Patent, dated Jan. 29, 2018, received in Danish Patent Application No. 201500596 (7339DK), which corresponds with U.S. Appl. No. 14/870,882, 4 pages.
Final Office Action, dated Feb. 16, 2018, received in U.S. Appl. No. 14/870,988 (7340), 18 pages.
Office Action, dated Nov. 22, 2017, received in U.S. Appl. No. 14/871,227 (7341), 24 pages.
Office Action, dated Oct. 16, 2017, received in Australian Patent Application No. 2016203040 (7341AU), which corresponds with U.S. Appl. No. 14/871,227, 5 pages.
Notice of Allowance, dated Jan. 4, 2018, received in Japanese Patent Application No. 2016-533201 (7341JP), which corresponds with U.S. Appl. No. 14/871,227, 4 pages.
Office Action, dated Oct. 26, 2017, received in U.S. Appl. No. 14/871,336 (7342), 22 pages.
Patent, dated Oct. 30, 2017, Danish Patent Application No. 201500601 (7342DK), which corresponds with U.S. Appl. No. 14/871,336, 5 pages.
Office Action, dated Oct. 16, 2017, received in U.S. Appl. No. 14/871,462 (7343), 26 pages.
Office Action, dated Sep. 29, 2017, received in Australian Patent Application No. 2016231505 (7343AU01), which corresponds with U.S. Appl. No. 14/871,462, 5 pages.
Innovation Patent, dated Oct. 11, 2017, received in Australian Patent Application No. 2016231505 (7343AU01), which corresponds with U.S. Appl. No. 14/871,462, 1 page.
Office Action, dated Nov. 13, 2017, received in Japanese Patent Application No. 2016-183289 (7343JP), which corresponds with U.S. Appl. No. 14/871,462, 5 pages.
Final Office Action, dated Nov. 29, 2017, received in U.S. Appl. No. 14/867,823 (7344), 47 pages.
Office Action, dated Jan. 23, 2018, received in Danish Patent Application No. 201500594 (7344DK), which corresponds with U.S. Appl. No. 14/867,823, 8 pages.
Final Office Action, dated Dec. 14, 2017, received in U.S. Appl. No. 14/867,892 (7345), 53 pages.
Office Action, dated Oct. 31, 2017, received in Danish Patent Application No. 201500598 (7345DK), which corresponds with U.S. Appl. No. 14/867,892, 2 pages.
Notice of Allowance, dated Jan. 26, 2018, received in Danish Patent Application No. 201500598 (7345DK), which corresponds with U.S. Appl. No. 14/867,892, 2 pages.
Final Office Action, dated Oct. 10, 2017, received in U.S. Appl. No. 14/869,855 (7347), 16 pages.
Office Action, dated Jan. 23, 2018, received in U.S. Appl. No. 14/869,855 (7347), 24 pages.
Office Action, dated Jan. 18, 2018, received in U.S. Appl. No. 14/869,873 (7348), 25 pages.
Office Action, dated Jan. 11, 2018, received in U.S. Appl. No. 14/869,997 (7351), 17 pages.
Notice of Allowance, dated Jan. 17, 2018, received in U.S. Appl. No. 14/867,990 (7352), 12 pages.
Office Action, dated Feb. 19, 2018, received in Danish Patent Application No. 201500581 (7352DK), which corresponds with U.S. Appl. No. 14/867,990, 4 pages.
Office Action, dated Dec. 12, 2017, received in U.S. Appl. No. 15/009,668 (7389), 32 pages.
Notice of Allowance, dated Dec. 4, 2017, received in U.S. Appl. No. 15/081,771 (7398), 10 pages.
Office Action, dated Feb. 1, 2018, received in Australian Patent Application No. 2017202058 (7398AU), which corresponds with U.S. Appl. No. 15/081,771, 4 pages.
Office Action, dated Jan. 26, 2018, received in Japanese Patent Application No. 2017-086460 (7398JP), which corresponds with U.S. Appl. No. 15/081,771, 6 pages.
Notice of Allowance, dated Oct. 20, 2017, received in U.S. Appl. No. 15/136,782 (7399), 9 pages.
Office Action, dated Jan. 8, 2018, received in Danish Patent Application No. 201770190 (7399DK), which corresponds with U.S. Appl. No. 15/136,782, 2 pages.
Office Action, dated Feb. 22, 2018, received in Danish Patent Application No. 201670587 (7403DK), which corresponds with U.S. Appl. No. 15/231,745, 4 pages.
Office Action, dated Jan. 10, 2018, received in Danish Patent Application No. 201670590 (74030K01), which corresponds with U.S. Appl. No. 15/231,745, 2 pages.
Office Action, dated Jan. 30, 2018, received in Danish Patent Application No. 201670592 (7403DK03), which corresponds with U.S. Appl. No. 15/231,745, 2 pages.
Patent, dated Oct. 30, 2017, received in Danish Patent Application No. 201670593 (7403DK04), which corresponds with U.S. Appl. No. 15/231,745, 3 pages.
Office Action, dated Feb. 7, 2018, received in Danish Patent Application No. 201770709 (7479DK01), 2 pages.
Office Action, dated Oct. 16, 2017, received in Danish Patent Application No. 201770710 (7479DK02), 10 pages.
Office Action, dated Oct. 31, 2017, received in U.S. Appl. No. 15/723,069 (7512), 7 pages.
Notice of Allowance, dated Dec. 21, 2017, received in U.S. Appl. No. 15/723,069 (7512), 7 pages.
Extended European Search Report, dated Nov. 24, 2017, received in European Patent Application No. 17186744.3 (5854EP01), which corresponds with U.S. Appl. No. 14/536,291, 10 pages.
Extended European Search Report, dated Oct. 17, 2017, received in European Patent Application No. 17184437.6 (7267EP01), Which corresponds with U.S. Appl. No. 14/868,078, 8 pages.
Search Report, dated Feb. 15, 2018, received in Dutch Patent Application No. 2019215 (7329NL), which corresponds with U.S. Appl. No. 14/864,529, 13 pages.

(56) References Cited

OTHER PUBLICATIONS

Search Report, dated Feb. 15, 2018, received in Dutch Patent Application No. 2019214 (7331NL), which corresponds with U.S. Appl. No. 14/864,601, 12 pages.
Extended European Search Report, dated Oct. 10, 2017, received in European Patent Application No. 17188507.2 (7334EP), which corresponds with U.S. Appl. No. 14/866,361, 9 pages.
Office Action, dated Mar. 9, 2018, received in European Patent Application No. 13795391.5 (5839EP), which corresponds with U.S. Appl. No. 14/536,426, 4 pages.
Intention to Grant, dated Mar. 9, 2018, received in European Patent Application No. 15183980.0 (5842EP01), which corresponds with U.S. Appl. No. 14/536,426, 5 pages.
Notice of Acceptance, dated Mar. 7, 2018, received in Australian patent Application No. 2016201303 (5848AU01), which corresponds with U.S. Appl. No. 14/608,942, 3 pages.
Office Action, dated Mar. 28, 2018, received in Chinese Patent Application No. 201380068295.X (5848CN), which corresponds with U.S. Appl. No. 14/608,942, 5 pages.
Notice of Allowance, dated Feb. 28, 2018, received in U.S. Appl. No. 14/536,166 (5849), 5 pages.
Notice of Allowance, dated Apr. 4, 2018, received in Chinese Patent Application No. 201380035977.0 (5850CN), which corresdponds with U.S. Appl. No. 14/536,203, 3 pages.
Patent, dated Feb. 16, 2018, received in Japanese Patent Application No. 2016173113 (5850JP01), which corresponds with U.S. Appl. No. 14/536,203, 3 pages.
Oral Proceedings, dated Mar. 7, 2018, received in European Office Action No. 13798465.4 (5851EP), which corresponds with U.S. Appl. No. 14/608,965, 5 pages.
Notice of Acceptance, dated Feb. 27, 2018, received in Australian Patent Application No. 2016204411 (5853AU01), which corresponds with U.S. Appl. No. 14/536,267, 3 pages.
Office Action, dated Mar. 20, 2018, received in U.S. Appl. No. 14/609,006 (5856), 13 pages.
Notice of Allowance, dated Mar. 14, 2018, received in U.S. Appl. No. 14/536,296 (5857), 8 pages.
Decision to grant, dated Mar. 29, 2018, received in European Patent Application No. 16710871.1 (7246EP), which corresponds with U.S. Appl. No. 14/864,737, 2 pages.
Notice of Allowance, dated Mar. 21, 2018, received in Danish Patent Application No. 201500574 (7265DK), which corresponds with U.S. Appl. No. 14/866,992, 3 pages.
Office Action, dated Mar. 26, 2018, received in Australian Patent Application No. 2016304890 (7310AU01), which corresponds with U.S. Appl. No. 14/866,992, 3 pages.
Office Action, dated Mar. 13, 2018, received in U.S. Appl. No. 15/009,688 (7313), 10 pages.
Final Office Action, dated Nov. 16, 2017, received in U.S. Appl. No. 14/856,520 (7319), 41 pages.
Notice of Allowance, dated Apr. 9, 2018, received in U.S. Appl. No. 14/857,700 (7324), 7 pages.
Notice of Allowance, dated Mar. 16, 2018, received in Danish Patent Application No. 2011500579 (7334DK), which corresponds with U.S. Appl. No. 14/866,361, 2 pages.
Notice of Allowance, dated Mar. 6, 2018, received in Japanese Patent Application No. 2017-126445 (7335JP01), which corresponds with U.S. Appl. No. 14/866,987, 5 pages.
Office Action, dated Feb. 26, 2018, received in Australian Patent Application No. 2017201079 (7336AU02), which corresponds with U.S. Appl. No. 14/866,989, 6 pages.
Patent, dated Mar. 9, 2018, received in Japanese Patent Application No. 2016-233450 (7336JP), which corresponds with U.S. Appl. No. 14/866,989, 4 pages.
Final Office Action, dated Mar. 9, 2018, received in U.S. Appl. No. 14/870,754 (7338), 19 pages.
Final Office Action, dated Mar. 15, 2018, received in U.S. Appl. No. 14/871,336 (7342), 23 pages.

Office Action, dated Apr. 2, 2018, received in Japanese Patent Application No. 2018-020324 (7342JP), which corresponds with U.S. Appl. No. 14/874,336, 4 pages.
Notice of Allowance, dated Apr. 18, 2018, received in U.S. Appl. No. 14/867,823 (7344), 10 pages.
Office Action, dated Feb. 28, 2018, received in U.S. Appl. No. 14/869,261 (7346), 26 pages.
Notice of Allowance, dated Mar. 30, 3018, received in U.S. Appl. No. 14/867,990 (7352), 5 pages.
Notice of Allowance, dated Mar. 19, 2018, received in Danish Patent Application No. 201770190 (7399DK), which corresponds with U.S. Appl. No. 15/136,782, 2 pages.
Office Action, dated Apr. 11, 2018, received in anish Patent Application No. 201670591 (7403DK02), which corresponds with U.S. Appl. No. 15/231,745, 3 pages.
Notice of Allowance, dated Mar. 27, 2018, received in Danish Patent Application No. 201670592 (7403DK03), which corresponds with U.S. Appl. No. 15/231,745, 2 pages.
Notice of Acceptance, dated Mar. 2, 2018, received in Australian Patent Application No. 2018200705 (7429AU), which corresponds with U.S. Appl. No. 15/272,327, 3 pages.
Notice of Acceptance, dated Mar. 2, 2018, received in Australian Patent Application No. 2016304832 (7432AU), which corresponds with U.S. Appl. No. 15/272,345, 3 pages.
Office Action, dated Mar. 7, 2018, received in U.S. Appl. No. 15/482,618 (7491), 7 pages.
Extended European Search Report, dated Mar. 2, 2018, received in European Patent Application No. 17206374.5 (7431EP), which corresponds with U.S. Appl. No. 15/272,343, 11 pages.
Anonymous, "1-Click Installer for Windows Media Taskbar Mini-Player for Windows 7, 8, 8.1 10", http://metadataconsulting.blogspot.de/2014/05/installer-for-windows-media-taskbar.htm, May 5, 2014, 6 pages.
Anonymous, "[new]WMP12 with Taskbarfooibar for Windows 7—Windows Customization—WinMatrix", hrrp://www.winmatrix.com/forums/index/php?/topic/25528-new-wmp12-with-taskbar-toolbar-for-windows-7, Jan. 27, 2013, 6 pages.
Anonymous, "Taskbar Extensions", https://web.archive.org/web/20141228124434/http://msdn.microsoft.com:80/en-us/library/windows/desktop/dd378460(v=vs.85).aspx, Dec. 28, 2014, 8 pages.
Easton-Ellett, "Three Free Cydia Utilities to Remove iOS Notification Badges", http://www.ijailbreak.com/cydia/three-free-cydia-utilities-to-remove-ios-notification-badges, Apr. 14, 2012, 2 pages.
iPhoneHacksTV, "Confero allows you to easily manage your Badge notifications—iPhone Hacks", youtube, https://wwwyoutube.com/watch?v=JCk61pnL4SU, Dec. 26, 2014, 3 pages.
Mandi, Confero now available in Cydia, brings a new way to manage Notification badges [Jailbreak Tweak], http://www.iphonehacks.com/2015/01/confero/tweak-manage-notification-badges.html, Jan. 1, 2015, 2 pages.
Oh, et al., "Moving Objects with 2D Input Devices in CAD Systems and Destop Virtual Environments", Proceedings of Graphics Interface 2005, 8 pages, May 2005.
Ritchie, "How to see all the unread message notifications on your iPhone, all at once, all in the same place | iMore", https://www.imore.com/how-see-all-unread-message-notifications-your-iphone-all-once-all-same-place, Feb. 22, 2014 2 pages.
Stewart, et al., "Characteristics of Pressure-Based Input for Mobile Devices", Proceedings of the SIGCHI Conference on Human Factors in Computing Systems, Apr. 2010, 10 pages.
Office Action, dated May 8, 2018, received in Australian Patent Application No. 2016216580, which corresponds with U.S. Appl. No. 14/536,426, 5 pages.
Notice of Allowance, dated May 17, 2018, received in Australian Patent Application No. 2016216580, which corresponds with U.S. Appl. No. 14/536,426, 3 pages.
Notice of Allowance, dated May 10, 2018, received in Chinese Patent Application No. 201380035982.1, which corresponds with U.S. Appl. No. 14/536,426, 2 pages.
Certificate of Grant, dated May 3, 2018, received in Australian Patent Application No. 2016201451, which corresponds with U.S. Appl. No. 14/608,926, 1 page.

(56) References Cited

OTHER PUBLICATIONS

Patent, dated May 4, 2018, received in Chinese Patent Application No. 201380068414.1, which corresponds with U.S. Appl. No. 14/608.926, 4 pages.
Patent dated Apr. 27, 2018, received in Japanese Patent Application No. 2017-024234, which corresponds with U.S. Appl. No. 14/608,926, 3 pages.
Patent, dated Apr. 20, 2018, received in Chinese Patent Application No. 201380035968.1, which corresponds with U.S. Appl. No. 14/536,267, 4 pages.
Office Action, dated Jun. 13, 2018, received in Chinese Patent Application No, 201810332044.2, which corresponds with U.S. Appl. No. 14/536,267 2 pages.
Intention to Grant, dated Jun. 27, 2018, received in European Patent Application No. 13724106.3, which corresponds with U.S. Appl. No. 14/536,267, 5 pages.
Office Action, dated Jun. 29, 2018, received in Japanese Patent Application No. 2017-083027, which corresponds with U.S. Appl. No. 14/536,291, 5 pages.
Office Action, dated Apr. 27, 2018, received in Japanese Patent Application No. 2017008764, which corresponds with U.S. Appl. No. 14/536,648, 5 pages.
Office Action, dated Apr. 16, 2018, received in Australian Patent Application No. 2016233792, which corresponds with U.S. Appl. No. 14/864,737, 2 pages.
Grant Certificate, dated Apr. 25, 2018, received in European Patent Application No. 16710871.1, which corresponds with U.S. Appl. No. 14/864,737, 2 pages.
Office Action, dated Jun. 5, 2018, received in Chinese Patent Application No. 201610137839.9, which corresponds with U.S. Appl. No. 14/866,159, 11 pages.
Patent, dated May 22, 2018, received in Danish Patent Application No. 201500574, which corresponds with U.S. Appl. No. 14/866,159, 2 pages.
Office Action, dated Apr. 25, 2018, received in European Patent Application No. 16708916.8, which corresponds with U.S. Appl. No. 14/868,078, 6 pages.
Office Action, dated May 24, 2018, received in European Patent Application No, 16727900.9, which corresponds with U.S. Appl. No. 14/866,511, 7 pages.
Notice of Allowance, dated Apr. 24, 2018, received in Danish Patent Application No. 201500592, which corresponds with U.S. Appl. No. 14/869,899, 2 pages.
Patent, dated May 28, 2018, received in Danish Patent Application No. 201500592, which corresponds with U.S. Appl. No. 14/869,899, 2 pages.
Office Action, dated May 1, 2018, received in Danish Patent Application No. 201670594, which corresponds with U.S. Appl. No. 14/869,899 2 pages.
Office Action, dated Jun. 25, 2018, received in Japanese Patent Application No. 2017-029201, which corresponds with U.S. Appl. No. 14/857,636, 4 pages.
Grant of Patent, dated Apr. 16, 2018, received in Dutch Patent Application No. 2019215, 2 pages.
Patent, dated May 22, 2018, received in Danish Patent Application No. 201500579, which corresponds with U.S Appl. No. 14/866,361, 2 pages.
Office Action, dated Jun. 11, 2018, received in European Patent Application No. 17188507.2, which corresponds with U.S. Appl. No. 14/866,361, 10 pages.
Office Action, dated May 7, 2018, received in European Patent Application No. 16189421.7, which corresponds with U.S. Appl. No. 14/866,987, 5 pages.
Notice of Allowance, dated Apr. 26, 2018, received in Danish Patent Application No. 201500595, which corresponds with U.S. Appl. No. 14/871,236, 2 pages.
Patent, dated Jun. 18, 2018, received in Danish Patent Application No. 201500595, which corresponds with U.S. Appl. No. 14/871,236, 3 pages.
Notice of Allowance, dated Jun. 28, 2018, received in Korean Patent Application No. 2017-7014536, which corresponds with U.S. Appl. No. 15/081,771, 4 pages.
Office Action, dated May 4, 2018, received in Australian Patent Application No. 2018202855, which corresponds with U.S. Appl. No. 15/136,782, 3 pages.
Patent, dated May 22, 2018, received in Danish Patent Application No. 201770190, which corresponds with U.S. Appl. No. 15/136,782, 2 pages.
Office Action, dated Jun. 1, 2018, received in Japanese Patent Application No. 2018062161, which corresponds with U.S. Appl. No. 15/136,782, 5 pages.
Patent, dated May 28, 2018, received in Danish Patent Application No. 201670590, which corresponds with U.S. Appl. No. 15/231,745, 2 pages.
Patent, dated May 28, 2018, received in Danish Patent Application No. 201670592, which corresponds with U.S. Appl. No. 15/231,745, 2 pages.
Office Action, dated Apr. 20, 2018, received in European Patent Application No. 16756862.5, which corresponds with U.S. Appl. No. 15/272,345, 15 pages.
Extended European Search Report, dated May 30, 2018, received in International Patent Application No. 18155939.4, which corresponds with U.S. Appl. No. 15/272,327, 8 pages.
Notice of Allowance, dated Jun. 26, 2018, received in U.S. Appl. No. 14/608,895, 9 pages.
Notice of Allowance, dated May 16, 2018, received in U.S. Appl. No. 14/536,367, 5 pages.
Final Office Action, dated Jun. 22, 2018, received in U.S. Appl. No. 14/536,464, 32 pages.
Final Office Action, dated May 3, 2018, received in U.S. Appl. No. 14/536,644, 28 pages.
Final Office Action, dated Jun. 6, 2018, received in U.S. Appl. No. 14/608,926, 19 pages.
Office Action, dated Jul. 2, 2018, received in U.S. Appl. No. 14/608,965, 16 pages.
Notice of Allowance, dated Jun. 1, 2018, received in U.S. Appl. No. 14/536,267, 5 pages.
Notice of Allowance, dated May 18, 2018, received in U.S. Appl. No. 14/866,159, 8 pages.
Notice of Allowance, dated May 24, 2018, received in U.S. Appl. No. 14/868,078, 6 pages.
Notice of Allowance, dated Jun. 29, 2018, received in U.S. Appl. No. 14/856,517, 11 pages.
Notice of Allowance, dated May 2, 2018, received in U.S. Appl. No. 14/856,519, 10 pages.
Notice of Allowance, dated Apr. 19, 2018, received in U.S. Appl. No. 14/864,529, 11 pages.
Final Office Action, dated Jul. 3, 2018, received in U.S. Appl. No. 14/866,989, 17 pages.
Notice of Allowance, dated Jul. 2, 2018, received in U.S. Appl. No. 14/870,754, 9 pages.
Final Office Action, dated Apr. 20, 2018, received in U.S. Appl. No. 14/870,882, 7 pages.
Notice of Allowance, dated Jul. 12, 2018, received in U.S. Appl. No. 14/870,882, 5 pages.
Notice of Allowance, dated Jun. 11, 2018, received in U.S. Appl. No. 14/871,227, 11 pages.
Office Action, dated Apr. 24, 2018, received in U.S. Appl. No. 14/867,892, 63 pages.
Notice of Allowance, dated May 31, 2018, received in U.S. Appl. No. 14/869,855, 10 pages.
Final Office Action, dated May 23, 2018, received in U.S. Appl. No. 14/869,873, 18 pages.
Office Action, dated Apr. 19, 2018, received in U.S. Appl. No. 14/869,703, 19 pages.
Final Office Action, dated Jul. 3, 2018, received in U.S. Appl. No. 15/009,668, 19 pages.
Office Action, dated Apr. 23, 2018, received in U.S. Appl. No. 15/499,691, 29 pages.

(56) References Cited

OTHER PUBLICATIONS

Final Office Action, dated May 10, 2018, received in U.S. Appl. No. 15/655,749, 19 pages.

* cited by examiner on a great battle-field of that war. We have come to dedicate a portion of that field, as a final resting place for those who here gave their lives that that nation might live. It is altogether fitting and proper that we should do this.

19202-58-b    19204

But, in a larger sense, we can not dedicate -- we can not consecrate -- we can not hallow -- this ground. The brave men, living and dead, who struggled here, have consecrated it, far above our poor power to add or detract. The world will little note, nor long remember what we say here, but it can never forget what they did here. It is for us the living, rather, to be dedicated here to the unfinished work which they who fought here have User Interface 19206

Touch-Sensitive Surface 451

Display 450

19208-b 19210-b

IT_D
IT_L
IT_0

Intensity of Contact 19208

Figure 8D

DEVICE, METHOD, AND GRAPHICAL USER INTERFACE FOR DETERMINING WHETHER TO SCROLL OR SELECT CONTENT BASED ON AN INTENSITY THESHOLD

RELATED APPLICATIONS

This application is a continuation of PCT Patent Application Serial No. PCT/US2013/069486, filed on Nov. 11, 2013, entitled "Device, Method, and Graphical User Interface for Determining Whether to Scroll or Select Content," which claims the benefit of and priority to U.S. Provisional Patent Application Ser. No. 61/778,416, filed on Mar. 13, 2013, entitled "Device, Method, and Graphical User Interface for Determining Whether to Scroll or Select Content;" and U.S. Provisional Patent Application No. 61/747,278, filed Dec. 29, 2012, entitled "Device, Method, and Graphical User Interface for Manipulating User Interface Objects with Visual and/or Haptic Feedback," which applications are incorporated by reference herein in their entireties.

This application is also related to the following: U.S. Provisional Patent Application Ser. No. 61/778,092, filed on Mar. 12, 2013, entitled "Device, Method, and Graphical User Interface for Selecting Object within a Group of Objects;" U.S. Provisional Patent Application Ser. No. 61/778,125, filed on Mar. 12, 2013, entitled "Device, Method, and Graphical User Interface for Navigating User Interface Hierarchies;" U.S. Provisional Patent Application Ser. No. 61/778,156, filed on Mar. 12, 2013, entitled "Device, Method, and Graphical User Interface for Manipulating Framed Graphical Objects;" U.S. Provisional Patent Application Ser. No. 61/778,179, filed on Mar. 12, 2013, entitled "Device, Method, and Graphical User Interface for Scrolling Nested Regions;" U.S. Provisional Patent Application Ser. No. 61/778,171, filed on Mar. 12, 2013, entitled "Device, Method, and Graphical User Interface for Displaying Additional Information in Response to a User Contact;" U.S. Provisional Patent Application Ser. No. 61/778,191, filed on Mar. 12, 2013, entitled "Device, Method, and Graphical User Interface for Displaying User Interface Objects Corresponding to an application;" U.S. Provisional Patent Application Ser. No. 61/778,211, filed on Mar. 12, 2013, entitled "Device, Method, and Graphical User Interface for Facilitating User Interaction with Controls in a User Interface;" U.S. Provisional Patent Application Ser. No. 61/778,239, filed on Mar. 12, 2013, entitled "Device, Method, and Graphical User Interface for Forgoing Generation of Tactile Output for a Multi-Contact Gesture;" U.S. Provisional Patent Application Ser. No. 61/778,284, filed on Mar. 12, 2013, entitled "Device, Method, and Graphical User Interface for Providing Tactile Feedback for Operations Performed in a User Interface;" U.S. Provisional Patent Application Ser. No. 61/778,287, filed on Mar. 12, 2013, entitled "Device, Method, and Graphical User Interface for Providing Feedback for Changing Activation States of a User Interface Object;" U.S. Provisional Patent Application Ser. No. 61/778,363, filed on Mar. 12, 2013, entitled "Device, Method, and Graphical User Interface for Transitioning between Touch Input to Display Output Relationships;" U.S. Provisional Patent Application Ser. No. 61/778,367, filed on Mar. 12, 2013, entitled "Device, Method, and Graphical User Interface for Moving a User Interface Object Based on an Intensity of a Press Input;" U.S. Provisional Patent Application Ser. No. 61/778,265, filed on Mar. 12, 2013, entitled "Device, Method, and Graphical User Interface for Transitioning between Display States in Response to a Gesture;" U.S. Provisional Patent Application Ser. No. 61/778,373, filed on Mar. 12, 2013, entitled "Device, Method, and Graphical User Interface for Managing Activation of a Control Based on Contact Intensity;" U.S. Provisional Patent Application Ser. No. 61/778,412, filed on Mar. 13, 2013, entitled "Device, Method, and Graphical User Interface for Displaying Content Associated with a Corresponding Affordance;" U.S. Provisional Patent Application Ser. No. 61/778,413, filed on Mar. 13, 2013, entitled "Device, Method, and Graphical User Interface for Selecting User Interface Objects;" U.S. Provisional Patent Application Ser. No. 61/778,414, filed on Mar. 13, 2013, entitled "Device, Method, and Graphical User Interface for Moving and Dropping a User Interface Object;" and U.S. Provisional Patent Application Ser. No. 61/778,418, filed on Mar. 13, 2013, entitled "Device, Method, and Graphical User Interface for Switching between User Interfaces," which are incorporated herein by reference in their entireties.

This application is also related to the following: U.S. Provisional Patent Application Ser. No. 61/645,033, filed on May 9, 2012, entitled "Adaptive Haptic Feedback for Electronic Devices;" U.S. Provisional Patent Application Ser. No. 61/665,603, filed on Jun. 28, 2012, entitled "Adaptive Haptic Feedback for Electronic Devices;" and U.S. Provisional Patent Application Ser. No. 61/681,098, filed on Aug. 8, 2012, entitled "Adaptive Haptic Feedback for Electronic Devices," which are incorporated herein by reference in their entireties.

TECHNICAL FIELD

This relates generally to electronic devices with touch-sensitive surfaces, including but not limited to electronic devices with touch-sensitive surfaces that detect inputs for manipulating user interfaces.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include adjusting the position and/or size of one or more user interface objects or activating buttons or opening files/applications represented by user interface objects, as well as associating metadata with one or more user interface objects or otherwise manipulating user interfaces. Exemplary user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture or iPhoto from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But existing methods for performing these manipulations are cumbersome and inefficient. In addition, existing methods take longer than necessary, thereby wasting energy. This latter consideration is particularly important in battery-operated devices.

SUMMARY

Accordingly, there is a need for electronic devices with faster, more efficient methods and interfaces for manipulating user interfaces. Such methods and interfaces optionally complement or replace conventional methods for manipulating user interfaces. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

There is a need for electronic devices with faster, more efficient methods and interfaces for zooming a user interface while performing an operation. Such methods and interfaces may complement or replace conventional methods for zooming a user interface while performing an operation. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface, and one or more sensors to detect intensity of contacts with the touch-sensitive surface. The method includes: displaying a user interface at a first zoom level on the display; while the user interface is displayed at the first zoom level, detecting a first input that includes movement of a contact on the touch-sensitive surface; in response to detecting the first input, initiating a respective operation associated with the user interface; after initiating the respective operation: detecting a second input, where detecting the second input includes detecting an increase in intensity of a contact on the touch-sensitive surface, and in response to detecting the second input, zooming the user interface to a second zoom level different from the first zoom level in accordance with the increase in intensity of the contact. The method further includes, while the user interface is displayed at the second zoom level: detecting a third input that includes movement of a contact on the touch-sensitive surface, and in response to detecting the third input, completing the respective operation.

In accordance with some embodiments, an electronic device includes a display unit configured to display a user interface at a first zoom level on the display unit, a touch-sensitive surface unit configured to receive inputs and contacts, one or more sensor units to detect intensity of contacts with the touch-sensitive surface unit, and a processing unit coupled to the display unit, the touch-sensitive surface unit, and the sensor units. The processing unit is configured to: while the user interface is displayed at the first zoom level, detect a first input that includes movement of a contact on the touch-sensitive surface unit; in response to detecting the first input, initiate a respective operation associated with the user interface; after initiating the respective operation: detect a second input, where detecting the second input includes detecting an increase in intensity of a contact on the touch-sensitive surface unit, and in response to detecting the second input, zoom the user interface to a second zoom level different from the first zoom level in accordance with the increase in intensity of the contact The processing unit is further configured to, while the user interface is displayed at the second zoom level: detect a third input that includes movement of a contact on the touch-sensitive surface unit, and in response to detecting the third input, complete the respective operation.

Thus, electronic devices with displays, touch-sensitive surfaces and one or more sensors to detect intensity of contacts with the touch-sensitive surface are provided with faster, more efficient methods and interfaces for zooming a user interface while performing an operation, thereby increasing the effectiveness, efficiency, and user satisfaction with such devices. Such methods and interfaces may complement or replace conventional methods for zooming a user interface while performing an operation.

There is a need for electronic devices with faster, more efficient methods and interfaces for determining whether to scroll or select content, for example, to more efficiently select and scroll content displayed on a user interface. Such methods and interfaces may complement or replace conventional methods for interacting with user interface content. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface and one or more sensors to detect intensity of contacts with the touch-sensitive surface. The method includes: displaying content on the display. The method further includes, while a focus selector is over the content, detecting a gesture on the touch-sensitive surface, the gesture including a first contact on the touch-sensitive surface and movement of the first contact across the touch-sensitive surface that corresponds to movement of the focus selector on the display. The method further includes, in response to detecting the gesture: in accordance with a determination that the first contact has an intensity below a selection intensity threshold, scrolling the content on the display in accordance with movement of the focus selector on the display without selecting the content; and in accordance with a determination that the first contact has an intensity above the selection intensity threshold, selecting at least a portion of the content in accordance with the movement of the focus selector over the content.

In accordance with some embodiments, an electronic device includes a display unit configured to display content, a touch-sensitive surface unit configured to receive user contacts, one or more sensors configured to detect intensity of contacts with the touch-sensitive surface unit and a processing unit coupled to the display unit, the touch-sensitive surface unit and the sensors. The processing unit is configured to: display content on the display unit. The processing unit is further configured to, while a focus selector is over the content, detect a gesture on the touch-sensitive surface unit, the gesture including a first contact on the touch-sensitive surface unit and movement of the first contact across the touch-sensitive surface unit that corresponds to movement of the focus selector on the display unit. The processing unit is further configured to, in response to detecting the gesture: in accordance with a determination that the first contact has an intensity below a selection intensity threshold, scroll the content on the display unit in accordance with movement of the focus selector on the display unit without selecting the content; and in accordance with a determination that the first contact has an intensity above the selection intensity threshold, select at least a portion of the content in accordance with the movement of the focus selector over the content.

Thus, electronic devices with displays, touch-sensitive surfaces and one or more sensors to detect intensity of contacts with the touch-sensitive surface are provided with faster, more efficient methods and interfaces for determining whether to scroll or select content, thereby increasing the effectiveness, efficiency, and user satisfaction with such devices. Such methods and interfaces may complement or replace conventional methods for interacting with user interface content.

There is a need for electronic devices with faster, more efficient methods and interfaces for determining whether to scroll or enlarge content, for example, to more efficiently magnify and edit content displayed on a user interface. Such methods and interfaces may complement or replace conventional methods for interacting with user interface content. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface and one or more sensors to detect intensity of contacts with the touch-sensitive surface. The method includes: displaying, on the display, content at a first size. The method further includes, while a focus selector is over the content, detecting a gesture on the touch-sensitive surface, the gesture including a contact on the touch-sensitive surface and movement of the contact across the touch-sensitive surface that corresponds to movement of the focus selector over the content on the display. The method further includes, in response to detecting the gesture: in accordance with a determination that the contact has an intensity below a first intensity threshold, scrolling the content on the display in accordance with movement of the focus selector on the display while maintaining display of the content at the first size; and in accordance with a determination that the contact has an intensity above the first intensity threshold, displaying an enlarged representation of a portion of the content corresponding to a location of the focus selector in the content, where the enlarged representation is displayed at a second size larger than the first size.

In accordance with some embodiments, an electronic device includes a display unit configured to display content; a touch-sensitive surface unit configured to receive user contacts, one or more sensors configured to detect intensity of contacts with the touch-sensitive surface unit and a processing unit coupled to the display unit, the touch-sensitive surface unit and the sensors. The processing unit is configured to: enable display of content at a first size on the display unit. The processing unit is further configures to, while a focus selector is over the content, detect a gesture on the touch-sensitive surface unit, the gesture including a contact on the touch-sensitive surface unit and movement of the contact across the touch-sensitive surface unit that corresponds to movement of the focus selector over the content on the display unit. The processing unit is further configured to, in response to detecting the gesture: in accordance with a determination that the contact has an intensity below a first intensity threshold, scroll the content on the display unit in accordance with movement of the focus selector on the display unit while maintaining display of the content at the first size; and in accordance with a determination that the contact has an intensity above the first intensity threshold, enable display of an enlarged representation of a portion of the content corresponding to a location of the focus selector in the content, where the enlarged representation is displayed at a second size larger than the first size.

Thus, electronic devices with displays, touch-sensitive surfaces and one or more sensors to detect intensity of contacts with the touch-sensitive surface are provided with faster, more efficient methods and interfaces for determining whether to scroll or enlarge content, thereby increasing the effectiveness, efficiency, and user satisfaction with such devices. Such methods and interfaces may complement or replace conventional methods for interacting with user interface content.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing the operations of any of the methods referred to in the fifth paragraph of the Description of Embodiments. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods referred to in the fifth paragraph of the Description of Embodiments, which are updated in response to inputs, as described in any of the methods referred to in the fifth paragraph of the Description of Embodiments. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform the operations of any of the methods referred to in the fifth paragraph of the Description of Embodiments. In accordance with some embodiments, an electronic device includes: a display, a touch-sensitive surface, and optionally one or more sensors to detect intensity of contacts with the touch-sensitive surface; and means for performing the operations of any of the methods referred to in the fifth paragraph of the Description of Embodiments. In accordance with some embodiments, an information processing apparatus, for use in an electronic device with a display and a touch-sensitive surface, optionally one or more sensors to detect intensity of contacts with the touch-sensitive surface, includes means for performing the operations of any of the methods referred to in the fifth paragraph of the Description of Embodiments.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
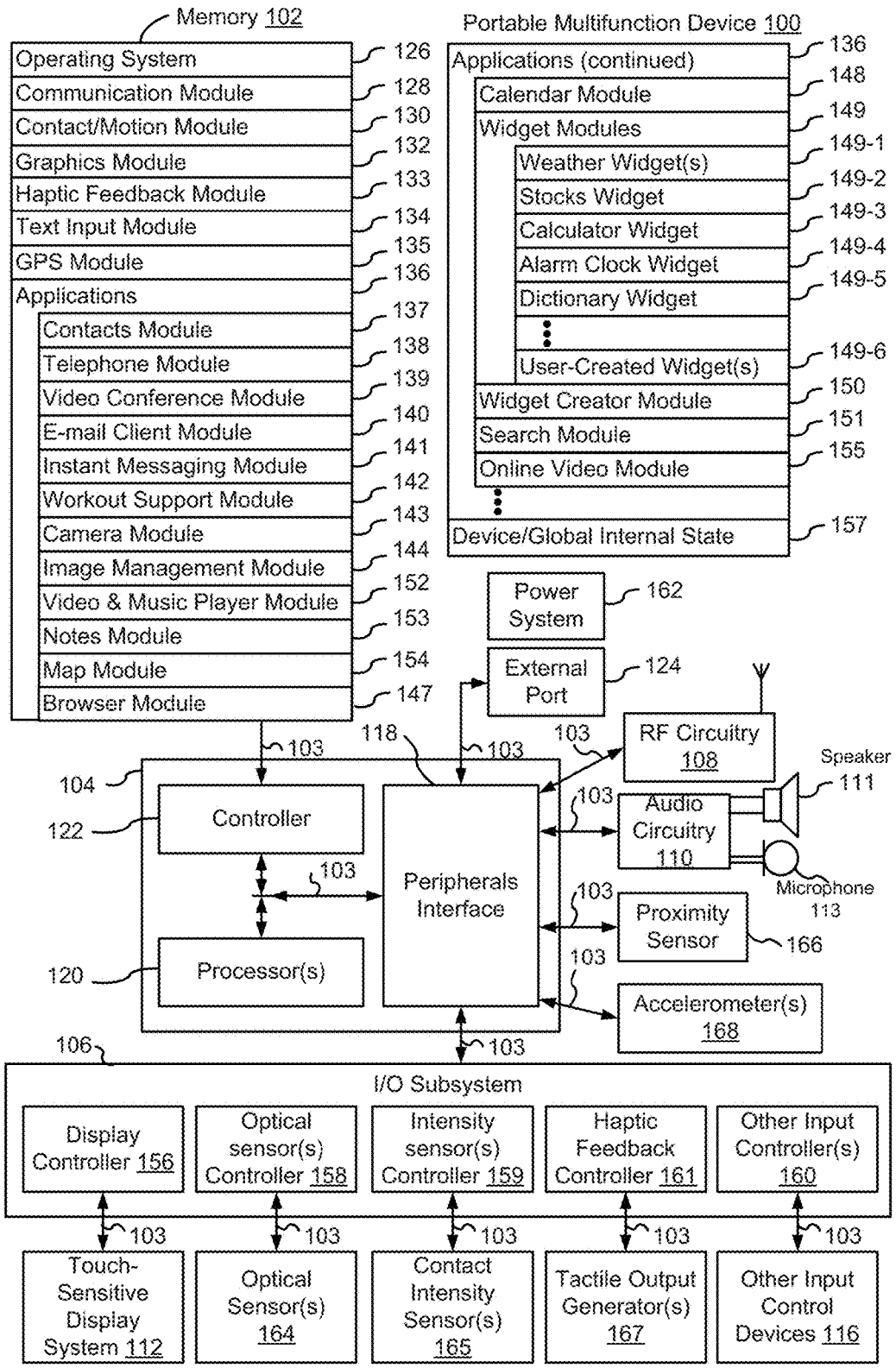
FIG. 1A is a block diagram illustrating a portable multifunction device with a touch-sensitive display in accordance with some embodiments.

The methods, devices and GUIs described herein provide visual and/or haptic feedback that makes manipulation of user interface objects more efficient and intuitive for a user. For example, in a system where the clicking action of a trackpad is decoupled from the contact intensity (e.g., contact force, contact pressure, or a substitute therefore) that is needed to reach an activation threshold, the device can generate different tactile outputs (e.g., "different clicks") for different activation events (e.g., so that clicks that accomplish a particular result are differentiated from clicks that do not produce any result or that accomplish a different result from the particular result). Additionally, tactile outputs can be generated in response to other events that are not related to increasing intensity of a contact, such as generating a tactile output (e.g., a "detent") when a user interface object is moved to a particular position, boundary or orientation, or when an event occurs at the device.

Additionally, in a system where a trackpad or touch-screen display is sensitive to a range of contact intensity that includes more than one or two specific intensity values (e.g., more than a simple on/off, binary intensity determination), the user interface can provide responses (e.g., visual or tactile cues) that are indicative of the intensity of the contact within the range. In some implementations, a pre-activation-threshold response and/or a post-activation-threshold response to an input are displayed as continuous animations. As one example of such a response, a preview of an operation is displayed in response to detecting an increase in contact intensity that is still below an activation threshold for performing the operation. As another example of such a response, an animation associated with an operation continues even after the activation threshold for the operation has been reached. Both of these examples provide a user with a continuous response to the force or pressure of a user's contact, which provides a user with visual and/or haptic feedback that is richer and more intuitive. More specifically, such continuous force responses give the user the experience of being able to press lightly to preview an operation and/or press deeply to push "past" or "through" a predefined user interface state corresponding to the operation.

Additionally, for a device with a touch-sensitive surface that is sensitive to a range of contact intensity, multiple contact intensity thresholds can be monitored by the device and different functions can be mapped to different contact intensity thresholds. This serves to increase the available "gesture space" providing easy access to advanced features for users who know that increasing the intensity of a contact at or beyond a second "deep press" intensity threshold will cause the device to perform a different operation from an operation that would be performed if the intensity of the contact is between a first "activation" intensity threshold and the second "deep press" intensity threshold. An advantage of assigning additional functionality to a second "deep press" intensity threshold while maintaining familiar functionality at a first "activation" intensity threshold is that inexperienced users who are, in some circumstances, confused by the additional functionality can use the familiar functionality by just applying an intensity up to the first "activation" intensity threshold, whereas more experienced users can take advantage of the additional functionality by applying an intensity at the second "deep press" intensity threshold.

Additionally, for a device with a touch-sensitive surface that is sensitive to a range of contact intensity, the device can provide additional functionality by allowing users to perform complex operations with a single continuous contact. For example, when selecting a group of objects, a user can move a continuous contact around the touch-sensitive surface and can press while dragging (e.g., applying an intensity greater than a "deep press" intensity threshold) to add additional elements to a selection. In this way, a user can intuitively interact with a user interface where pressing harder with a contact causes objects in the user interface to be "stickier."

Figure 5A:
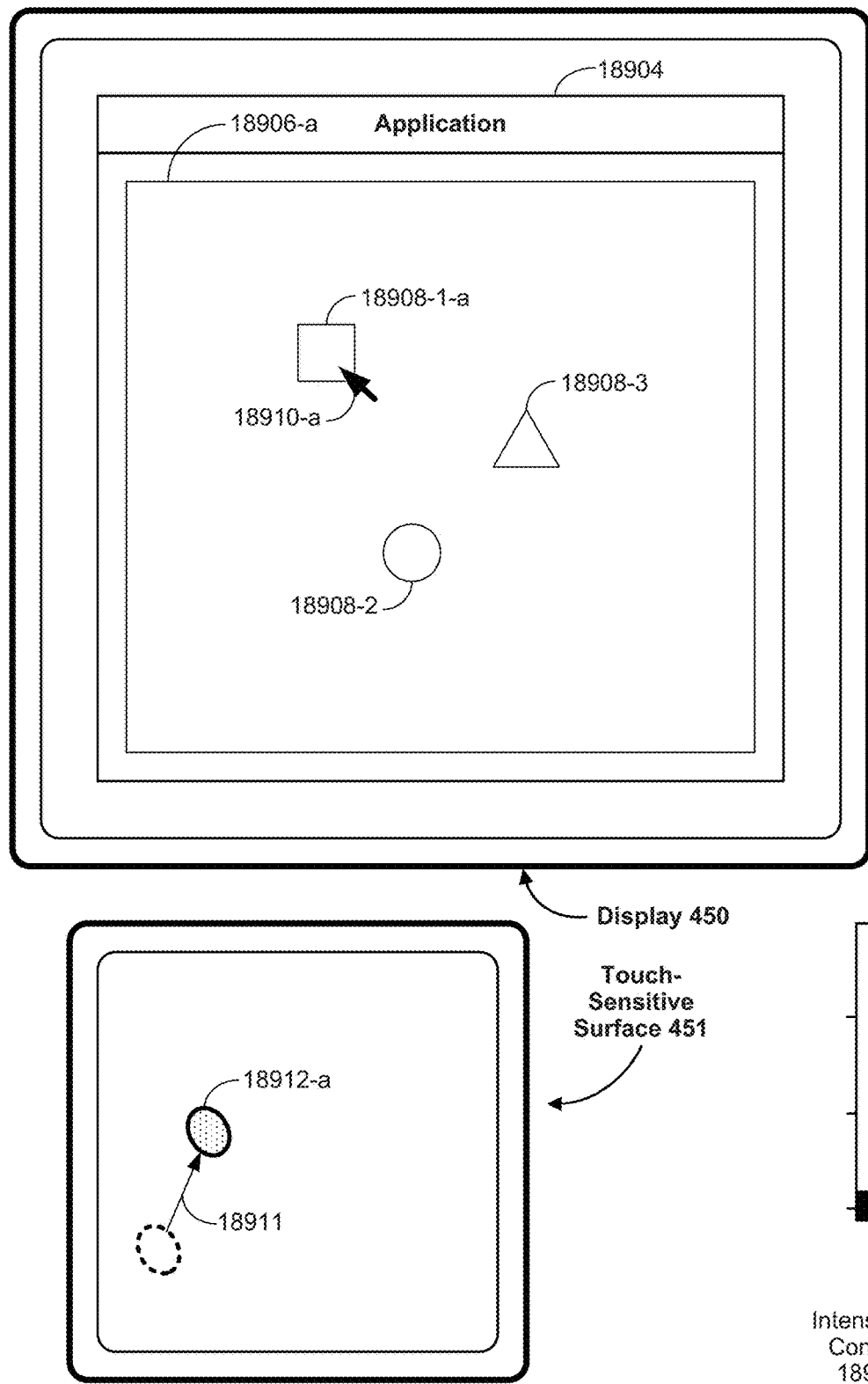
FIGS. 5A-5W illustrate exemplary user interfaces for zooming a user interface while performing an operation in accordance with some embodiments.
Figure 5B:
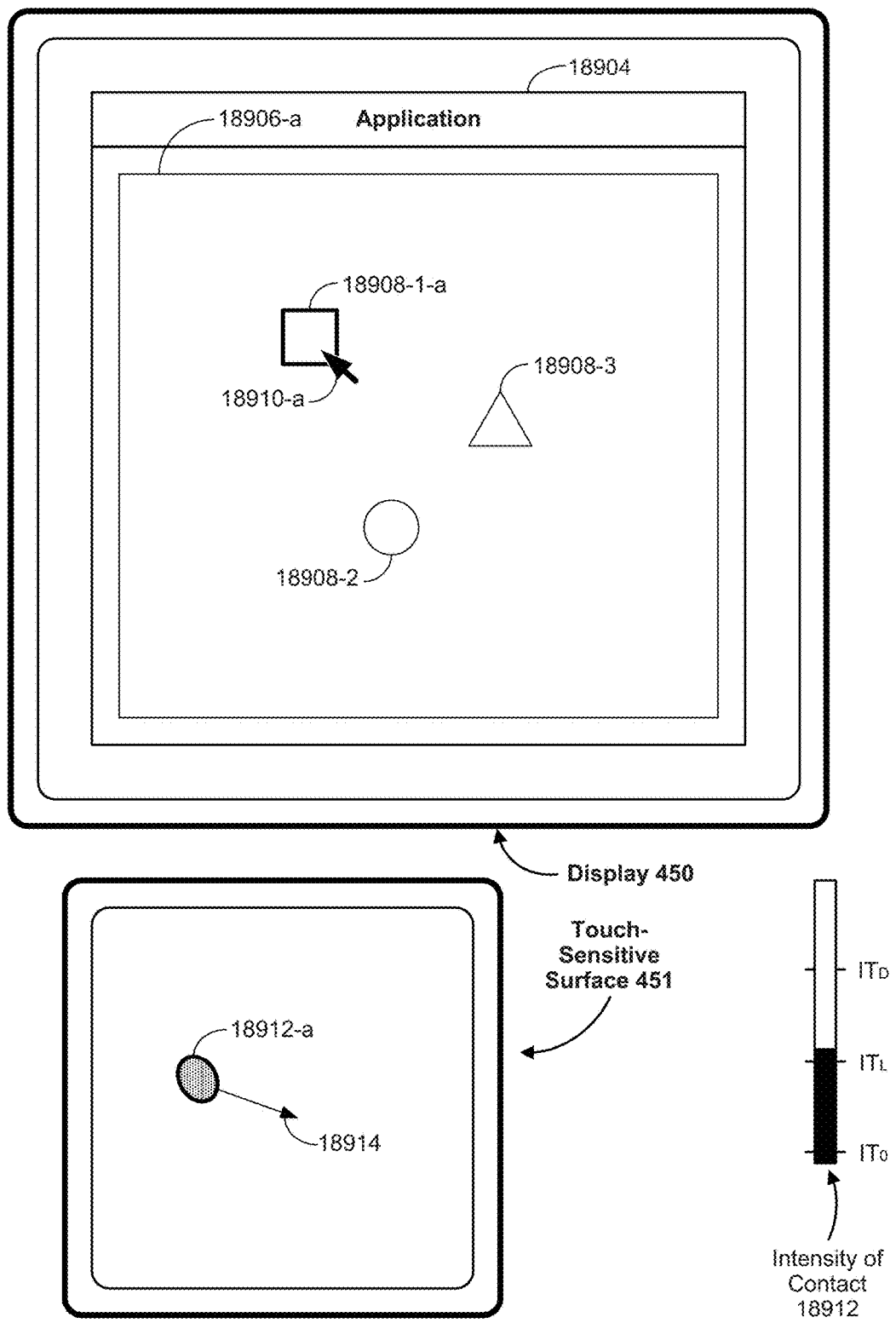

A number of different approaches to providing an intuitive user interface on a device where a clicking action is decoupled from the force that is needed to reach an activation threshold and/or the device is sensitive to a wide range of contact intensities are described below. Using one or more of these approaches (optionally in conjunction with each other) helps to provide a user interface that intuitively provides users with additional information and functionality, thereby reducing the user's cognitive burden and improving the human-machine interface. Such improvements in the human-machine interface enable users to use the device faster and more efficiently. For battery-operated devices, these improvements conserve power and increase the time between battery charges. For ease of explanation, systems, methods and user interfaces for including illustrative examples of some of these approaches are described below, as follows:

Many electronic devices have graphical user interfaces that are responsive to user inputs and enable the user to request performance of an operation (e.g., scroll a document, move a user interface object) in accordance with the user inputs. In some circumstances (e.g., for greater accuracy), it is convenient to make the input in a "zoomed-in" user interface. User inputs for zooming and user inputs for activating operations are often distinct, and require sequential performance. It would be beneficial to provide a way for a user to zoom while making a user input for activating an operation (for example, to allow a user to drag an object across a wide area and then zoom into accurately place the object). The embodiments described below provide a convenient and intuitive method of zooming a user interface, in accordance with an intensity of a contact, while performing an operation. In particular, FIG. 5A-5W illustrate exemplary user interfaces for zooming a user interface while performing an operation. FIGS. 6A-6D are flow diagrams illustrating a method of zooming a user interface while performing an operation. The user interfaces in FIGS. 5A-5W are used to illustrate the processes in FIGS. 6A-6D.

Many electronic devices have graphical user interfaces that display content upon which multiple operations are, optionally, performed with the same type of gesture (e.g., gestures are overloaded). Sometimes, overloaded gestures are distinguished based on context or a selected mode of operation however separately selecting a mode of operation and performing a gesture can be confusing and inefficient for a user. Thus, it would be beneficial to provide users with an additional degree of control over which of the multiple operations corresponding to a single gesture are performed. The embodiments described below provide a convenient and efficient method of determining whether to scroll or select content based on the intensity of a contact on a touch-sensitive surface. In particular, FIGS. 8A-8AA illustrate exemplary user interfaces for determining whether to scroll or select content. FIGS. 9A-9E are flow diagrams illustrating a method of determining whether to scroll or select content. The user interfaces in FIGS. 8A-8AA are used to illustrate the processes in FIGS. 9A-9E.

Figure 11A:
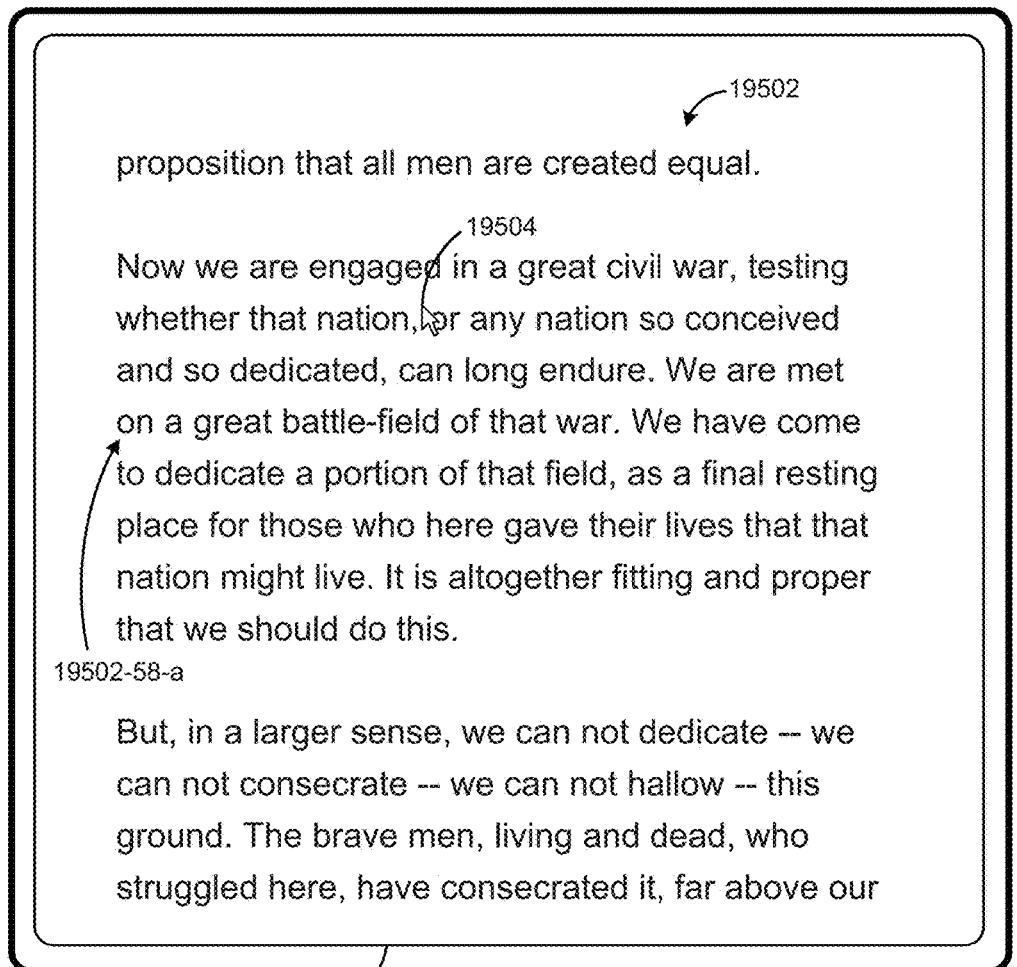
FIGS. 11A-11Y illustrate exemplary user interfaces for interacting with user interface content in accordance with some embodiments.
Figure 11A:
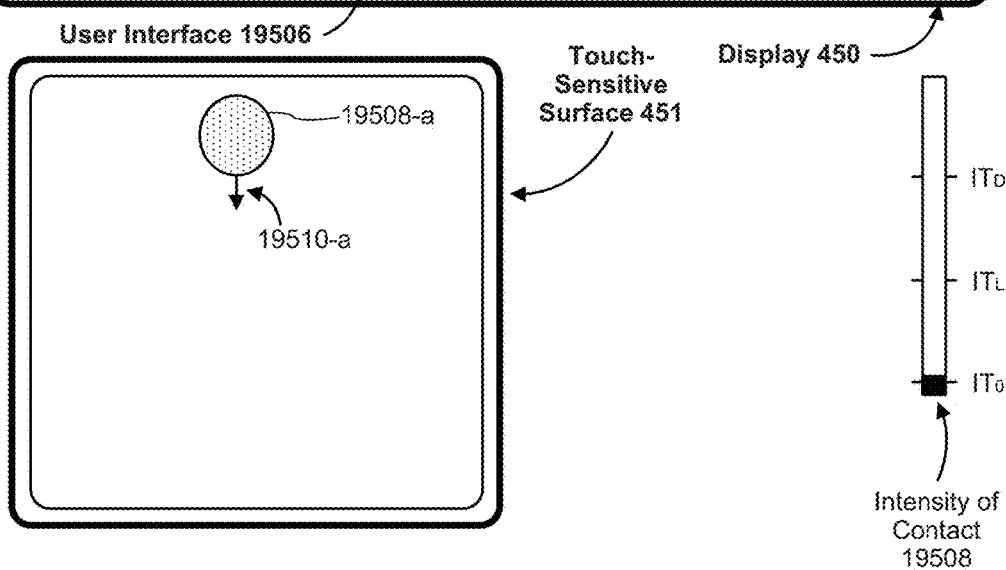

Many electronic devices have graphical user interfaces that display content upon which multiple operations are, optionally, performed with the same type of gesture (e.g., gestures are overloaded). Sometimes, overloaded gestures are distinguished based on context or a selected mode of operation however separately selecting a mode of operation and performing a gesture can be confusing and inefficient for a user. Thus, it would be beneficial to provide users with an additional level of control over which of the multiple operations corresponding to a single gesture are performed. The embodiments described below provide a convenient and efficient method of for determining whether to scroll or enlarge content based on the intensity of a contact on a touch-sensitive surface. In particular, FIGS. 11A-11Y illustrate exemplary user interfaces for determining whether to scroll or enlarge content. FIGS. 12A-12C are flow diagrams illustrating a method of determining whether to scroll or enlarge content. The user interfaces in FIGS. 11A-11Y are used to illustrate the processes in FIGS. 12A-12C.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions)

Figure 3:
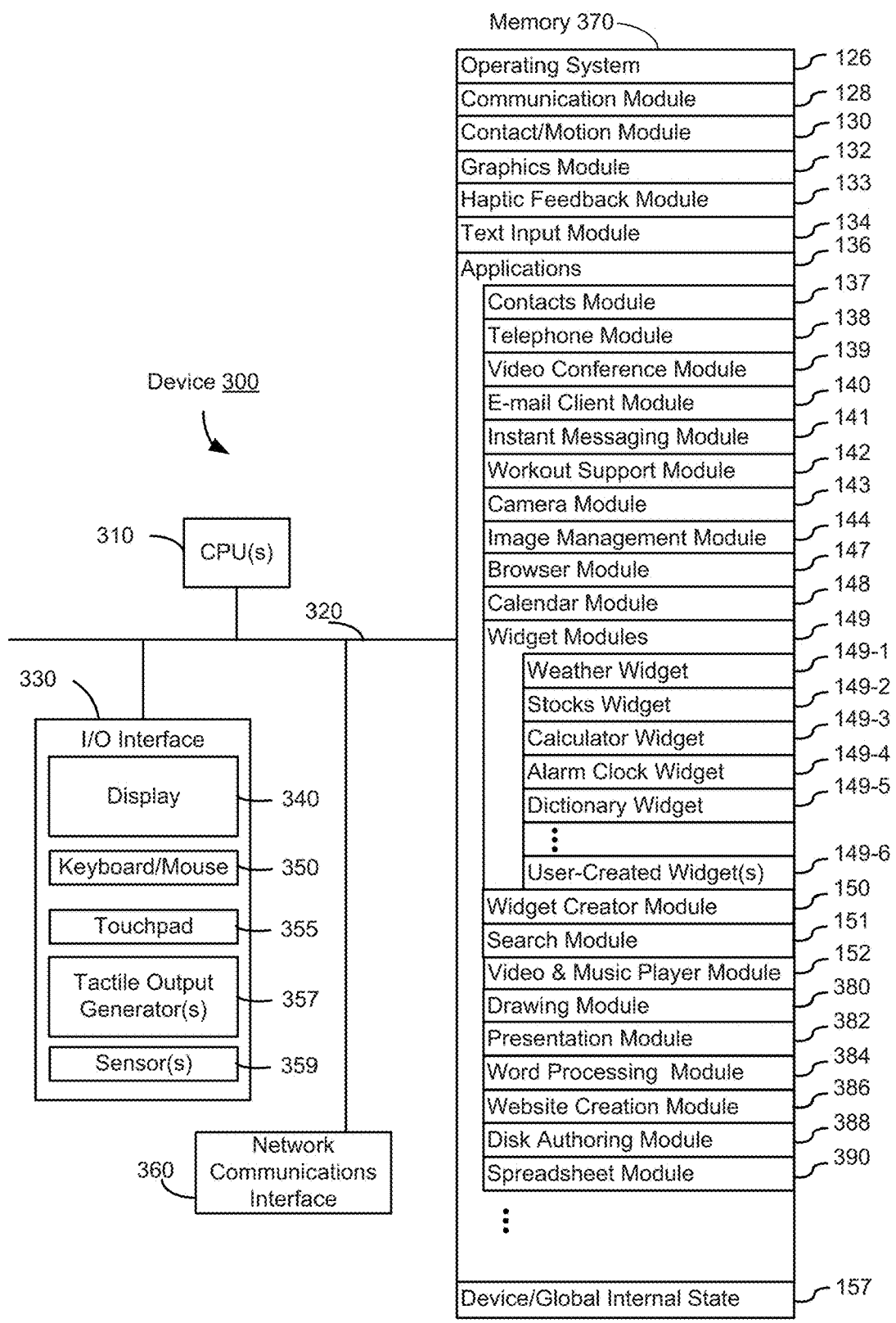
FIG. 3 is a block diagram of an exemplary multifunction device with a display and a touch-sensitive surface in accordance with some embodiments.

136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns and intensities. Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

widget creator module 150 for making user-created widgets 149-6;

search module 151;

video and music player module 152, which is, optionally, made up of a video player module and a music player module;

notes module 153;

map module 154; and/or online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
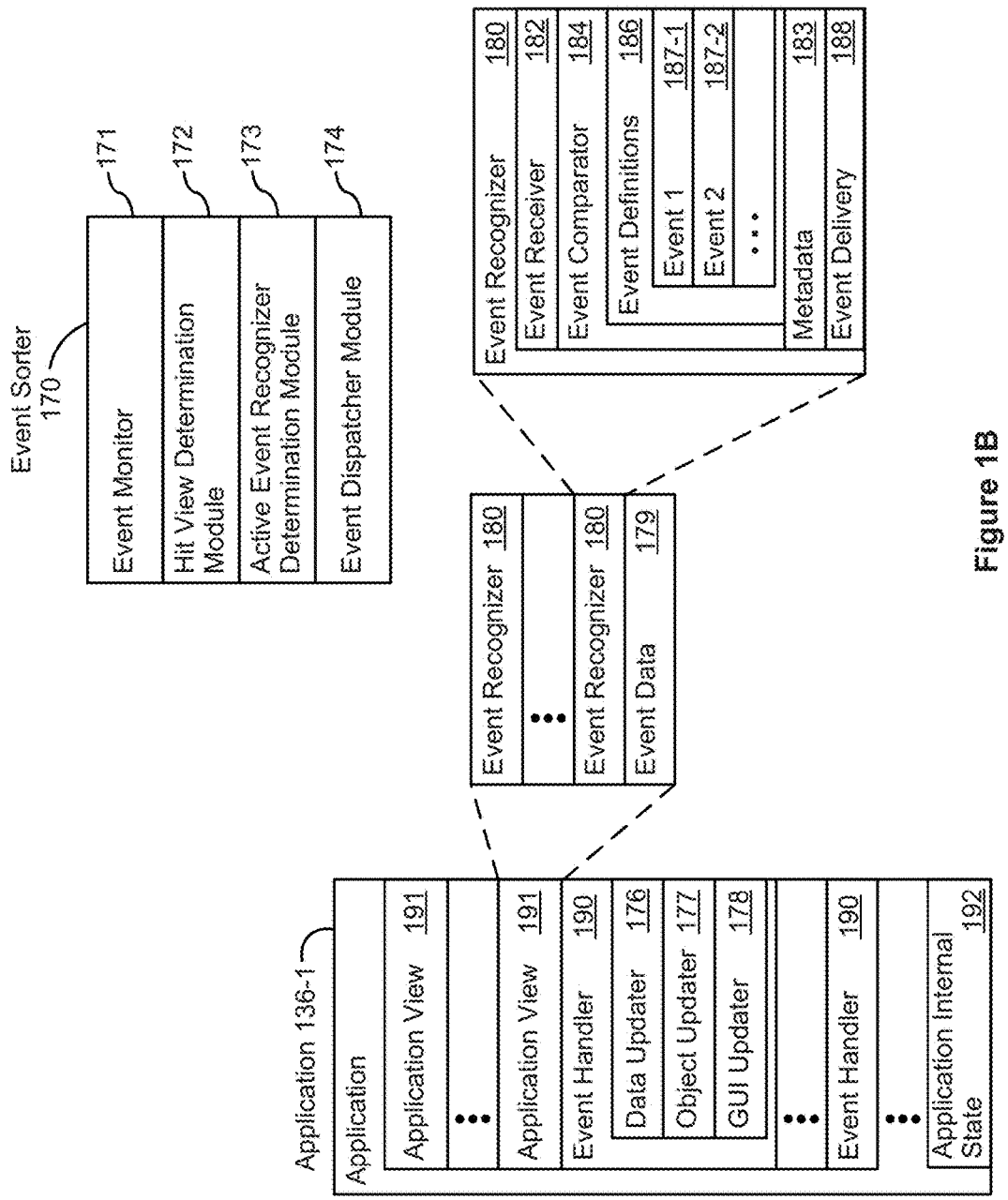
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
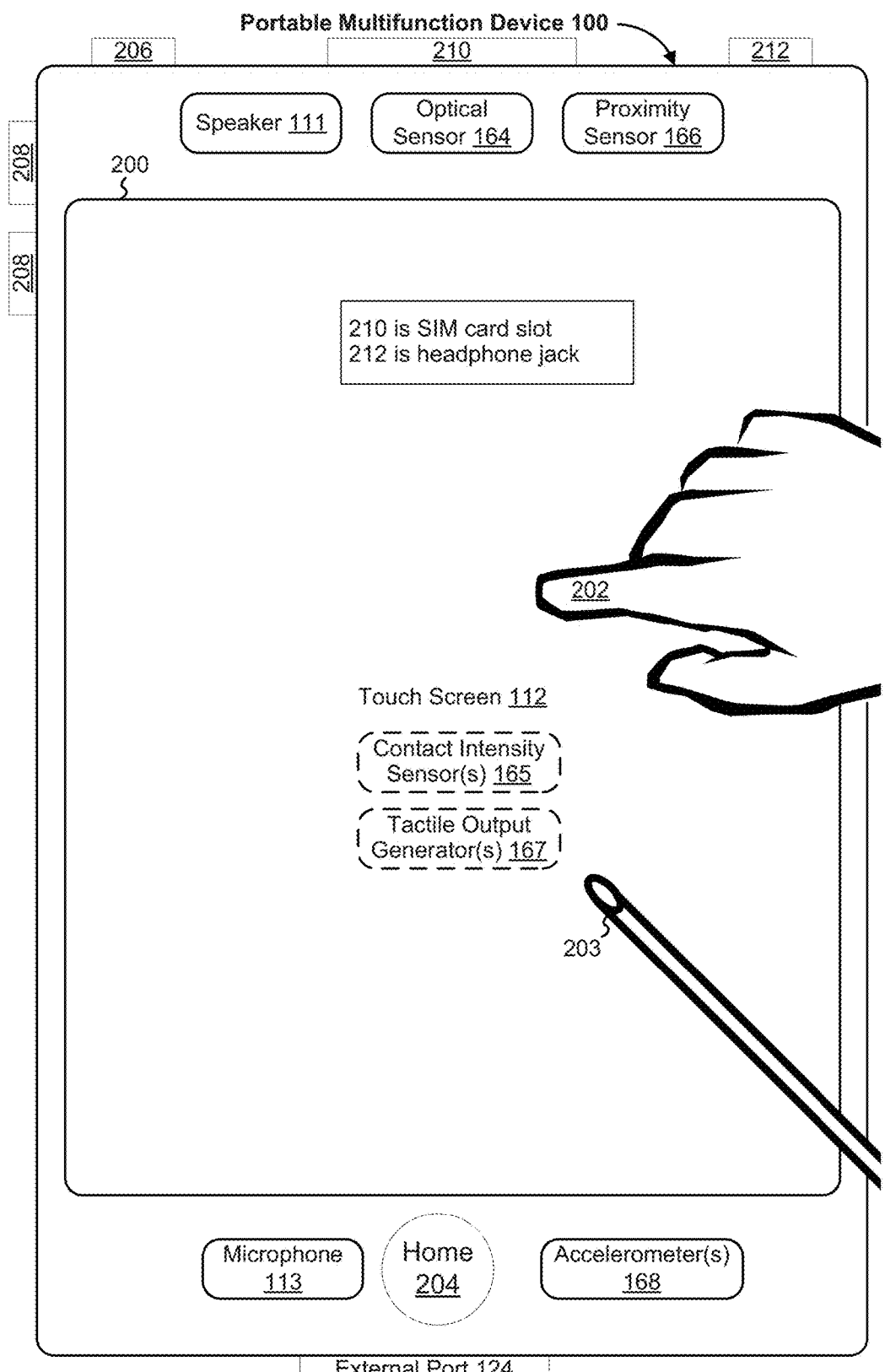
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
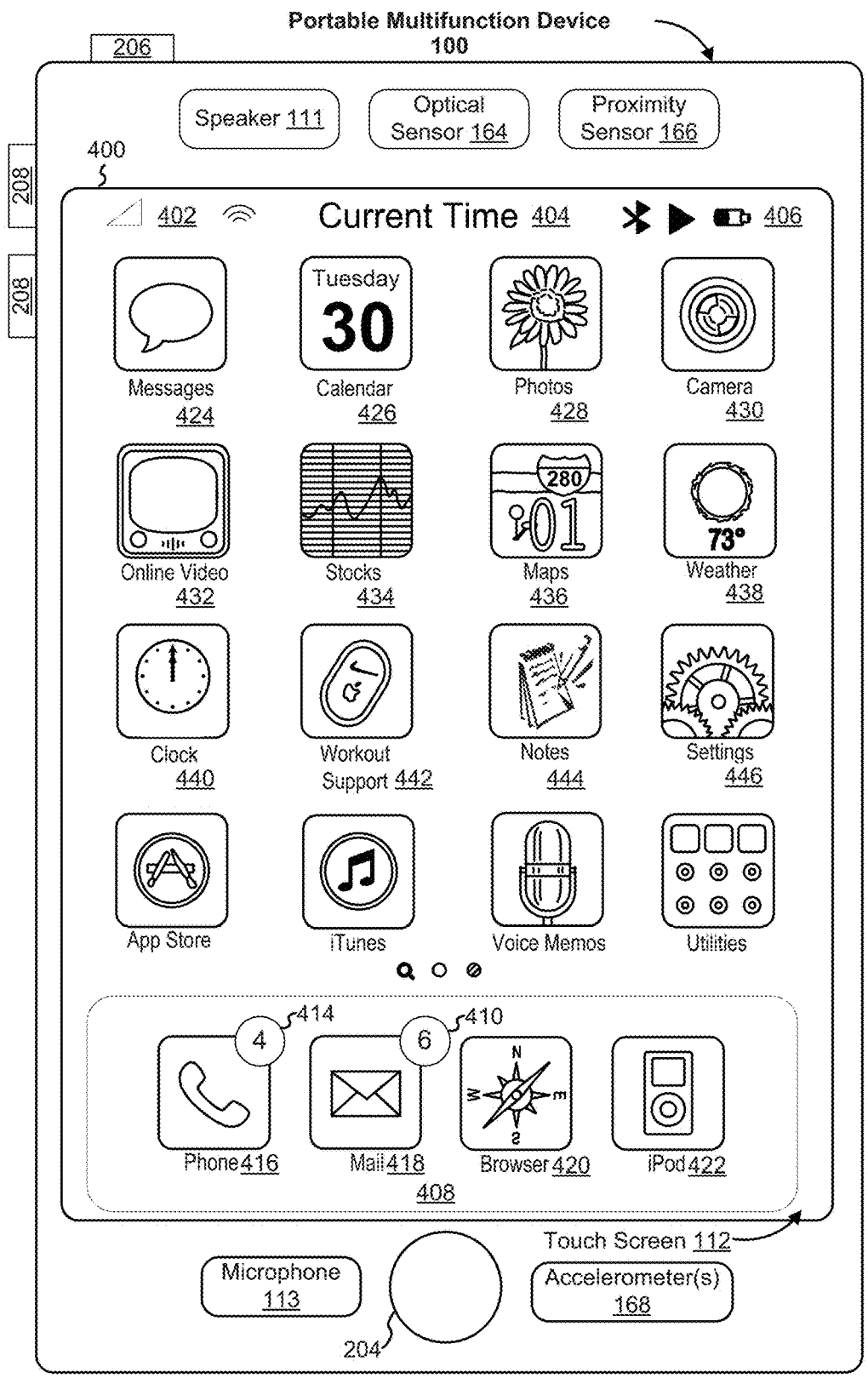
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
Icon 416 for telephone module 138, labeled "Phone," which optionally includes an indicator 414 of the number of missed calls or voicemail messages;
Icon 418 for e-mail client module 140, labeled "Mail," which optionally includes an indicator 410 of the number of unread e-mails;
Icon 420 for browser module 147, labeled "Browser;" and
Icon 422 for video and music player module 152, also referred to as iPod (trademark of Apple Inc.) module 152, labeled "iPod;" and
Icons for other applications, such as:
Icon 424 for IM module 141, labeled "Text;"
Icon 426 for calendar module 148, labeled "Calendar;"
Icon 428 for image management module 144, labeled "Photos;"
Icon 430 for camera module 143, labeled "Camera;"
Icon 432 for online video module 155, labeled "Online Video"
Icon 434 for stocks widget 149-2, labeled "Stocks;"
Icon 436 for map module 154, labeled "Map;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
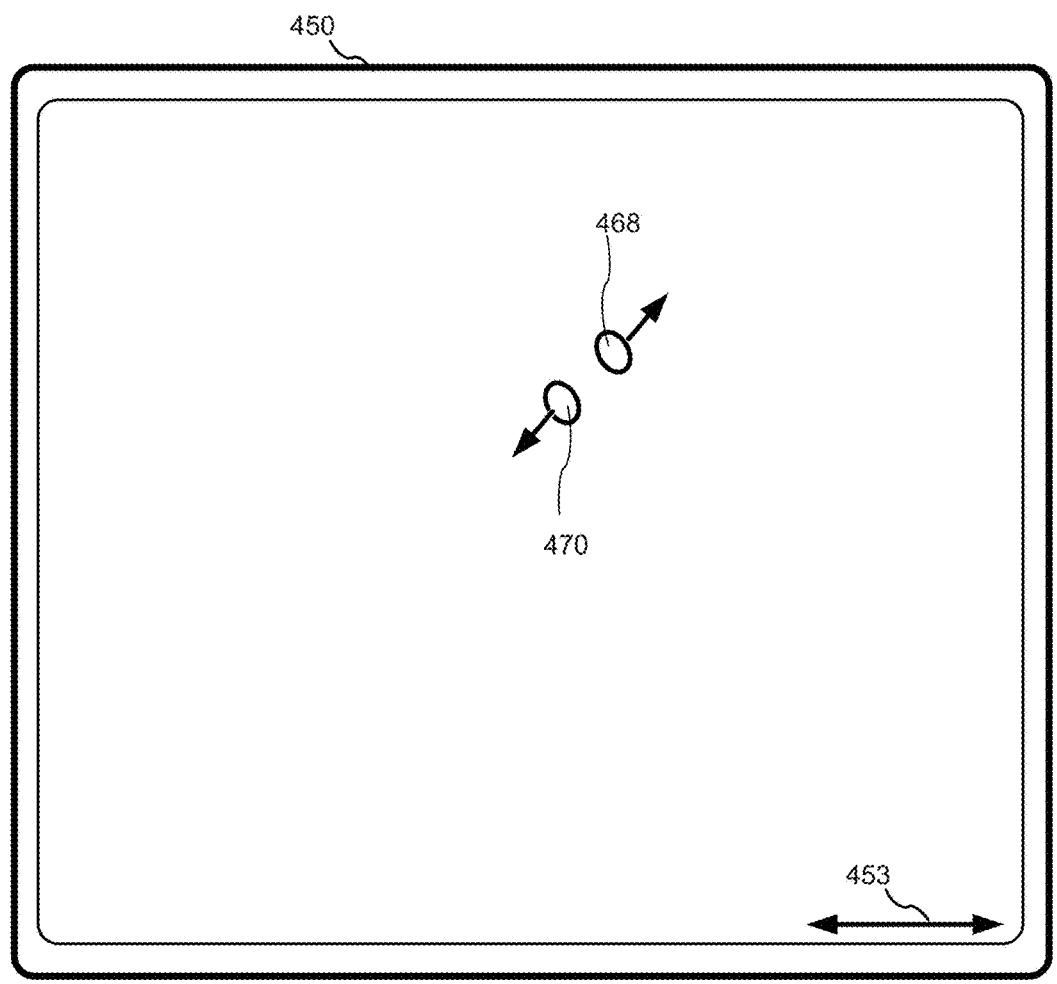
FIG. 4B illustrates an exemplary user interface for a multifunction device with a touch-sensitive surface that is separate from the display in accordance with some embodiments.
Figure 4B:
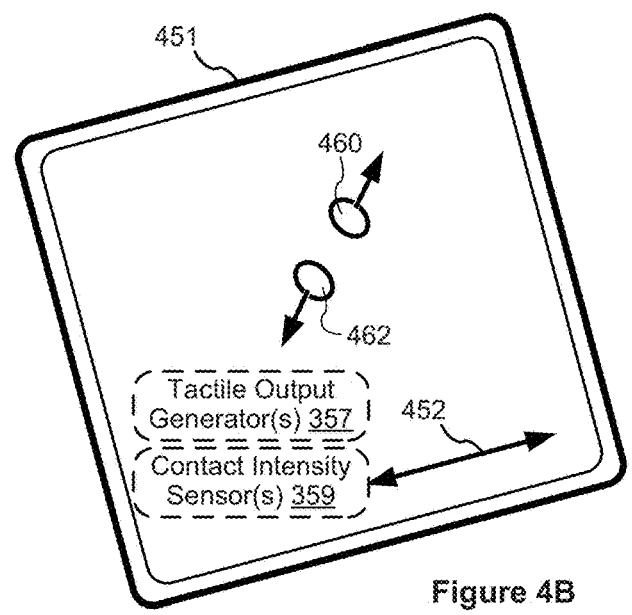

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG.

4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

The user interface figures described below include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$, and/or one or more other intensity thresholds). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with an intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of intensity of the contact from an intensity below the light press intensity threshold $IT_L$ to an intensity between the light press intensity threshold $IT_L$ and the deep press intensity threshold $IT_D$ is sometimes referred to as a "light press" input. An increase of intensity of the contact from an intensity below the deep press intensity threshold $IT_D$ to an intensity above the deep press intensity threshold $IT_D$ is sometimes referred to as a "deep press" input. An increase of intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of intensity of the contact from an intensity above the contact-detection intensity threshold $IT_0$ to an intensity below the contact intensity threshold $IT_0$ is sometimes referred to as detecting liftoff of the contact from the touch-surface. In some embodiments $IT_0$ is zero. In some embodiments $IT_0$ is greater than zero. In some illustrations a shaded circle or oval is used to represent intensity of a contact on the touch-sensitive surface. In some illustrations a circle or oval without shading is used represent a respective contact on the touch-sensitive surface without specifying the intensity of the respective contact.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

User Interfaces and Associated Processes

Zooming a User Interface while Performing an Operation

Many electronic devices have graphical user interfaces that are responsive to user inputs and enable the user to request performance of an operation (e.g., scroll a document, move a user interface object) in accordance with the user inputs. In some circumstances, the user desires to perform the operation in a zoomed in user interface, in order to have more precision. In existing methods, if the user wants to zoom the user interface while in the middle of an operation, the user has to stop the operation, or partly complete the operation, to zoom the interface, and then resume the operation. The embodiments described below improve on existing methods by allowing the user to zoom the user interface in or out using the same continuous gesture or contact as the gesture or contact that is activating the operation. The user changes the intensity of the gesture or contact used to activate the operation to zoom the user interface in or out. Thus, the user can activate an operation and zoom the user interface with a smooth gesture or contact input.

FIGS. 5A-5W illustrate exemplary user interfaces for zooming a user interface while performing an operation in accordance with some embodiments. The user interfaces in these figures are used to illustrate the processes described below, including the processes in FIGS. 6A-6D. FIGS. 5A-5W include intensity diagrams that show the current intensity of the contact on the touch-sensitive surface relative to a plurality of intensity thresholds including a light press intensity threshold (e.g., "$IT_L$") and a deep press intensity threshold (e.g., "$IT_D$"). In some embodiments, operations similar to those described below with reference to "$IT_L$" are performed with reference to a different intensity threshold (e.g., "$IT_D$").

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 5A-5W and FIGS. 6A-6D will be discussed with reference to display 450 and a separate touch-sensitive surface 451, however analogous operations are, optionally, performed on a device with a touch-sensitive display system 112 in response to detecting the contacts described in FIGS. 5A-5W on the touch-sensitive display system 112 while displaying the user interfaces shown in FIGS. 5A-5W on the touch-sensitive display system 112; in such embodiments, the focus selector is, optionally: a respective contact, a representative point corresponding to a contact (e.g., a centroid of a respective contact or a point associated with a respective contact), or a centroid of two or more contacts detected on the touch-sensitive display system 112, in place of cursor 18910.

FIG. 5A illustrates application window 18904 displayed on display 450 (e.g., display 340, touch screen 112) of a device (e.g., device 300, device 100). Application window 18904 is associated with an application (e.g., a web browser, an email application, a word processing application, a drawing application, a spreadsheet, a presentation, etc.).

Document 18906 is displayed in application window 18904. Document 18906 is displayed at zoom level 18906-a in FIG. 5A. Document 18906 is, optionally, a drawing or a presentation document. Document 18906 includes objects 18908-1, 18908-2, and 18908-3. Cursor 18910 is also displayed on display 450. Cursor 18910 is an example of a focus selector. In FIG. 5A, the device detects movement 18911 of contact 18912 to location 18912-a that corresponds to movement of cursor 18910 over user interface object 18908-1 while the intensity of contact 18912 is between $IT_0$ and $IT_L$. In FIG. 5B, cursor 18910 is located over, and puts focus on, object 18908-1.

FIG. 5B shows contact 18912 detected on touch-sensitive surface 451 of the device. In FIGS. 5A-5B, the device detects an increase in intensity of contact 18912 from an intensity between $IT_0$ and $IT_L$ in FIG. 5A to an intensity above $IT_L$ in FIG. 5B. In response to detecting the increase in intensity of contact 18912 in FIGS. 5A-5B, the device selects object 18908-1.

Figure 5C:
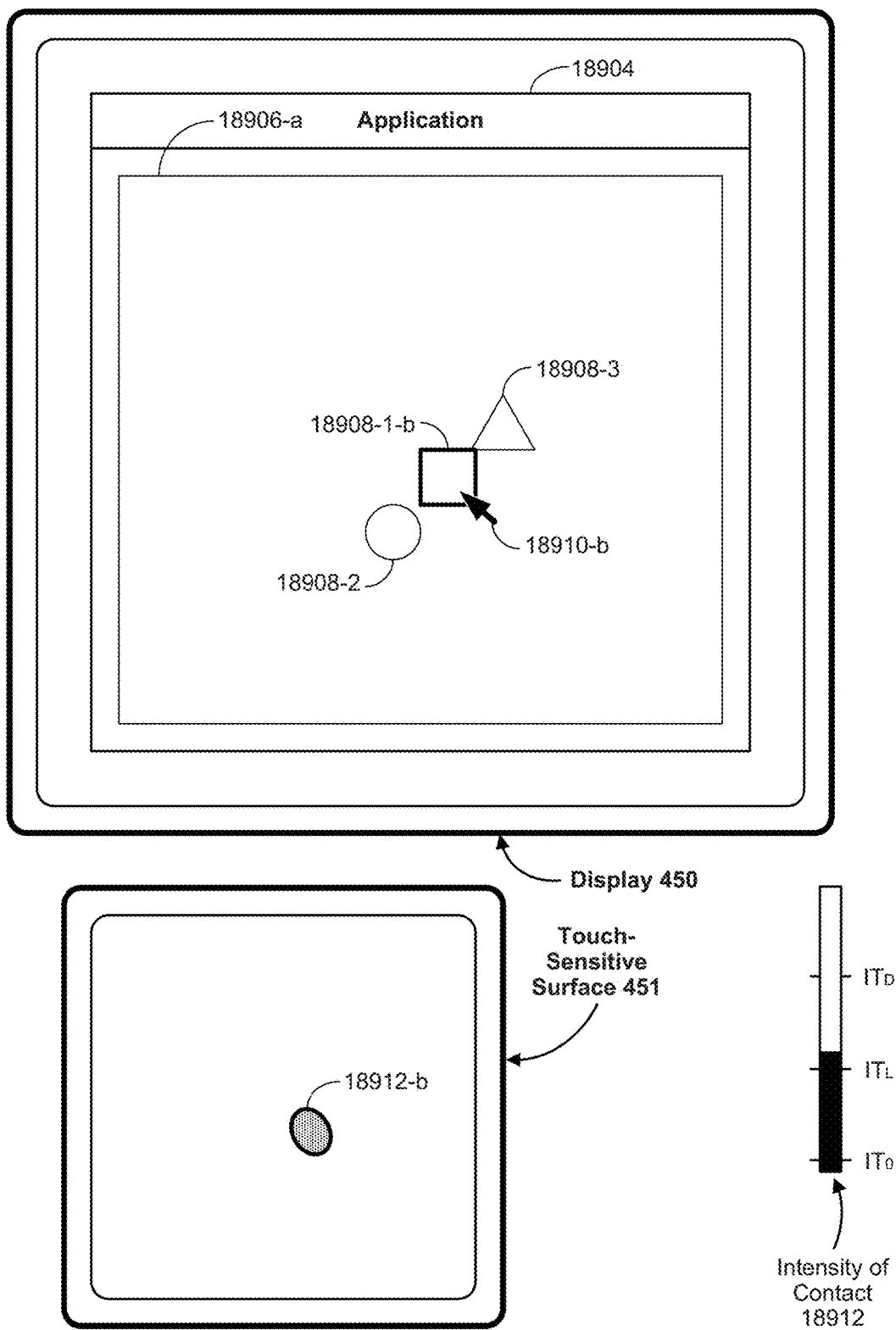

In FIGS. 5B-5C, movement 18914 of contact 18912 is detected on touch-sensitive surface 451 while object 18908-1 is selected. Movement 18914 moves contact 18912 from location 18912-*a* in FIG. 5B to location 18912-*b* in FIG. 5C on touch-sensitive surface 451. In response to detection of movement 18914 of contact 18912, cursor 18910 moves from location 18910-*a* to location 18910-*b* on display 450, and object 18908-1 moves from location 18908-1-*a* to location 18908-1-*b* on display 450, as shown in FIG. 5C; object 18908-1 is dragged to location 18908-1-*b* in accordance with movement 18914 of contact 18912. In FIGS. 5A-5C, contact 18912 remains continuously detected on touch-sensitive surface 451.

Figure 5D:
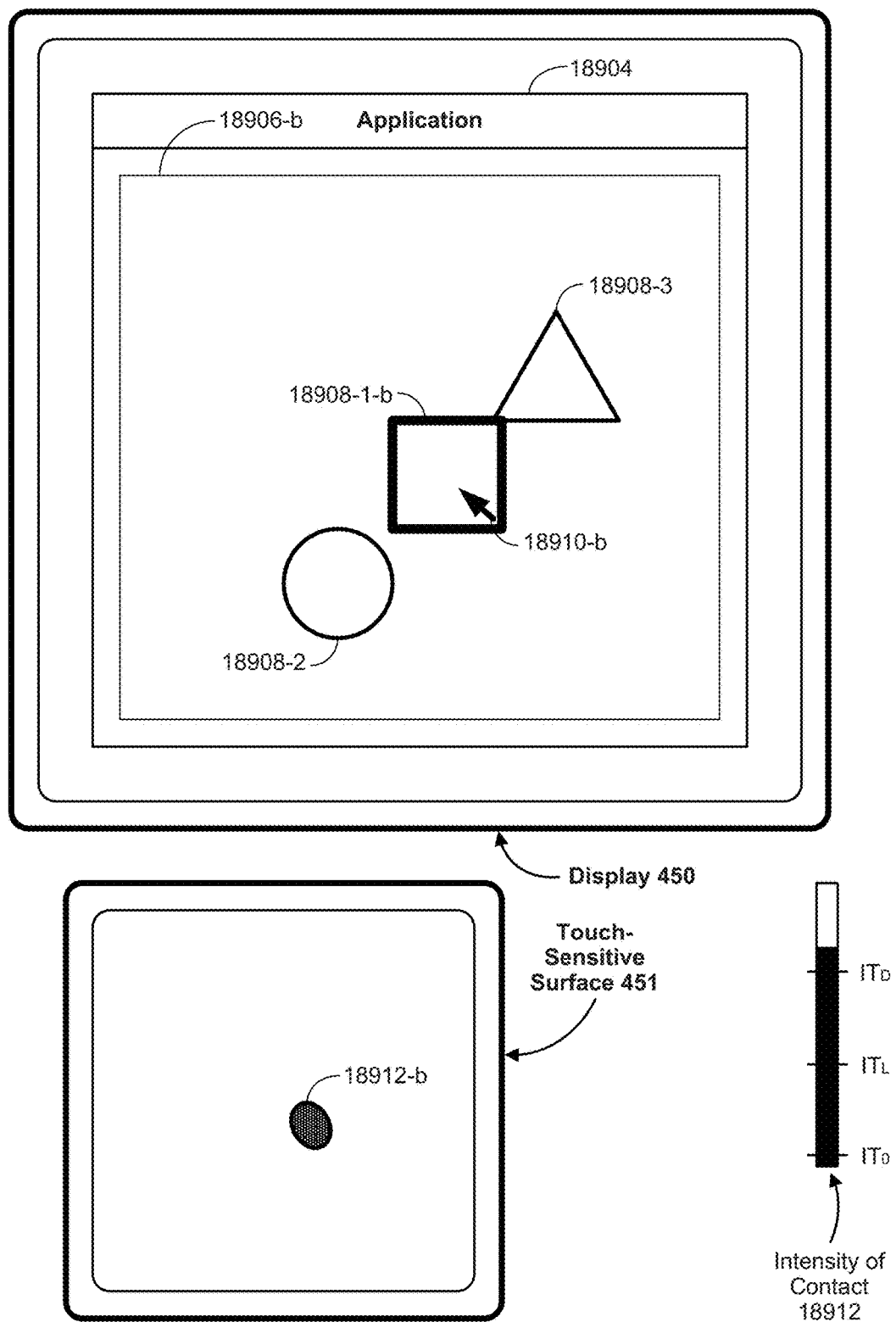

FIGS. 5C-5D show the intensity of continuously detected contact 18912 increasing from an intensity between $IT_L$ and $IT_D$ in FIG. 5C to an intensity above $IT_D$ in FIG. 5D. In response to detection of the increase in the intensity of contact 18912 in FIGS. 5C-5D, the device zooms document 18906 from zoom level 18906-*a* in FIG. 5C to zoom level 18906-*b* in FIG. 5D, and objects 18908-1, 18908-2, and 18908-3 are concurrently enlarged in accordance with the zooming of document 18906.

In some embodiments, zoom level 18906-*b* is a predefined zoom level. In some other embodiments, zoom level 18906-*b* is dynamically selected in accordance with a maximum intensity of contact 18912 (e.g., zoom level 18906-*b* is selected from a range of zoom levels based on a maximum intensity of contact 18912). In some other embodiments, zoom level 18906-*b* is dynamically selected in accordance with the current intensity of contact 18912 (e.g., zoom level 18906-*b* is selected from a range of zoom levels based on a current intensity of contact 18912).

Figure 5E:
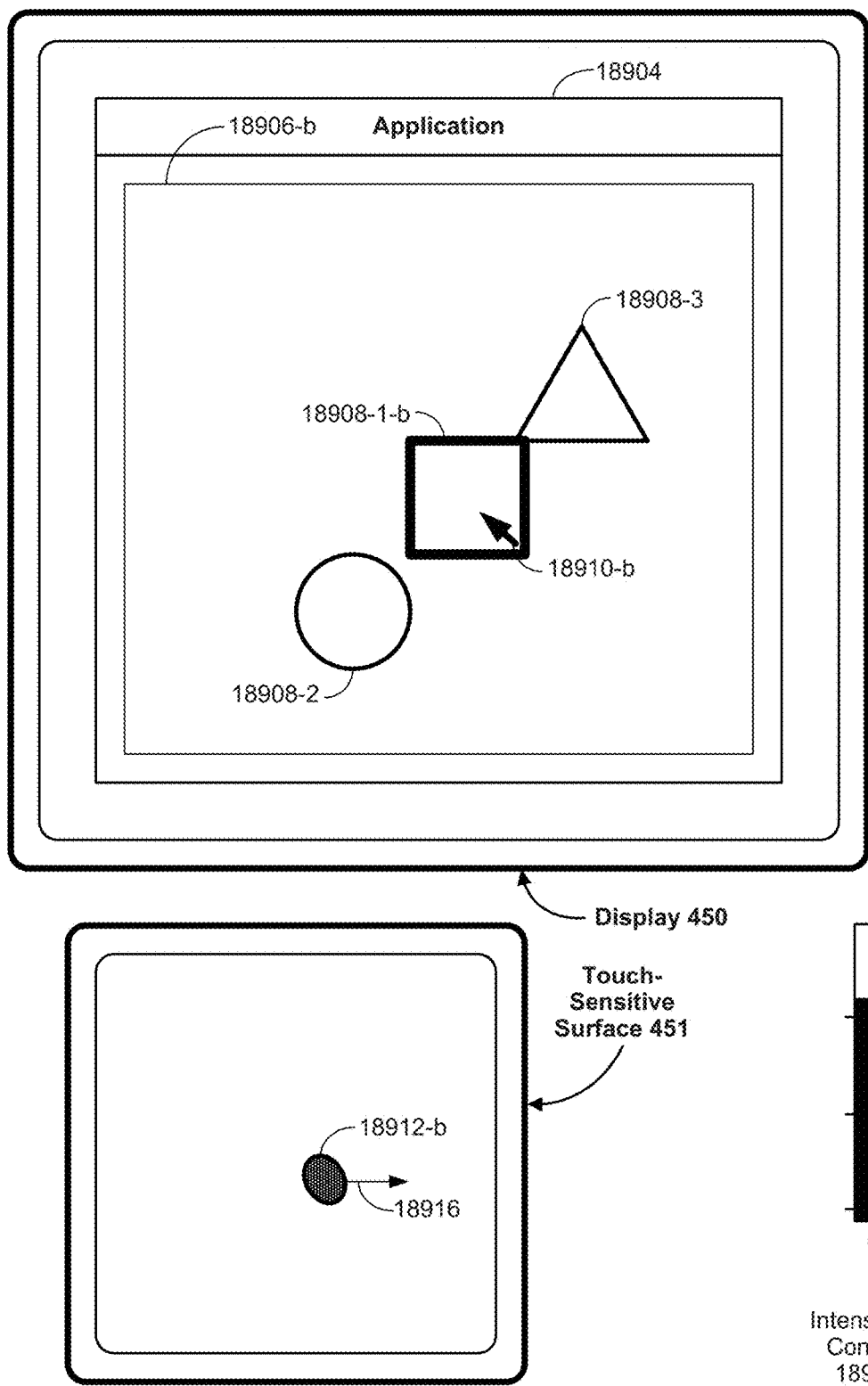
Figure 5F:
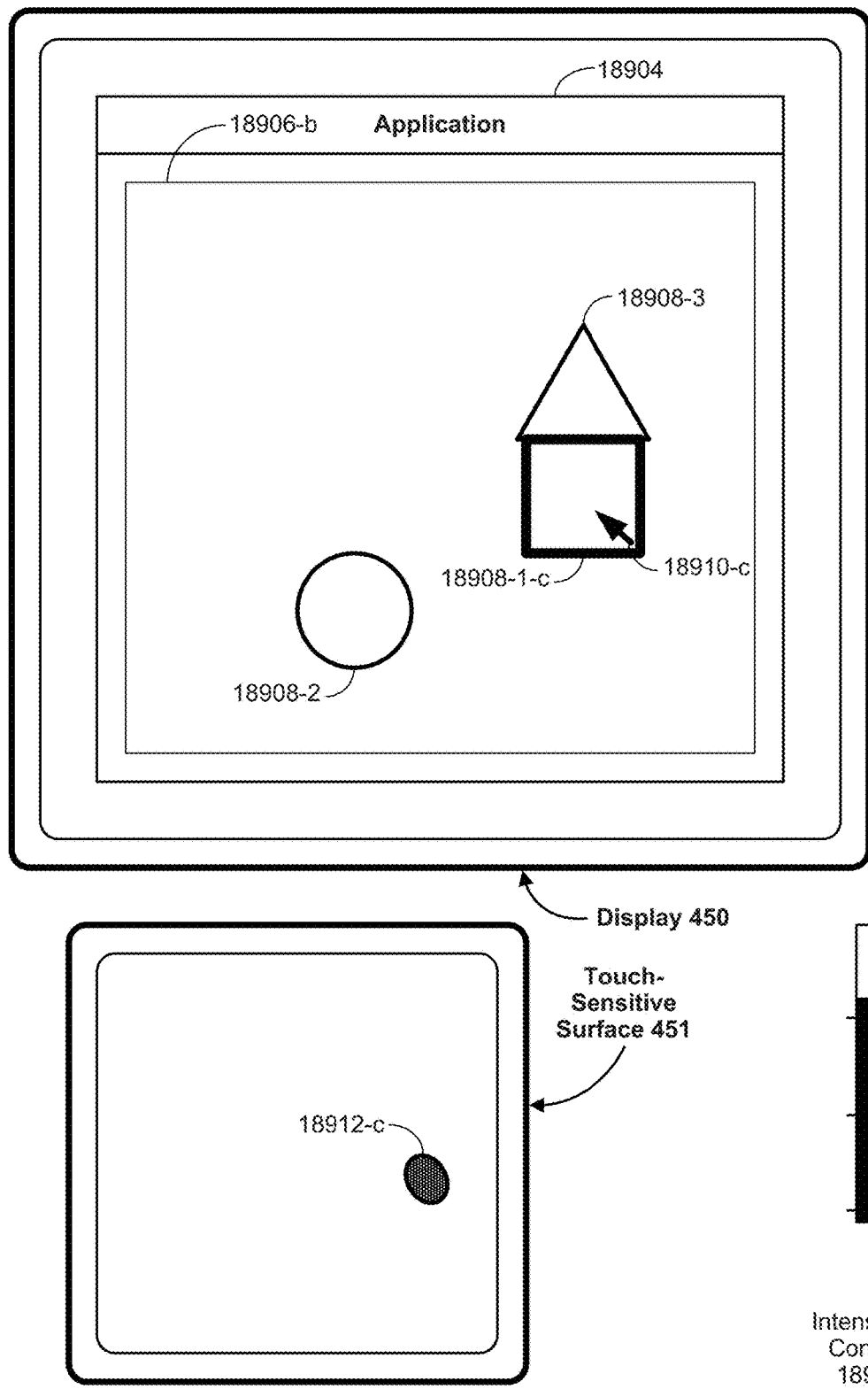
Figure 5G:
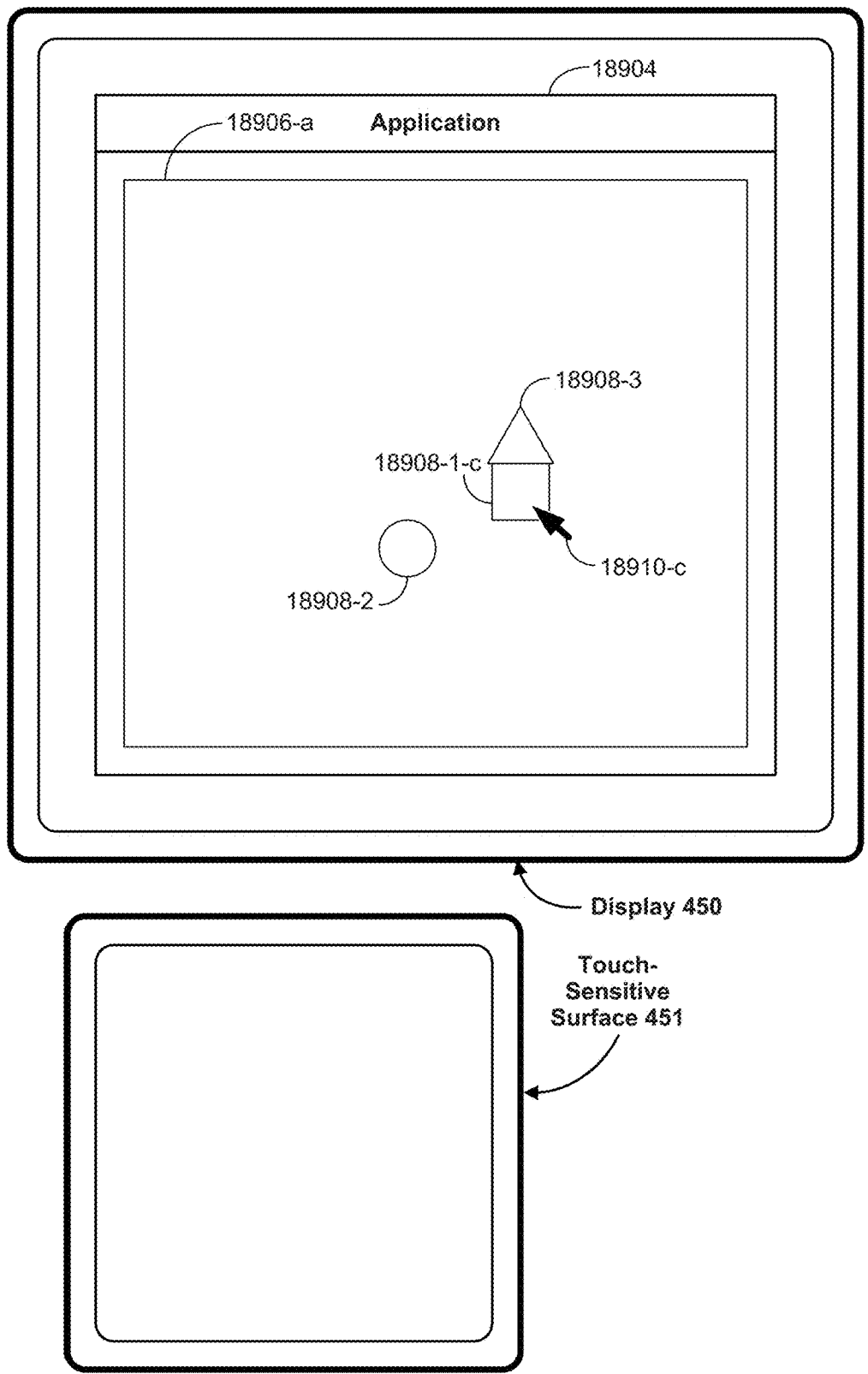
Figure 5H:
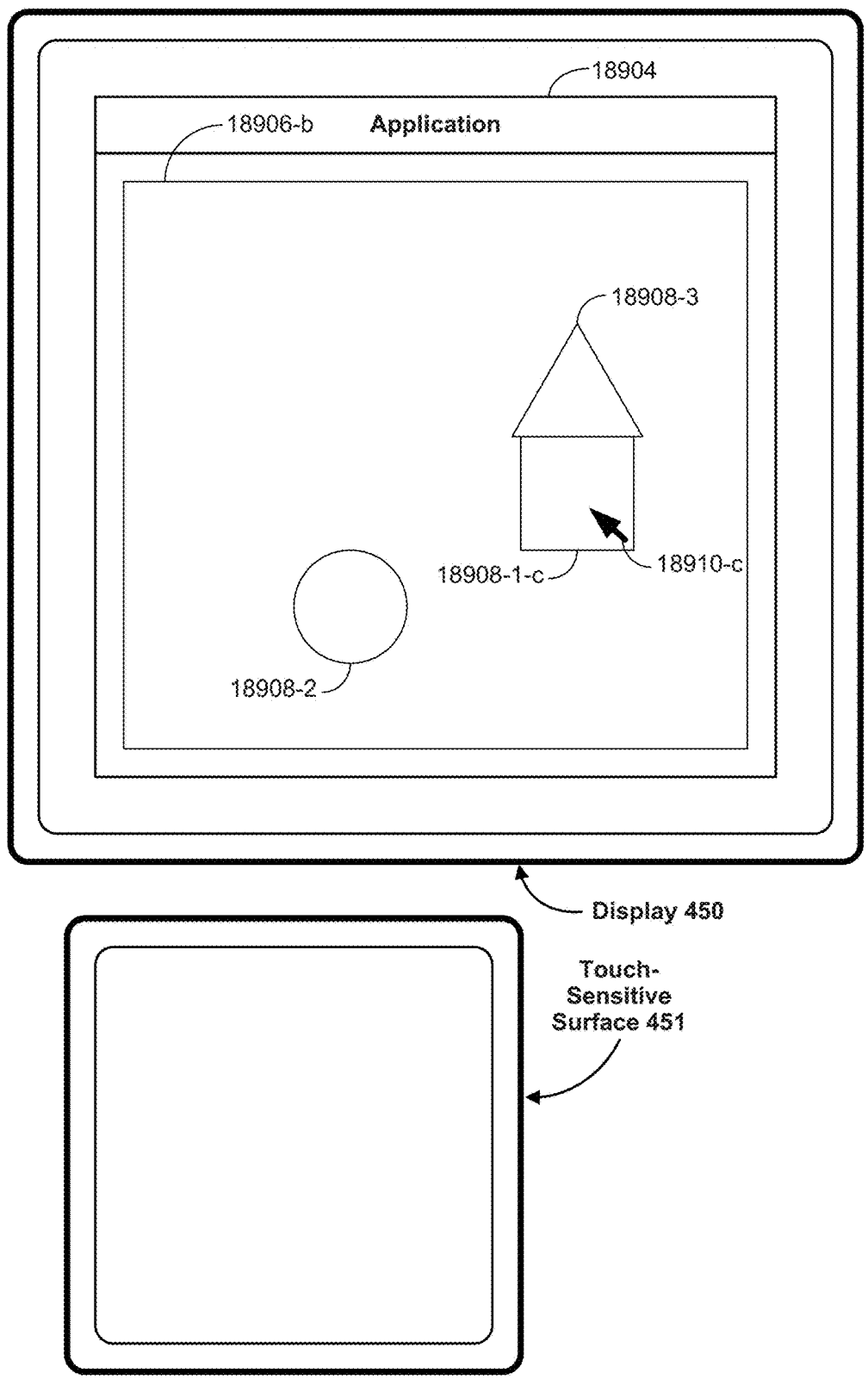

FIGS. 5E-5F show, while document 18906 is displayed at zoom level 18906-*b*, the device detecting movement 18916 of contact 18912 on touch-sensitive surface 451 while object 18908-1 is still selected. Movement 18916 moves contact 18912 from location 18912-*b* in FIG. 5E to location 18912-*c* in FIG. 5F on touch-sensitive surface 451. In response to detection of movement 18916 of contact 18912, cursor 18910 moves from location 18910-*b* in FIG. 5E to location 18910-*c* in FIG. 5F on display 450, and object 18908-1 moves from location 18908-1-*b* in FIG. 5E to location 18908-1-*c* in FIG. 5F on display 450; object 18908-1 is dragged to location 18908-1-*c* in accordance with movement 18916 of contact 18912. Document 18906 remains at zoom level 18906-*b* (e.g., while contact 18912 continues to have an intensity above $IT_D$ or a hysteresis intensity threshold associated with, and below, $IT_D$). At this point, contact 18912 is, optionally, lifted off touch-sensitive surface 451 to complete the movement of object 18908-1 (e.g., as shown in FIGS. 5G and 5H). In some embodiments, movement of object 18908-1 is completed in response to detecting a decrease in intensity of contact 18912 below $IT_L$ or a hysteresis intensity threshold associated with, and below, $IT_L$ even if the contact continues to be detected on touch-sensitive surface 451.

In FIGS. 5G-5H, after detecting movement 18916 of contact 18912, contact 18912 is, optionally, lifted off from touch-sensitive surface 451. In some embodiments, in response to detection of the liftoff of contact 18912, document 18906 reverts back to zoom level 18906-*a*, as shown in FIG. 5G, and objects 18908-1, 18908-2, and 18908-3 also revert zoom level along with document 18906 reverting back to zoom level 18906-*a*. In some embodiments, in response to detection of the liftoff of contact 18912, document 18906 remains at zoom level 18906-*b*, as shown in FIG. 5H, and objects 18908-1, 18908-2, and 18908-3 maintain zoom level along with document 18906.

Figure 5I:
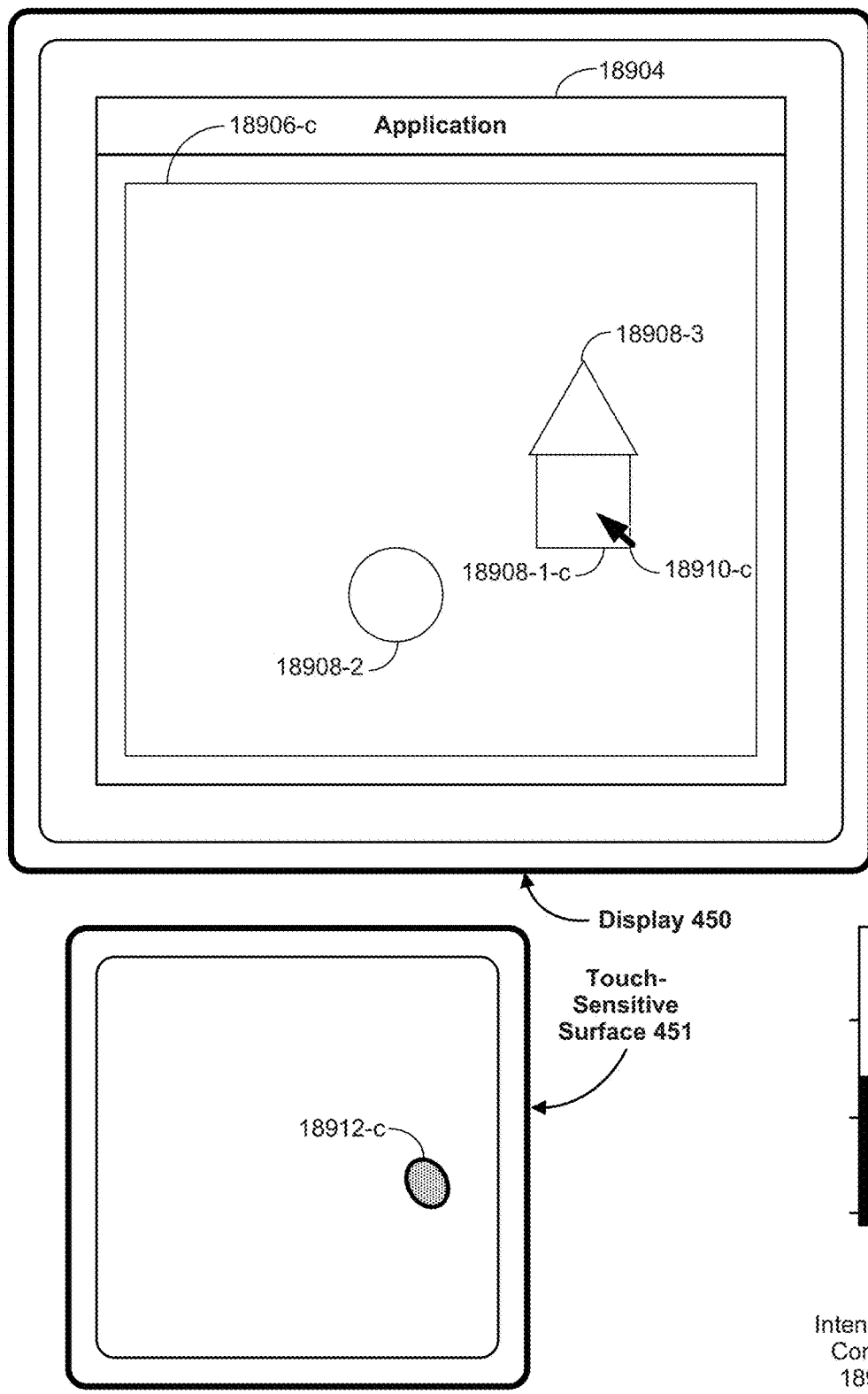

In FIGS. 5F and 5I, after detecting movement 18916 of contact 18912, the intensity of contact 18912 is, optionally, decreased without lifting off contact 18912. For example, FIGS. 5F and 5I show the intensity of contact 18912 decreasing from an intensity above $IT_D$ in FIG. 5F to an intensity between $IT_L$ and $IT_D$ in FIG. 5I. In response to detection of the decrease in the intensity of contact 18912 in FIGS. 5F and 5I, document 18906 zooms from zoom level 18906-*b* to zoom level 18906-*c*, as shown in FIG. 5I, and objects 18908-1, 18908-2, and 18908-3 also zoom along with document 18906.

Figure 5J:
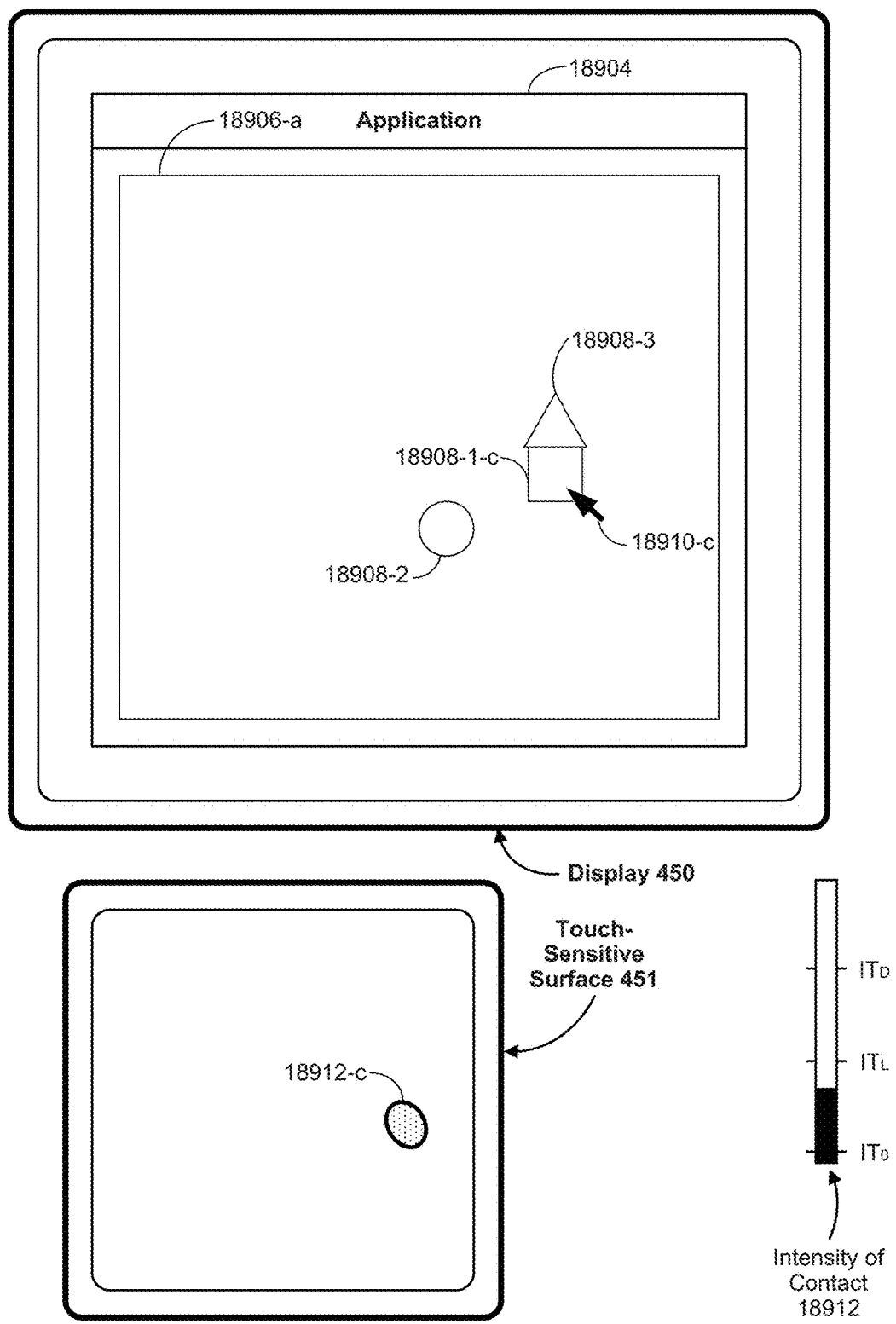

In FIGS. 5I-5J, the intensity of contact 18912 continues to be decreased without lifting off contact 18912. For example, FIGS. 5I-5J show the intensity of contact 18912 decreasing from an intensity between $IT_L$ and $IT_D$ in FIG. 5I to an intensity between $IT_0$ and $IT_L$ in FIG. 5J. In response to detection of the decrease in the intensity of contact 18912 in FIGS. 5I-5J, document 18906 zooms from zoom level 18906-*c* to zoom level 18906-*a*, as shown in FIG. 5J, and objects 18908-1, 18908-2, and 18908-3 also zoom along with document 18906. Zoom level 18906-*c* is different from zoom level 18906-*a* and 18906-*b*. For example, zoom level 18906-*c* is, optionally, higher than zoom level 18906-*a* but lower than zoom level 18906-*b*.

Figure 5K:
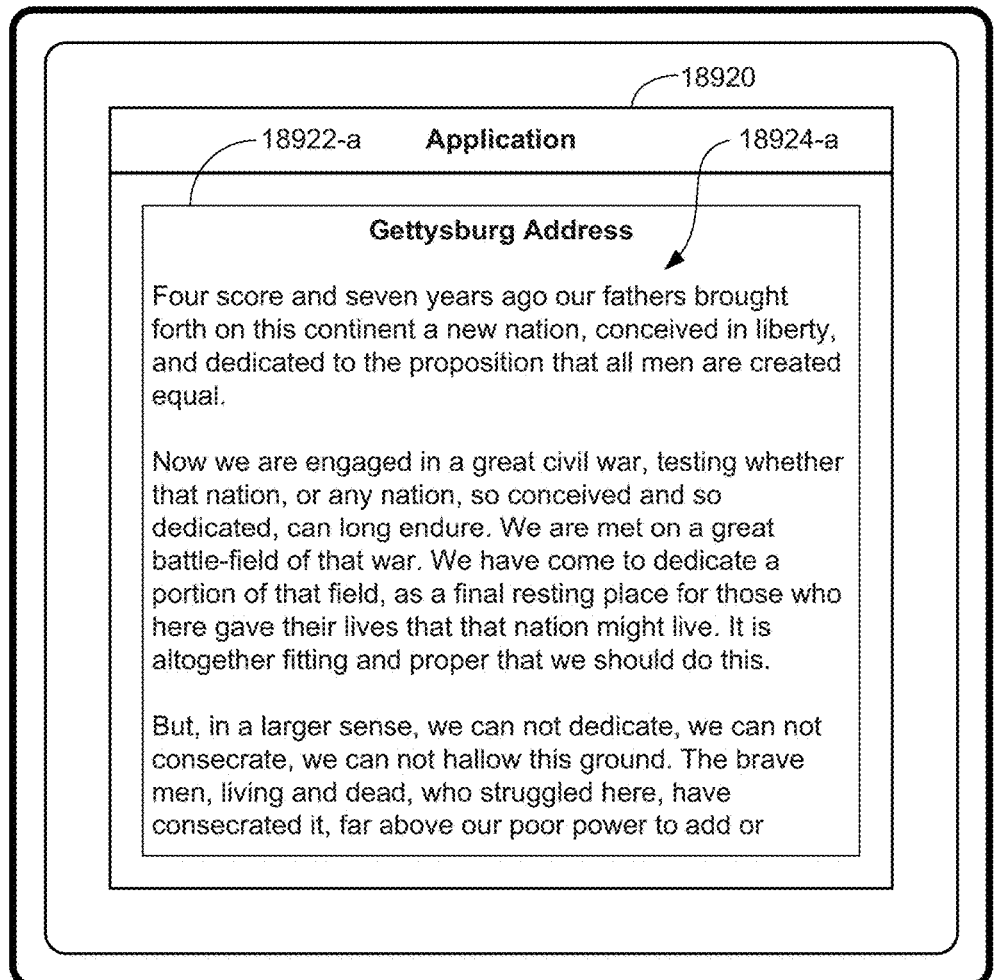
Figure 5K:
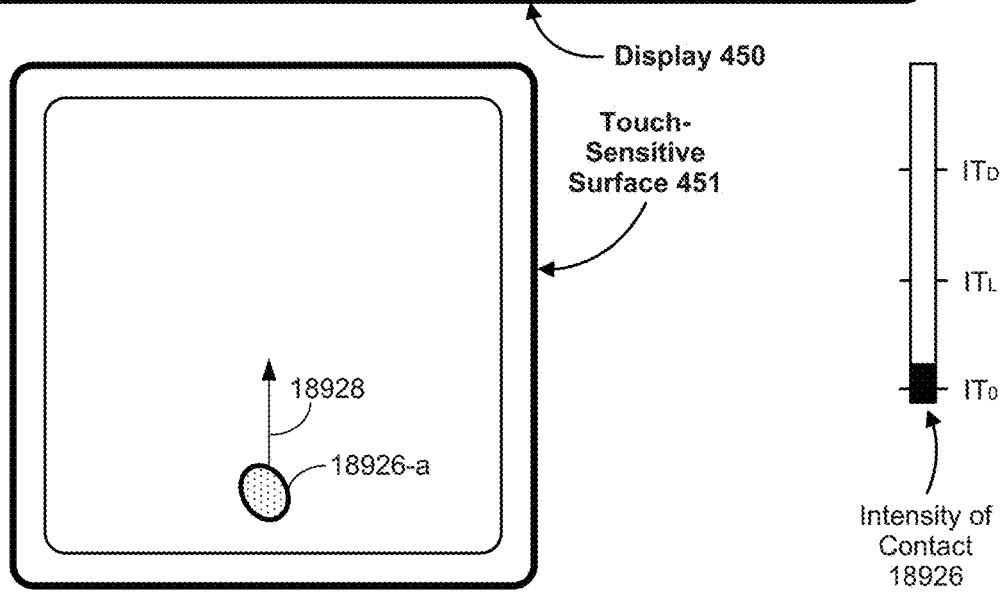

FIG. 5K illustrates application window 18920 displayed on display 450. Application window 18920, like application window 18904, is associated with an application (e.g., a web browser, an email application, a word processing application, a drawing application, a spreadsheet, a presentation, etc.). Document 18922 is displayed in application window 18920. Document 18922 is displayed at zoom level 18922-*a*. Document 18922 is, optionally, a web page, a word processing document, or a text document. Document 18922 includes content 18924 (e.g., text). In FIG. 5K, portion 18924-*a* of content 18924 is displayed in document 18922.

Figure 5L:
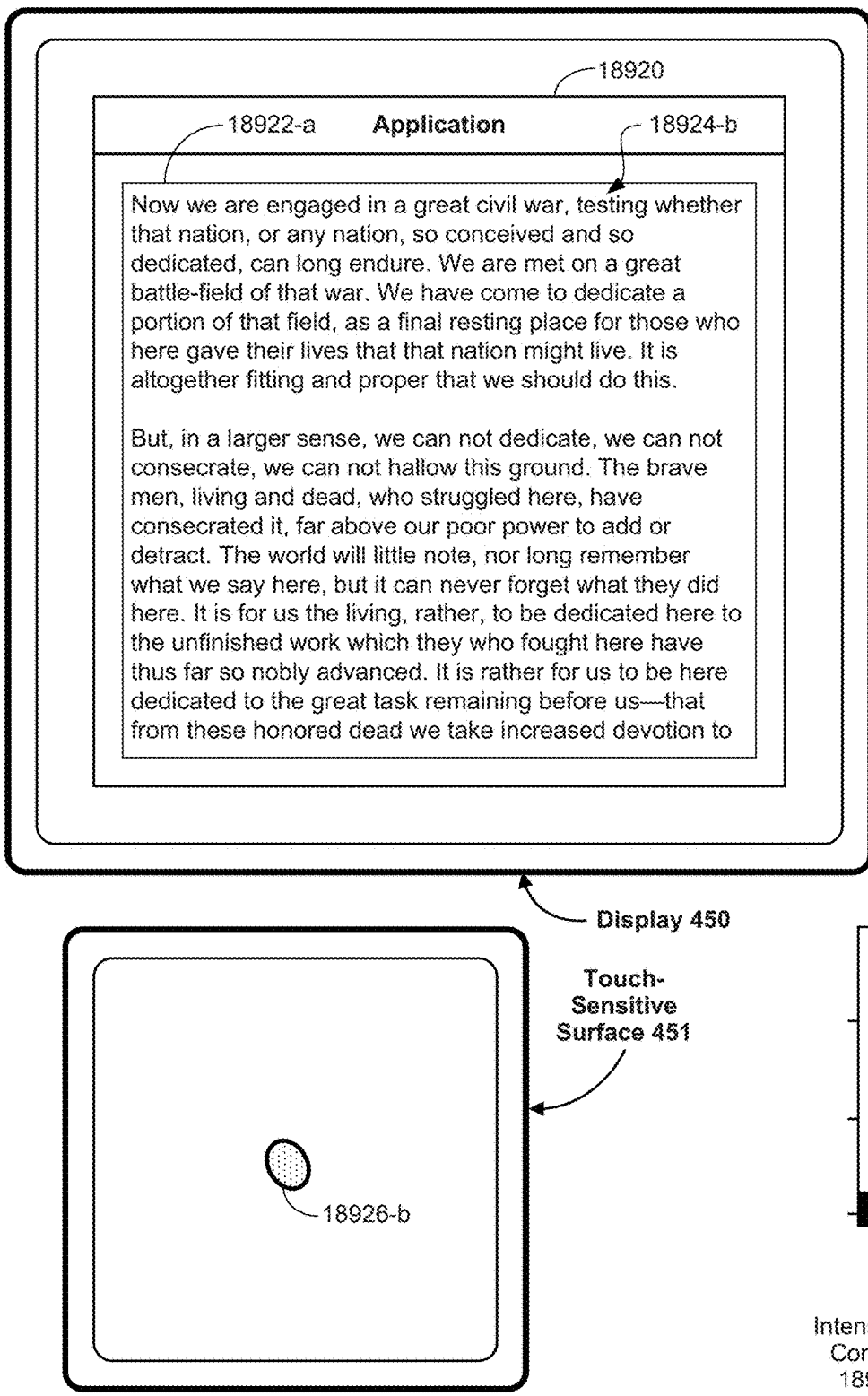

FIG. 5K shows contact 18926 detected on touch-sensitive surface 451. Contact 18926 has an intensity between $IT_0$ and $IT_L$. In FIGS. 5K-5L, movement 18928 of contact 18926 is detected on touch-sensitive surface 451. Movement 18928 moves contact 18926 from location 18926-*a* in FIG. 5K to location 18926-*b* in FIG. 5L on touch-sensitive surface 451. In response to the detection of movement 18928 of contact 18926, document 18922 is scrolled. In accordance with the scrolling of document 18922, portion 18924-*b* of content 18924 is displayed, as shown in FIG. 5L.

Figure 5M:
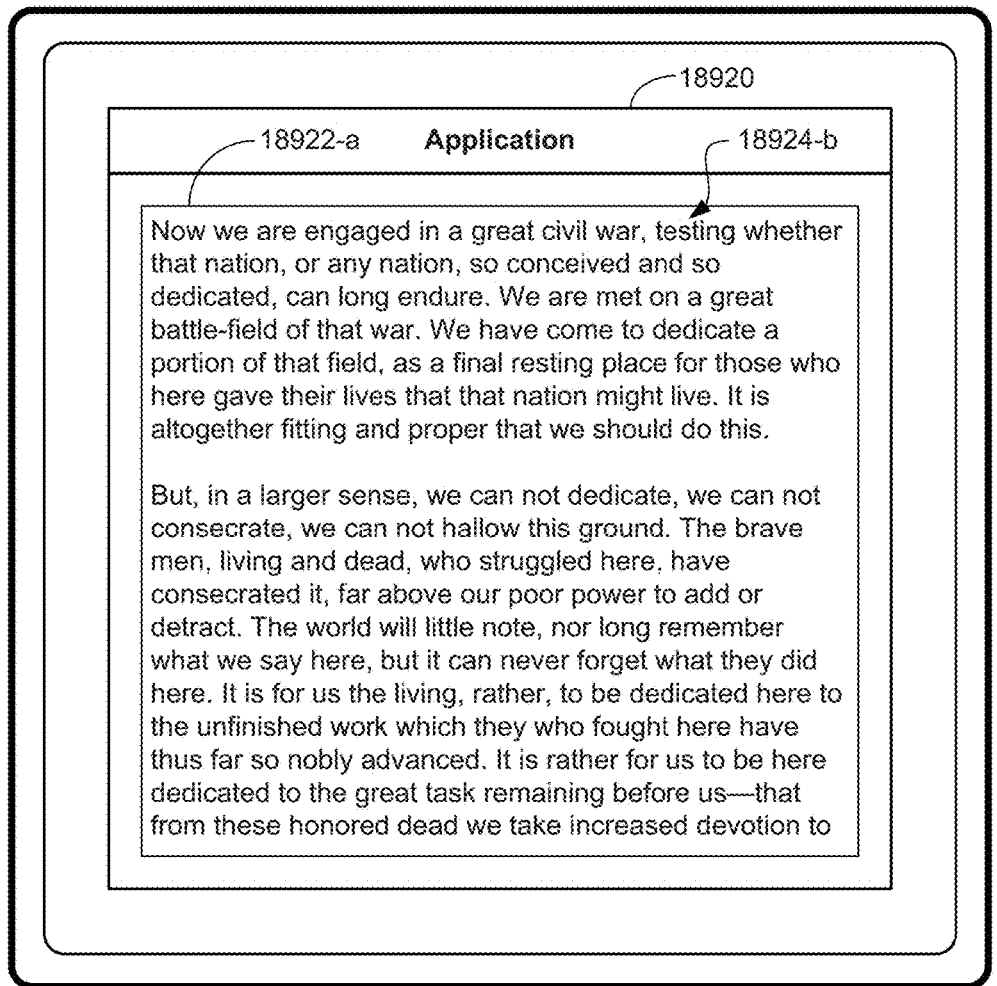
Figure 5M:
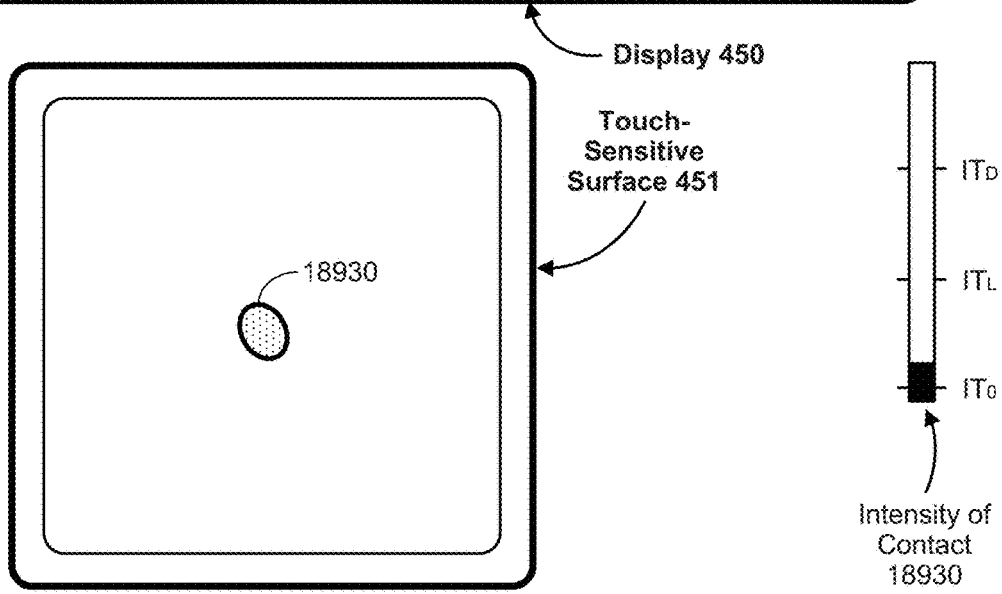
Figure 5N:
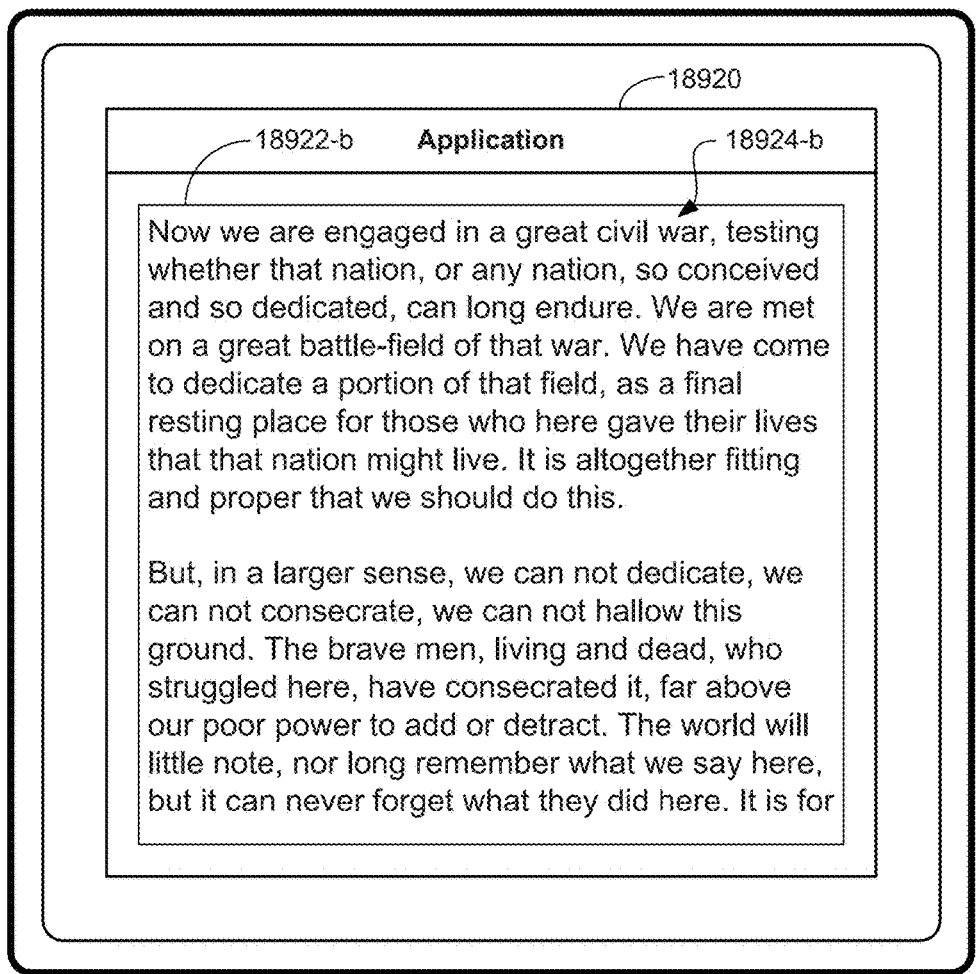
Figure 5N:
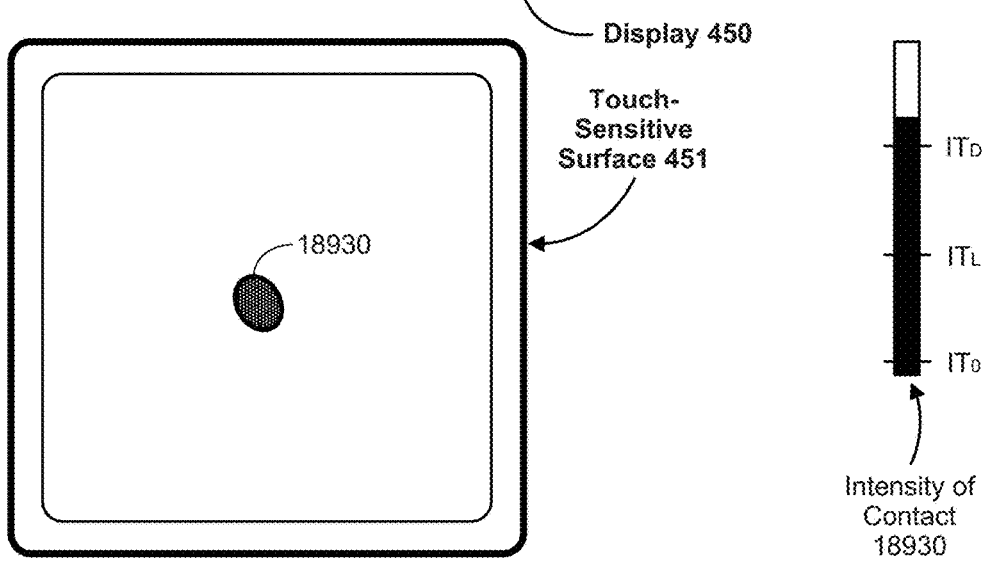

After movement 18928, contact 18926 is lifted off, and then new contact 18930 is detected on touch-sensitive surface 451, as shown in FIG. 5M. Contact 18930 has an intensity between $IT_0$ and $IT_L$. FIG. 5N shows the intensity of contact 18930 increasing to an intensity above $IT_D$. In response to detection of the increase in the intensity of contact 18930 in FIGS. 5M-5N, document 18922 is zoomed from zoom level 18922-*a* in FIG. 5M to zoom level 18922-*b* in FIG. 5N. Portion 18924-*b* of content 18924 is zoomed in accordance of the zooming of document 18922.

In some embodiments, zoom level 18922-*b* is a predefined zoom level. In some other embodiments, zoom level 18922-*b* is dynamically selected in accordance with a maximum intensity of contact 18930 (e.g., zoom level 18922-*b* is selected from a range of zoom levels based on a maximum intensity of contact 18930). In some other embodiments, zoom level 18922-*b* is dynamically selected in accordance with the current intensity of contact 18930 (e.g., zoom level 18922-*b* is selected from a range of zoom levels based on a current intensity of contact 18930).

Figure 5O:
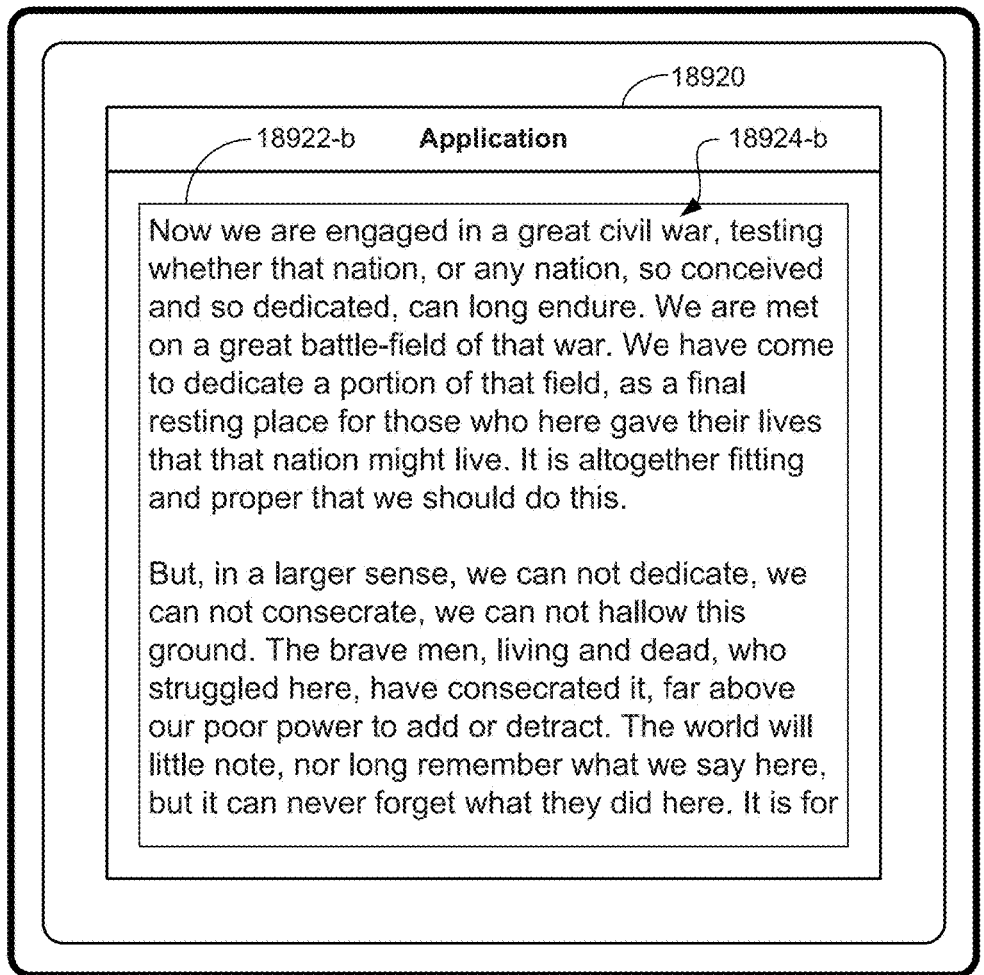
Figure 5O:
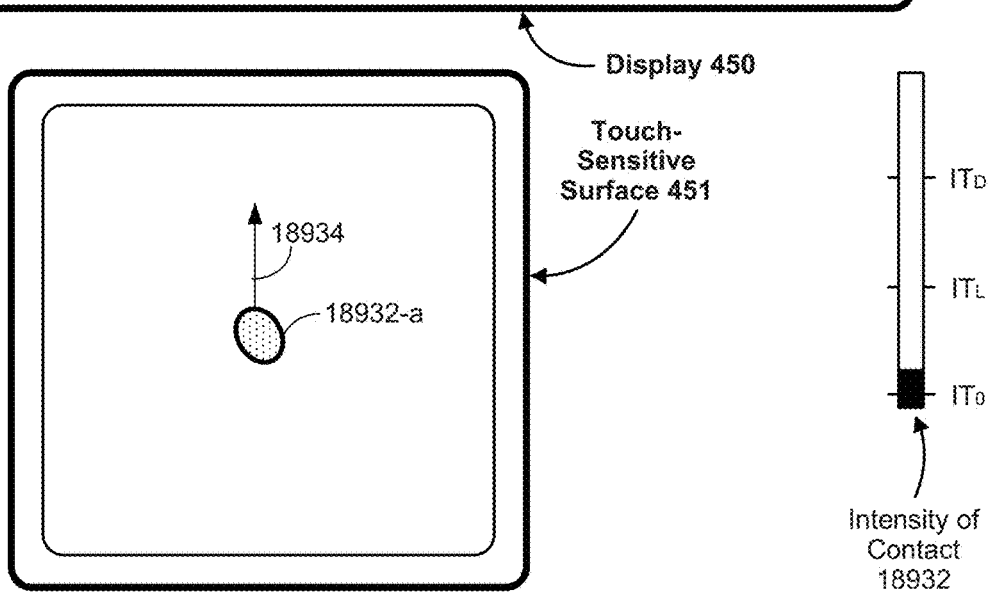
Figure 5P:
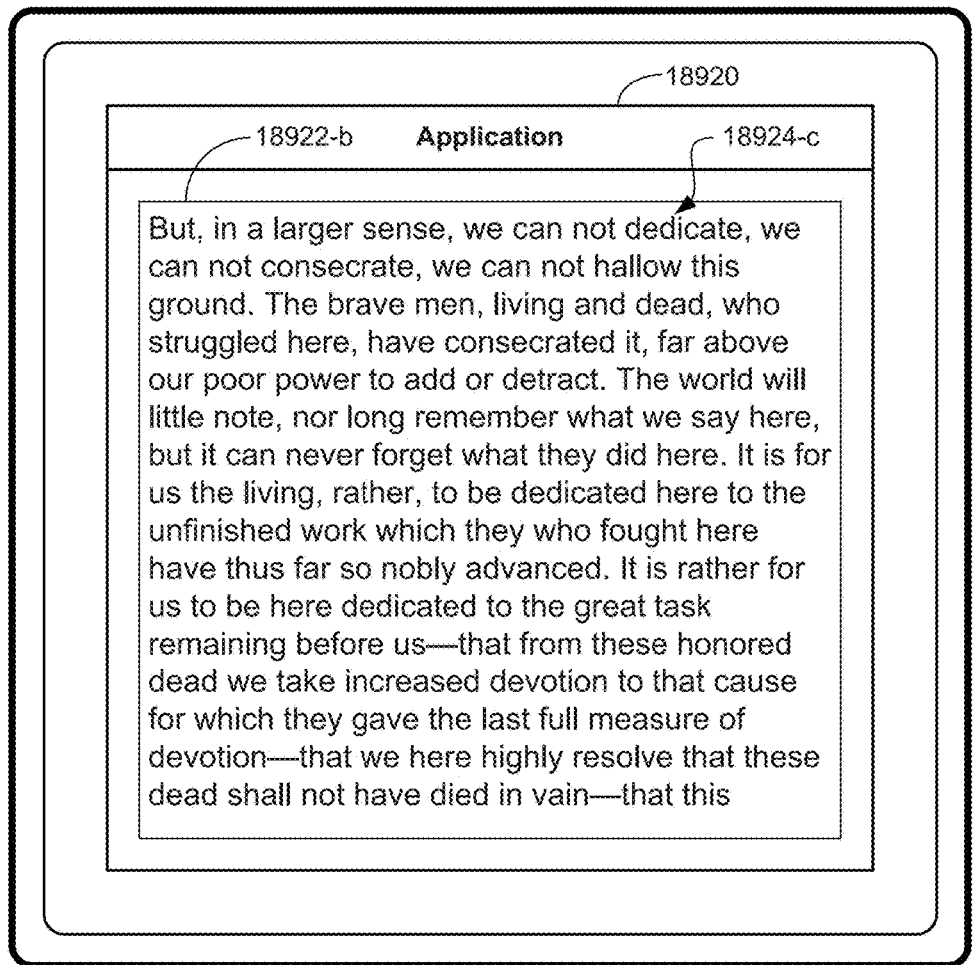
Figure 5P:
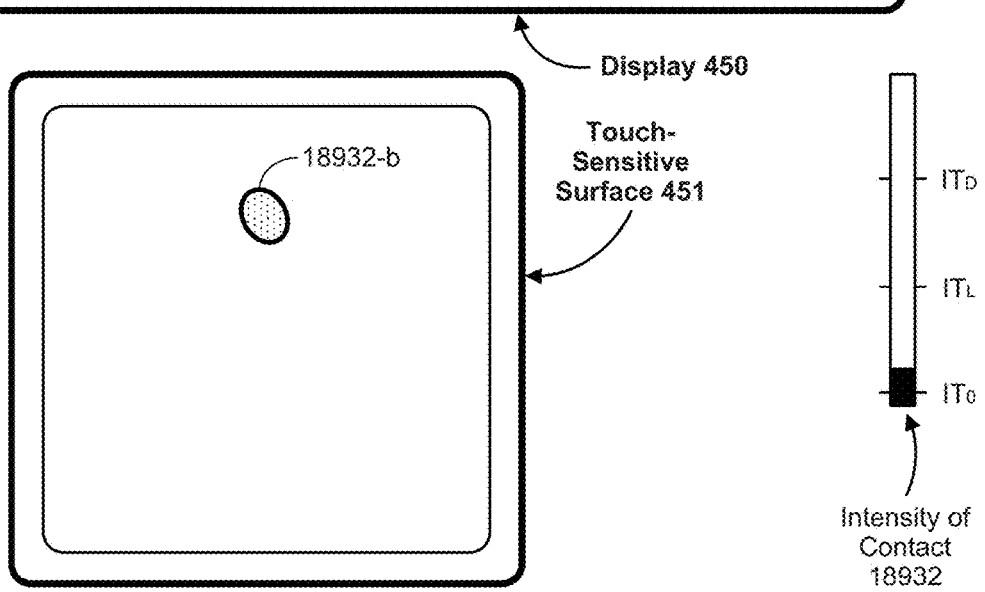

After the increase in the intensity of contact 18930 in FIGS. 5M-5N, contact 18930 is lifted off, and then new contact 18932 is detected on touch-sensitive surface 451, as shown in FIG. 5O. Contact 18932 has an intensity between $IT_0$ and $IT_L$ in FIG. 5O. Movement 18934 of contact 18932 is detected on touch-sensitive surface 451 in FIGS. 5O-5P. Movement 18934 moves contact 18932 from location 18932-*a* in FIG. 5O to location 18932-*b* in FIG. 5P on touch-sensitive surface 451. In response to the detection of movement 18934 of contact 18932 in FIGS. 5O-5P, document 18922 is scrolled while displayed at zoom level 18922-*b*. In accordance with the scrolling of document 18922, portion 18924-*c* of content 18924 is displayed, as shown in FIG. 5P. At this point, contact 18932 is, optionally, lifted off touch-sensitive surface 451 to complete the scrolling of document 18922.

In some embodiments, contacts 18930 and 18932 are the same contact. That is, after contact 18926 is lifted off, contact 18930 is detected as described above with reference to FIG. 5M. The intensity of contact 18930 increases as described above with reference to FIG. 5N, and document 18922 zooms in response. Then, without liftoff, contact 18930 moves on the touch-sensitive surface 451 (e.g., with movement analogous to that described with reference to the movement 18934 of contact 18932 described above with reference to FIG. 5O), and document 18922 scrolls in response.

In some embodiments, contacts 18926 and 18930 are the same contact. That is, contact 18926 moves as described above with reference to FIGS. 5K-5L, and document 18922 scrolls in response. Then, without liftoff, the intensity of contact 18926 increases like the intensity of contact 18930 increases as described above with reference to FIG. 5N, and document 18922 zooms in response. Then, contact 18926 is lifted off, and contact 18932 is detected as described above with reference to FIGS. 5O-5P. In some embodiments, contacts 18926, 18930 and 18932 are the same continuously detected contact (e.g., the operations shown in FIGS. 5K-5P are performed in response to a gesture including a continuously detected contact).

Figure 5Q:
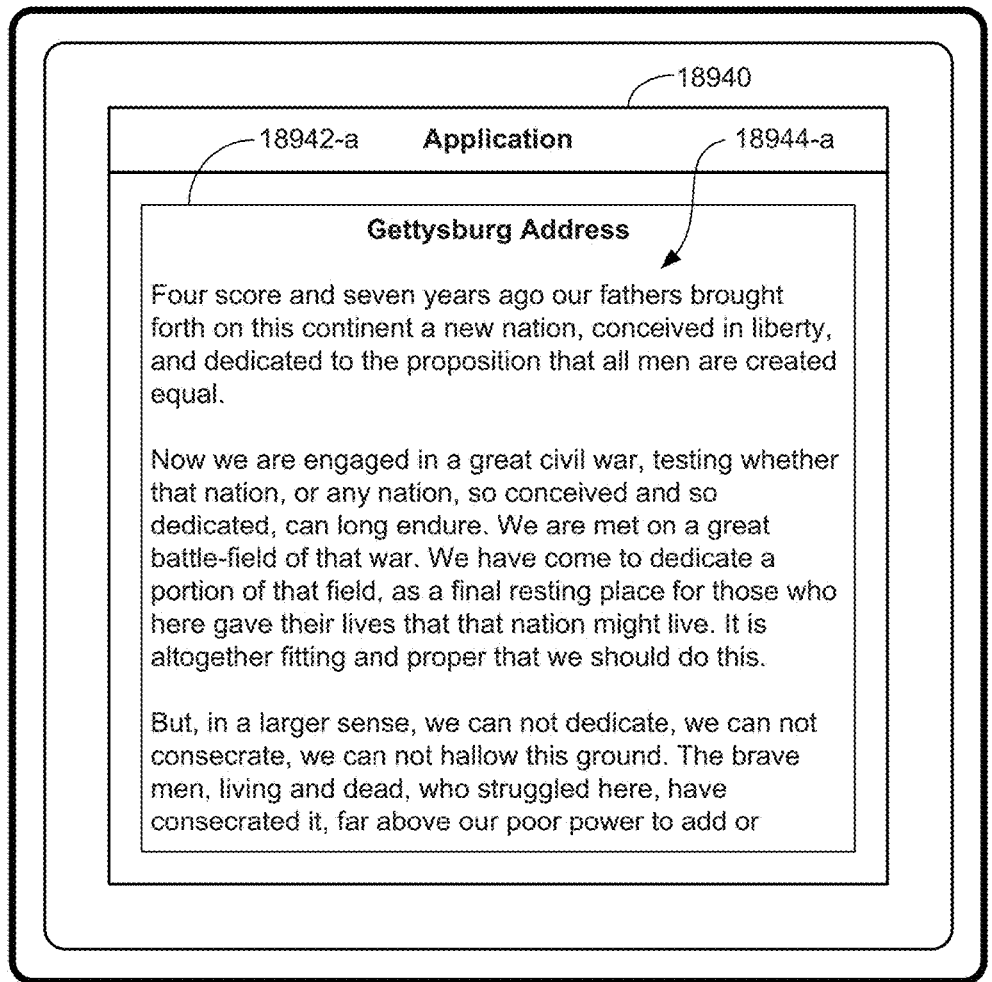
Figure 5Q:
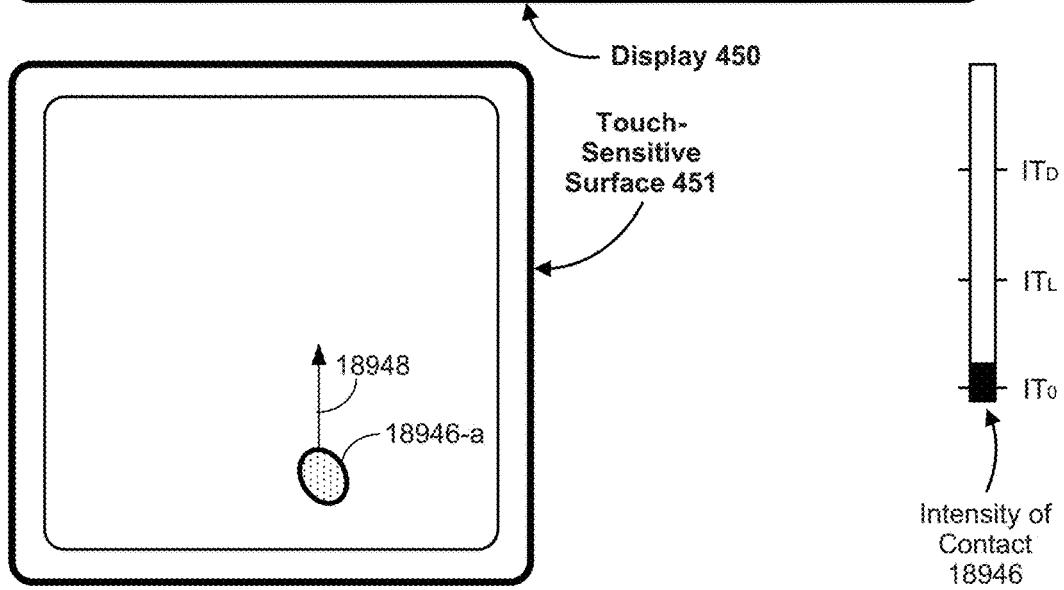

FIG. 5Q illustrates application window 18940 displayed on display 450. Application window 18940, like application window 18904 or 18920, is associated with an application (e.g., a web browser, an email application, a word processing application, a drawing application, a spreadsheet, a presentation, etc.). Document 18942 is displayed in application window 18940. Document 18942 is displayed at zoom level 18942-*a*. Document 18942 is, optionally, a web page, a word processing document, or a text document. Document 18942 includes content 18944 (e.g., text). In FIG. 5Q, portion 18944-*a* of content 18944 is displayed in document 18942.

Figure 5R:
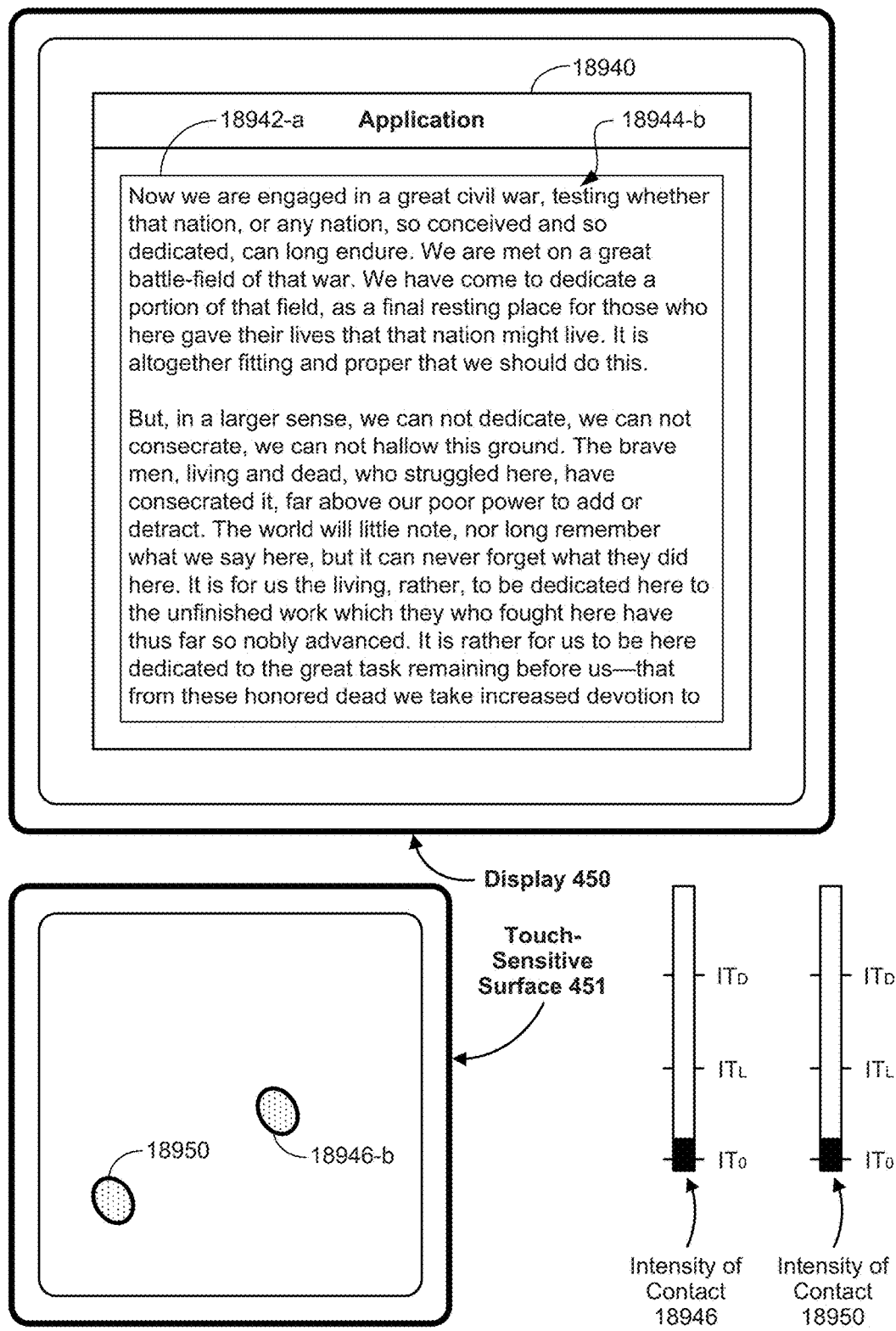

FIG. 5Q also shows contact 18946 detected on touch-sensitive surface 451. Contact 18946 has an intensity between $IT_0$ and $IT_L$. In FIGS. 5Q and 5R, the device detects movement 18948 of contact 18946 on touch-sensitive surface 451. Movement 18948 moves contact 18946 from location 18946-*a* in FIG. 5Q to location 18946-*b* in FIG. 5R on touch-sensitive surface 451. In response to the detection of movement 18948 of contact 18946 in FIGS. 5Q-5R, document 18942 is scrolled. In accordance with the scrolling of document 18942, portion 18944-*b* of content 18944 is displayed, as shown in FIG. 5R.

Figure 5S:
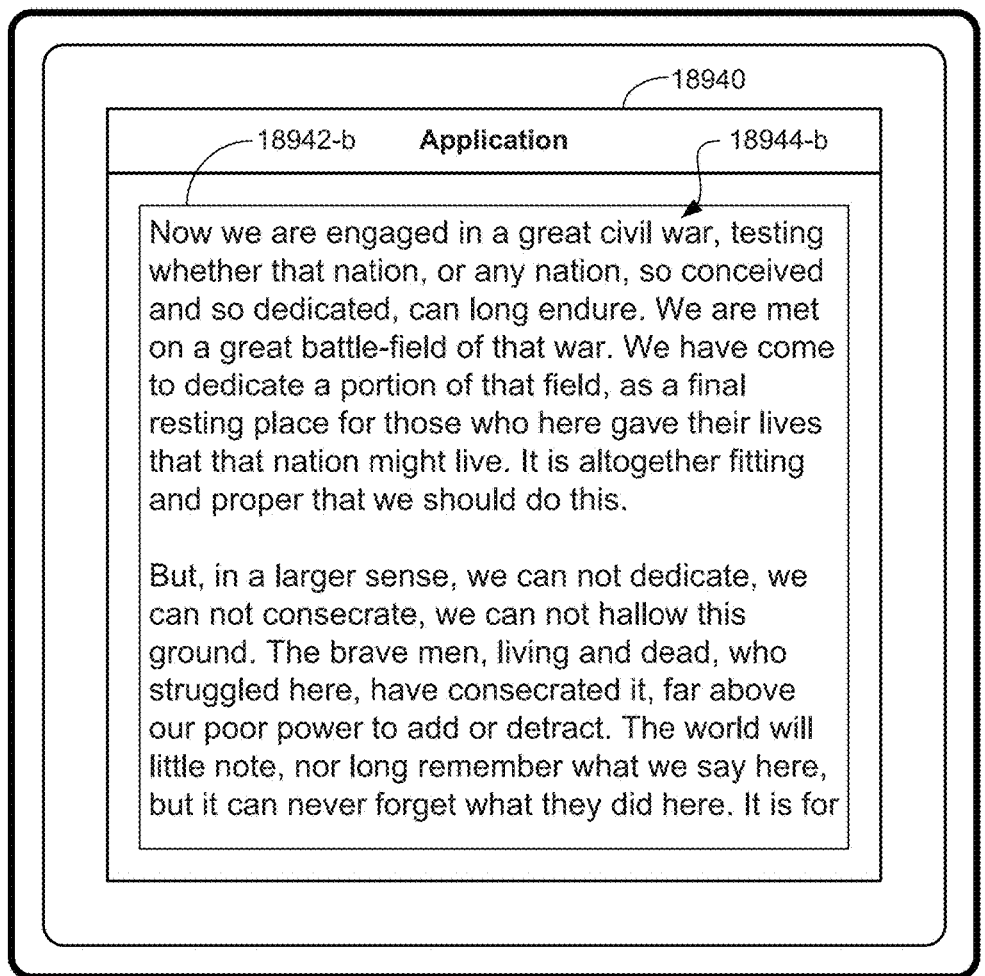
Figure 5S:
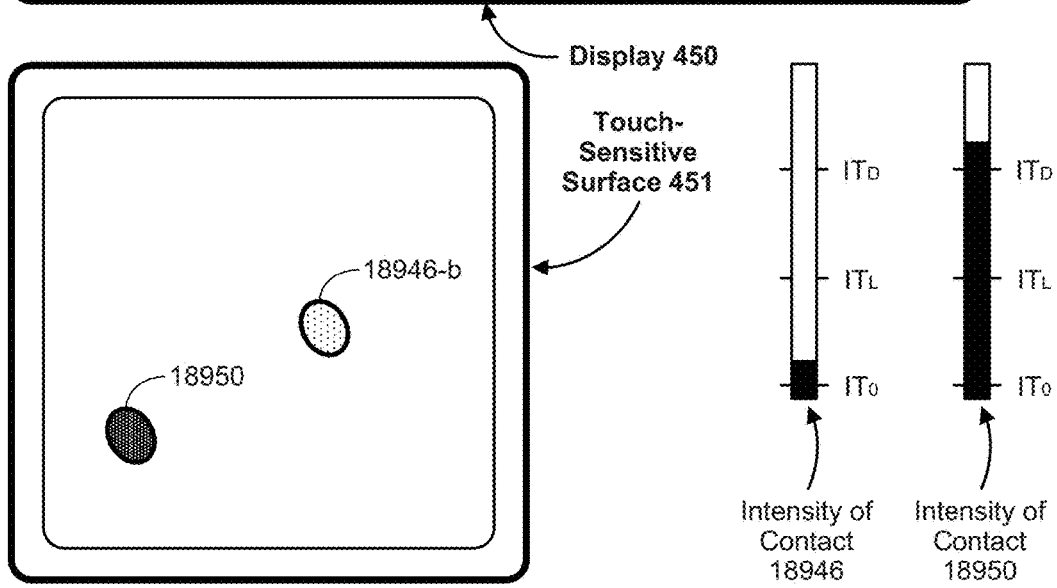

While contact 18946 continues to be detected, contact 18950 is detected on touch-sensitive surface 451, as shown in FIG. 5R. Contact 18950 has an intensity between $IT_0$ and $IT_L$. In FIGS. 5R-5S the device detects an increase in intensity of contact 18950 from an intensity between $IT_0$ and $IT_L$ in FIG. 5R to an intensity above $IT_D$ in FIG. 5S. In response to detection of the increase in the intensity of contact 18950, document 18942 is zoomed from zoom level 18942-*a* in FIG. 5R to zoom level 18942-*b* in FIG. 5S. Portion 18944-*b* of content 18944 is zoomed in accordance of the zooming of document 18942.

Figure 5T:
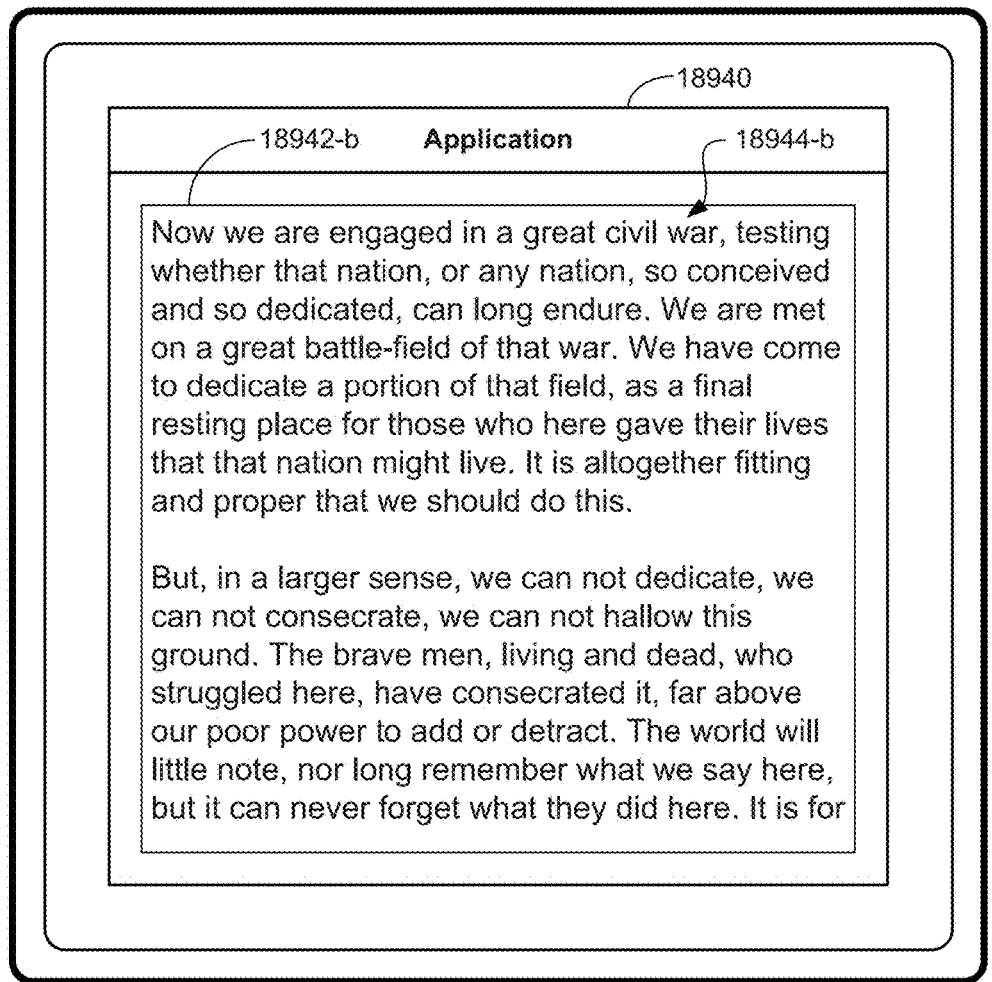
Figure 5T:
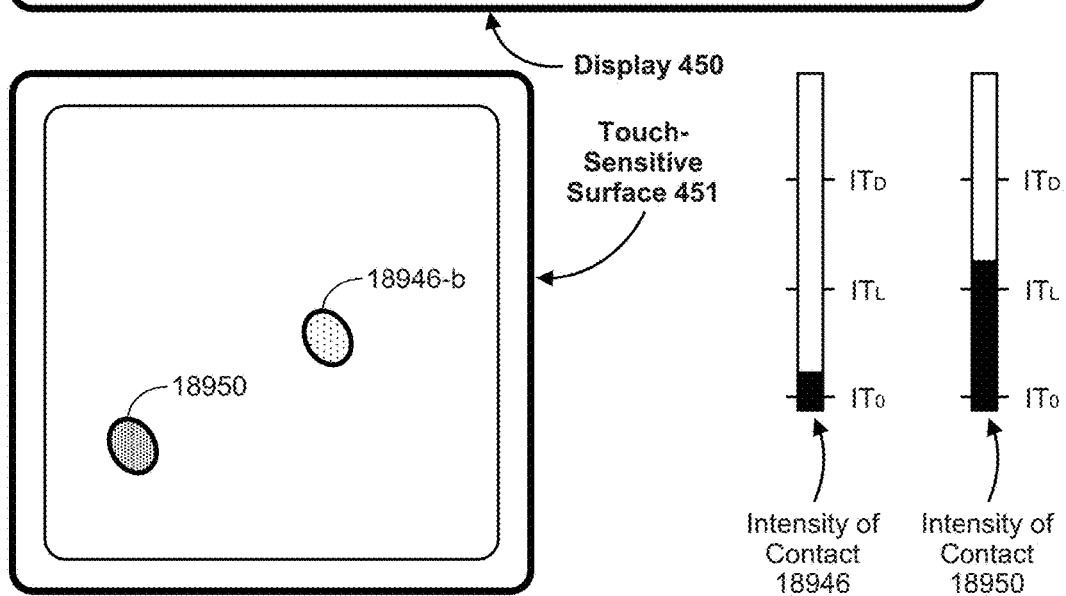
Figure 5U:
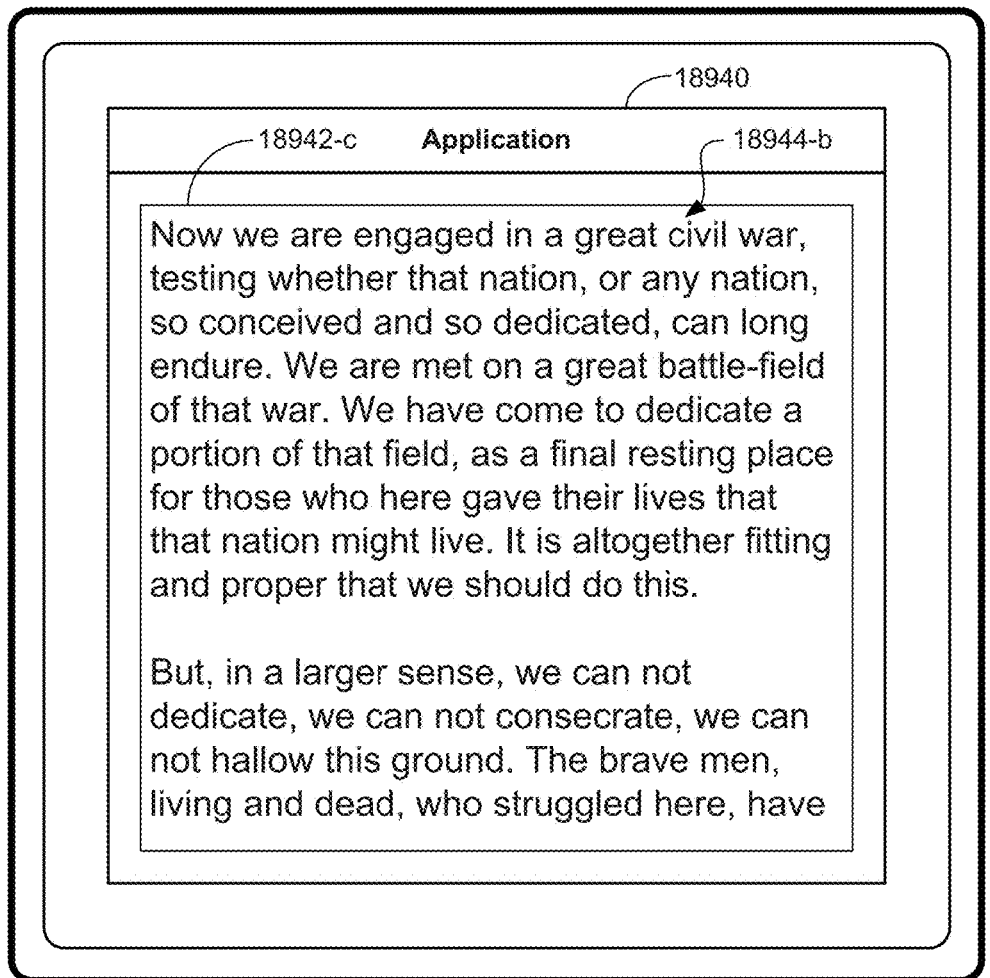
Figure 5U:
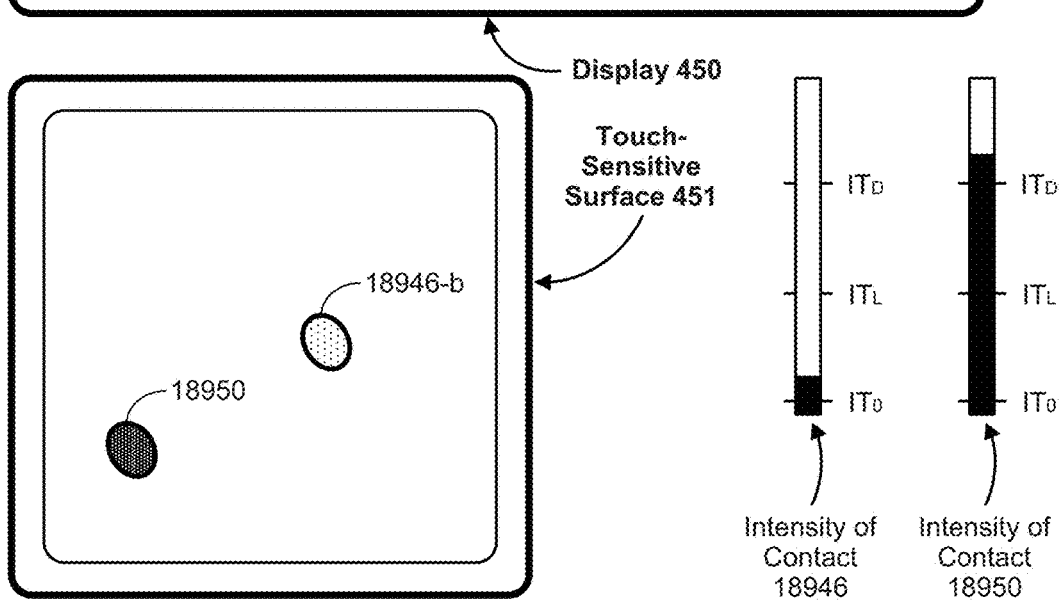

In FIGS. 5S-5T the device detects a decrease in intensity of contact 18950 from an intensity above $IT_D$ in FIG. 5S to an intensity below $IT_D$ or a hysteresis intensity threshold associated with, and below, $IT_D$ in FIG. 5T. In response to detection of the decrease in the intensity of contact 18950, document 18942 is maintained at zoom level 18942-*b* in FIG. 5S. In FIGS. 5T-5U, the device detects an increase in intensity of contact 18950 increasing from an intensity below $IT_D$ in FIG. 5T to an intensity above $IT_D$ in FIG. 5U. In response to detection of the increase in the intensity of contact 18950 in FIG. 5T-5U, document 18942 is zoomed from zoom level 18942-*b* in FIG. 5T to zoom level 18942-*c* in FIG. 5U. Portion 18944-*b* of content 18944 is zoomed in accordance of the zooming of document 18942. In some embodiments, zoom level 18942-*b* is a zoom level that is a predefined increment from zoom level 18942-*a*, and zoom level 18942-*c* is a zoom level that is the predefined increment from zoom level 18942-*b*.

Figure 5V:
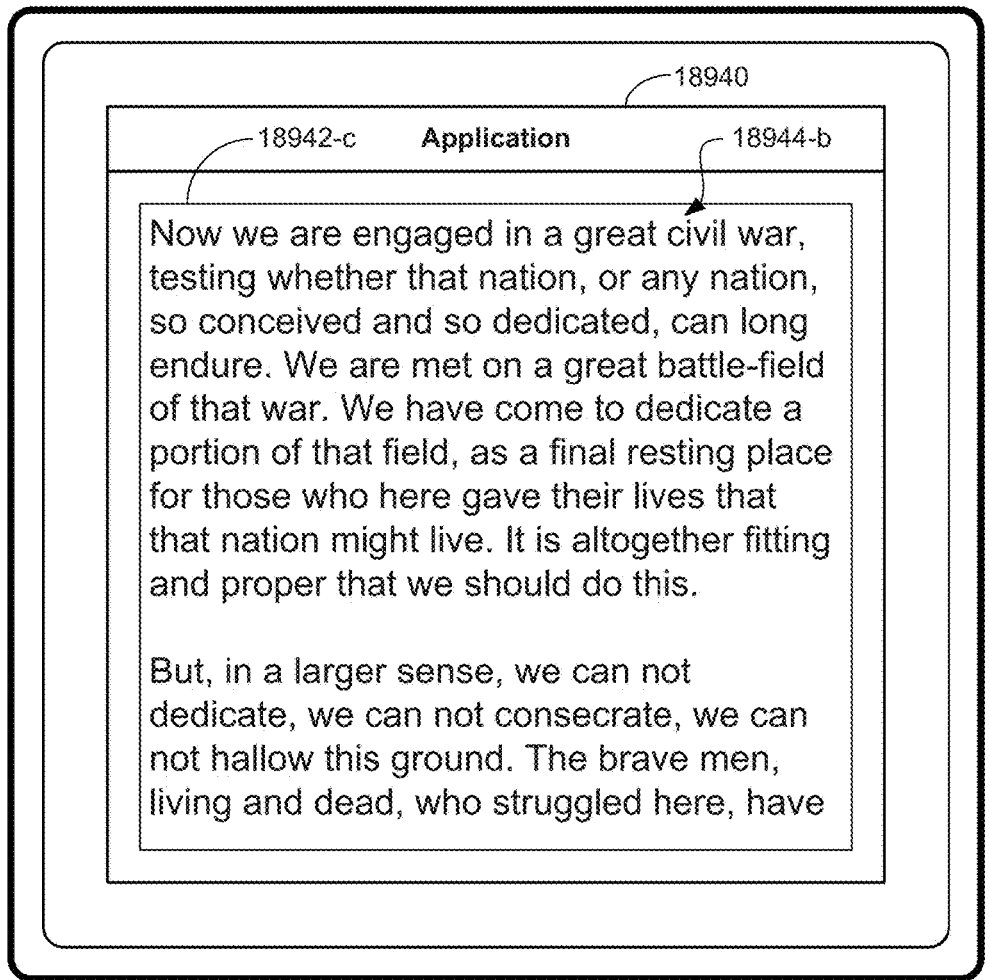
Figure 5V:
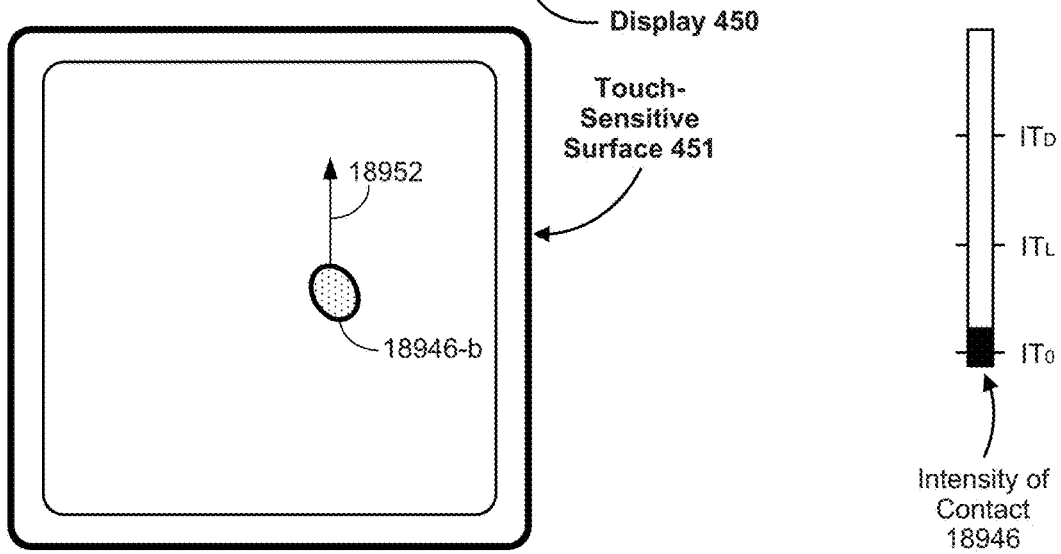
Figure 5W:
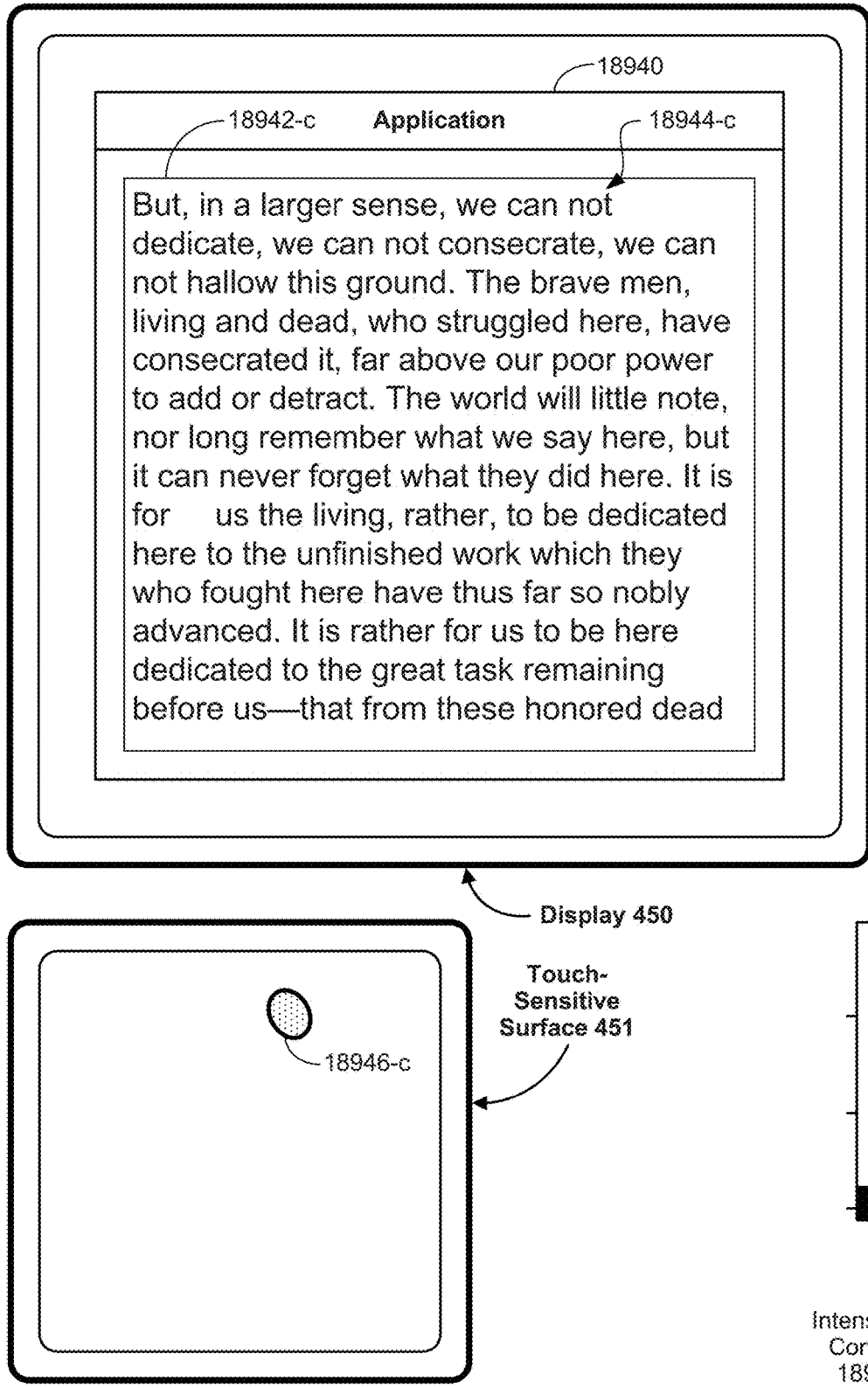
Figure 6A:
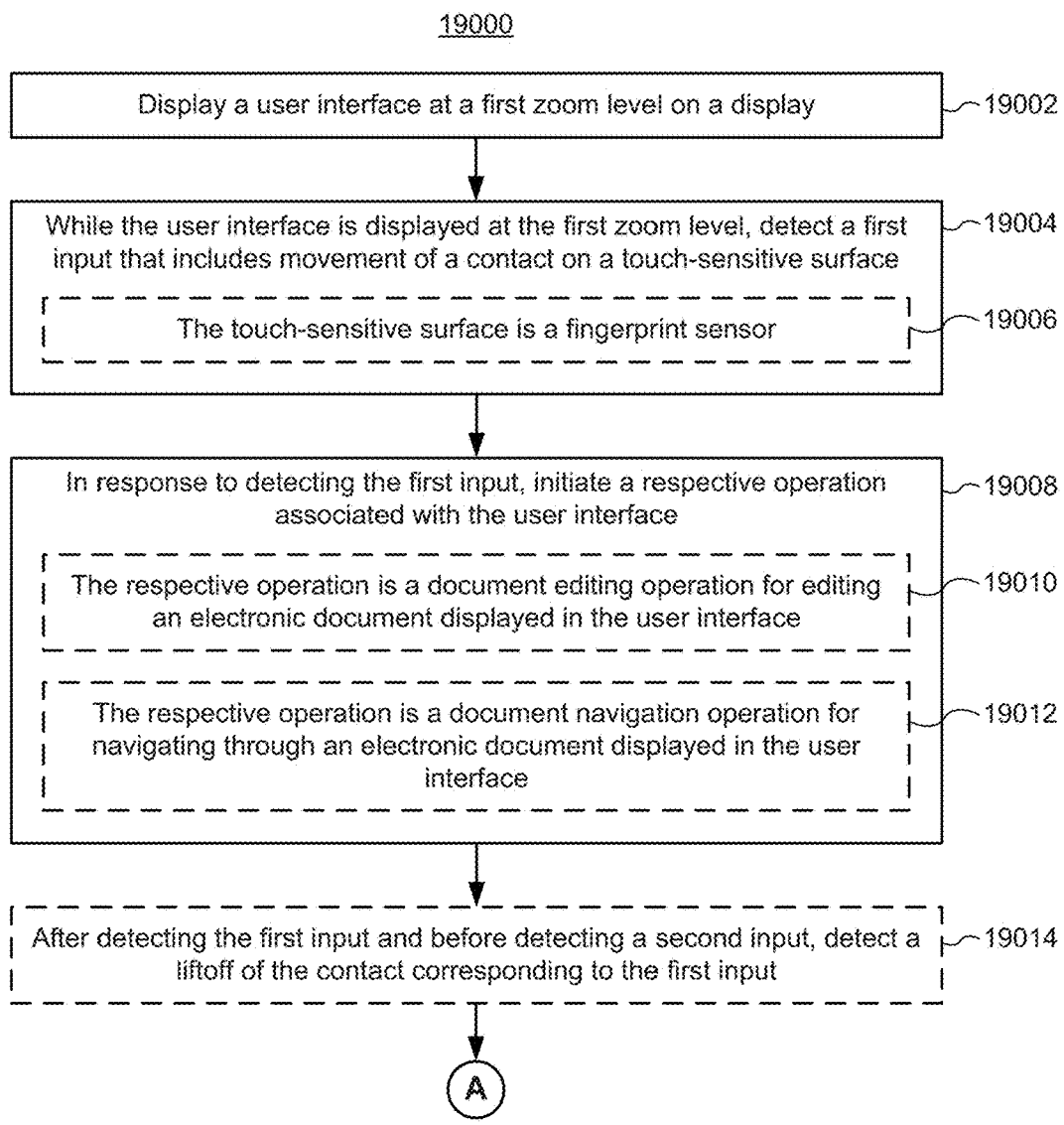
FIGS. 6A-6D are flow diagrams illustrating a method of zooming a user interface while performing an operation in accordance with some embodiments.
Figure 6B:
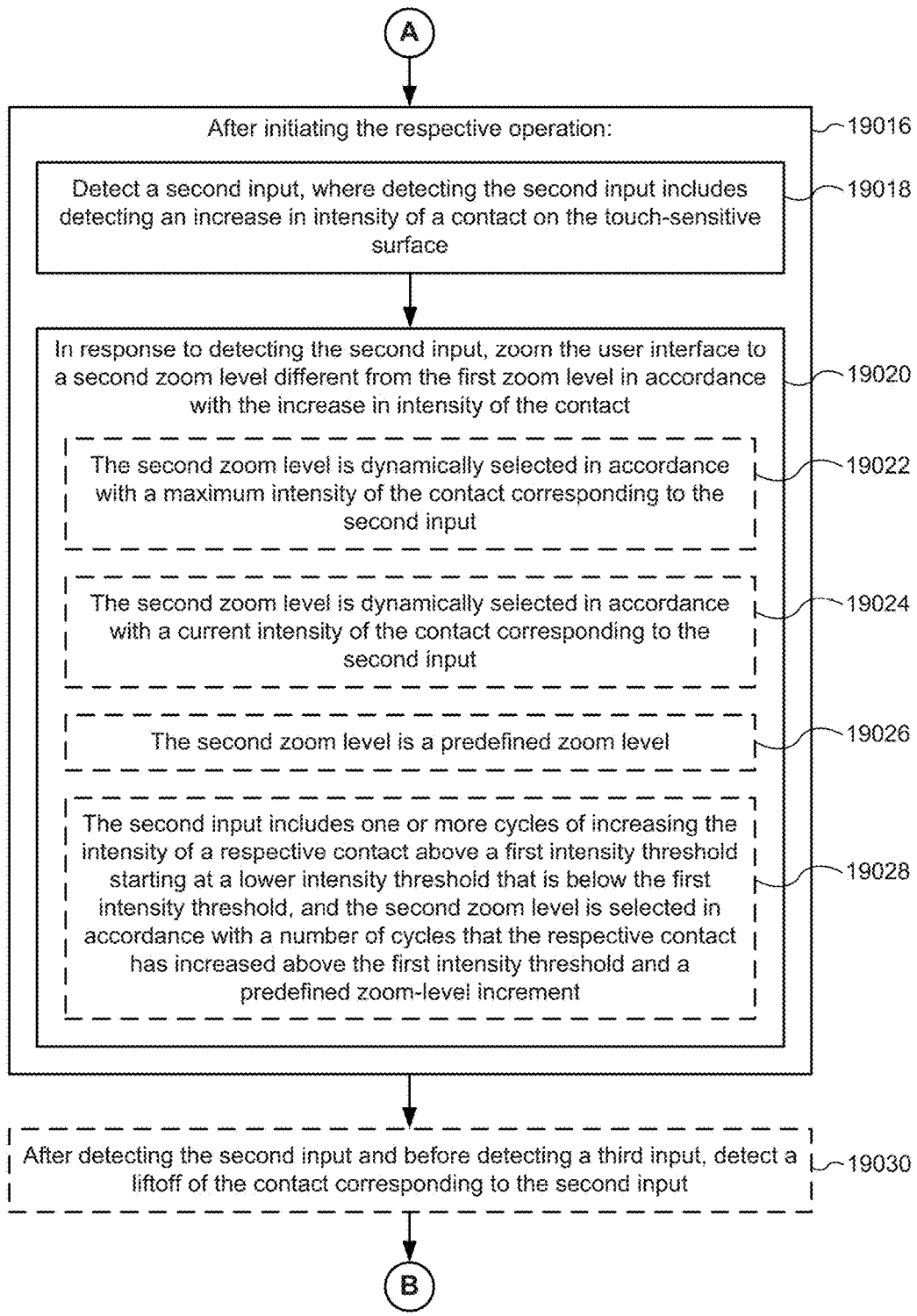
Figure 6C:
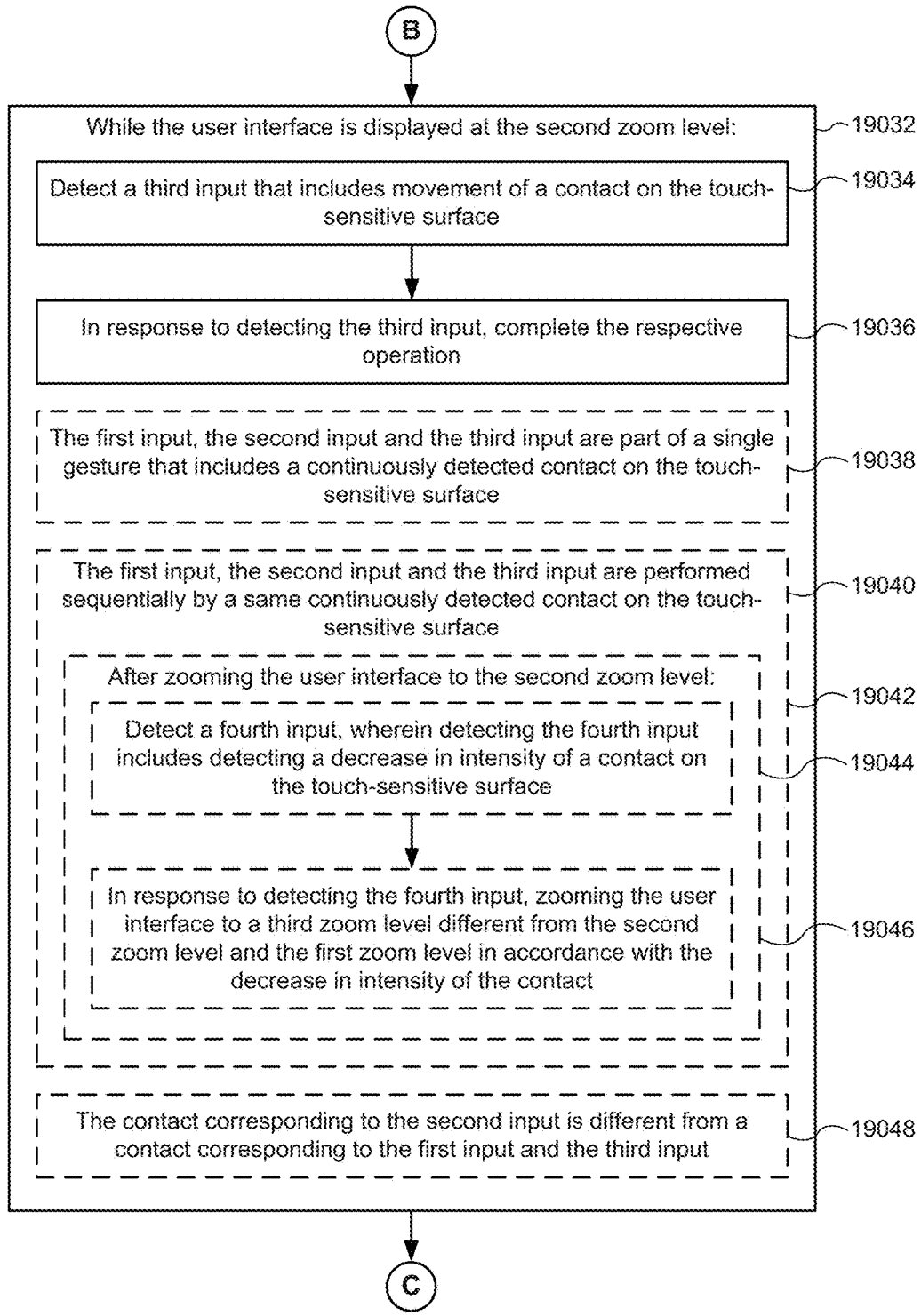
Figure 6D:
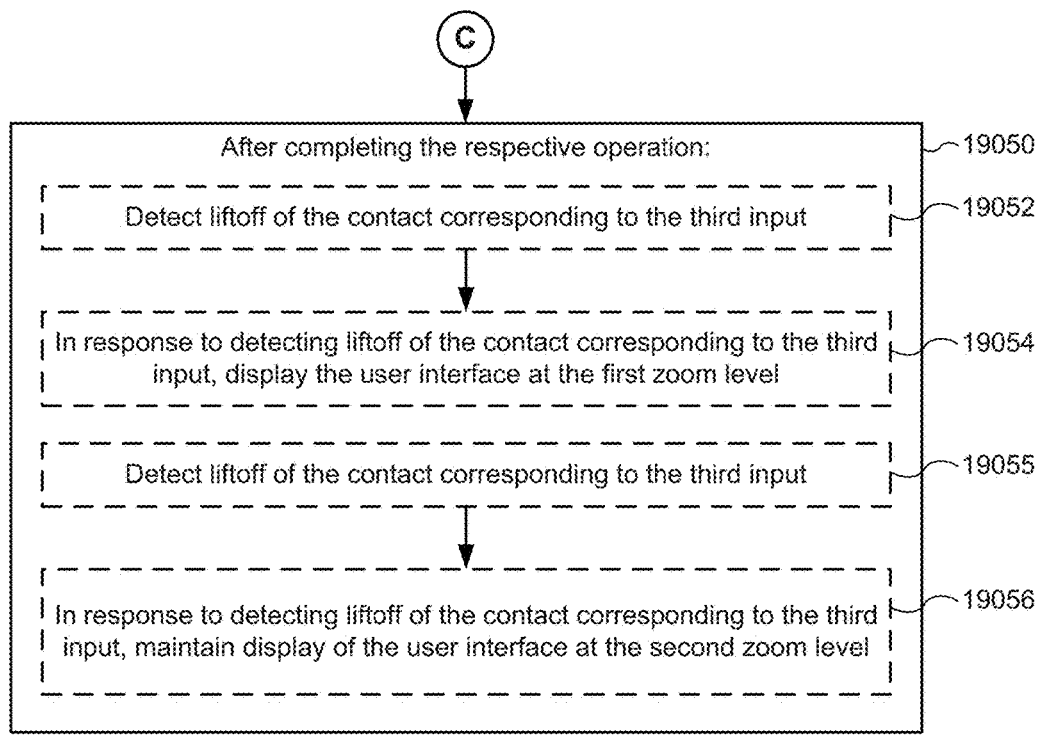

After document 18942 zooms to zoom level 18942-*c* in FIG. 5U, contact 18950 is, optionally, lifted off of touch-sensitive surface 451, as shown in FIG. 5V. FIG. 5V illustrates contact 18946 continuing to be detected on touch-sensitive surface 451, but contact 18950 has lifted off. Document 18942 maintains zoom level 18942-*c*. In some other embodiments, for document 18942 to maintain zoom level 18942-*c*, continued detection of contact 18950 on touch-sensitive surface 451 is needed.

In FIGS. 5V-5W, the device detects movement 18952 of contact 18946 on touch-sensitive surface 451. Movement 18952 moves contact 18946 from location 18946-*b* in FIG. 5V to location 18946-*c* in FIG. 5W on touch-sensitive surface 451. In response to the detection of movement 18952 of contact 18946, document 18942 is scrolled. In accordance with the scrolling of document 18942, portion 18944-*c* of content 18944 is displayed, as shown in FIG. 5W. At this point, contact 18946 is, optionally, lifted off touch-sensitive surface 451 to complete the scrolling of document 18942. In some embodiments, after contact 18946 is lifted off of touch-sensitive surface 451, document 18942 is maintained at zoom level 18942-*c*. In some embodiments, after contact 18946 is lifted off of touch-sensitive surface 451, document 18942 is displayed at zoom level 18942-*a*.

FIGS. 6A-6D are flow diagrams illustrating a method 19000 of zooming a user interface while performing an operation in accordance with some embodiments. The method 19000 is performed at an electronic device (e.g., device 300, FIG. 3, or portable multifunction device 100, FIG. 1A) with a display, a touch-sensitive surface, and one or more sensors to detect intensity of contacts. In some embodiments, the display is a touch screen display and the touch-sensitive surface is on the display. In some embodiments, the display is separate from the touch-sensitive surface. Some operations in method 19000 are, optionally, combined and/or the order of some operations is, optionally, changed.

As described below, the method 19000 provides an intuitive way to zoom a user interface while performing an operation. The method reduces the cognitive burden on a user when zooming a user interface while performing an operation, thereby creating a more efficient human-machine interface. For battery-operated electronic devices, enabling a user to zoom a user interface while performing an operation faster and more efficiently conserves power and increases the time between battery charges.

The device displays (19002) a user interface (e.g., including an electronic document) at a first zoom level on the display. FIG. 5A, for example, shows application window 18904, which is associated with an application and presents a user interface for the application, displayed on display 450. Document 18906 is displayed in application window 18904 in FIG. 5A. Similarly, FIG. 5K shows application 18920 with document 18922 displayed on display 450. FIG. 5Q shows application 18940 with document 18942 displayed on display 450.

While the user interface is displayed at the first zoom level (e.g., a first magnification), the device detects (19004) a first input that includes movement of a contact on the touch-sensitive surface. For example, FIGS. 5B-5C show an input that includes contact 18912 and movement 18914 of contact 18912 detected on touch-sensitive surface 451 while document 18906 is displayed at zoom level 18906-a. FIGS. 5K-5L show an input that includes contact 18926 and movement 18928 of contact 18926 detected on touch-sensitive surface 451 while document 18922 is displayed at zoom level 18922-a. FIGS. 5Q-5R show an input that includes contact 18946 and movement 18948 of contact 18946 detected on touch-sensitive surface 451 while document 18942 is displayed at zoom level 18942-a. In some embodiments, the touch-sensitive surface is (19006) a fingerprint sensor (e.g., the touch-sensitive surface is a high-resolution touch-sensitive surface that is capable of detecting features formed by ridges in a fingerprint placed on the touch-sensitive surface).

In response to detecting the first input, the device initiates (19008) a respective operation associated with the user interface. For example, in FIGS. 5B-5C, in response to the detection of movement 18914, object 18908-1 is moved to location 18908-1-b in FIG. 5C; the operation is the dragging movement of object 18908-1. In FIGS. 5K-5L, in response to the detection of movement 18928, document 18922 is scrolled so that portion 18924-b is displayed in FIG. 5L; the operation is the scrolling of document 18922. In FIGS. 5Q-5R, in response to the detection of movement 18948, document 18942 is scrolled so that portion 18944-b is displayed in FIG. 5R; the operation is the scrolling of document 18942.

In some embodiments, the respective operation is (19010) a document editing operation for editing an electronic document displayed in the user interface (e.g., dragging a picture to a different location or resizing content in a word processing document or a presentation document). For example, the operation in FIGS. 5B-5C is the dragging of an object, which is, optionally, an icon, a picture, an image, or a shape, to list a few examples. In some embodiments, the respective operation is (19012) a document navigation operation for navigating through an electronic document displayed in the user interface (e.g., scrolling through a document). For example, the operation in FIGS. 5K-5L or 5Q-5R is the scrolling of a document.

In some embodiments, after detecting the first input and before detecting the second input, the device detects (19014) a liftoff of the contact corresponding to the first input. For example, FIG. 5M shows contact 18930 detected on touch-sensitive surface 451 after contact 18926 has been lifted off.

After (19016) initiating the respective operation, the device detects (19018) a second input, where detecting the second input includes detecting an increase in intensity of a contact on the touch-sensitive surface (e.g., from a first intensity value to a second intensity value of a plurality of intensity values detectable by the device). For example, in FIGS. 5C-5D, after movement of object 18908-1 has been initiated, an increase in the intensity of contact 18912 is detected; the input is the increase in intensity of the continuously detected contact 18912. In FIGS. 5M-5N, after the scrolling of document 18922 has been initiated, contact 18930 and an increase in the intensity of contact 18930 is detected; the input is newly detected contact 18930 the increase in intensity of contact 18930. In FIGS. 5R-5S, after the scrolling of document 18942 has been initiated, contact 18950 and an increase in the intensity of contact 18950 is detected; the input is newly detected contact 18950 the increase in intensity of contact 18950.

In response to detecting the second input, the device zooms (19020) the user interface to a second zoom level (e.g., a second magnification) different from the first zoom level (e.g., the first magnification) in accordance with the increase in intensity of the contact. In some embodiments, the user interface includes a first portion (e.g., a menu or toolbar) and a second portion (e.g., content such as an electronic document) and zooming the user interface includes zooming the second portion of the user interface without zooming the first portion of the user interface. For example, in FIG. 5D, in response to the increase in the intensity of contact 18912, document 18906 is zoomed to zoom level 18906-b in accordance with the increase in intensity of contact 18912. In FIG. 5N, in response to the increase in the intensity of contact 18930, document 18922 is zoomed to zoom level 18922-b in accordance with the increase in intensity of contact 18930. In FIG. 5S, in response to the increase in the intensity of contact 18950, document 18942 is zoomed to zoom level 18942-b in accordance with the increase in intensity of contact 18950.

In some embodiments, the second zoom level (e.g., zoom level 18906-b, 18922-b, or 18942-b) is (19022) dynamically selected in accordance with a maximum intensity of the contact (e.g., contact 18912, 18930, or 18950, respectively) corresponding to the second input (e.g., the second zoom level is selected from a range of zoom levels based on a maximum intensity of the contact). In some embodiments, the second zoom level (e.g., zoom level 18906-b, 18922-b, or 18942-b) is (19024) dynamically selected in accordance with a current intensity of the contact (e.g., contact 18912, 18930, or 18950, respectively) corresponding to the second input (e.g., the second zoom level is selected from a range of zoom levels based on a current intensity of the contact). In some embodiments, the second zoom level (e.g., zoom level 18906-b, 18922-b, or 18942-b) is (19026) a predefined zoom level (e.g., zoom level is a predefined zoom level such as 150% or 200%).

In some embodiments, the second input includes (19028) one or more cycles of increasing the intensity of a respective contact above a first intensity threshold (e.g., $IT_D$) starting at a lower intensity threshold (e.g., $IT_L$ or a hysteresis intensity threshold associated with, and below, $IT_D$) that is below the first intensity threshold, and the second zoom level is selected in accordance with a number of cycles that the respective contact has increased above the first intensity threshold and a predefined zoom-level increment (e.g., in response to detecting multiple increases/decreases in intensity, the device keeps zooming the user interface further in, such as by 10% increments, 20% increments, 30% increments, or the like). For example, in FIGS. 5R-5S, in response to a first cycle including an increase in intensity of contact 18950 from an intensity below $IT_D$ (or a hysteresis intensity threshold that is associated with, and below, $IT_D$)

to an intensity above $IT_D$, the device increases the zoom level of document 18942 form a first zoom level 18942-*a* in FIG. 5R to a second zoom level 18942-*b* in FIG. 5S. Subsequently, in FIGS. 5T-5U, in response to a second cycle including an increase in intensity of contact 18950 from an intensity below $IT_D$ to an intensity above $IT_D$, the device increases the zoom level of document 18942 from the second zoom level 18942-*b* in FIG. 5T to a third zoom level 18942-*c* in FIG. 5U. Zoom level 18942-*b* is a zoom level that is a predefined increment from zoom level 18942-*a*, and zoom level 18942-*c* is a zoom level that is the predefined increment from zoom level 18942-*b*.

In some embodiments, after detecting the second input and before detecting the third input, the device detects (19030) a liftoff of the contact corresponding to the second input. For example, FIG. 5O shows contact 18932 detected on touch-sensitive surface 451 after contact 18930 has been lifted off.

While (19032) the user interface is displayed at the second zoom level (e.g., the second magnification), the device detects (19034) a third input that includes movement of a contact on the touch-sensitive surface. In response to detecting the third input, the device completes (19036) the respective operation. In some embodiments, the third input includes movement of the contact and subsequent liftoff of the contact from the touch-sensitive surface. In some embodiments the respective operation includes resizing a window, selecting text, or moving a user interface object across the display. For example, in FIGS. 5E-5F, movement 18916 of contact 18912 is detected while document 18906 is displayed at zoom level 18906-*b*. In response to detection of movement 18916, object 18908-1 is moved from location 18908-1-*b* in FIG. 5E to location 18908-1-*c* in FIG. 5F. In FIGS. 5O-5P, movement 18934 of contact 18932 is detected while document 18922 is displayed at zoom level 18922-*b*. In response to detection of movement 18934, document 18922 is scrolled so that portion 18924-*c* of content 18924 is displayed in FIG. 5P. In FIGS. 5V-5W, movement 18952 of contact 18946 is detected while document 18942 is displayed at zoom level 18942-*b*. In response to detection of movement 18952, document 18942 is scrolled so that portion 18944-*c* of content 18944 is displayed in FIG. 5W.

In some embodiments, the first input, the second input and the third input are (19038) part of a single gesture that includes a continuously detected contact on the touch-sensitive surface. In some embodiments, the first input, the second input, and the third input are made by a single finger contact. For example, movement 18914 of contact 18912, the increase in the intensity of contact 18912, and movement 18916 of contact 18912, as shown in FIGS. 5A-5F, are, optionally, all part of a single gesture that includes continuously detected contact 18912.

In some embodiments, the first input, the second input and the third input are (19040) performed sequentially by a same continuously detected contact on the touch-sensitive surface (e.g., while a user is performing an operation corresponding to movement of a contact, the user can increase the intensity of the contact to zoom in for finer control of the operation). In some embodiments, the first press input and the second press input are made by a single continuously detected (unbroken) contact on the touch-sensitive surface. For example, movement 18914 of contact 18912, the increase in the intensity of contact 18912, and movement 18916 of contact 18912, as shown in FIGS. 5A-5F, are, optionally, sequential inputs performed by continuously detected contact 18912.

In some embodiments, after (19042) zooming the user interface to the second zoom level, the device detects (19044) a fourth input, where detecting the fourth input includes detecting a decrease in intensity of a contact on the touch-sensitive surface. In response to detecting the fourth input, the device zooms (19046) the user interface to a third zoom level (e.g., a third magnification) different from the second zoom level (e.g., the second magnification) and the first zoom level (e.g., the first magnification) in accordance with the decrease in intensity of the contact. In some embodiments, while the user is performing the respective operation, the zoom level is dynamically increased and decreased in accordance with changes in intensity of the continuously detected contact. For example, in FIGS. 5F and 5I-5J, after document 18906 is zoomed to zoom level 18906-*b*, the intensity of contact 18912 is decreased. In response to detection of the decrease in intensity, document 18906 is zoomed from zoom level 18906-*b* in FIG. 5F to zoom level 18906-*c* in FIG. 5I, and then subsequently zoomed from zoom level 18906-*c* in FIG. 5I to zoom level 18906-*a* in FIG. 5J in accordance with the decrease in intensity.

In some embodiments, the contact corresponding to the second input is (19048) different from a contact corresponding to the first input and the third input (e.g., the user uses another finger to press on the touch-sensitive surface while performing a gesture associated with the respective operation to zoom the user interface while the respective operation is being performed). For example, while performing an operation with the index finger of the user's right hand on the touch-sensitive surface, the user can press down with a thumb of the user's left hand on the touch-sensitive surface to zoom the user interface. As shown in FIGS. 5R-5W, for example, the contact (contact 18950) that performs the inputs that cause the device to zoom document 18942 is different from the contact (contact 18946) that performs the inputs that cause the device to scroll document 18942.

In some embodiments, after (19050) completing the respective operation, the device detects (19052) liftoff of the contact corresponding to the third input, and in response to detecting liftoff of the contact corresponding to the third input, the device displays (19054) the user interface at the first zoom level. FIGS. 5F-5G show, for example, after object 18908-1 is moved to location 18908-1-*c* (as shown in FIG. 5F), document 18906 reverting back to zoom level 18906-*a* in response to detection of the liftoff of contact 18912 in FIG. 5G.

In some embodiments, after (19050) completing the respective operation, the device detects (19055) liftoff of the contact corresponding to the third input, and in response to detecting liftoff of the contact corresponding to the third input, the device maintains (19054) display of the user interface at the second zoom level. FIGS. 5F and 5H show, for example, after object 18908-1 is moved to location 18908-1-*c* (as shown in FIG. 5F), document 18906 maintaining zoom level 18906-*b* in response to detection of the liftoff of contact 18912 in FIG. 5H.

It should be understood that the particular order in which the operations in FIGS. 6A-6D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 19000 described above with respect to FIGS. 6A-6D. For example, the contacts, gestures, user interface objects, intensity thresholds, and focus selectors described above with reference to method 19000 optionally have one or more of the characteristics of the contacts, gestures, user interface objects, intensity thresholds, and focus selectors described herein with reference to other methods described herein (e.g., those listed in the fifth paragraph of the Description of Embodiments). For brevity, these details are not repeated here.

Figure 7:
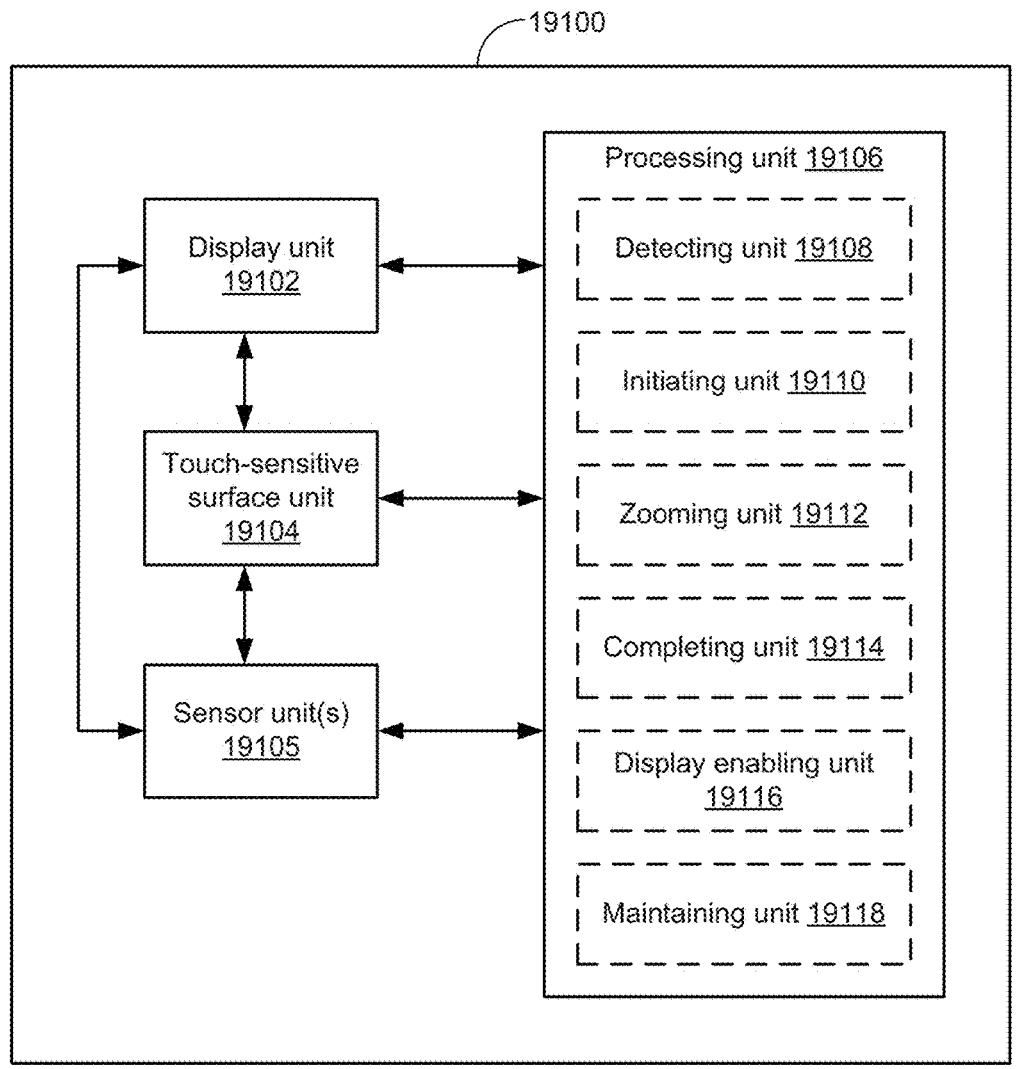
FIG. 7 is a functional block diagram of an electronic device in accordance with some embodiments.

In accordance with some embodiments, FIG. 7 shows a functional block diagram of an electronic device 19100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 7 are, optionally, combined or separated into sub-blocks to implement the principles of the various described embodiments. Therefore, the description herein optionally supports any possible combination or separation or further definition of the functional blocks described herein.

As shown in FIG. 7, an electronic device 19100 includes a display unit 19102 configured to display a user interface at a first zoom level on the display unit 19102, a touch-sensitive surface unit 19104 configured to receive inputs and contacts, one or more sensor units 19105 to detect intensity of contacts with the touch-sensitive surface unit 19104, and a processing unit 19106 coupled to the display unit 19102, the touch-sensitive surface unit 19104, and the sensor units 19105. In some embodiments, the processing unit 19106 includes a detecting unit 19108, an initiating unit 19110, a zooming unit 19112, a completing unit 19114, a display enabling unit 19116, and a maintaining unit 19118.

The processing unit 19106 is configured to: while the user interface is displayed at the first zoom level, detect a first input that includes movement of a contact on the touch-sensitive surface unit 19104 (e.g., with the detecting unit 19108); in response to detecting the first input, initiate a respective operation associated with the user interface (e.g., with the initiating unit 19110); after initiating the respective operation: detect a second input, wherein detecting the second input includes detecting an increase in intensity of a contact on the touch-sensitive surface unit 19104 (e.g., with the detecting unit 19108), and in response to detecting the second input, zoom the user interface to a second zoom level different from the first zoom level in accordance with the increase in intensity of the contact (e.g., with the zooming unit 19112); and while the user interface is displayed at the second zoom level: detect a third input that includes movement of a contact on the touch-sensitive surface unit 19104 (e.g., with the detecting unit 19108), and in response to detecting the third input, complete the respective operation (e.g., with the completing unit 19114).

In some embodiments, the first input, the second input and the third input are part of a single gesture that includes a continuously detected contact on the touch-sensitive surface unit 19104.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6D are, optionally, implemented by components depicted in FIGS. 1A-1B or FIG. 7. For example, detection operations 19004, 19018, and 19034, initiating operation 19008, zooming operation 19020, and completing operation 19036 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Determining Whether to Scroll or Select Content

Many electronic devices have graphical user interfaces that display content (e.g., text, images, tables, document icons and/or application shortcut icons) upon which multiple operations are, optionally, performed with the same type of gesture. For example, a word processing application window, optionally, displays editable text that is, optionally, scrolled and/or selected by a user moving a contact, e.g., on a touch sensitive surface. When this gesture overloading happens within the same application, the different operations (e.g., scrolling and selecting) are typically associated with different modes of operation. For example, in some circumstances, a user wants to scroll content without selecting the content and in other circumstances, a user wants to select content without scrolling the content, while in other circumstances a user wants to scroll content while selecting the content. Given the complexity of a user interface environment where a single gesture corresponds to multiple operations, there is a need to provide methods and user interfaces that enable the user to more efficiently and conveniently interact with content in the user interface environment.

The embodiments described below provide improved methods and user interfaces for determining whether to scroll or select content when navigating a complex user interface environment. More specifically, these methods and user interfaces simplify the process of switching between content scrolling and selecting modes of operation. According to some embodiments described below, a content scrolling and/or selecting mode of operation is initiated upon the detection of a gesture including a contact on a touch-sensitive surface and movement of the contact across the touch-sensitive surface corresponding to movement of a focus selector over the content. The user controls whether the gesture initiates the content scrolling and/or selecting mode of operation through the intensity of the contact. For example, in one embodiment, a user presses down lightly (e.g., with a light press intensity) on the touch-sensitive surface to initiate a scrolling mode of operation and presses down heavily (e.g., with a deep press intensity) on the touch-sensitive surface to initiate a selecting mode of operation, or vice versa. In some methods, the user switches modes of operation, for example, by selecting a different mode from a menu of options or making a second contact in addition to the gesture for activating the operation. Advantageously, the methods and user interfaces described below simplify the process of switching between modes of operation associated with a same gesture (e.g., scrolling and/or selecting text) by eliminating the need for additional inputs, such as going through a menu or making an additional contact.

Figure 8A:
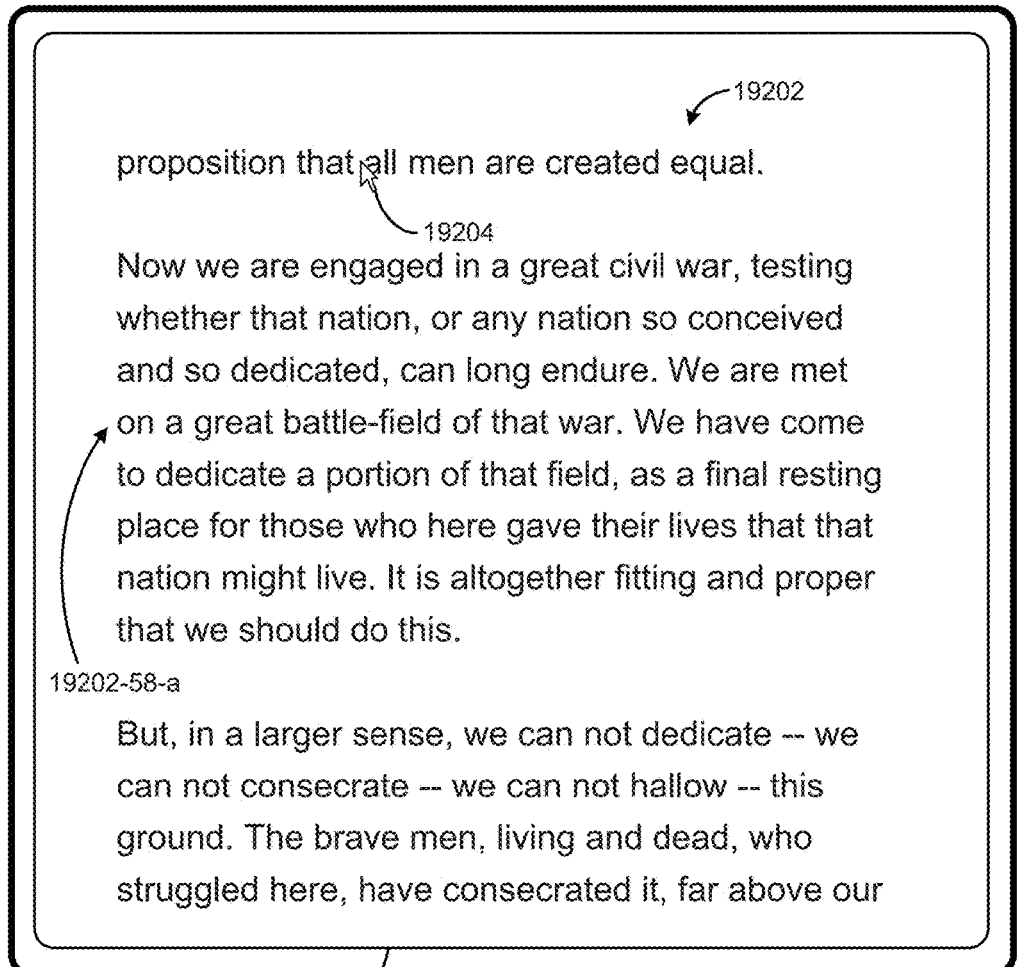
FIGS. 8A-8AA illustrate exemplary user interfaces for determining whether to scroll or select content in accordance with some embodiments.
Figure 8A:
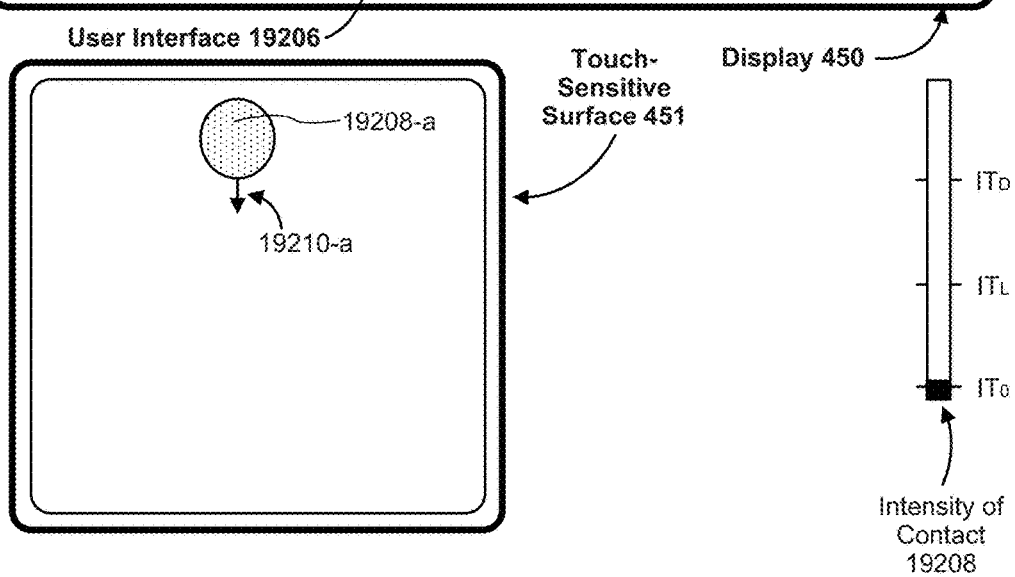

FIGS. 8A-8AA illustrate exemplary user interfaces for determining whether to scroll or select content in accordance with some embodiments. The user interfaces in these figures are used to illustrate the processes described below, including the processes in FIGS. 9A-9E. FIGS. 8A-8AA include intensity diagrams that show the current intensity of the contact on the touch-sensitive surface relative to a plurality of intensity thresholds including a cursor-preview intensity threshold (e.g., light press intensity threshold "$IT_L$"), a cursor-insertion intensity threshold (e.g., deep press intensity threshold "$IT_D$") and a selection intensity threshold (e.g., deep press intensity threshold "$IT_D$"). These intensity diagrams are typically not part of the displayed user interface, but are provided to aid in the interpretation of the figures.

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 8A-8AA and FIGS. 9A-9E will be discussed with reference to display 450 and a separate touch-sensitive surface 451, however analogous operations are, optionally, performed on a device with a touch-sensitive display system 112 in response to detecting the contacts described in FIGS. 8A-8AA on the touch-sensitive display system 112 while displaying the user interfaces shown in FIGS. 8A-8AA on the touch-sensitive display system 112; in such embodiments, the focus selector is, optionally: a respective contact, a representative point corresponding to a contact (e.g., a centroid of a respective contact or a point associated with a respective contact), or a centroid of two or more contacts detected on the touch-sensitive display system 112, in place of focus cursor 19204 or selection cursor 19212.

FIG. 8A illustrates exemplary user interface 19206 displaying text 19202 and cursor 19204. In FIG. 8A, user interface 19206 is displayed on display 450 of an electronic device that also includes touch-sensitive surface 451 and one or more sensors for detecting intensity of contacts with touch-sensitive surface. In some embodiments, touch-sensitive surface 451 is a touch screen display that is optionally display 450 or a separate display.

FIGS. 8A-8AA illustrate various embodiments where focus cursor 19204 (e.g., a mouse pointer), controlled by contact 19208 on touch-sensitive surface 451 and movement 19210 thereof, moves over at least a portion of text 19202. In response, depending on the intensity of contact 19208 detected on touch-sensitive surface 451, at least a portion of text 19202 is scrolled and/or selected. For example, when the intensity of contact 19208 exceeds a selection intensity threshold (e.g., deep press intensity threshold "ITD"), the portion of text 19202 is selected. In contrast, when the intensity of contact 19208 does not exceed the selection intensity threshold (e.g., "ITD"), text 19202 is scrolled without the portion of the text being selected.

Figure 8B:
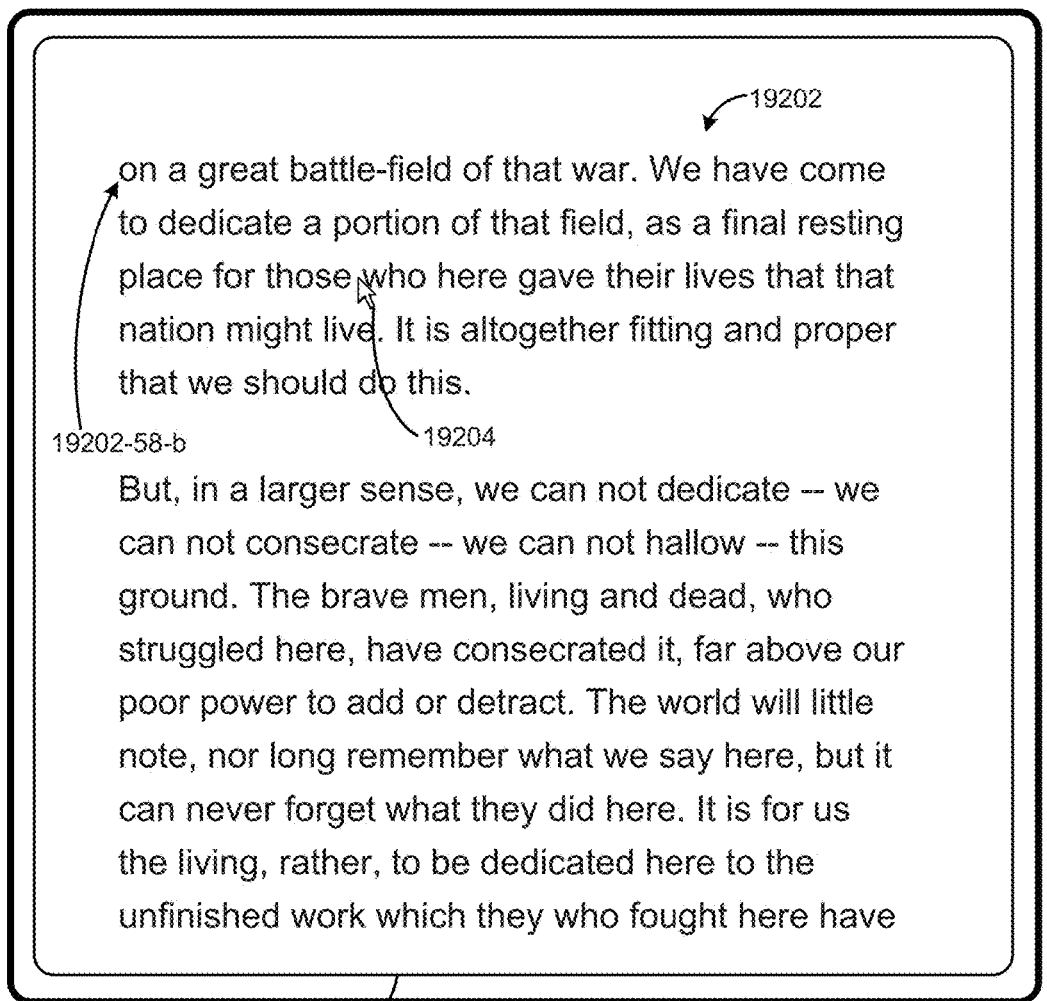
Figure 8B:
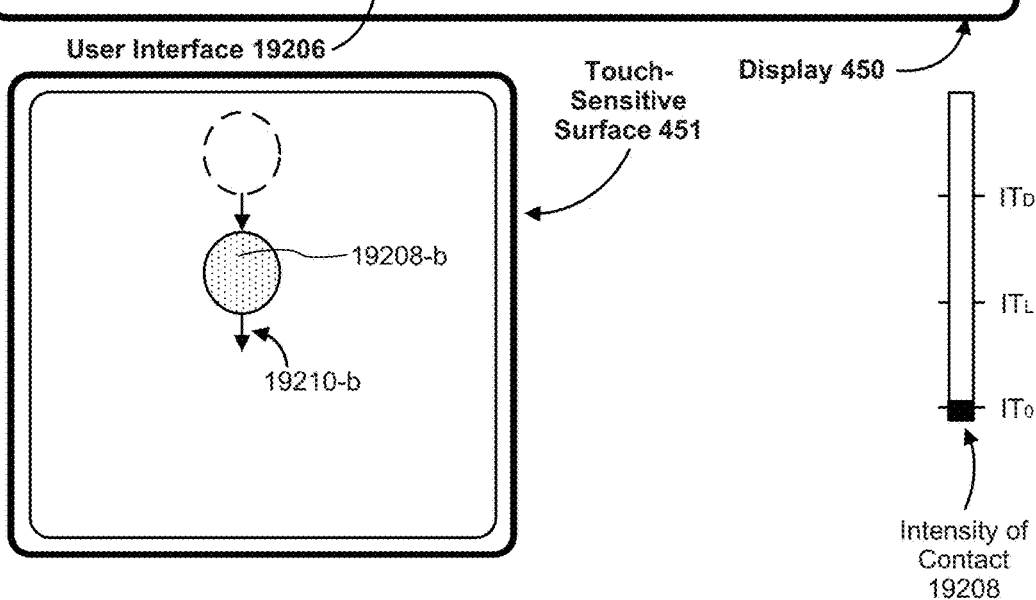
Figure 8C:
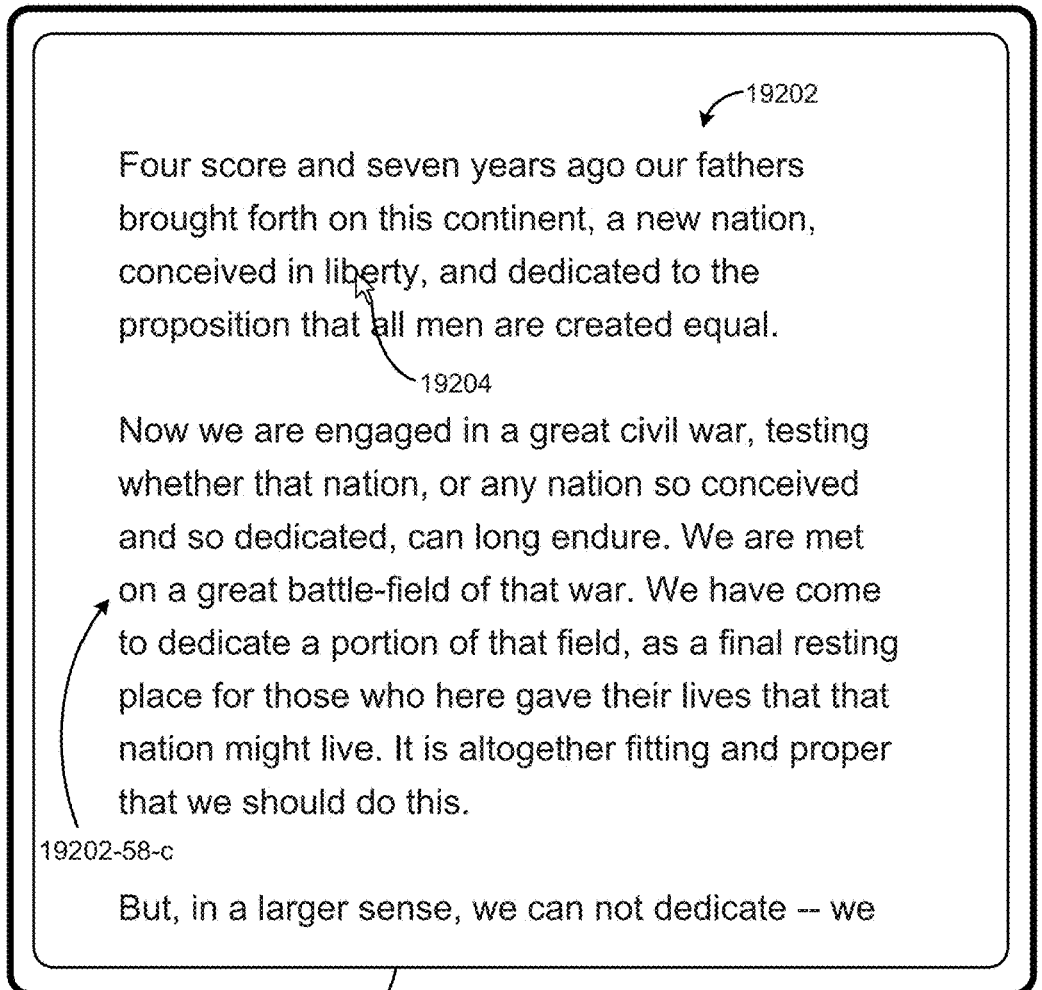
Figure 8C:
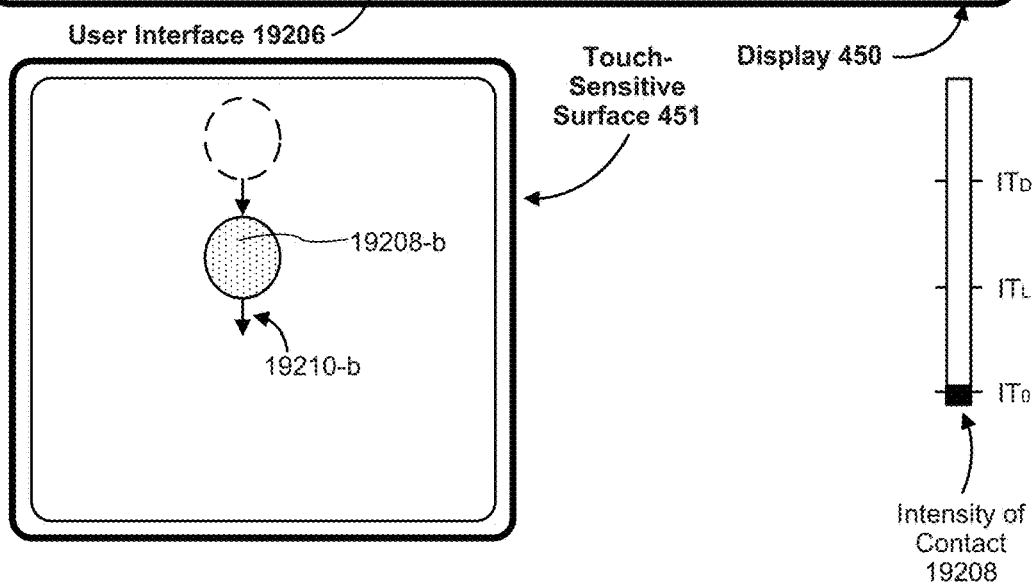
Figure 8E:
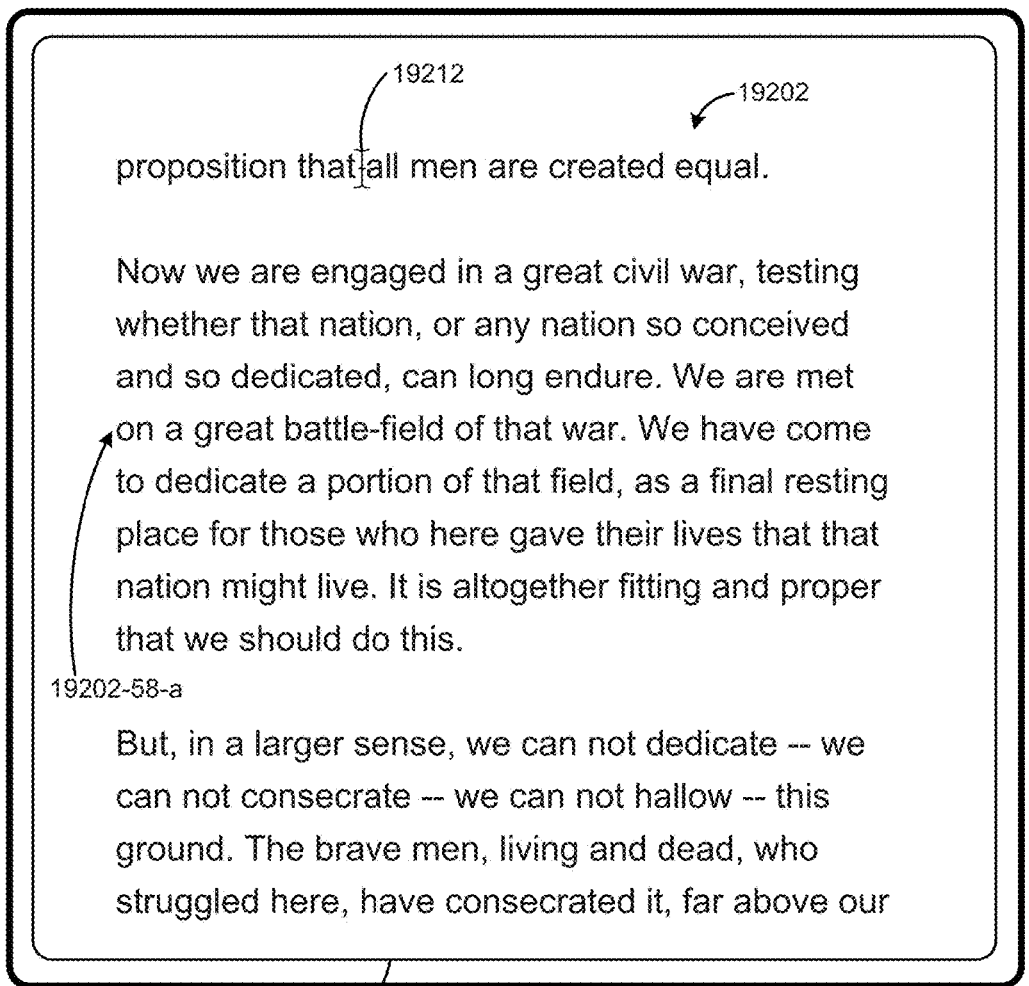
Figure 8E:
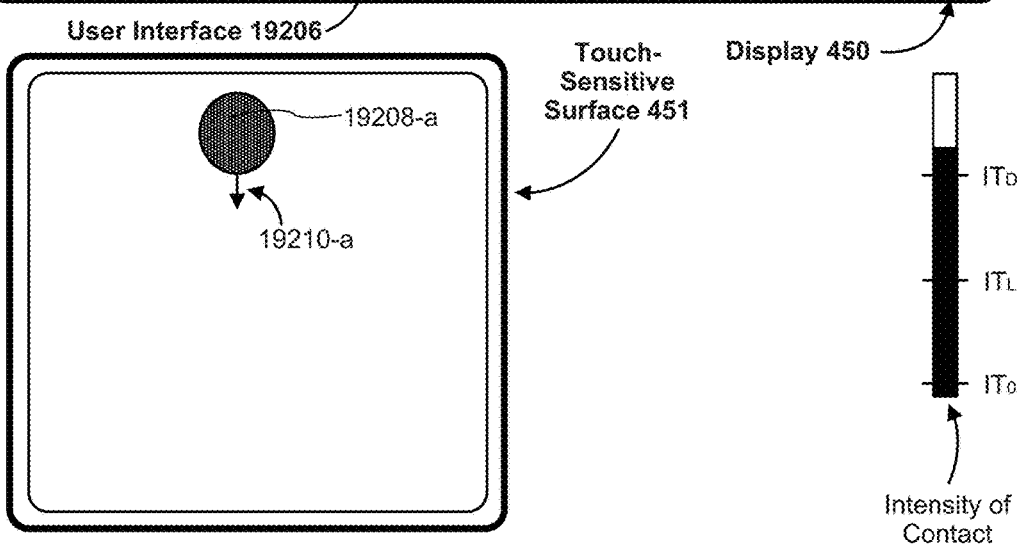
Figure 8F:
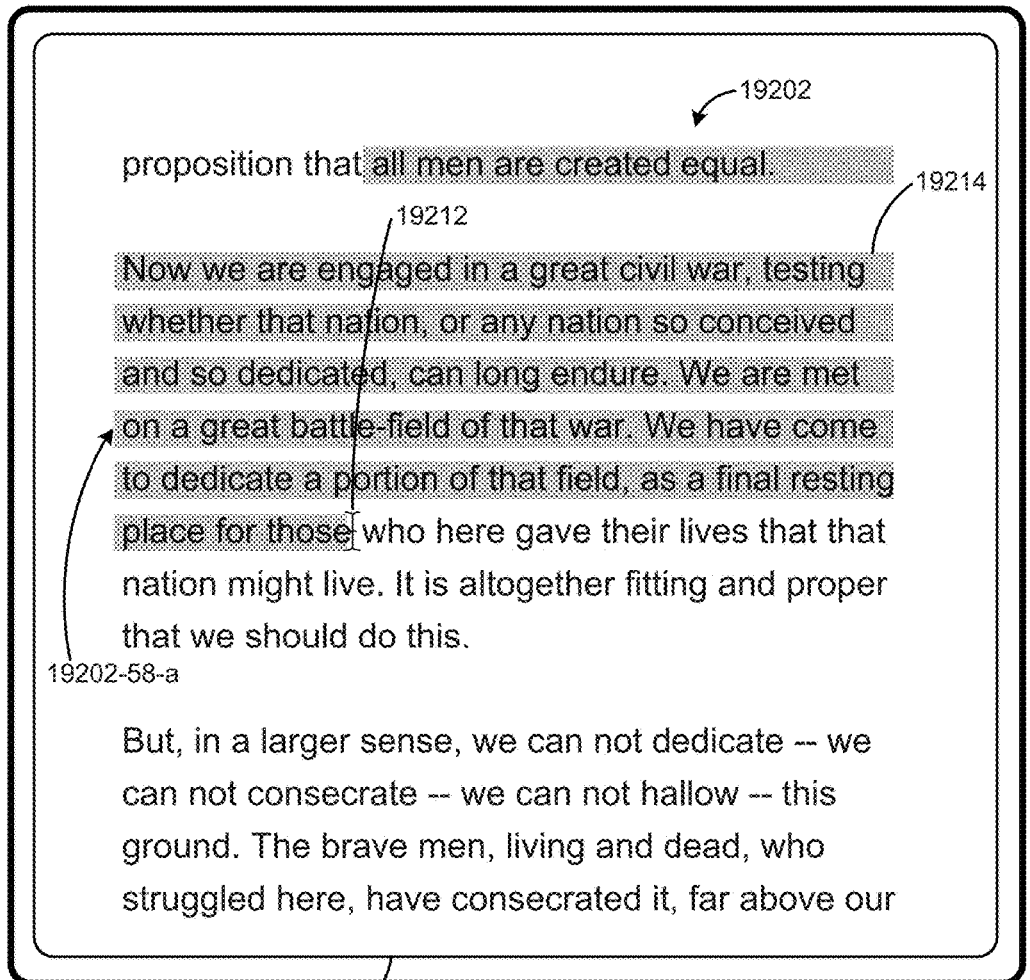
Figure 8F:
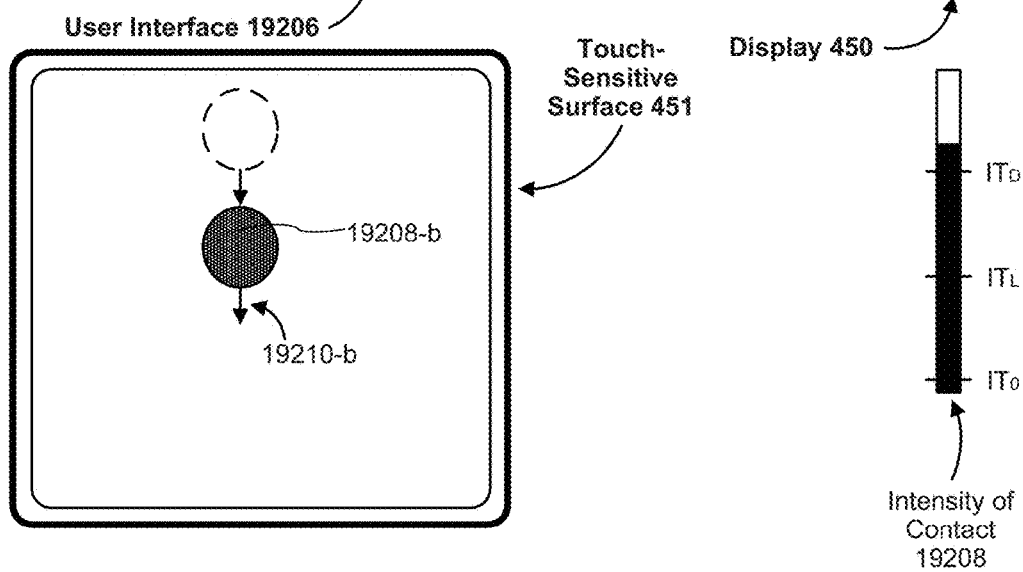
Figure 8G:
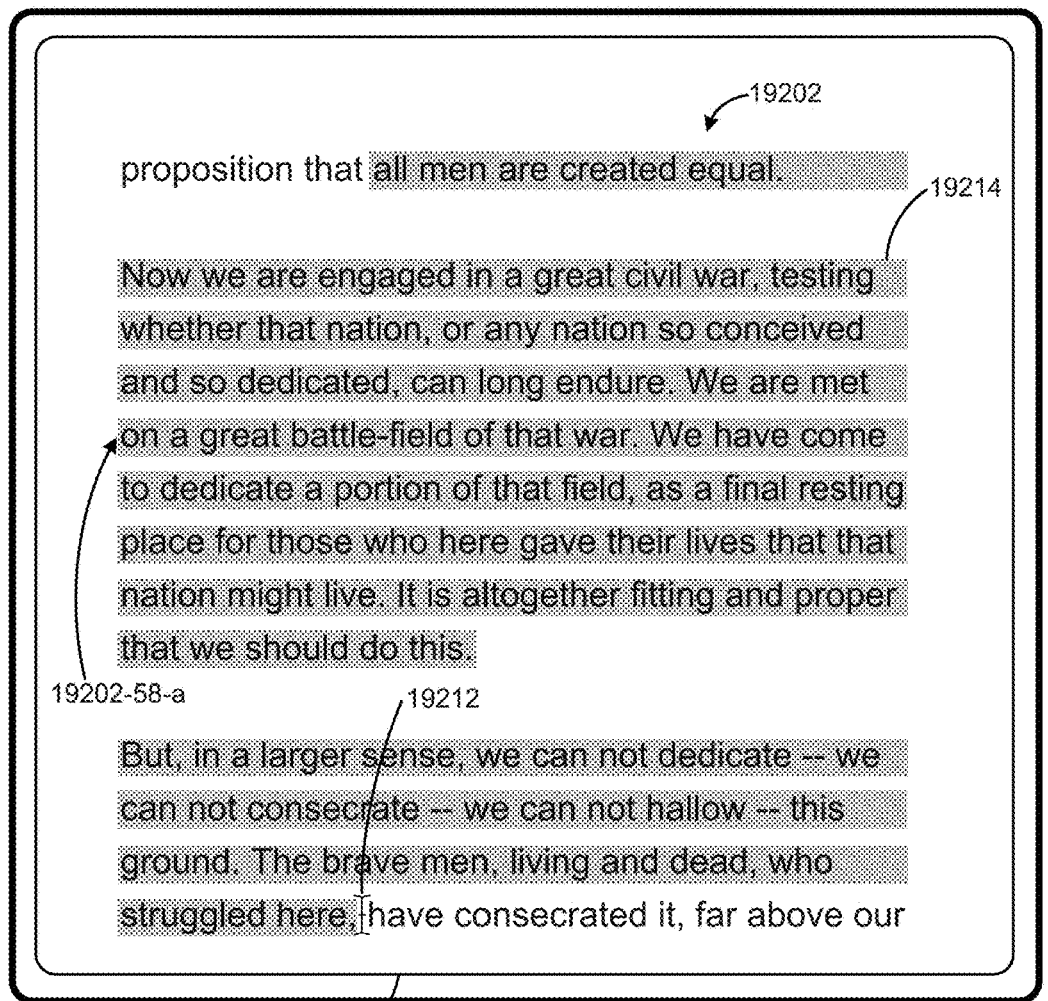
Figure 8G:
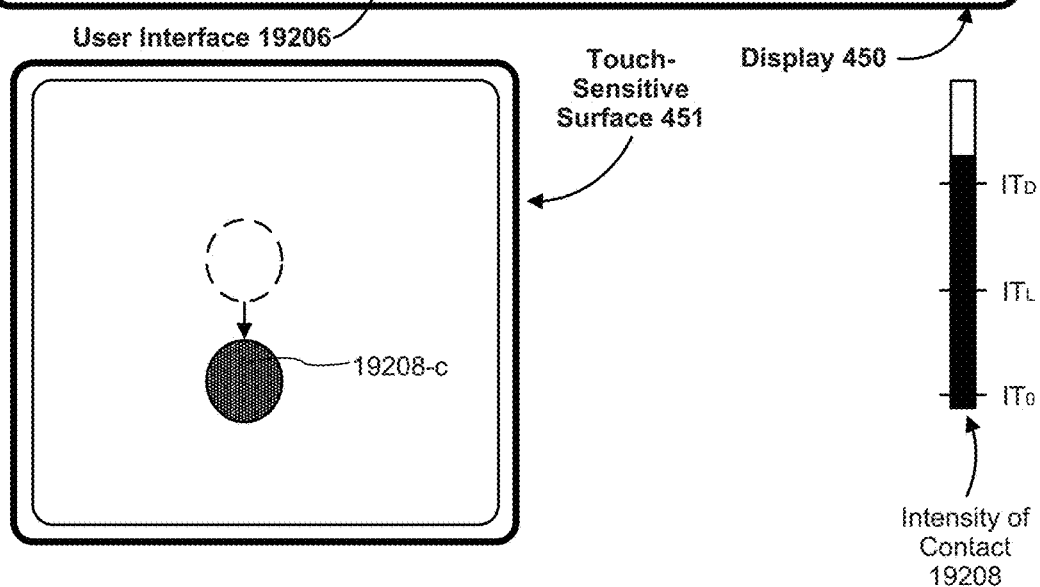
Figure 8H:
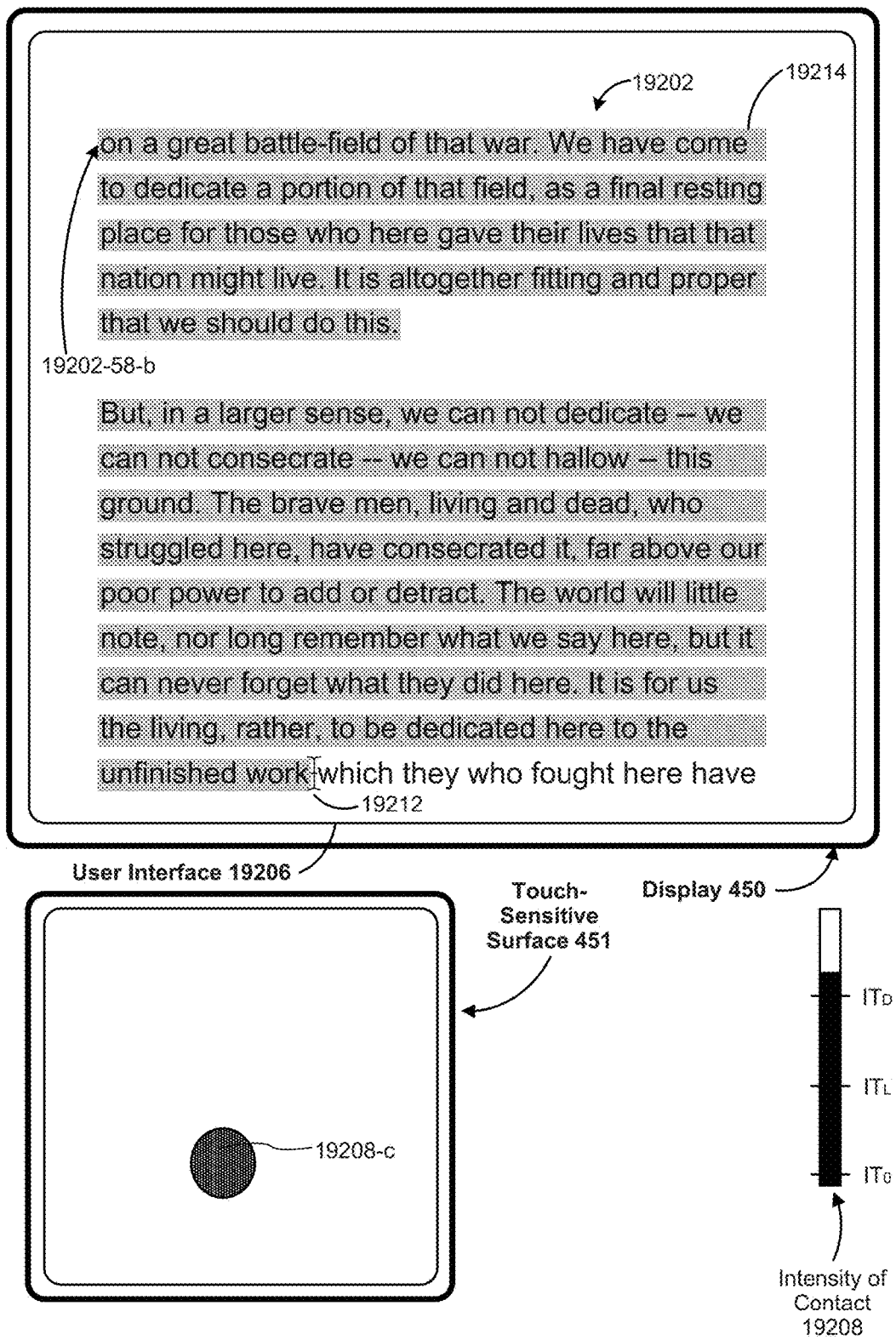
Figure 8I:
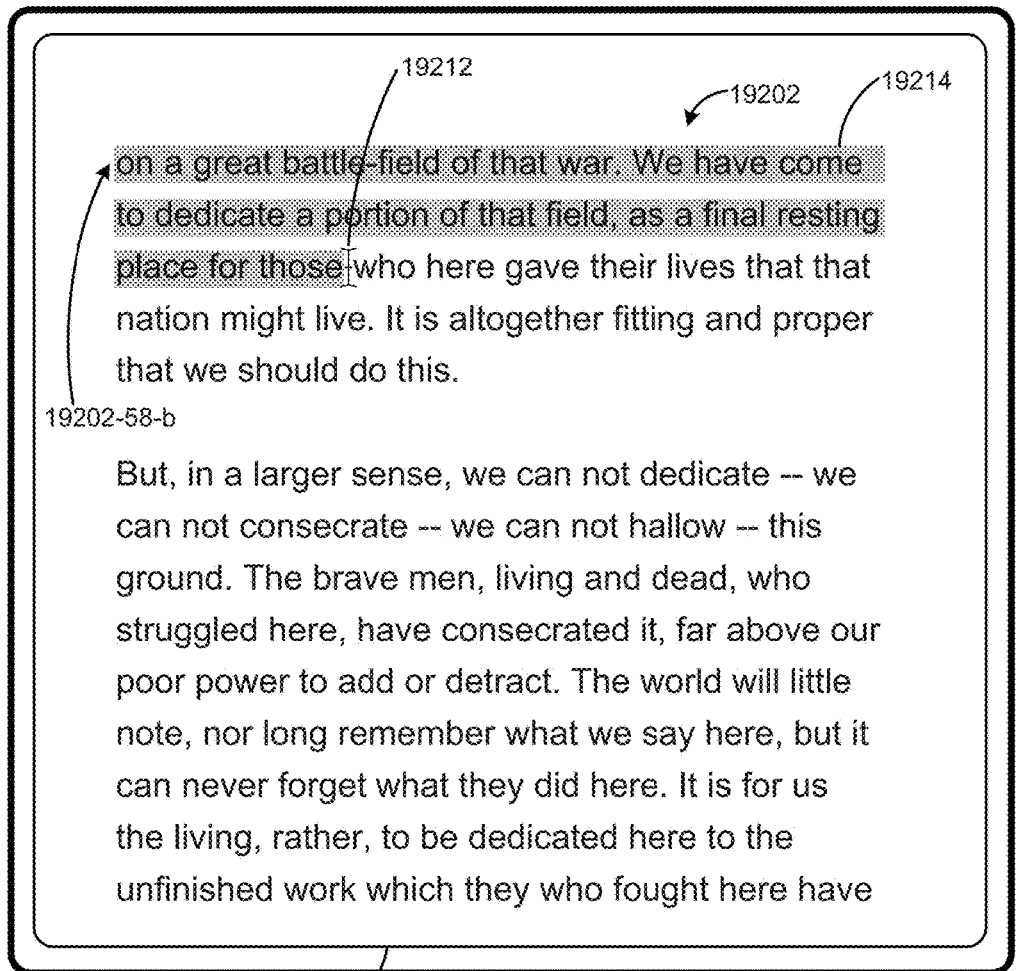
Figure 8I:
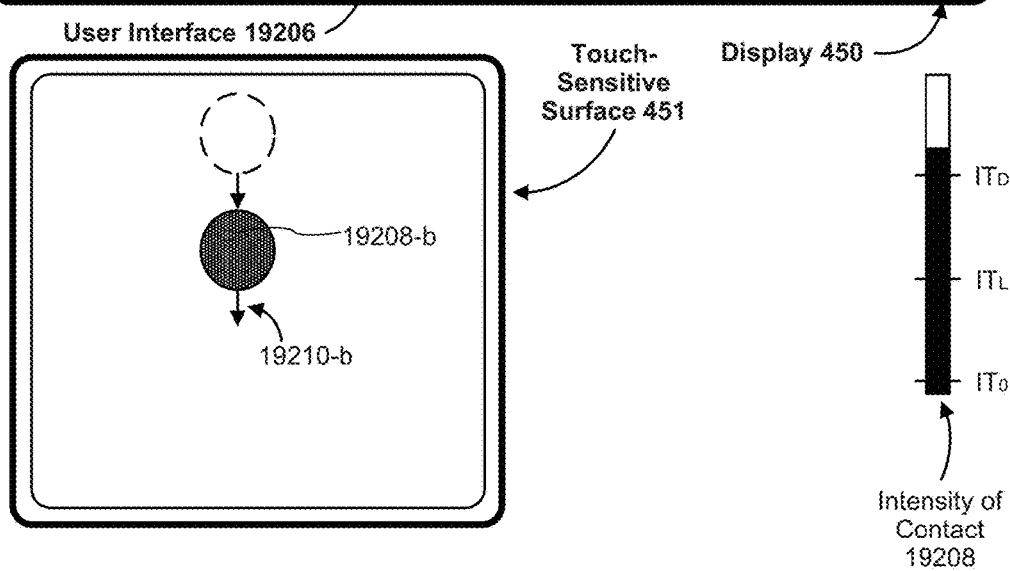
Figure 8J:
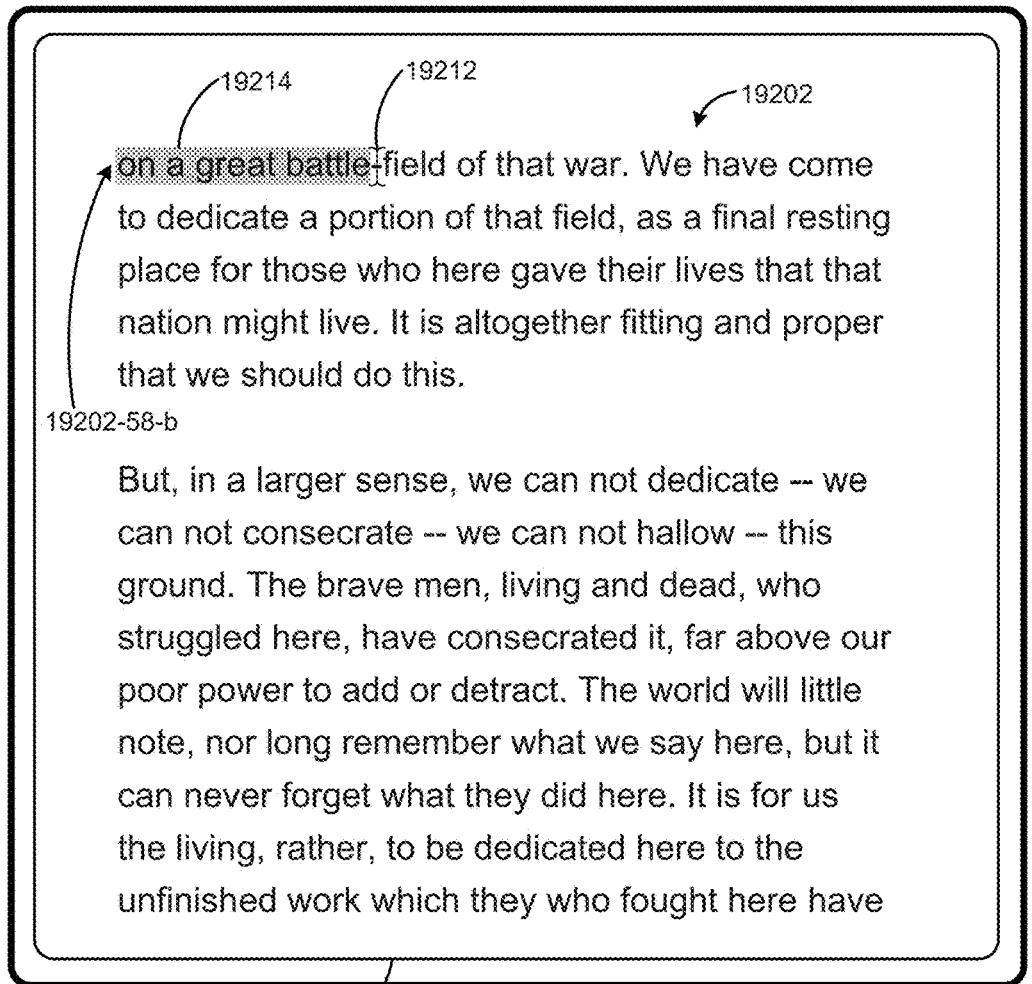
Figure 8J:
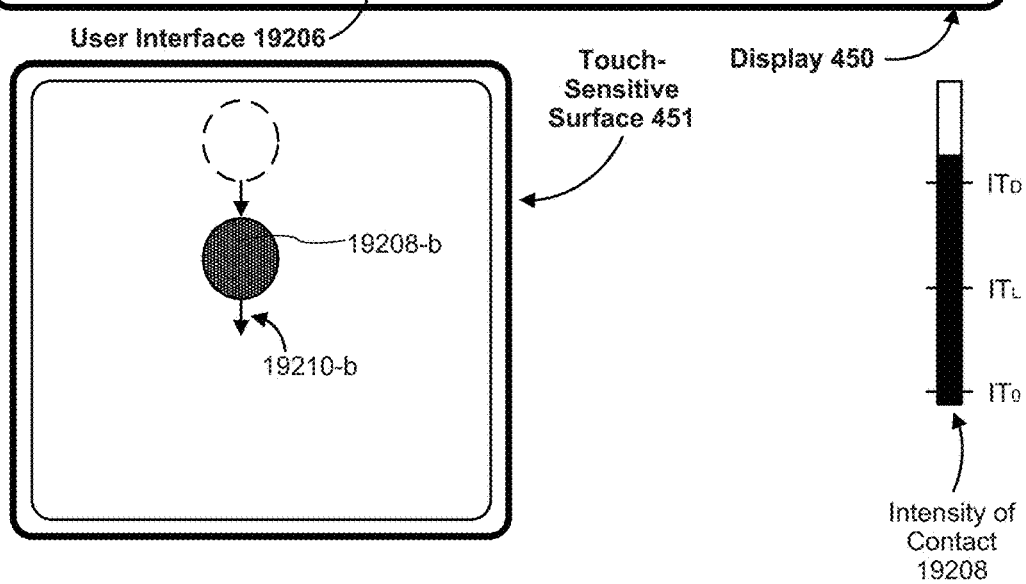
Figure 8K:
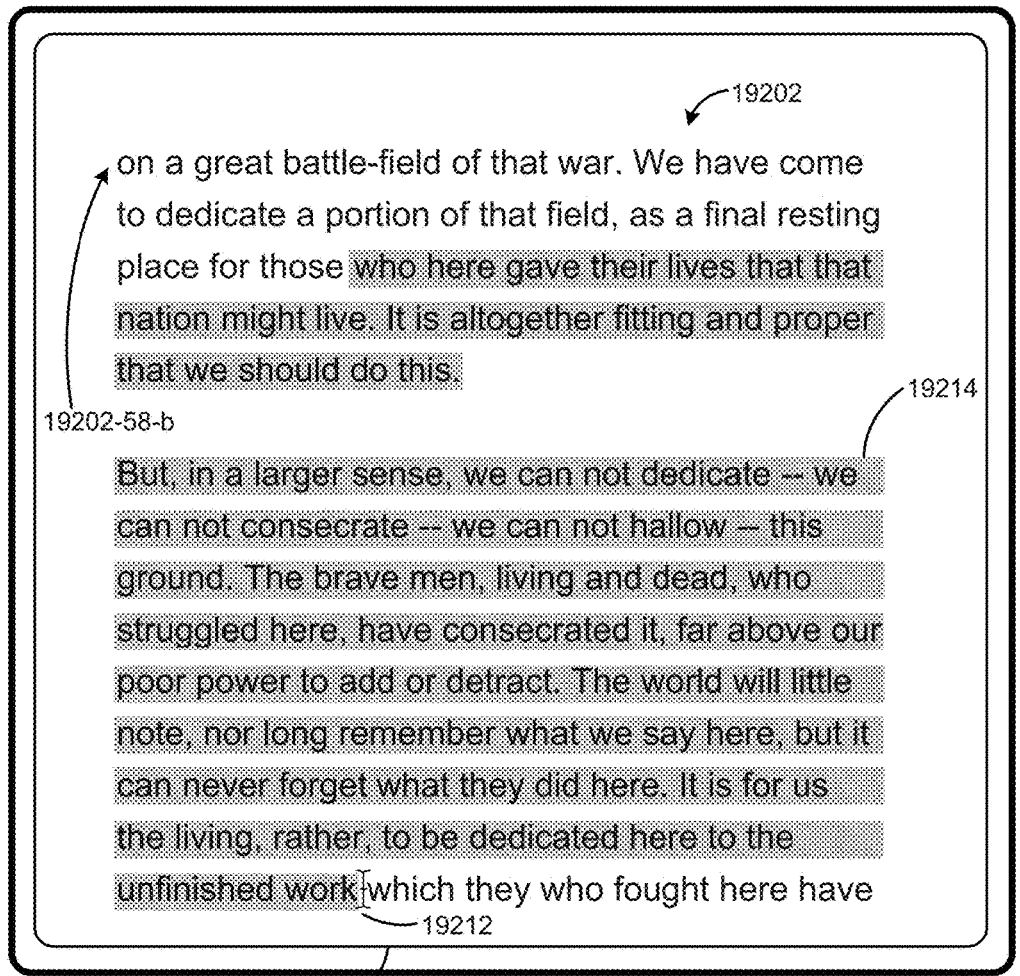
Figure 8K:
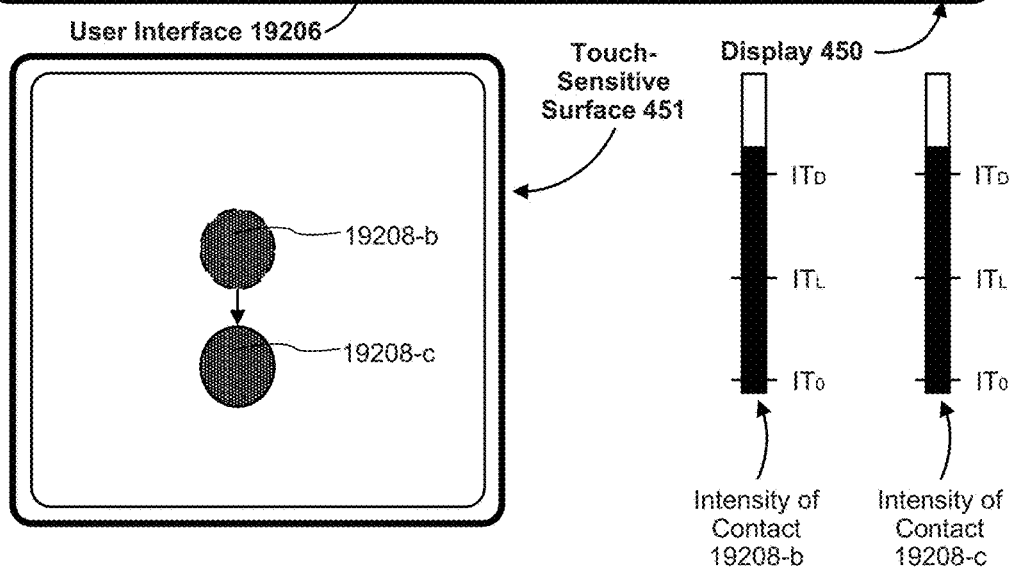
Figure 8L:
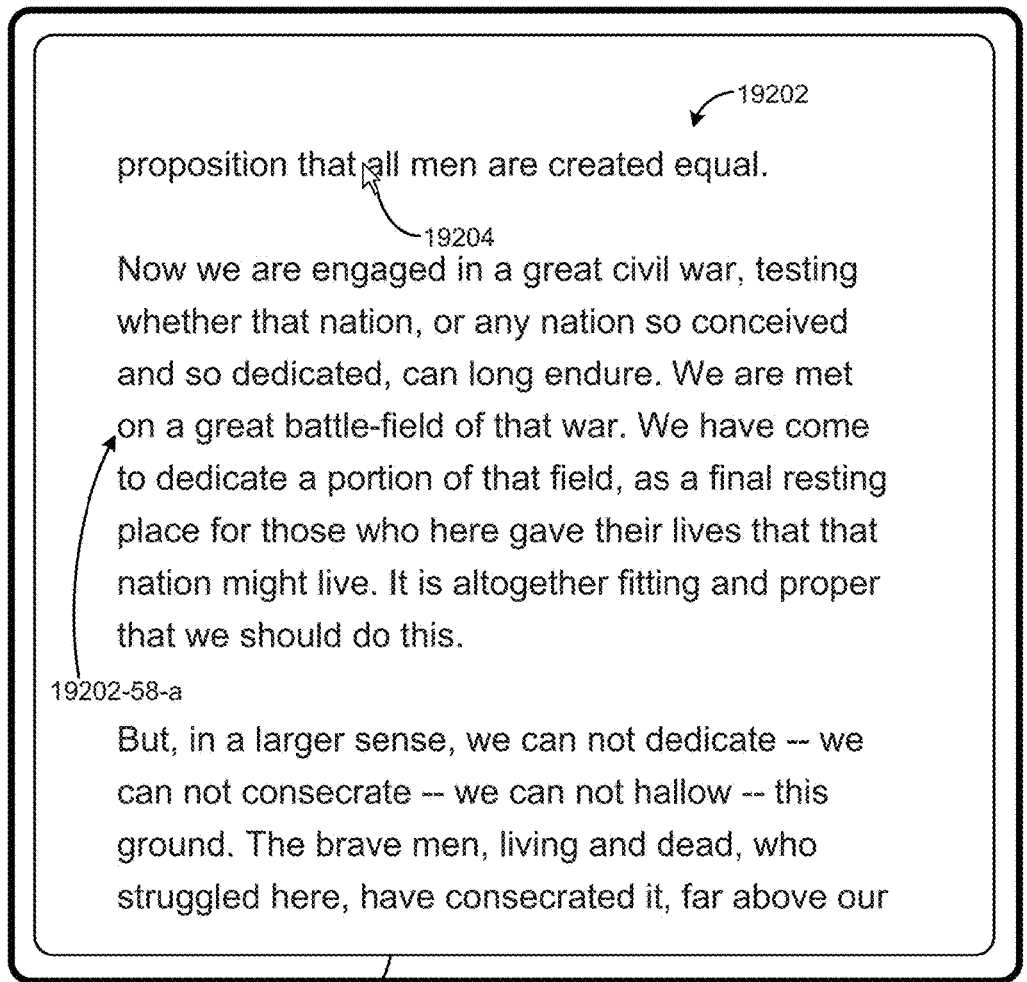
Figure 8L:
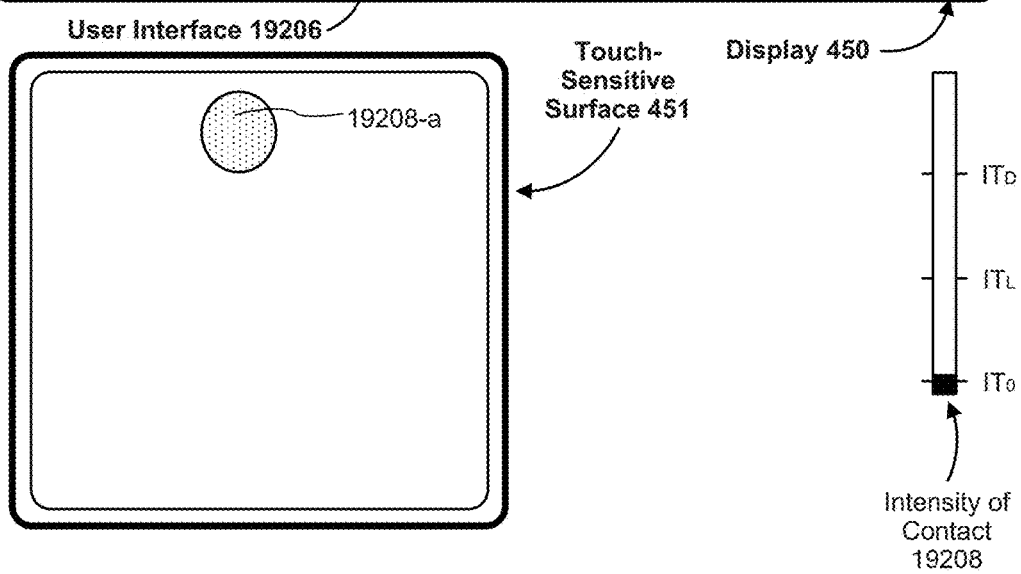
Figure 8M:
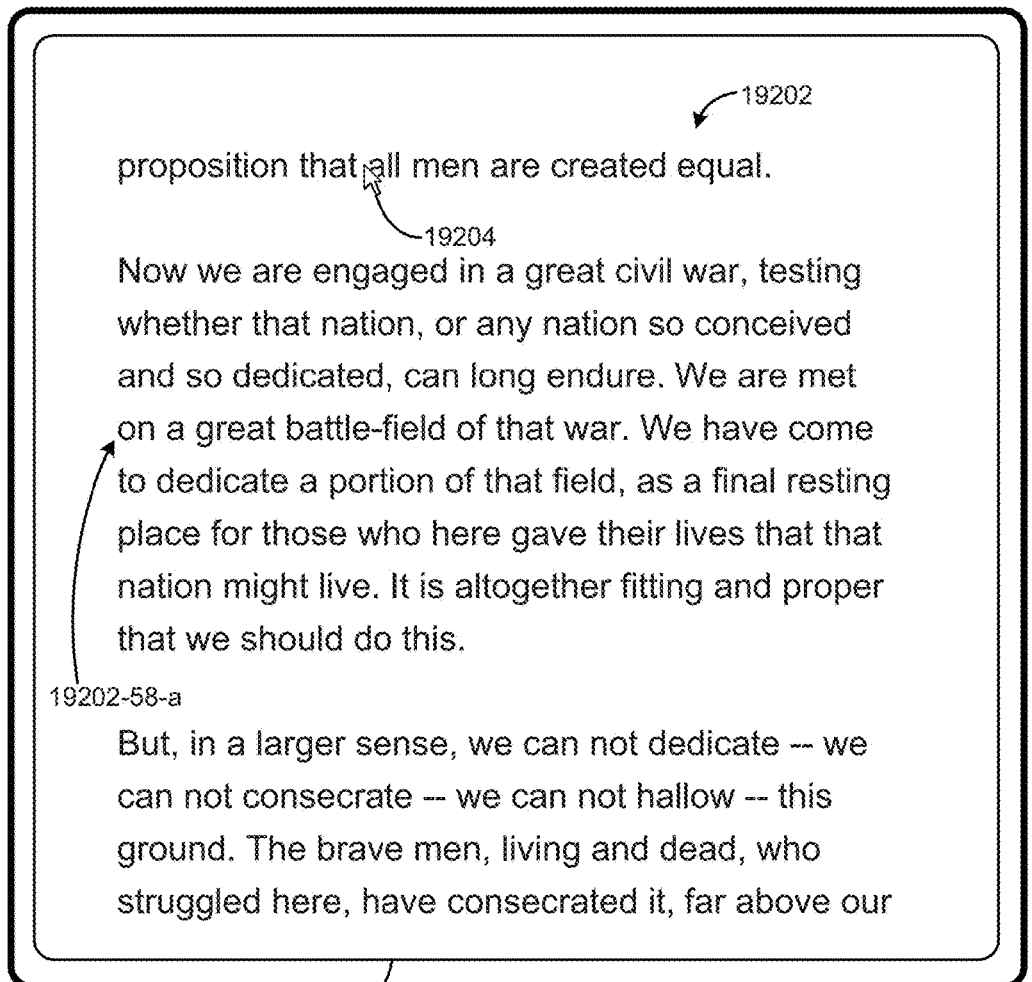
Figure 8M:
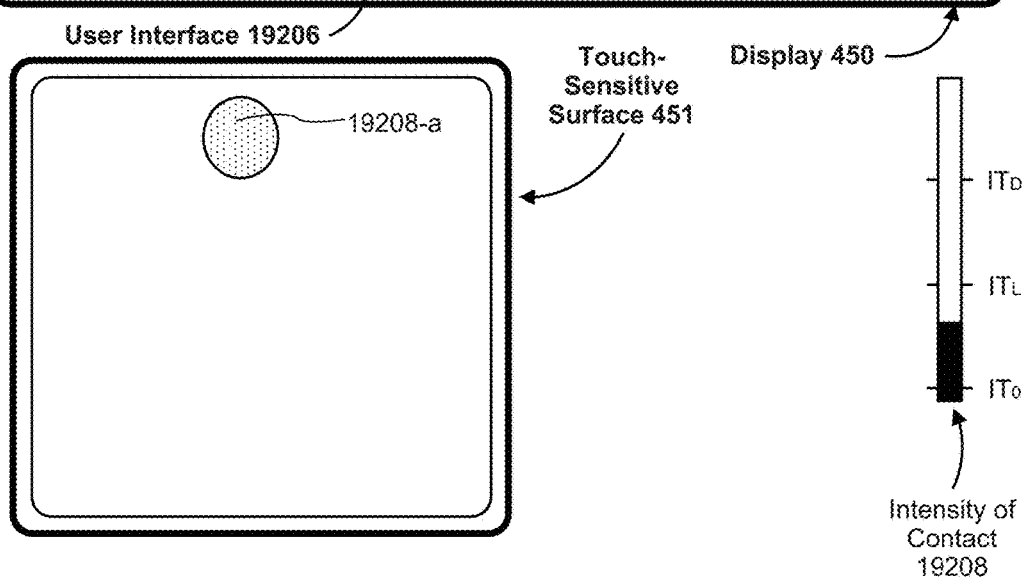
Figure 8N:
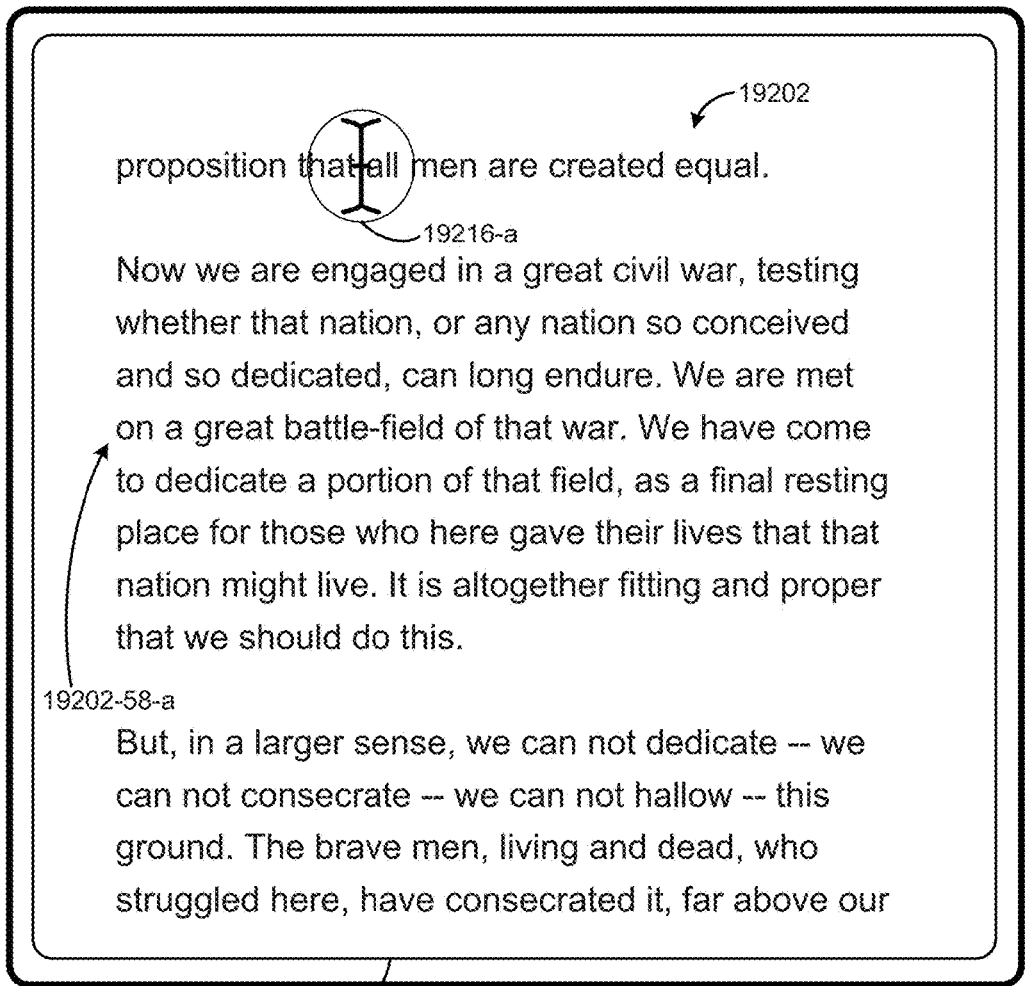
Figure 8N:
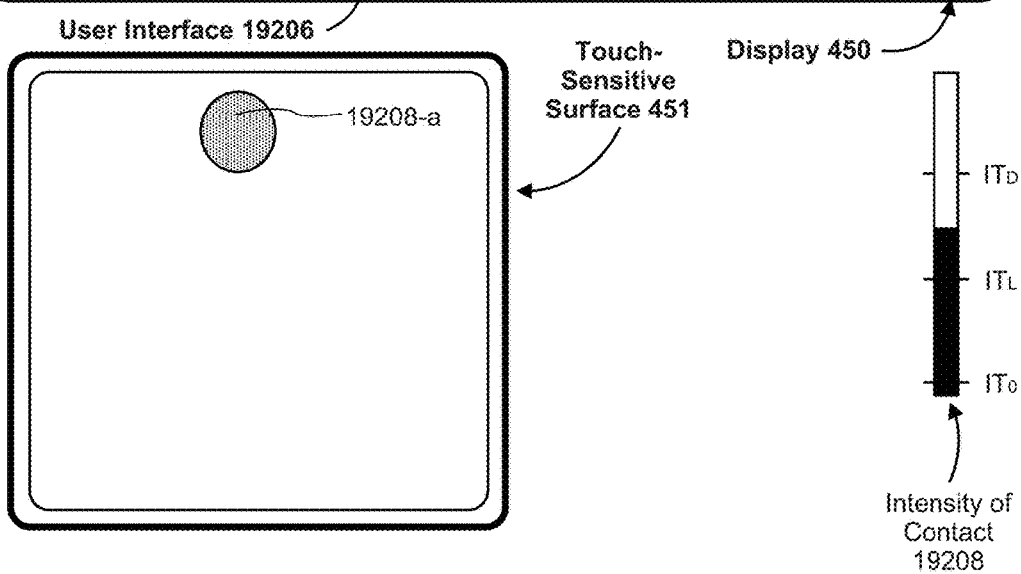
Figure 8O:
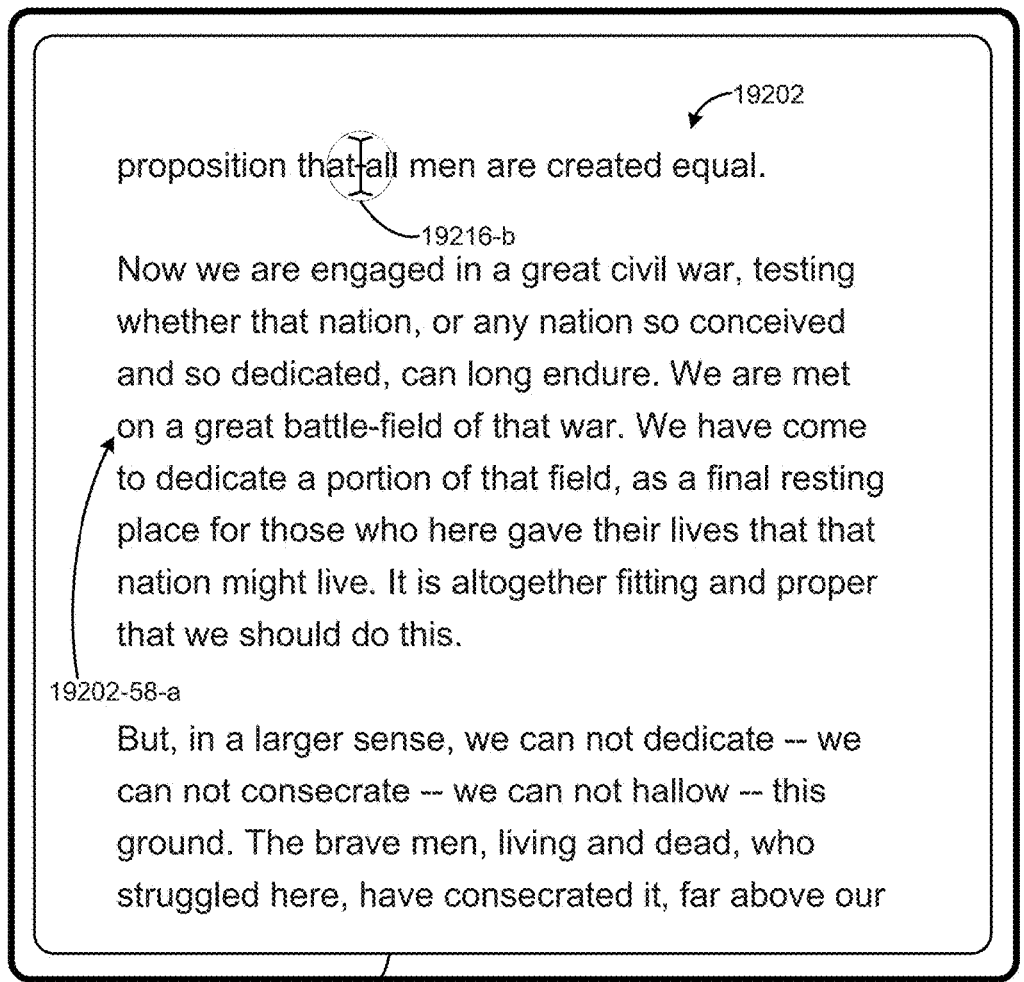
Figure 8O:
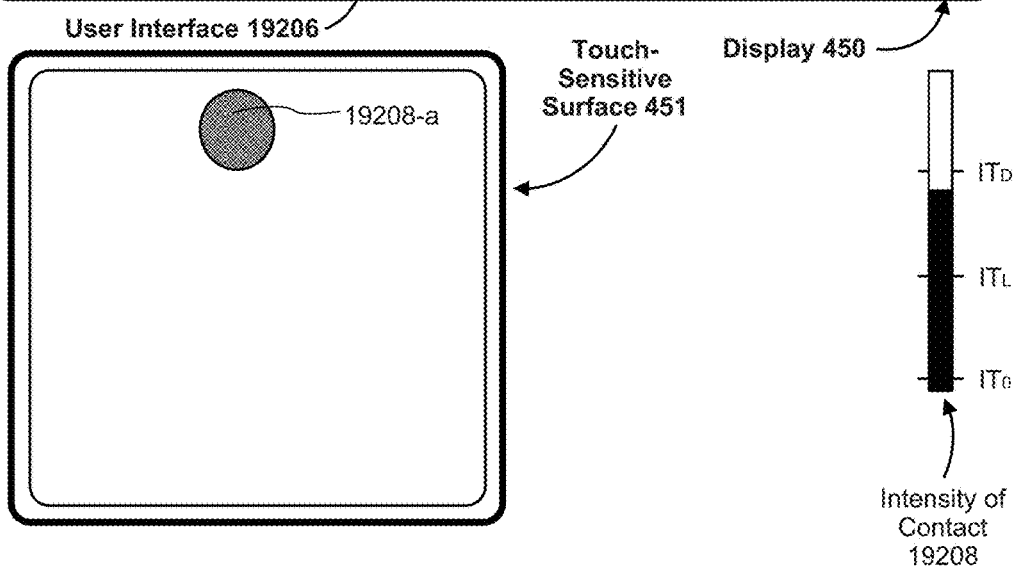
Figure 8P:
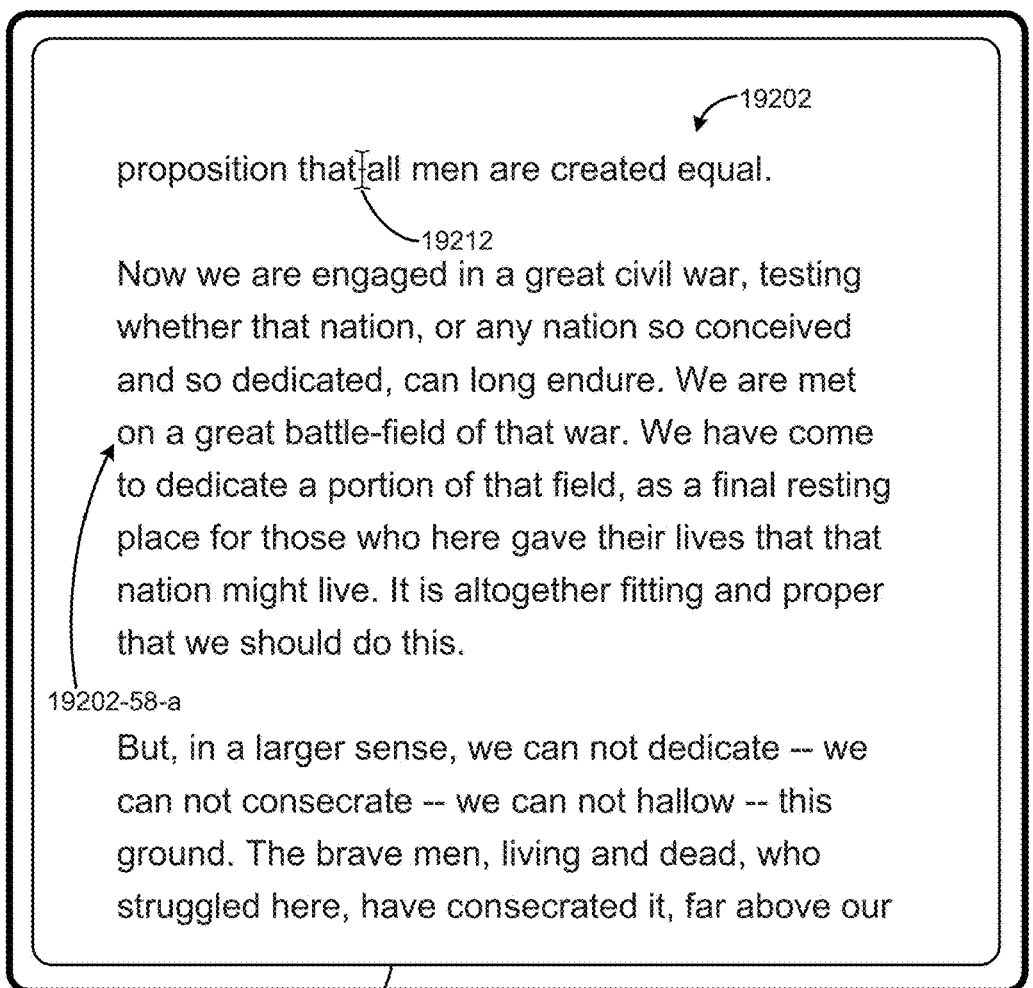
Figure 8P:
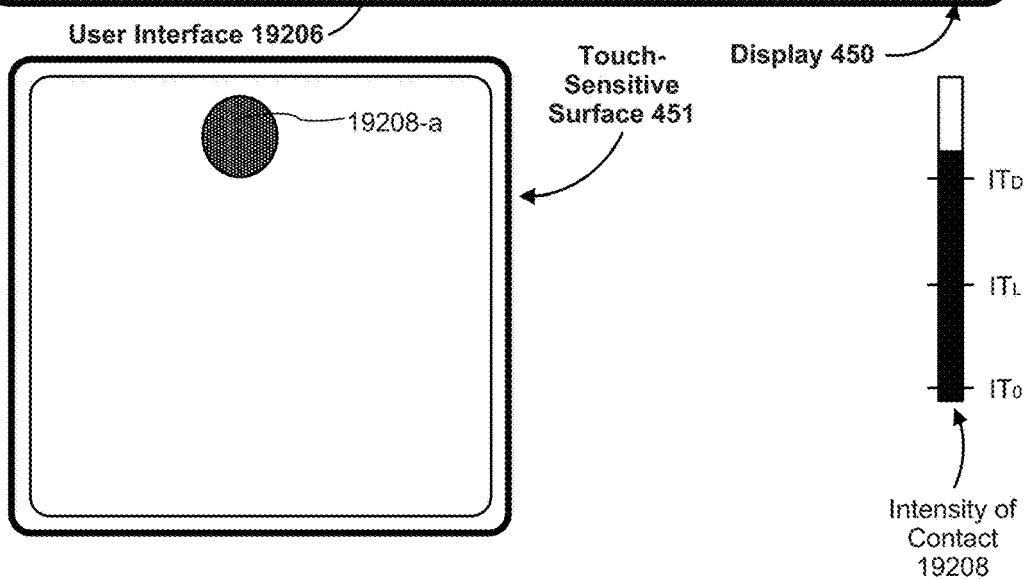
Figure 8Q:
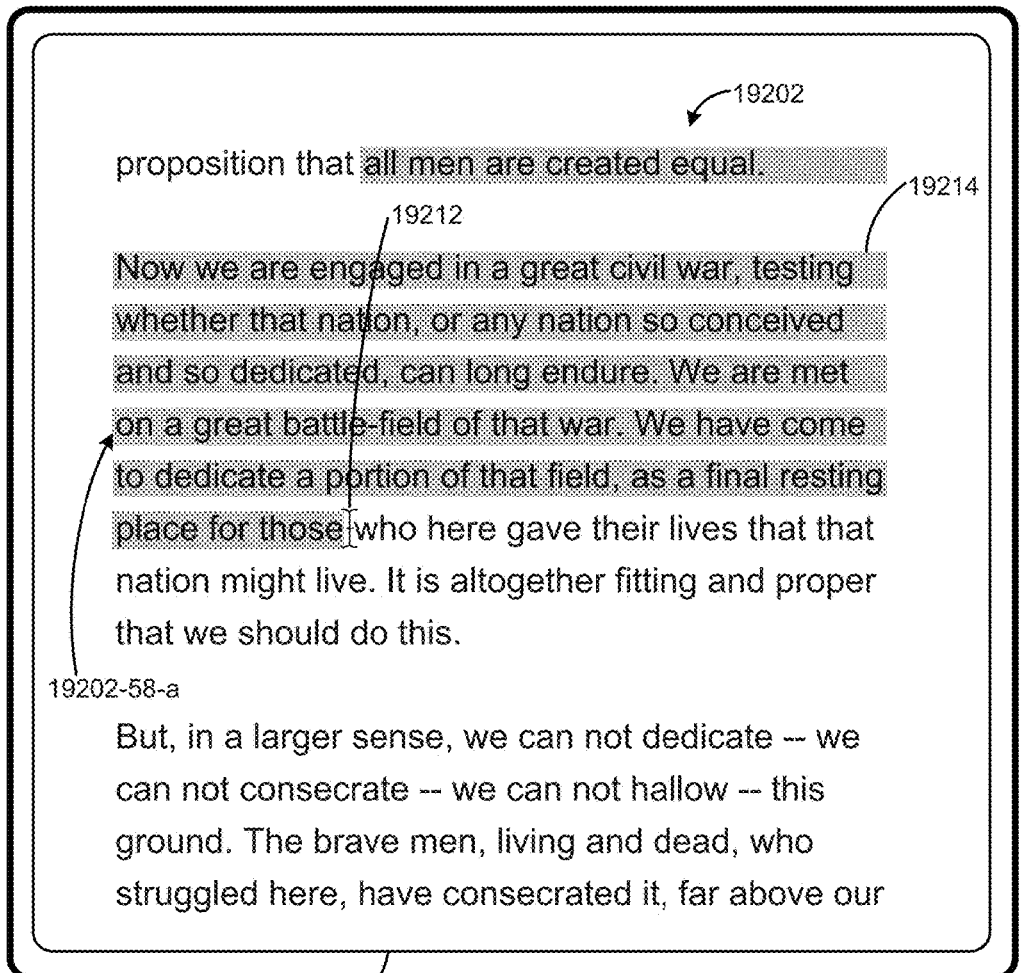
Figure 8Q:
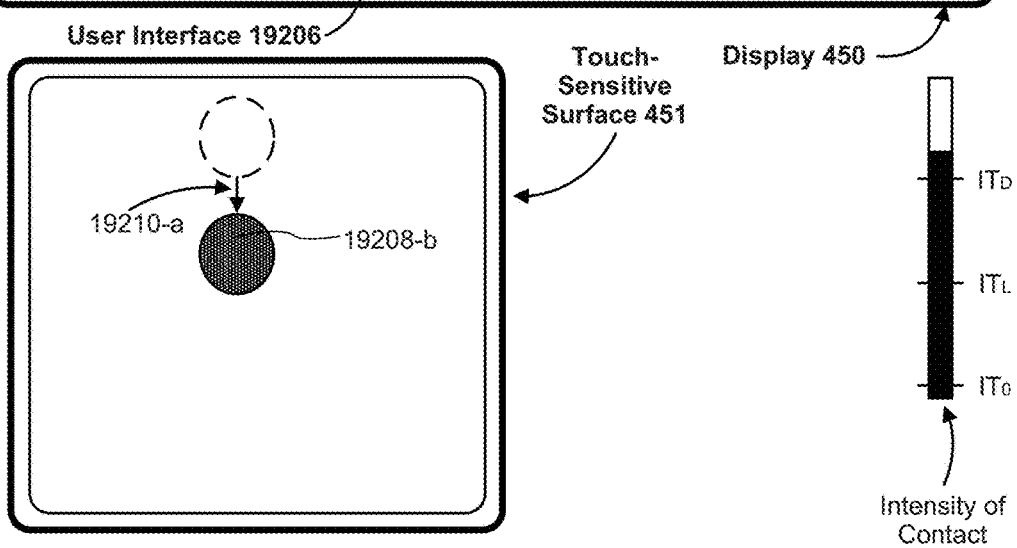
Figure 8R:
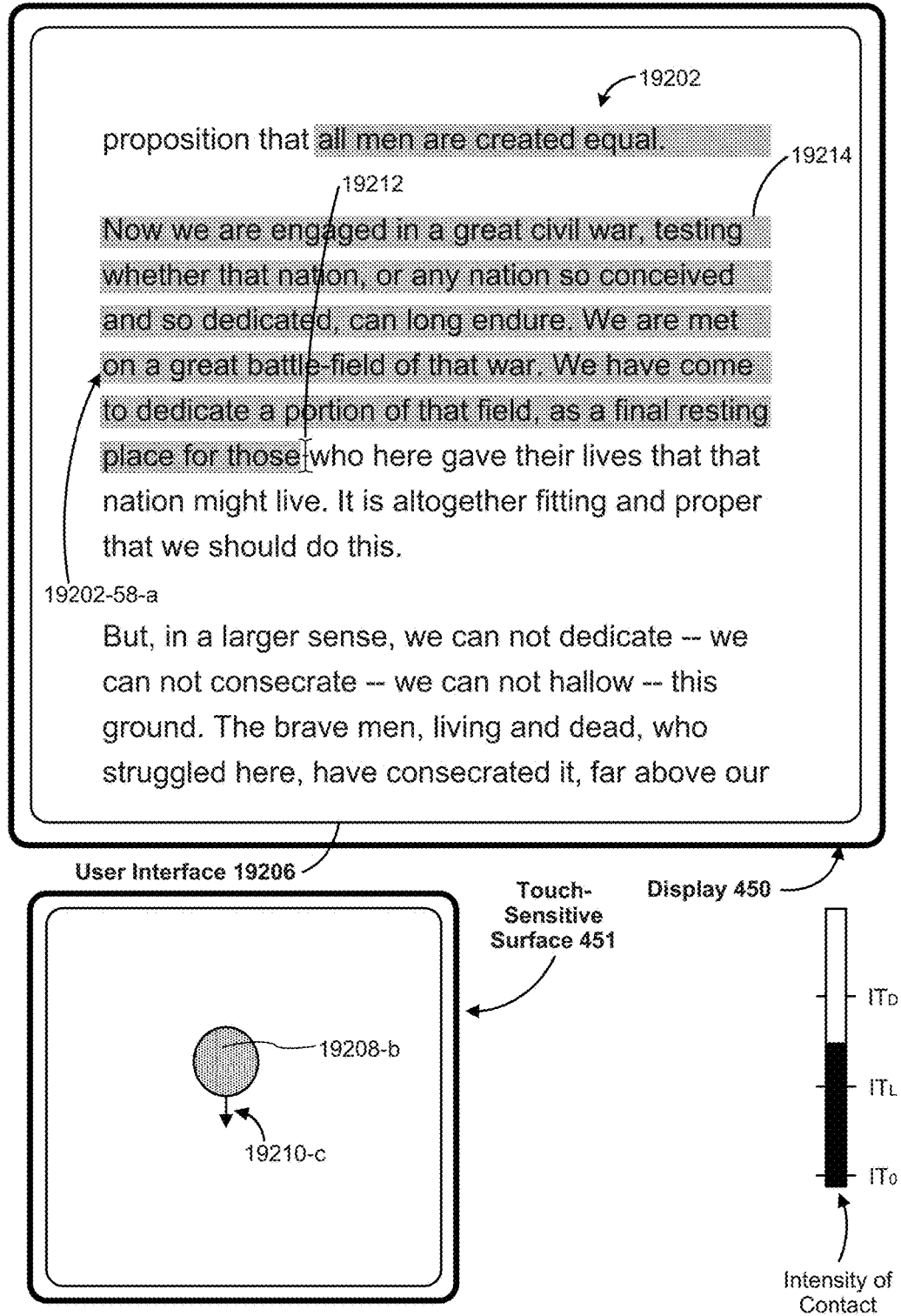
Figure 8S:
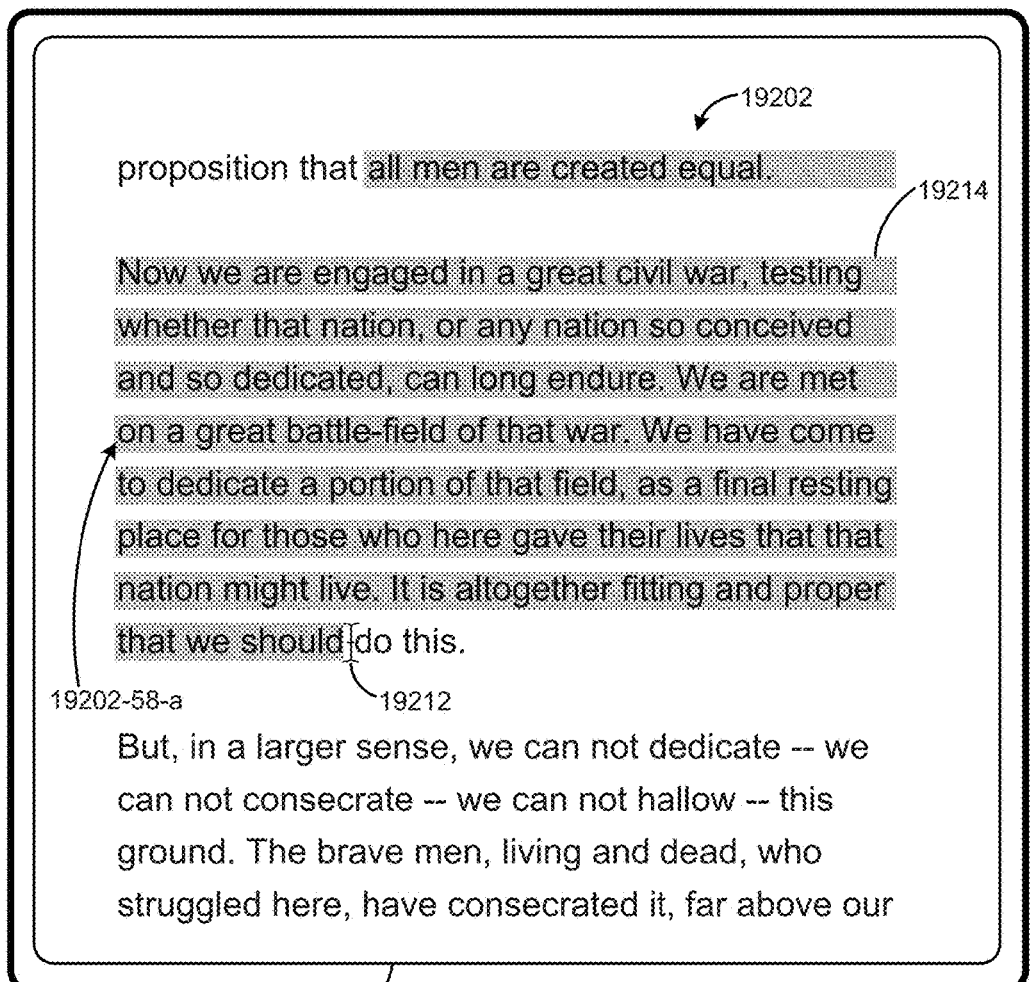
Figure 8S:
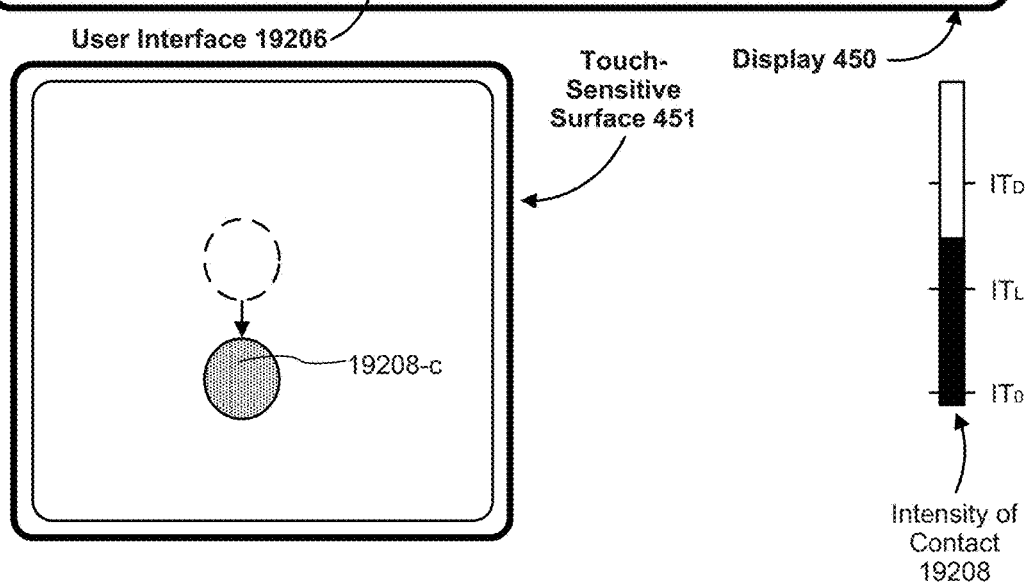
Figure 8T:
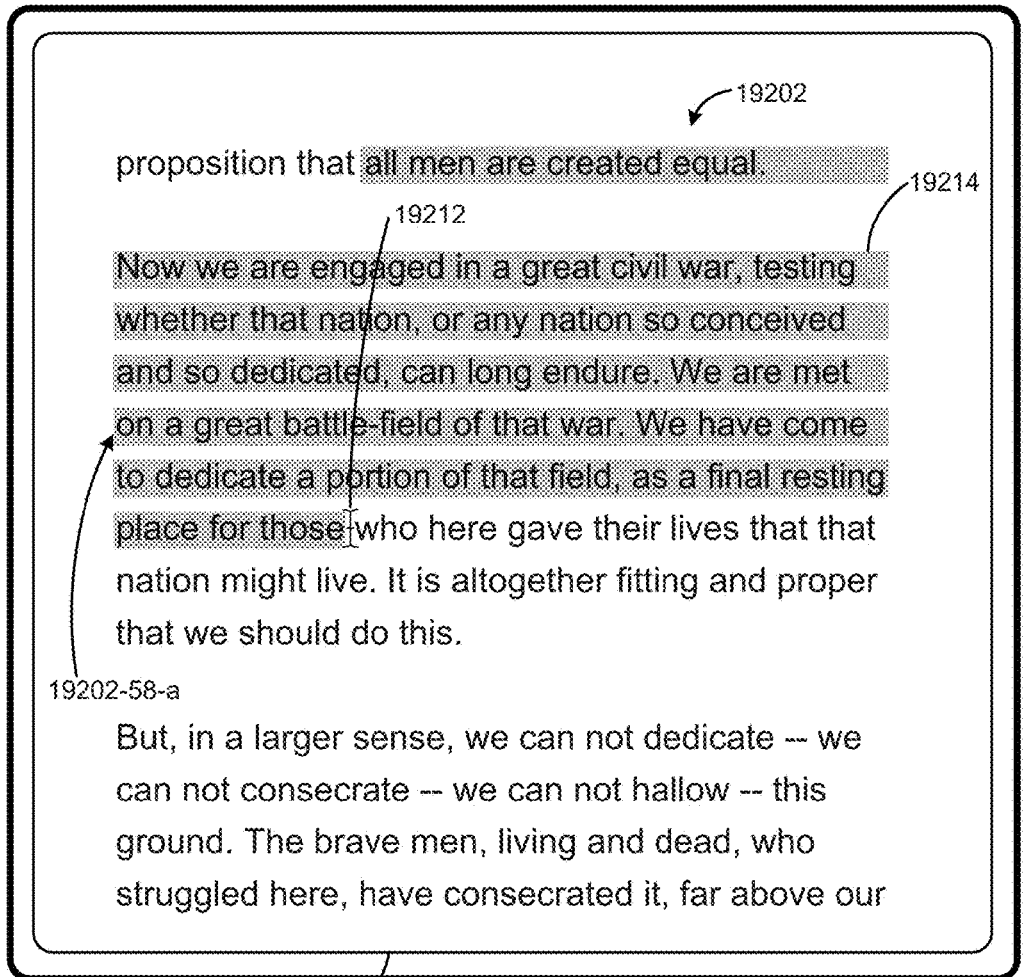
Figure 8T:
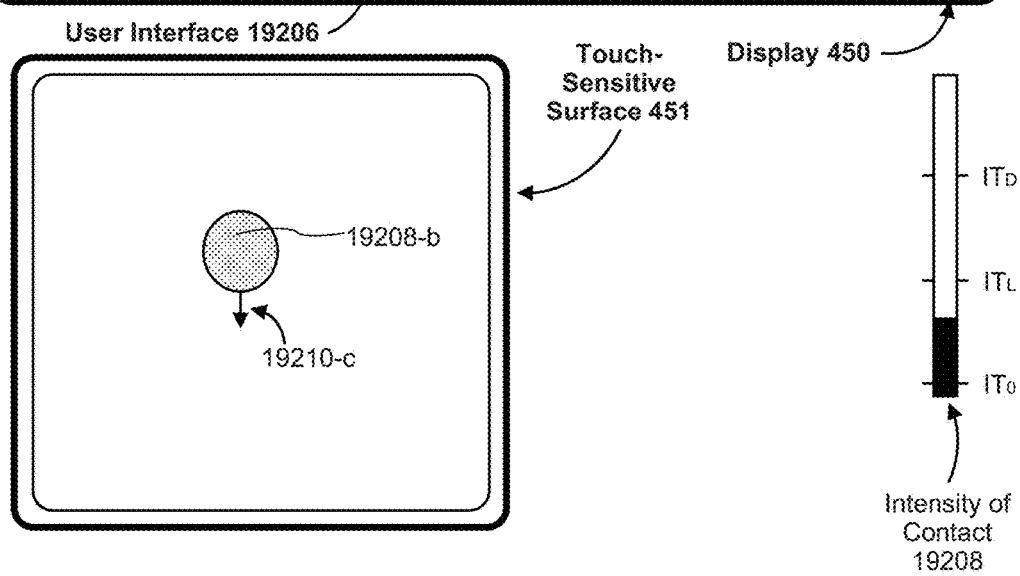
Figure 8U:
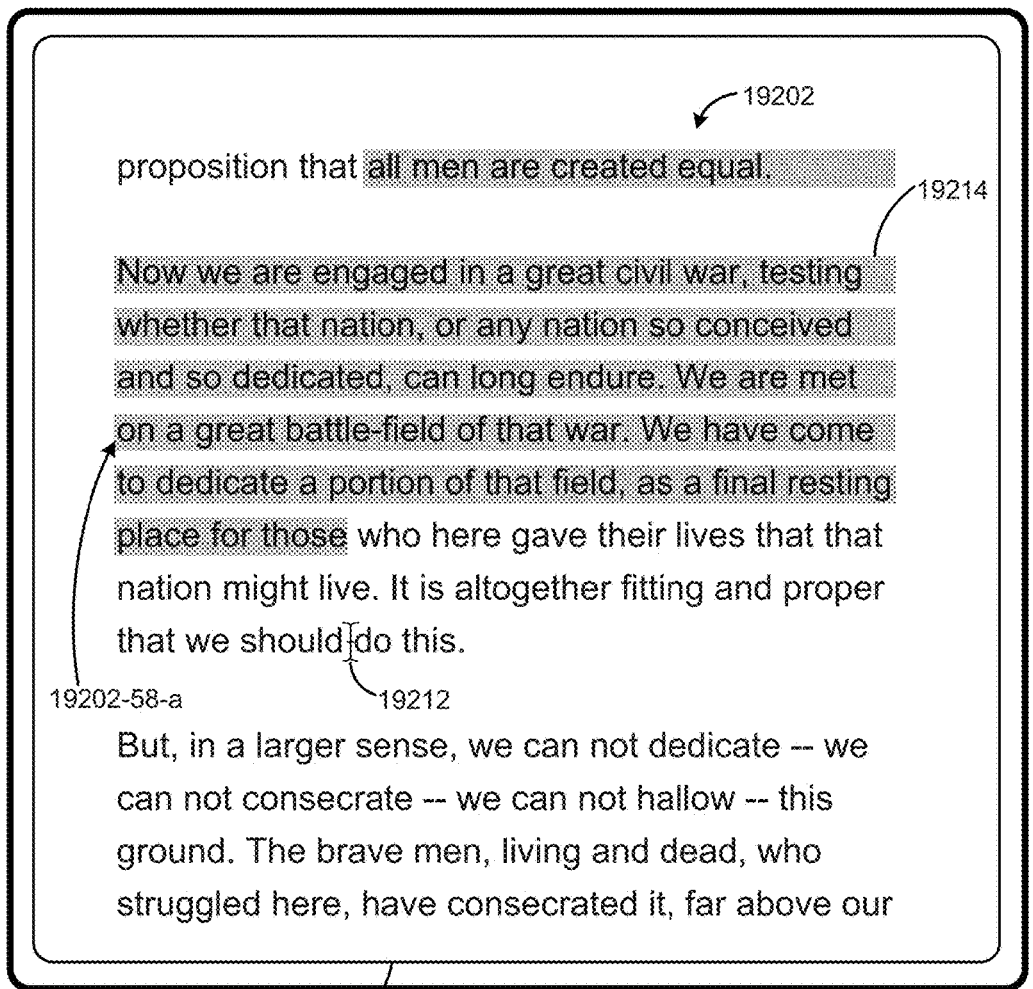
Figure 8U:
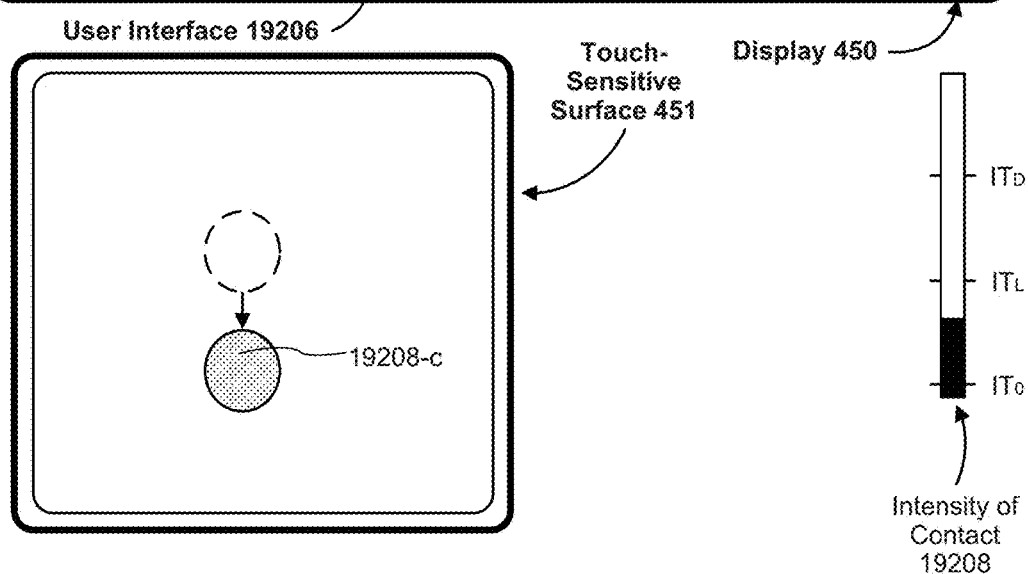
Figure 8V:
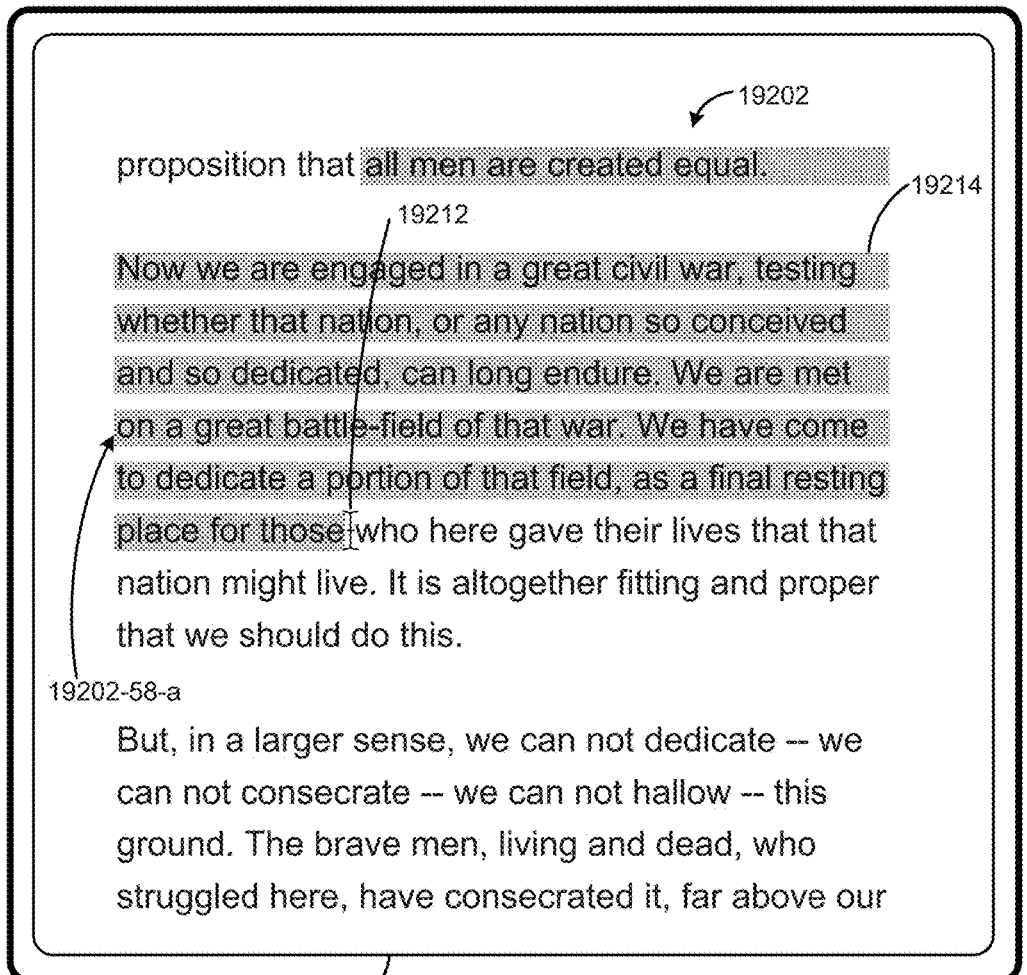
Figure 8V:
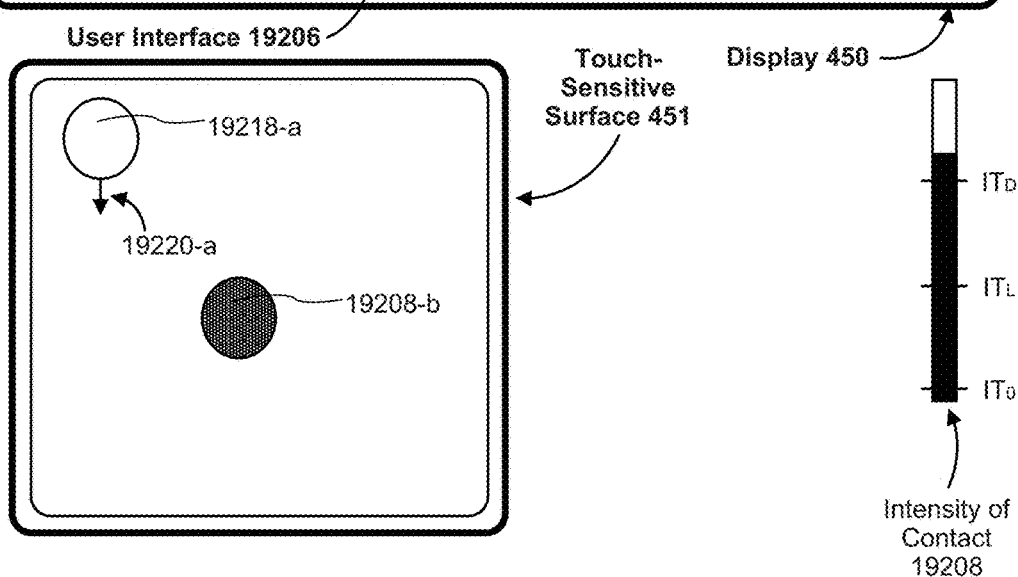
Figure 8W:
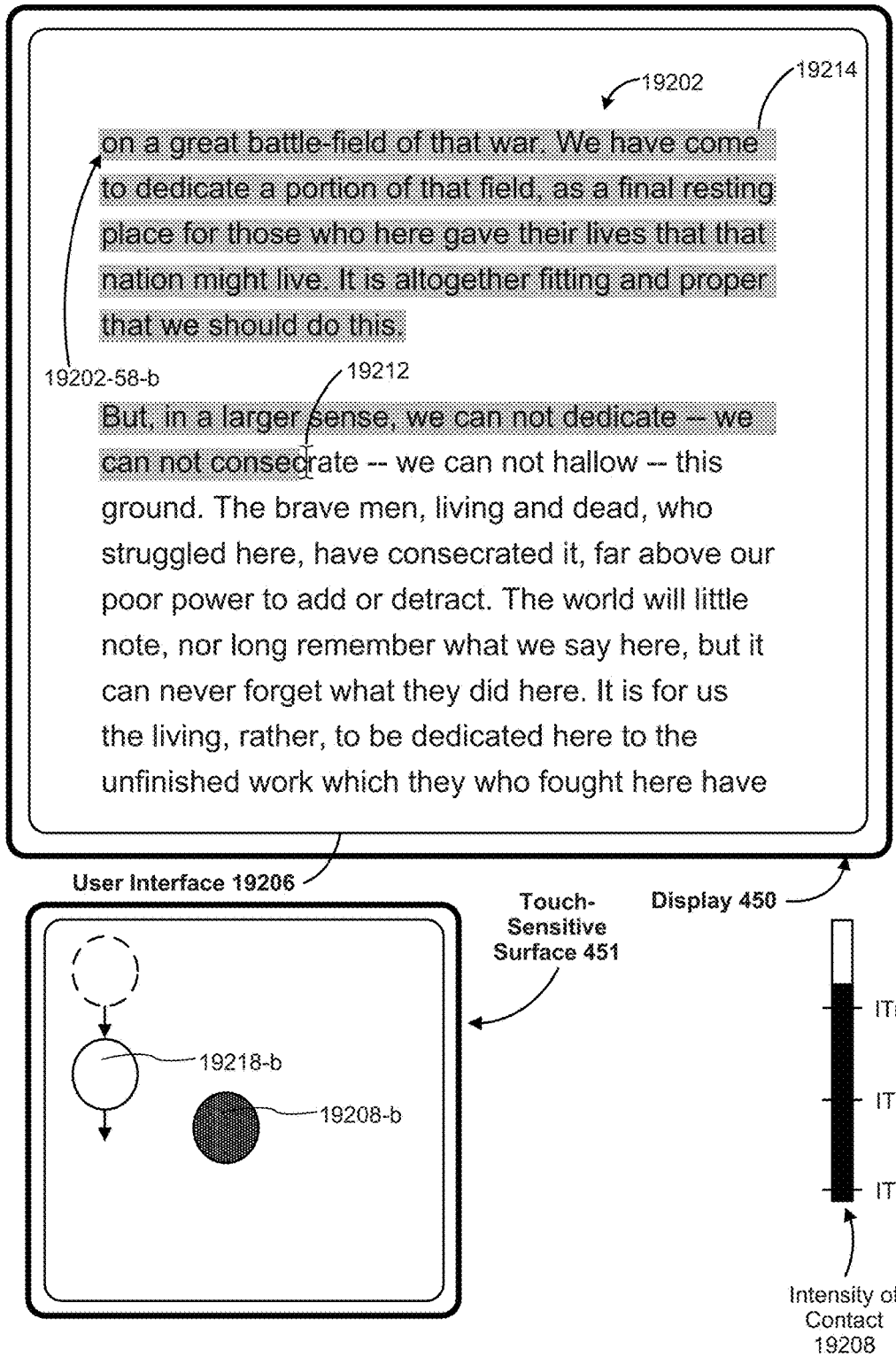

FIGS. 8A-8W illustrate detection of a contact 19208, corresponding to focus cursor 19204 or selection cursor 19212 displayed on display 450, and a gesture including movement 19210 of contact 19208 (e.g., movement 19210-*a* of contact 19208 from location 19208-*a* in FIG. 8A to location 19208-*b* in FIGS. 8B-8D; movement 19210-*a* of contact 19208 from location 19208-*a* in FIG. 8E to location 19208-*b* in FIGS. 8F, 8I-8J and 8Q; movement 19210-*b* of contact 19208 from location 19208-*b* in FIG. 8B to location 19208-*c* in FIG. 8K; movement 19210-*b* of contact 19208 from location 19208-*b* in FIG. 8F to location 19208-*c* in FIG. 8G; movement 19210-*b* of contact 19208 from location 19208-*b* in FIG. 8R to location 19208-*c* in FIG. 8S; and/or movement 19210-*b* of contact 19208 from location 19208-*b* in FIG. 8T to location 19208-*c* in FIG. 8U) are detected on touch-sensitive surface 451. Contact 19208 is detected at a position on touch-sensitive surface 451 corresponding to an area on display 450 occupied by focus cursor 19204 or selection cursor 19212 (e.g., contact 19208 corresponds to a focus selector on the display which is at or near a location of text 19202). In some embodiments, movement 19210 of contact 19208 on touch-sensitive surface 451 corresponds to movement of focus cursor 19204 or selection cursor 19212 on display 450. In some embodiments focus cursor 19204 and selection cursor 19212 are examples of displayed representations of a focus selector.

FIGS. 8A-8D illustrate an example of a beginning of a gesture where contact 19208 that is detected on touch-sensitive surface 451, corresponds to cursor 19204 displayed over text 19202 on display 450, and has an intensity below the selection intensity threshold (e.g., "$IT_D$"). In accordance with movement 19210 of contact 19208 on touch-sensitive surface 451, text 19202 is scrolled, but not selected, because contact 19208 has an intensity below the selection intensity threshold (e.g., "$IT_D$").

FIGS. 8A-8C illustrate various embodiments where text 19202 is scrolled, but not selected, in accordance with movement of focus cursor 19204. In some embodiments, as illustrated in FIG. 8B, text 19202 is scrolled in the opposite direction as the movement of focus cursor 19204 on display 450. For example, in response to movement 19210 of contact 19208, corresponding to movement of focus cursor 19204 on display 450, downward from position 19208-*a* in FIG. 8A to position 19208-*b* in FIG. 8B on touch-sensitive surface 451, word 19202-58 of text 19202 moves upwards from position 19202-58-*a* in FIG. 8A to position 19202-58-*b* in FIG. 8B on display 450. In some embodiments, as illustrated in FIG. 8C, text 19202 is scrolled in the same direction as the movement of focus cursor 19204 on display 450. For example, in response to movement 19210 of contact 19208, corresponding to movement of focus cursor 19204 on display 450, downward from position 19208-*a* in FIG. 8A to position 19208-*b* in FIG. 8C on touch-sensitive surface 451, word 19202-58 of text 19202 moves downward from position 19202-58-*a* in FIG. 8A to position 19202-58-*c* in FIG. 8C on display 450.

The series of FIGS. 8A and 8D illustrates an embodiment where text 19202 scrolls on display 450 in accordance with movement 19210 of contact 19208 on touch-sensitive surface 451, however, focus cursor 19204 does not move. For example, in response to movement 19210 of contact 19208 downward from position 19208-*a* in FIG. 8A to position 19208-*b* in FIG. 8D on touch-sensitive surface 451, word 19202-58 of text 19202 moves upwards from position 19202-58-*a* in FIG. 8A to position 19202-58-*b* in FIG. 8D on display 450, but focus cursor 19204 does not move. As such, the relative position of focus cursor 19204 in text 19202 moves in accordance with movement 19210 of contact 19208 on touch-sensitive surface 451 without cursor 19204 moving on display 450.

FIGS. 8E-8J illustrate an example of a beginning of a gesture where contact 19208 that is detected on touch-sensitive surface 451, corresponds to selection cursor 19212 displayed over text 19202 on display 450, and has an intensity above the selection intensity threshold (e.g., "$IT_D$"). In accordance with movement of selection cursor 19212 over text 19202, portion 19214 of text 19202 is selected because contact 19208 has an intensity above the selection intensity threshold (e.g., "$IT_D$").

FIGS. 8E-8G illustrate an embodiment where portion 19214 of text 19202 is selected, but text 19202 is not scrolled. For example, in accordance with the movement of selection cursor 19212 on display 450, corresponding to movement 19210 of contact 19208 from position 19208-*a* in FIG. 8E, through position 19208-*b* in FIG. 8F, to position 19208-*c* in FIG. 8G on touch-sensitive surface 451, portion 19214 of text 19202 is selected because the intensity of contact 19208 is above the selection intensity threshold (e.g., "$IT_D$"). During the selection, word 19202-58 does not move (e.g., is not scrolled) from position 19202-58-*a* in FIG. 8E, despite movement of selection cursor 19212 downward on display 450.

FIGS. 8E-8H illustrate an embodiment where portion 19214 of text 19202 is selected, and text 19202 is scrolled when additional text is prompted to be displayed. For example, in accordance with movement of selection cursor 19212 on display 450, corresponding to movement 19210 of contact 19208 from position 19208-*a* in FIG. 8E, through position 19208-*b* in FIG. 8F, to position 19208-*c* in FIG. 8G on touch-sensitive surface 451, portion 19214 of text 19202 is selected because the intensity of contact 19208 is above the selection intensity threshold (e.g., "$IT_D$"), but text 19202 is not scrolled on display 450. In response to selection cursor 19212 reaching an edge of displayed text 19202 in FIG. 8G, text 19202 is scrolled upwards (e.g., word 19202-58 is scrolled from position 19202-58-*a* in FIG. 8G to position 19202-58-*b* in FIG. 8H on display 450) so that additional text is displayed proximate to selection cursor 19212. In some embodiments, as illustrated in FIG. 8H, when contact 19208 is maintained at an intensity above the selection intensity threshold (e.g., "$IT_D$") at position 19208-*c* on touch-sensitive surface 451, corresponding to a position proximal to an edge of displayed text 19202, scrolling of text 19202 is continued despite the lack of movement of contact 19208. In some embodiments, the portion of text that was selected (e.g., in FIG. 8G) prior to scrolling the text continues to be selected even after the text is scrolled as shown in FIG. 8H.

The series of FIGS. 8E and 8I illustrate an embodiment where portion 19214 of text 19202 is selected while text 19202 is scrolled. For example, portion 19214 of text 19202 is selected in accordance with movement of selection cursor 19212 on display 450, corresponding to movement of contact 19208 from position 19208-*a* in FIG. 8E to position 19208-*b* in FIG. 8I, because the intensity of contact 19208 is above the selection intensity threshold (e.g., "$IT_D$"). During the selection, word 19202-58 moves (e.g., is scrolled) from position 19202-58-*a* in FIG. 8E to position 19202-58-*b* in FIG. 8I on display 450, in accordance with movement of selection cursor 19212 downward on display 450.

The series of FIGS. 8E and 8J illustrate an embodiment where portion 19214 of text 19202 is selected while text 19202 is scrolled, but selection cursor 19212 does not move on display 450. For example, text 19202 scrolls on display 450 in accordance with movement 19210 of contact 19208 from position 19208-*a* in FIG. 8E to position 19208-*b* in FIG. 8J on touch-sensitive surface 451 (e.g., word 19202-58 is scrolled from position 19202-58-*a* in FIG. 8E to position 19202-58-*b* in FIG. 8J on display 450). In accordance with the change (e.g., movement) of the relative position of selection cursor 19212 in text 19202, despite the lack of movement of selection cursor 19212 on display 450, portion 19214 of text 19202 is selected because contact 19208 has an intensity above the selection intensity threshold (e.g., "$IT_D$").

The series of FIGS. 8A, 8B and 8K illustrate an embodiment where text 19202 is initially scrolled, but not selected, in accordance with movement of focus cursor 19204, corresponding to movement of contact 19208 having an intensity below a selection intensity threshold (e.g., "$IT_D$"). Following an increase in the intensity of contact 19208 to an intensity above the selection intensity threshold (e.g., "$IT_D$"), scrolling of text 19202 is stopped and portion 19214 of text 19202 is selected in accordance with subsequent movement of contact 19208. For example, when the intensity of contact 19208 is increased at position 19208-*b* in FIG. 8B from an initial intensity below a selection intensity threshold (e.g., "$IT_D$") to a subsequent intensity above the selection intensity threshold (e.g., as shown in FIG. 8K), scrolling of text 19202 is stopped (e.g., word 19202-58 does not move from position 19202-58-*b* in FIG. 8B despite movement of contact 19208 to position 19208-*c* in FIG. 8K) and portion 19214 of text 19202 is selected in accordance with movement of contact 19208 from position 19208-*b* in FIG. 8B to position 19208-*c* in FIG. 8K on touch-sensitive surface 451.

FIGS. 8L-8Q illustrate various embodiments where, prior to selecting a portion 19214 of text 19202, preview 19216 of selection cursor 19212 is displayed at an area of display 450 proximate to focus cursor 19204. For example, as illustrated in FIGS. 8L-8N, in response to an increase of the intensity of contact 19208 on touch-sensitive surface 451, corresponding to focus cursor 19204 on display 450, from an initial intensity in FIG. 8L to an intensity below the selection intensity threshold (e.g., "$IT_D$") but above a cursor-preview intensity threshold (e.g., light press intensity threshold "$IT_L$") in FIG. 8N, preview 19216 of selection cursor 19212 is displayed as replacing focus cursor 19204 on display 450. In contrast, as illustrated by the series of FIG. 8L-8M, in response to an increase of the intensity of contact 19208 on touch-sensitive surface 451, corresponding to focus cursor 19204 on display 450, from an initial intensity in FIG. 8L that is just above a contact-detection intensity threshold (e.g., "$IT_0$") to an intensity that is below both the selection intensity threshold (e.g., "$IT_D$") and the cursor-preview intensity threshold (e.g., "$IT_L$") in FIG. 8M, preview 19216 of selection cursor 19212 is not displayed.

The series of FIGS. 8L-8P illustrates an embodiment where selection cursor 19212 is placed in text 19202 when the intensity of contact 19208 is further increased. For example, while preview 19216 of selection cursor 19212 is displayed in FIG. 8N, in response to a subsequent increase in the intensity of contact 19208 on touch-sensitive surface 451 shown in FIG. 8N to an intensity above a cursor-insertion intensity threshold (e.g., deep press intensity threshold "$IT_D$") shown in FIG. 8P, selection cursor 19212 is placed in text 19202 at a position on display 450 previously occupied by preview 19216 of selection cursor 19212.

The series of FIGS. 8L-8P illustrates an embodiment where an animation is shown during replacement of preview 19216 of selection cursor 19212 with selection cursor 19212. For example, while preview 19216 of selection cursor 19212 is displayed at size 19216-*a* on display 450 in FIG. 8N, in response to a subsequent increase in the intensity of contact 19208 on touch-sensitive surface 451 shown in FIG. 8N to a greater intensity that is still below the cursor-insertion intensity threshold (e.g., "IT$_D$") shown in FIG. 8O, preview 19216 of selection cursor 19212 is shrunk to size 19216-*b* in FIG. 8O. In response to a further increase in the intensity of contact 19208 on touch-sensitive surface 451 from an intensity below the cursor-insertion intensity threshold (e.g., "IT$_D$") shown in FIG. 8O to an intensity above the cursor-insertion intensity threshold (e.g., "IT$_D$") shown in FIG. 8P, selection cursor 19212 is placed in text 19202 at a position on display 450 previously occupied by preview 19216 of selection cursor 19212, giving the impression that preview 19216 of selection cursor 19212 gradually "drops" into text 19202 in accordance with the increase in intensity of contact 19208 from FIG. 8L to FIG. 8P.

In some embodiments, while the intensity of a contact is between the cursor-preview intensity threshold (e.g., IT$_L$) and the cursor insertion intensity threshold (e.g., IT$_D$), the device responds to movement of the contact (e.g., contact 19208 in FIG. 8O) by repositioning the cursor within displayed text without scrolling the text (e.g., the text is locked in place and movement of the contact moves the cursor relative to the text). For example, in FIG. 8O, if the device detected movement of contact 19208 down and to the right on touch-sensitive surface 451, the device would move the cursor downward and to the right in the text in accordance with the movement of contact 19208 without scrolling the text.

In some embodiments, while the intensity of a contact is between the cursor-preview intensity threshold (e.g., IT$_L$) and the cursor insertion intensity threshold (e.g., IT$_D$), the device responds to movement of the contact (e.g., contact 19208 in FIG. 8O) by scrolling the text without repositioning the cursor within displayed text (e.g., the cursor is locked in place in the text and movement of the contact moves the text and cursor together). For example, in FIG. 8O, if the device detected movement of contact 19208 down and to the right on touch-sensitive surface 451, the device would scroll the text downward and to the right in accordance with the movement of contact 19208 while maintaining the location of the cursor between the words "that" and "all."

In some embodiments, while the intensity of a contact is between the cursor-preview intensity threshold (e.g., IT$_L$) and the cursor insertion intensity threshold (e.g., IT$_D$), the device responds to a component of movement of the contact (e.g., contact 19208 in FIG. 8O) in a first direction (e.g., horizontally left to right) by repositioning the cursor within displayed text in the first direction without scrolling the text in the first direction and the device responds to a component of movement of the contact (e.g., contact 9208 in FIG. 8O) in a second direction that is different from (e.g., perpendicular to) the first direction (e.g., vertically up or down) by scrolling the displayed text in the first direction without repositioning the cursor within the displayed text (e.g., the text is locked in place in a first direction but the cursor can move relative to the text in the first direction and the cursor is locked in place relative to the text in the second direction but the text is not locked in place in the second direction). For example, in FIG. 8O, if the device detected movement of contact 19208 down and to the right on touch-sensitive surface 451, the device would scroll the text downward in accordance with the vertical component of movement of contact 19208 and would move the cursor to the right within the text in accordance with the horizontal component of movement of contact 19208.

The series of FIGS. 8L-8Q illustrates an embodiment where selection of portion 19214 of text 19202 begins where selection cursor 19212 is placed into text 19202. For example, in response to an increase in the intensity of contact 19208 on touch-sensitive surface 451 from an intensity below the cursor-insertion intensity threshold (e.g., "IT$_D$") shown in FIG. 8L to an intensity above the cursor-insertion intensity threshold (e.g., "IT$_D$") shown in FIG. 8P, selection cursor 19212 is placed in text 19202. In accordance with subsequent movement 19210-*a* of contact 19208 from position 19208-*a* in FIG. 8P to position 19208-*b* in FIG. 8Q on touch-sensitive surface 451, portion 19214 of text 19202 is selected starting at the location where selection cursor 19212 was previously placed.

FIGS. 8Q-8U illustrate an example of a beginning of a gesture, including movement 19210-*a* of contact 19208 on touch-sensitive surface 451 from position 19208-*a* to position 19208-*b*, where contact 19208 corresponding to selection cursor 19212 displayed over text 19202 on display 450, has an initial intensity above the selection intensity threshold (e.g., "IT$_D$"), resulting in selection of portion 19214 of text 19202.

FIGS. 8Q-8S illustrate an embodiment where, after selection of portion 19214 of text 19202, a decrease in the intensity of contact 19208 followed by subsequent movement of cursor 19212 results in adjustment of selected portion 19214 of text 19202. For example, in response to a decrease in the intensity of contact 19208 on touch-sensitive surface 451 from an intensity above the selection intensity threshold (e.g., "IT$_D$") shown in FIG. 8Q to an intensity below the selection intensity threshold (e.g., "IT$_D$") but above a selection-adjustment intensity threshold (e.g., light press intensity threshold "IT$_L$") shown in FIG. 8R, in accordance with movement 19210-*c* of contact 19208 from position 19208-*b* in FIG. 8R to position 19208-*c* in FIG. 8S on touch-sensitive surface 451, selection 19214 of text 19202 is adjusted to include additional words. Thus, in some embodiments, even though the intensity of contact 19208 decreases below the selection intensity threshold (e.g., "IT$_D$"), the device continues to select text in accordance with a text selection operation that was initiated when the contact had an intensity above the selection intensity threshold (e.g., "IT$_D$") as long as the contact 19208 has an intensity above the selection-adjustment intensity threshold (e.g., "IT$_L$").

The series of FIGS. 8Q, 8T and 8U illustrate an embodiment where, after selection of portion 19214 of text 19202, a decrease in the intensity of contact 19208 followed by subsequent movement of cursor 19212 does not results in adjustment of selected portion 19214 of text 19202. For example, in response to a decrease in the intensity of contact 19208 on touch-sensitive surface 451 from an intensity above the selection intensity threshold (e.g., "IT$_D$") shown in FIG. 8Q to an intensity below the selection intensity threshold (e.g., "IT$_D$") and below the selection-adjustment intensity threshold (e.g., "IT$_L$") shown in FIG. 8T, in accordance with movement 19210-*c* of contact 19208 from position 19208-*b* in FIG. 8T to position 19208-*c* in FIG. 8U on touch-sensitive surface 451, cursor 19212 moves on display 450, but selection 19214 of text 19202 is not adjusted to include additional words. Thus, in some embodiments, when the intensity of contact 19208 decreases below the selection-adjustment intensity threshold (e.g., "$IT_L$"), the device ceases to select text in accordance with a text selection operation that was initiated when the contact had an intensity above the selection intensity threshold (e.g., "$IT_D$").

The series of FIGS. 8Q, 8V and 8W illustrate an example of a beginning of a gesture where contact 19208 on touch-sensitive surface 451, corresponding to selection cursor 19212 displayed over text 19202 on display 450, has an intensity above the selection intensity threshold (e.g., "$IT_D$"). In accordance with movement of cursor 19212 over text 19202, portion 19214 of text 19202 is selected because contact 19208 has an intensity above the selection intensity threshold (e.g., "$IT_D$").

The series of FIGS. 8Q, 8V and 8W illustrate an embodiment where, while first contact 19208 corresponds to an activated selection cursor 19212 (e.g., movement of contact 19208 would cause text to be selected), a second gesture results in scrolling of text 19202 and continuation of selecting portion 19214 of text 19202. For example, in FIG. 8V, movement of initial contact 19208 on touch-sensitive surface 451, corresponding to selection cursor 19212 on display 450, is stopped and the device detects a gesture including movement 19220 of subsequent contact 19218 on touch sensitive surface 451. In response to detecting movement of contact 19218 in FIGS. 8V-8W, the device scrolls of text 19202 in accordance with movement 19220-a of contact 19218 from position 19218-a in FIG. 8V to position 19218-b in FIG. 8W (e.g., word 19202-58 is scrolled from position 19202-58-a in FIG. 8V to position 19202-58-b in FIG. 8W on display 450). In response, additional text is added to selected portion 19214 of text 19202 in accordance with the movement of the text under the selection cursor 19212 while contact 19208 has an intensity above the selection intensity threshold (e.g., "$IT_D$").

Figure 8X:
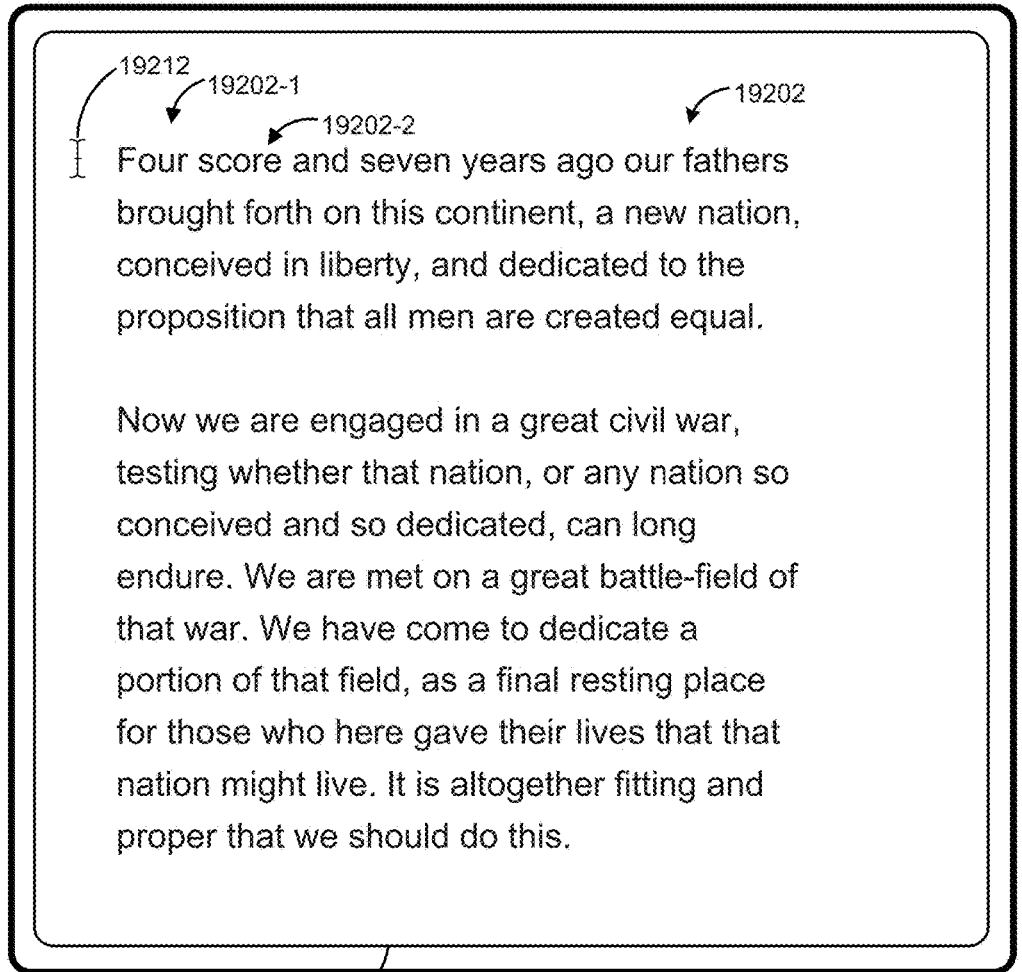
Figure 8X:
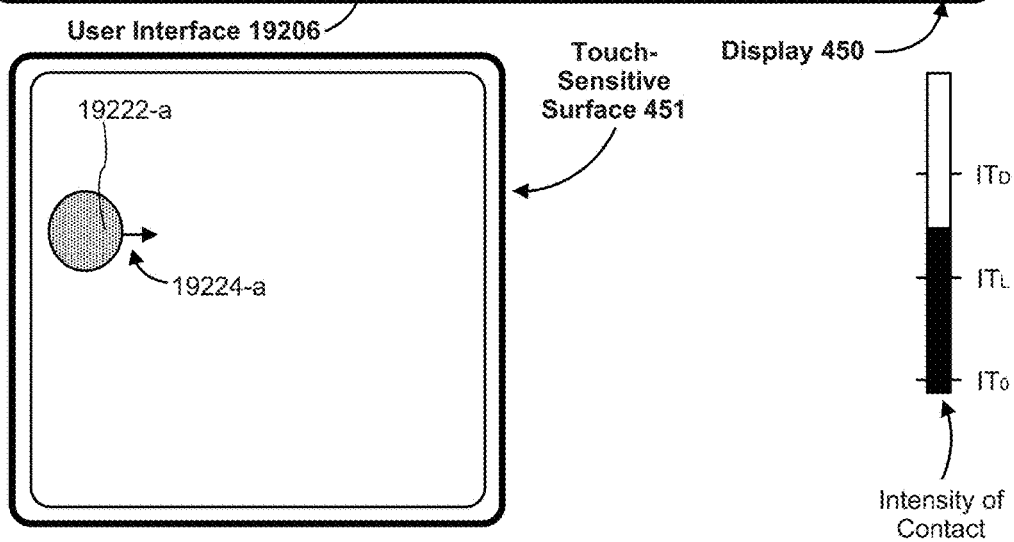

FIGS. 8X-8AA illustrate a contact 19222 that is detected on touch-sensitive surface 451 and corresponds to selection cursor 19212 displayed on display 450. The device detects a gesture including movement 19224 of contact 19222 (e.g., movement 19224-a of contact 19222 from location 19222-a in FIG. 8X to location 19208-b in FIG. 8Y and/or movement 19224-a of contact 19222 from location 19222-a in FIG. 8Z to location 19208-b in FIG. 8AA) are detected on touch-sensitive surface 451. Contact 19222 is detected at a position on touch-sensitive surface 451 corresponding to an area on display 450 occupied by selection cursor 19212 (e.g., contact 19222 corresponds to a focus selector on the display which is at or near a location of text 19202). In some embodiments, movement 19224 of contact 19222 on touch-sensitive surface 451 corresponds to movement of selection cursor 19212 on display 450.

Figure 8Y:
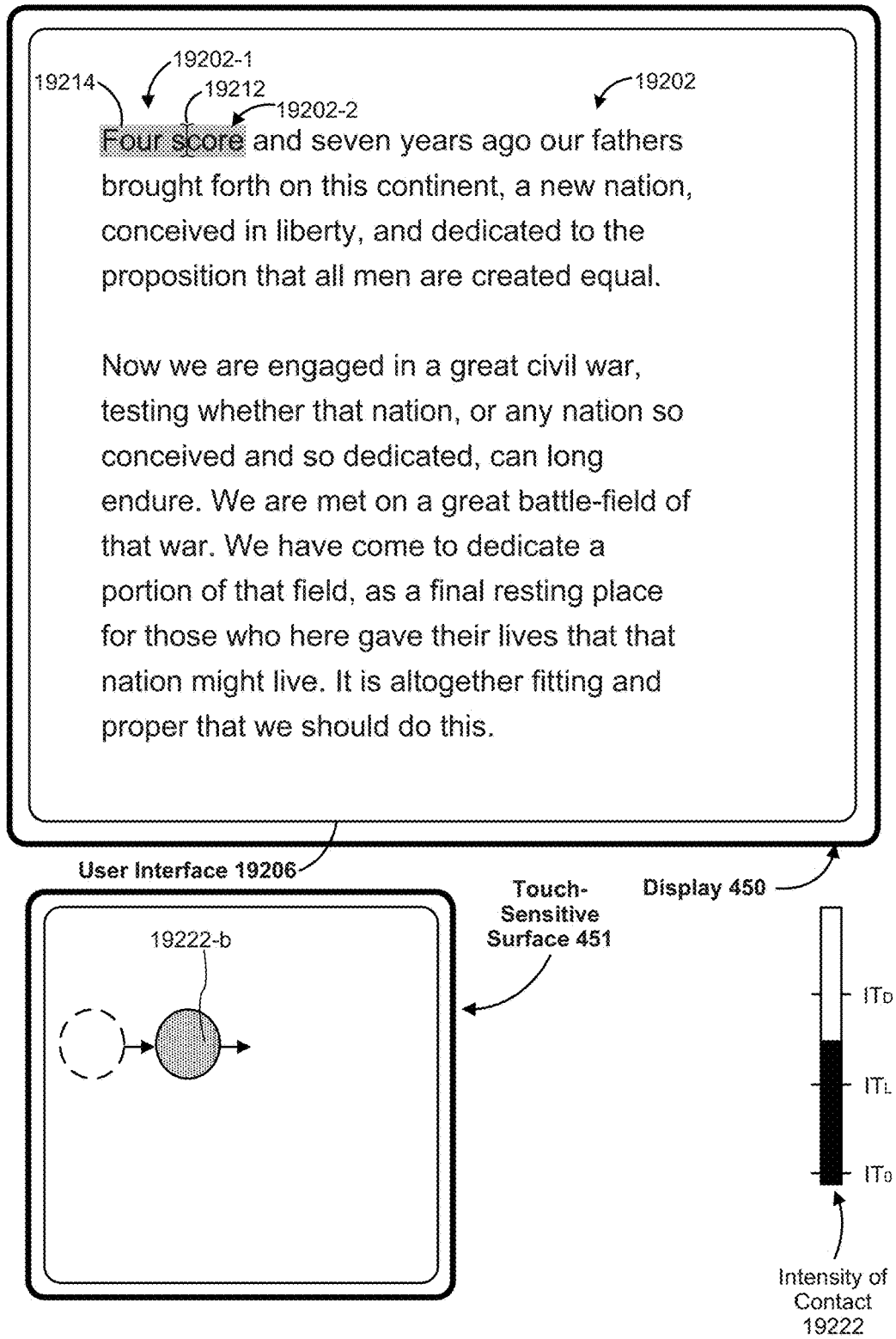

FIGS. 8X-8Y illustrate an example of a beginning of a gesture where contact 19222 that is detected on touch-sensitive surface 451, corresponds to selection cursor 19212 displayed near text 19202 on display 450, and has an intensity below an individual letter-selection intensity threshold (e.g., deep press intensity threshold "$IT_D$"). In accordance with movement 19224 of contact 19222 on touch-sensitive surface 451, portion 19214 of text 19202 is adjusted by adding whole words to the portion. For example, in response to selection cursor 19212 moving over word 19202-2 (e.g., "score"), in accordance with movement 19224-a of contact 19222 from position 19222-a in FIG. 8X to position 19222-b in FIG. 8Y on touch-sensitive surface 451, selected portion 19214 of text 19202 is adjusted by the addition of the entire word 19202-2 (e.g., "score") because contact 19222 has an intensity below the individual letter-selection intensity threshold (e.g., "$IT_D$").

Figure 8Z:
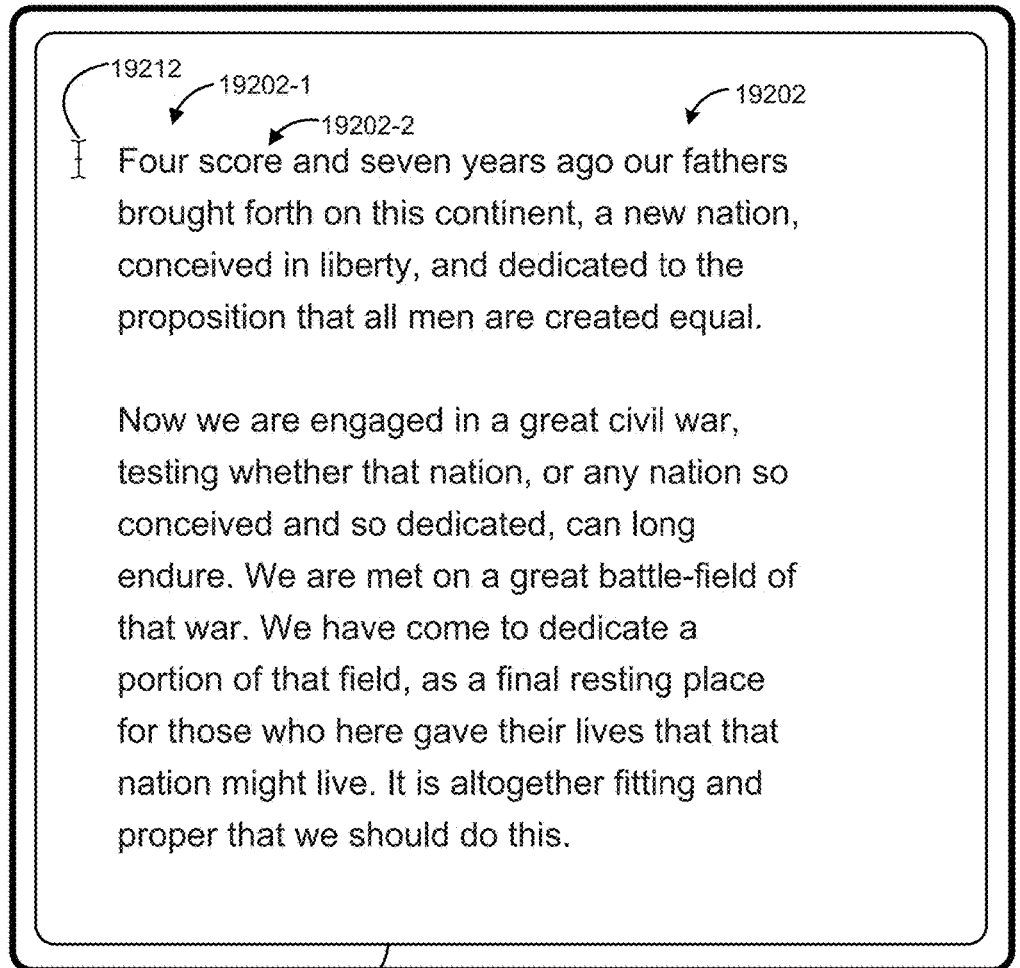
Figure 8Z:
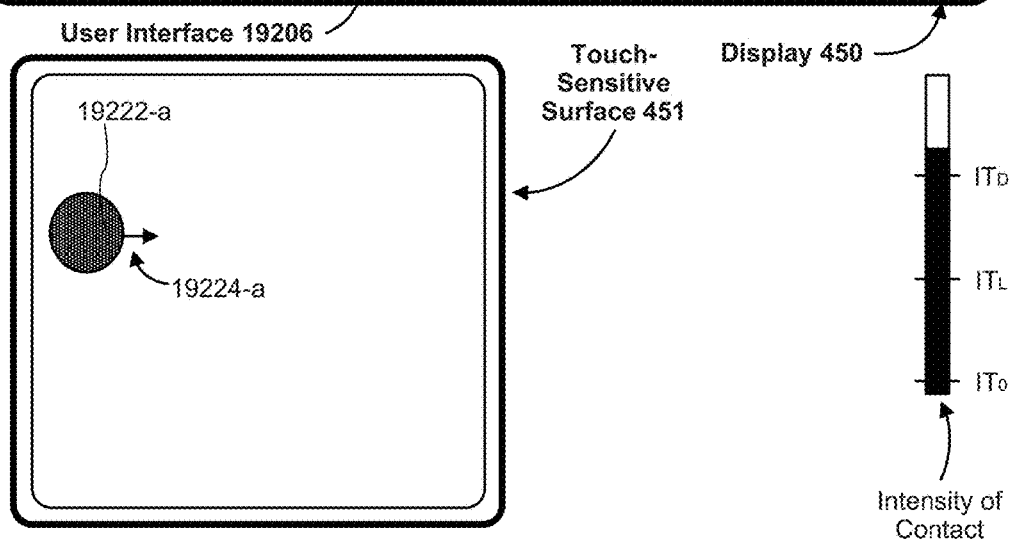
Figure 8A:
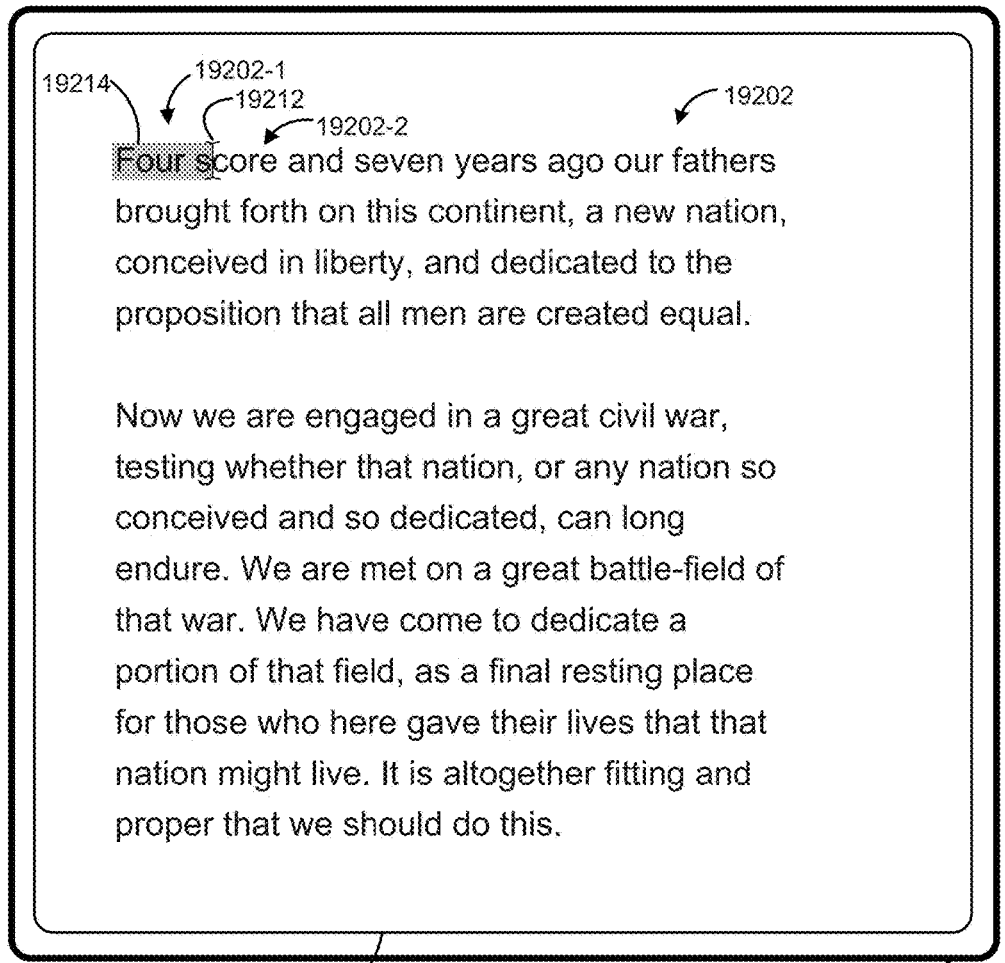
Figure 8A:
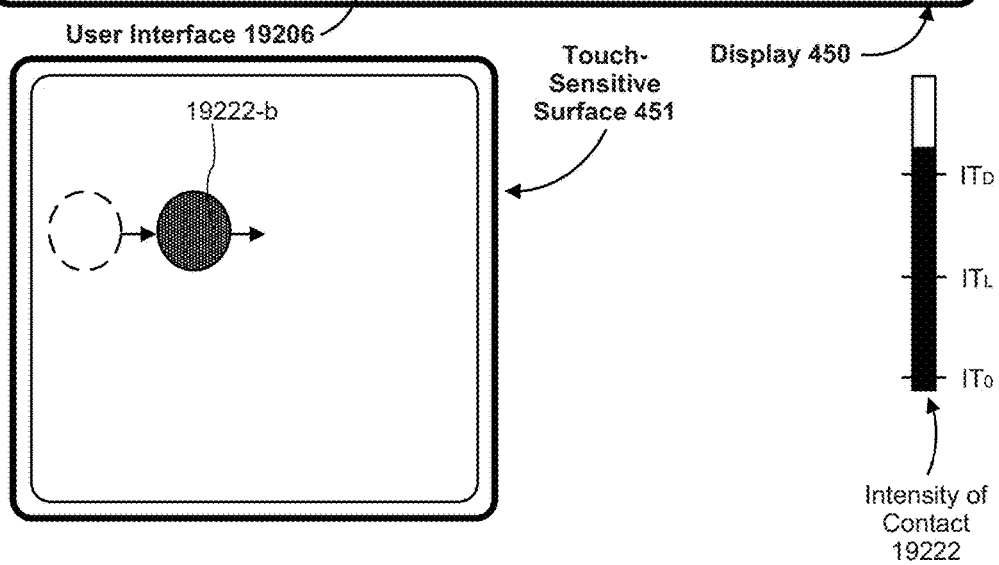
Figure 9A:
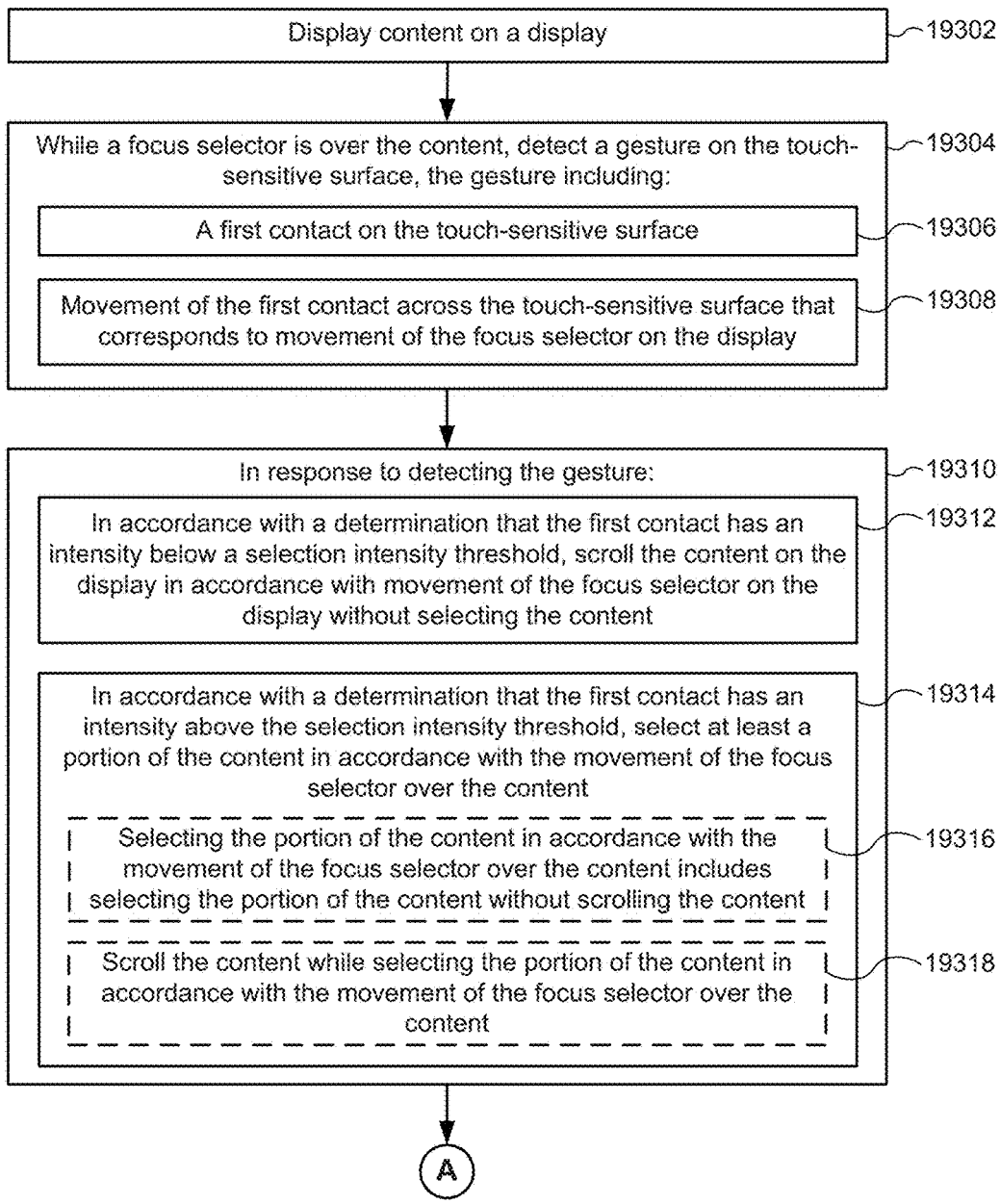
FIGS. 9A-9E are flow diagrams illustrating a method of determining whether to scroll or select content in accordance with some embodiments.
Figure 9B:
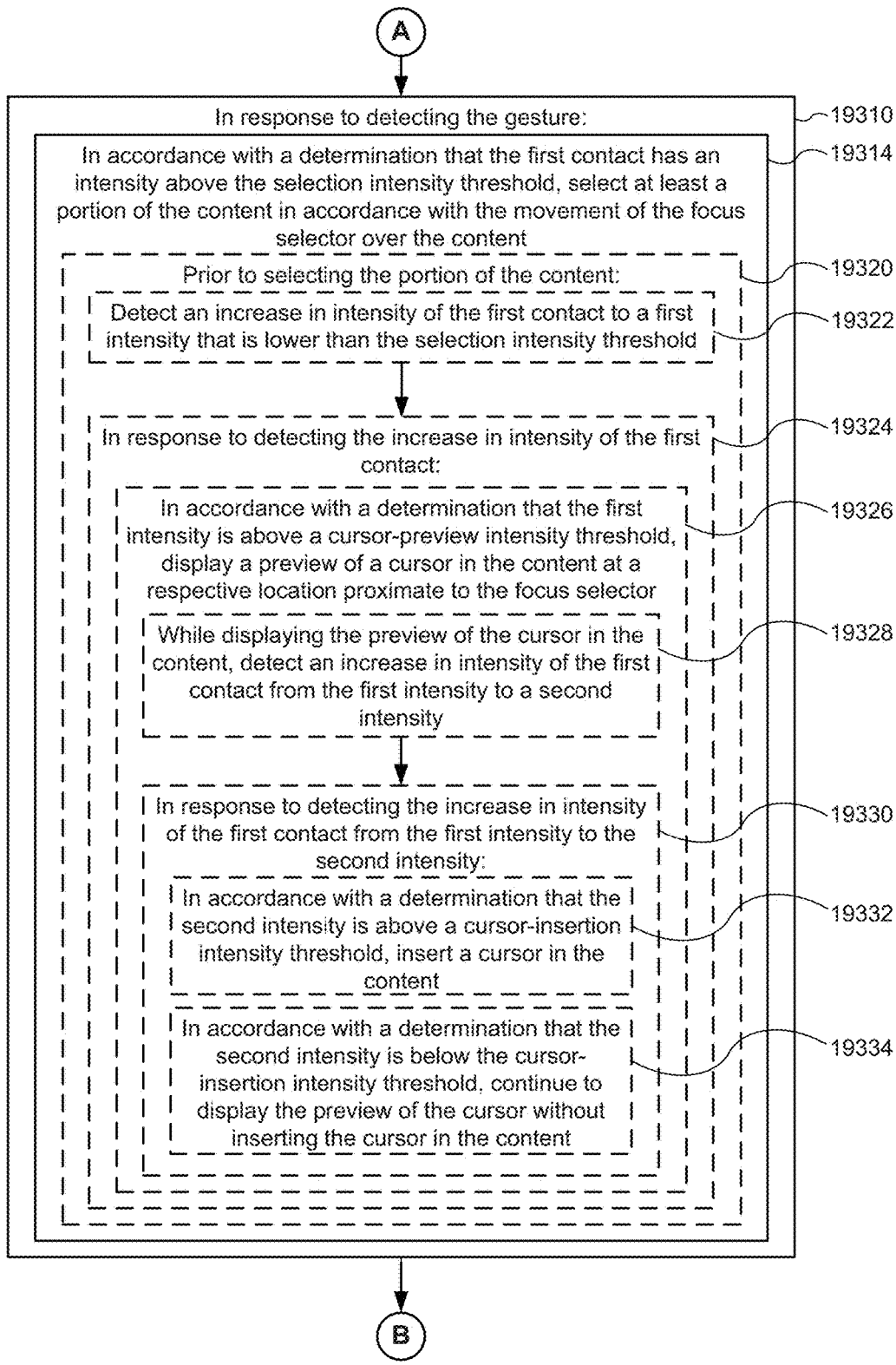
Figure 9C:
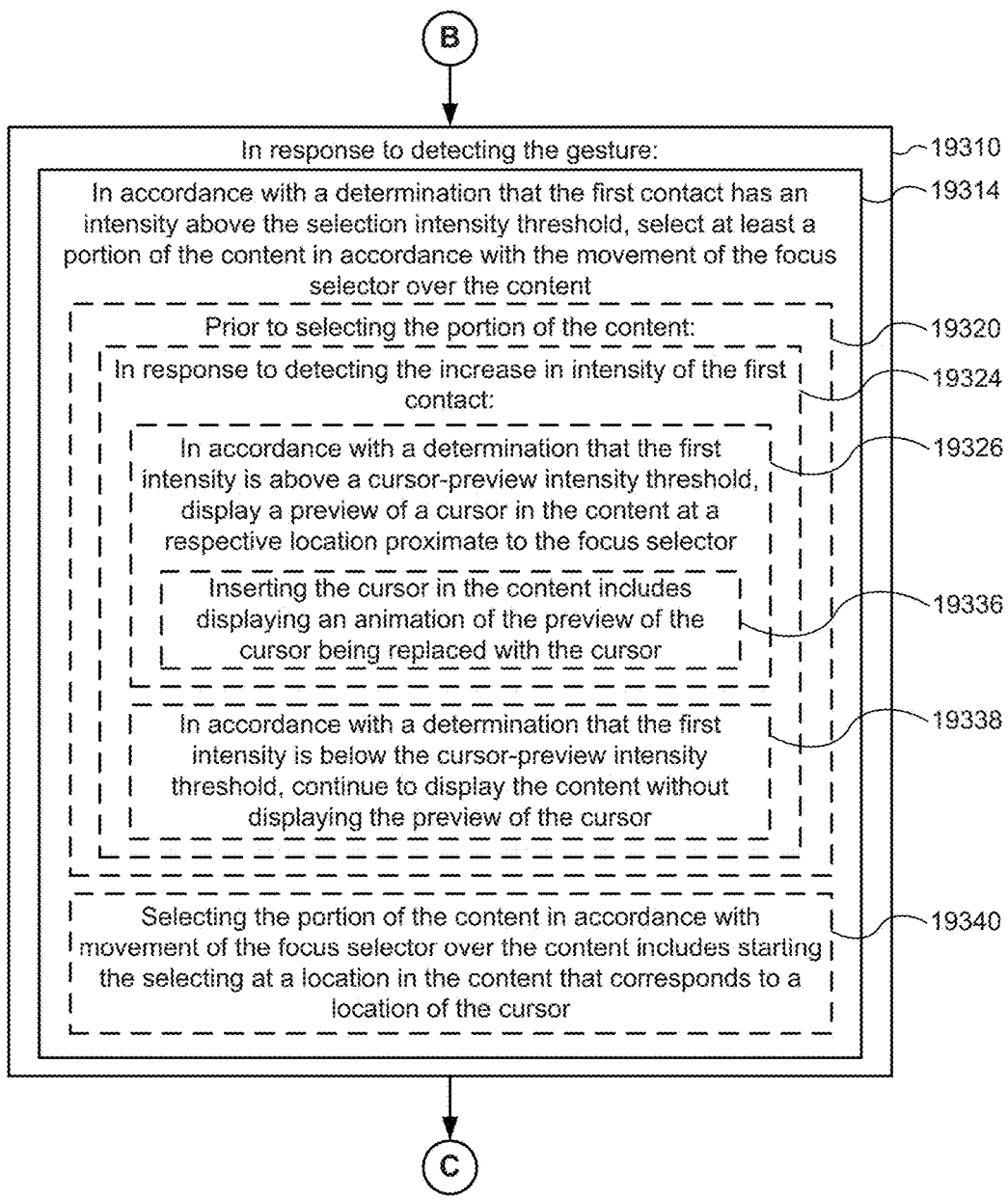
Figure 9D:
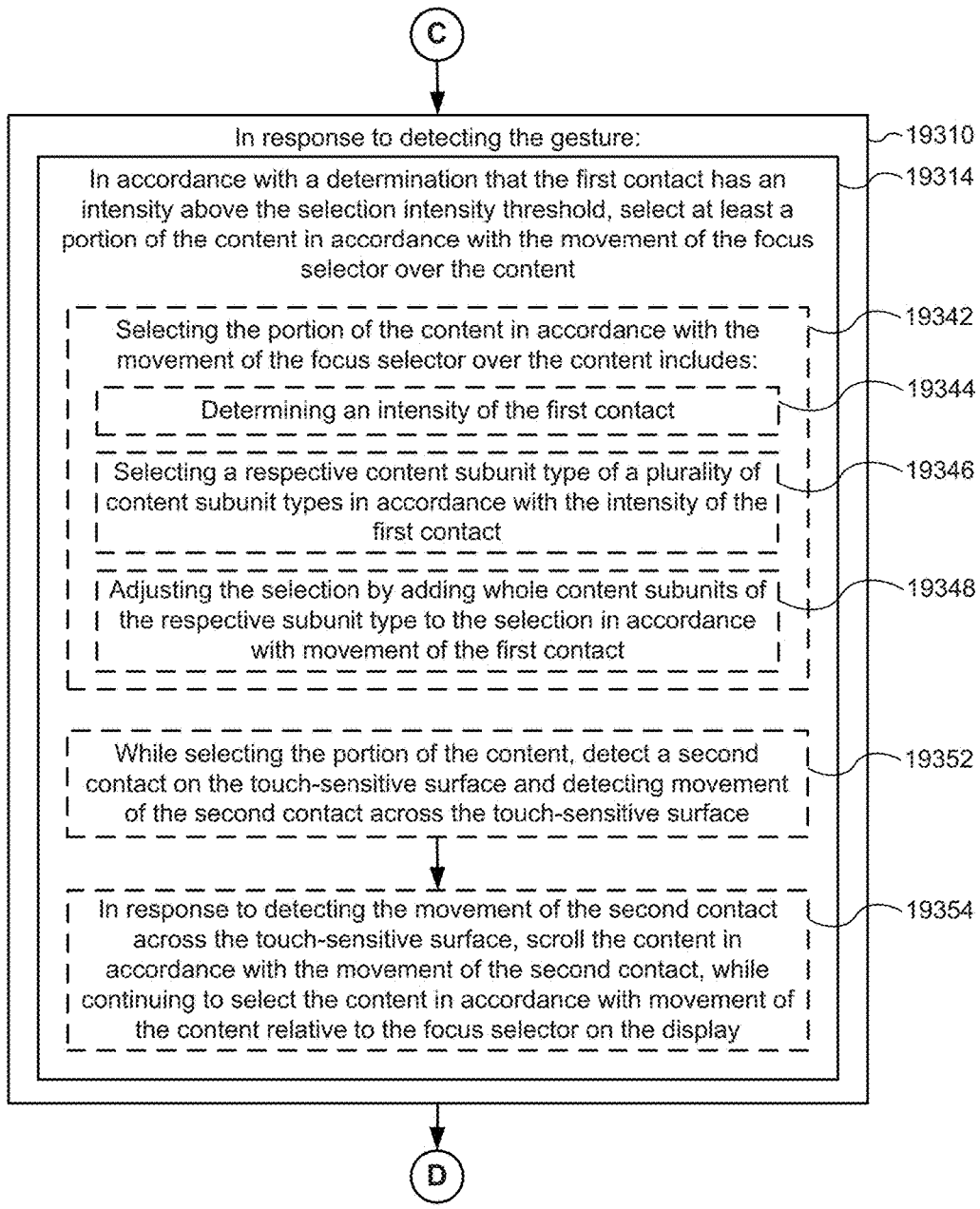
Figure 9E:
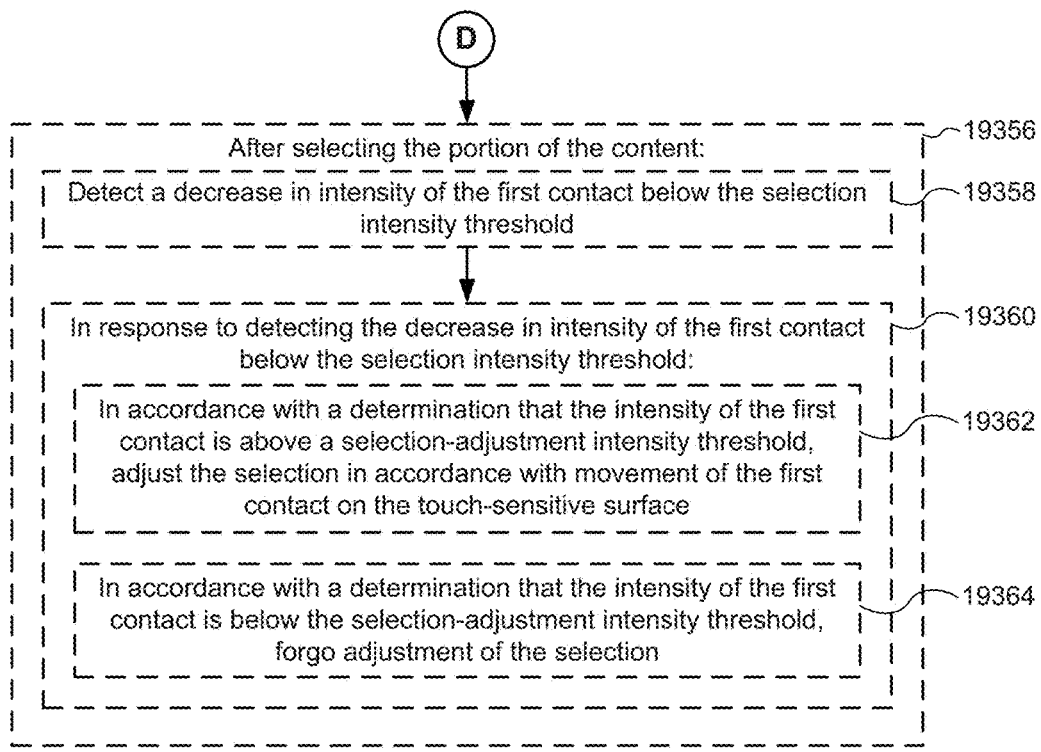

FIGS. 8Z-8AA illustrate an example of a beginning of a gesture where contact 19222 that is detected on touch-sensitive surface 451, corresponds to selection cursor 19212 displayed near text 19202 on display 450, and has an intensity above the individual letter-selection intensity threshold (e.g., "$IT_D$"). In accordance with movement 19224 of contact 19222 on touch-sensitive surface 451, portion 19214 of text 19202 is adjusted by adding individual letters to the portion. For example, in response to selection cursor 19212 moving over the letter "s" in word 19202-2 (e.g., "score"), in accordance with movement 19224-a of contact 19222 from position 19222-a in FIG. 8Z to position 19222-b in FIG. 8AA on touch-sensitive surface 451, selected portion 19214 of text 19202 is adjusted by the addition of only the letter "s" of word 19202-2 (e.g., "score") because contact 19222 has an intensity above the individual letter-selection intensity threshold (e.g., "$IT_D$").

FIGS. 9A-9E are flow diagrams illustrating a method 19300 of determining whether to scroll or select content in accordance with some embodiments. The method 19300 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 19300 are, optionally, combined and/or the order of some operations is, optionally, changed.

As described below, the method 19300 provides an intuitive way to interact with user interface content. The method reduces the cognitive burden on a user when interacting with user interface content, thereby creating a more efficient human-machine interface. For battery-operated electronic devices, enabling a user to interact with user interface content faster and more efficiently conserves power and increases the time between battery charges.

In some embodiments, the device displays (19302) content (e.g. text 19202 in FIGS. 8A-8AA) on a display (e.g., display 450). In some embodiments, the content includes text, one or more images and/or more or more tables. In some embodiments, the content is selectable content that is configured to be selected and once selected can be copied, deleted or modified in accordance with input from a user of the device (e.g., text in a word processing application window, numbers in a spreadsheet application window, document icons in a folder application window, images in photography application window, music file icons in an audio player application window, video file icons in a video player application window, application shortcut icons displayed on a desktop).

In some embodiments, while a focus selector (e.g., focus cursor 19204 in FIGS. 8A-8D, and 8L-8M or selection cursor 19212 in FIGS. 8E-8K, and 8P-8AA) is over the content, the device detects (19304) a gesture on a touch-sensitive surface (e.g., touch-sensitive surface 451), the gesture including a first contact (e.g., contact 19208 in FIGS. 8A-8W or contact 19222 in FIGS. 8X-8AA) on (19306) the touch-sensitive surface and movement (e.g., movement 19210 of contact 19208 in FIGS. 8A-8W or movement 19224 of contact 19222 in FIGS. 8X-8AA) of the first contact across (19308) the touch-sensitive surface that corresponds to movement of the focus selector on the display (e.g., movement of the focus selector over at least a portion of the content.

In some embodiments, in response (19310) to detecting the gesture: in accordance with a determination that the first contact has an intensity below a selection intensity threshold (e.g., "$IT_D$" in FIGS. 8A-8D), the device scrolls (19312) the content on the display (e.g., display 450) in accordance with movement of the focus selector on the display without selecting the content. In some embodiments, the selection intensity threshold is an intensity threshold that is higher than an input-detection intensity threshold (e.g., "$IT_0$") at which the first contact is initially detected. In some embodiments, scrolling the content in accordance with movement of the focus selector includes scrolling the content so that it moves in a same direction as movement of the focus selector on the display (e.g., display 450) and/or movement of the contact on the touch-sensitive surface (e.g., touch-sensitive surface 451), as shown in FIGS. 8A and 8C. In some embodiments, scrolling the content in accordance with movement of the focus selector includes scrolling the content so that it moves in an opposite direction from movement of the focus selector on the display (e.g., display 450) and/or movement of the contact on the touch-sensitive surface (e.g., touch-sensitive surface 451), as shown in FIGS. 8A-8B.

In response (19310) to detecting the gesture: in accordance with a determination that the first contact has an intensity above the selection intensity threshold (e.g., contact 19208 has an intensity above "$IT_D$," as shown in FIGS. 8E-8K, 8Q and 8V-8W), the device selects (19314) at least a portion (e.g., portion 19214 in FIGS. 8F-8K, 8Q-8W, 8Y and 8AA) of the content (e.g., text 19202 in FIGS. 8A-8AA) in accordance with the movement of the focus selector over the content (e.g., selecting a portion of the content for cutting, copying, or other editing).

In some embodiments, selecting the portion (e.g., portion 19214) of the content (e.g., text 19202) in accordance with the movement of the focus selector (e.g., selection cursor 19212) over the content includes selecting (19316) the portion of the content without scrolling the content. For example, when the contact reaches the selection intensity threshold (e.g., "$IT_D$"), the device stops scrolling the content in accordance with movement of the focus selector and begins selecting content in accordance with movement of the focus selector, as shown in FIGS. 8F-8G.

In some embodiments, the device scrolls (19318) the content (e.g., text 19202) while selecting the portion (e.g., portion 19214 of text 19202) of the content in accordance with the movement of the focus selector (e.g., selection cursor 19212) over the content. For example, even if the device stopped scrolling the content when the contact reached the selection intensity threshold, when the focus selector reaches an edge of a displayed portion of the content or the first contact reaches an edge of the touch-sensitive surface, the device scrolls the content so that additional content is displayed proximate to the first contact (e.g., by scrolling the content up if the first contact is near a bottom edge of the displayed content or scrolling the content down if the first contact is near a top edge of the displayed content), as shown in FIGS. 8G-8H.

In some embodiments, prior (19320) to detecting the contact, the device detects (19322) an increase in intensity of the first contact to a first intensity that is lower than the selection intensity threshold (e.g., an intensity that is lower than intensity threshold "$IT_D$," as illustrated in FIGS. 8M-8O). In some embodiments, the intensity of the first contact increases to the first intensity from a nominal intensity that corresponds to a minimum detectable intensity (e.g., "$IT_0$") that, when exceeded, indicates that a first contact is in contact with the touch-sensitive surface. In some embodiments, in response (19324) to detecting the increase in intensity of the first contact to the intensity below the selection intensity threshold (e.g., "$IT_D$"): in accordance with a determination that the first intensity is above a cursor-preview intensity threshold (e.g. "$IT_L$"), the device displays (19326) a preview of a cursor (e.g., preview 19216 of selection cursor 19212 in FIGS. 8N-8O) in the content (e.g., text 19202) at a respective location proximate to the focus selector (e.g., focus cursor 19204 in FIG. 8L). In some embodiments, the focus selector (e.g., focus cursor 19204 in FIG. 8L) is replaced by the preview of a cursor (e.g., preview 19216 of selection cursor 19212 replaces focus cursor 19204 in FIGS. 8N-8O).

In some embodiments, while displaying the preview of the cursor (e.g., preview 19216 of selection cursor 19212) in the content, the device detects (19328) an increase in intensity of the first contact (e.g., contact 19208 or contact 19222) from the first intensity (e.g., an intensity between "$IT_L$" and "$IT_D$") to a second intensity (e.g., an intensity above "$IT_D$"). In some embodiments, in response (19330) to detecting the increase in intensity of the first contact from the first intensity to the second intensity: in accordance with a determination that the second intensity is above a cursor-insertion intensity threshold (e.g. "$IT_D$"), the device inserts (19332) a cursor (e.g., selection cursor 19212) in the content (e.g., as illustrated in FIG. 8P). In some embodiments, in response (19330) to detecting the increase in intensity of the first contact from the first intensity to the second intensity: in accordance with a determination that the second intensity is below the cursor-insertion intensity threshold (e.g. "$IT_D$"), the device continues (19334) to display the preview of the cursor without inserting the cursor in the content (e.g., as illustrated in FIG. 8O)

In some embodiments, inserting the cursor (e.g., selection cursor 19212) in the content includes (19336) displaying an animation of the preview of the cursor (e.g., preview 19216 of selection cursor 19212) being replaced with the cursor. In some embodiments, the animation progresses in accordance with a change in intensity of the first contact. For example, the cursor fades in and shrinks in size, appearing to "drop" into the content at a rate by an amount corresponding to the intensity of the first contact. For example in FIGS. 8N-8P, the device displays an animation of preview 19216 gradually dropping into text 19202 as the intensity of contact 19208 increases.

In response (19324) to detecting the increase in intensity of the first contact: in accordance with a determination that the first intensity is below the cursor-preview intensity threshold (e.g., "$IT_L$"), the device continues (19338) to display the content (e.g., text 19202) without displaying the preview of the cursor (e.g., as illustrated in FIG. 8M).

In some embodiments, selecting the portion of the content (e.g., portion 19214 of text 19202) in accordance with movement of the focus selector (e.g., selection cursor 19212) over the content includes (19340) starting the selecting at a location in the content that corresponds to a location of the cursor. For example, in FIG. 8P-8Q, selection of portion 19214 of text 19202 starts at the location of selection cursor 19212 that was placed in text 19202 in response to the increase in intensity described above with reference to FIGS. 8L-8O.

In some embodiments, selecting (19314) the portion of the content in accordance with the movement of the focus selector over the content includes (19342): determining (19344) an intensity of the first contact, selecting (19346) a respective content subunit type of a plurality of content subunit types (e.g., characters, words, sentences or paragraphs) in accordance with the intensity of the first contact and adjusting (19348) the selection by adding whole content subunits of the respective subunit type to the selection in accordance with movement of the first contact. For example, when the contact has a lower intensity (e.g., an intensity below "$IT_D$," as illustrated in FIGS. 8X-8Y), the word type subunits are selected and the device adds to the selection by selecting whole words of the content, whereas when the contact has a higher intensity (e.g., an intensity above "$IT_D$," as illustrated in FIGS. 8Z-8AA), the character type subunits are selected and the device adds to the selection by selecting individual characters of the content, or vice versa.

In some embodiments, while selecting (19314) the portion of the content (e.g., portion 19214 of text 19202), the device detects (19352) a second contact (e.g., contact 19218 in FIGS. 8V-8W) on the touch-sensitive surface and the device detects movement (e.g., movement 19220-*a* in FIGS. 8V-8W) of the second contact across the touch-sensitive surface (e.g., touch-sensitive surface 451). In some embodiments, in response to detecting the movement of the second contact (e.g., contact 19218 in FIGS. 8V-8W) across the touch-sensitive surface, the device scrolls (19354) the content in accordance with the movement of the second contact (e.g., movement 19220-*a* of contact 19218 in FIGS. 8V-8W), while continuing to select the content in accordance with movement of the content relative to the focus selector on the display. For example, as shown in FIG. 8W, the device continues to add to selection 19214 as content 19202 scrolls under selection cursor 19212.

In some embodiments, after (19356) selecting the portion of the content: the device detects (19358) a decrease in intensity of the first contact (e.g., contact 19208 or contact 19222) below the selection intensity threshold (e.g., "$IT_D$"). For example in both FIG. 8R and FIG. 8T, contact 19208 decreases in intensity from an intensity above the selection intensity threshold (e.g., "$IT_D$") to an intensity below the selection intensity threshold (e.g., "$IT_D$"). In some embodiments, in response (19360) to detecting the decrease in intensity of the first contact below the selection intensity threshold (e.g., "$IT_D$"): in accordance with a determination that the intensity of the first contact is above a selection-adjustment intensity threshold (e.g., "$IT_L$"), the device adjusts (19362) the selection (e.g., by adding and/or removing content from the selection) in accordance with subsequent movement of the first contact (e.g., contact 19208 or contact 19222) on the touch-sensitive surface (e.g., as illustrated in FIGS. 8R-8S). In contrast, in some embodiments, in response (19360) to detecting the decrease in intensity of the first contact below the selection intensity threshold: in accordance with a determination that the intensity of the first contact is below the selection-adjustment intensity threshold (e.g., "$IT_L$"), the device forgoes (19364) adjustment of the selection (e.g., as illustrated in FIGS. 8T-8U). In some embodiments, ceasing to adjust the selection includes cancelling the selection. In some embodiments, ceasing to adjust the selection includes displaying an indication of the content that is selected and ceasing to adjust the content in accordance with movement of the first contact on the touch-sensitive surface (e.g., displaying a selection box around content, where the selection box is no longer adjusted in accordance with movement of the first contact).

It should be understood that the particular order in which the operations in FIGS. 9A-9E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 19300 described above with respect to FIGS. 9A-9E. For example, the contacts, gestures, user interface objects, intensity thresholds, focus selectors and animations described above with reference to method 19300 optionally have one or more of the characteristics of the contacts, gestures, user interface objects, intensity thresholds, focus selectors and animations described herein with reference to other methods described herein (e.g., those listed in the fifth paragraph of the Description of Embodiments). For brevity, these details are not repeated here.

Figure 10:
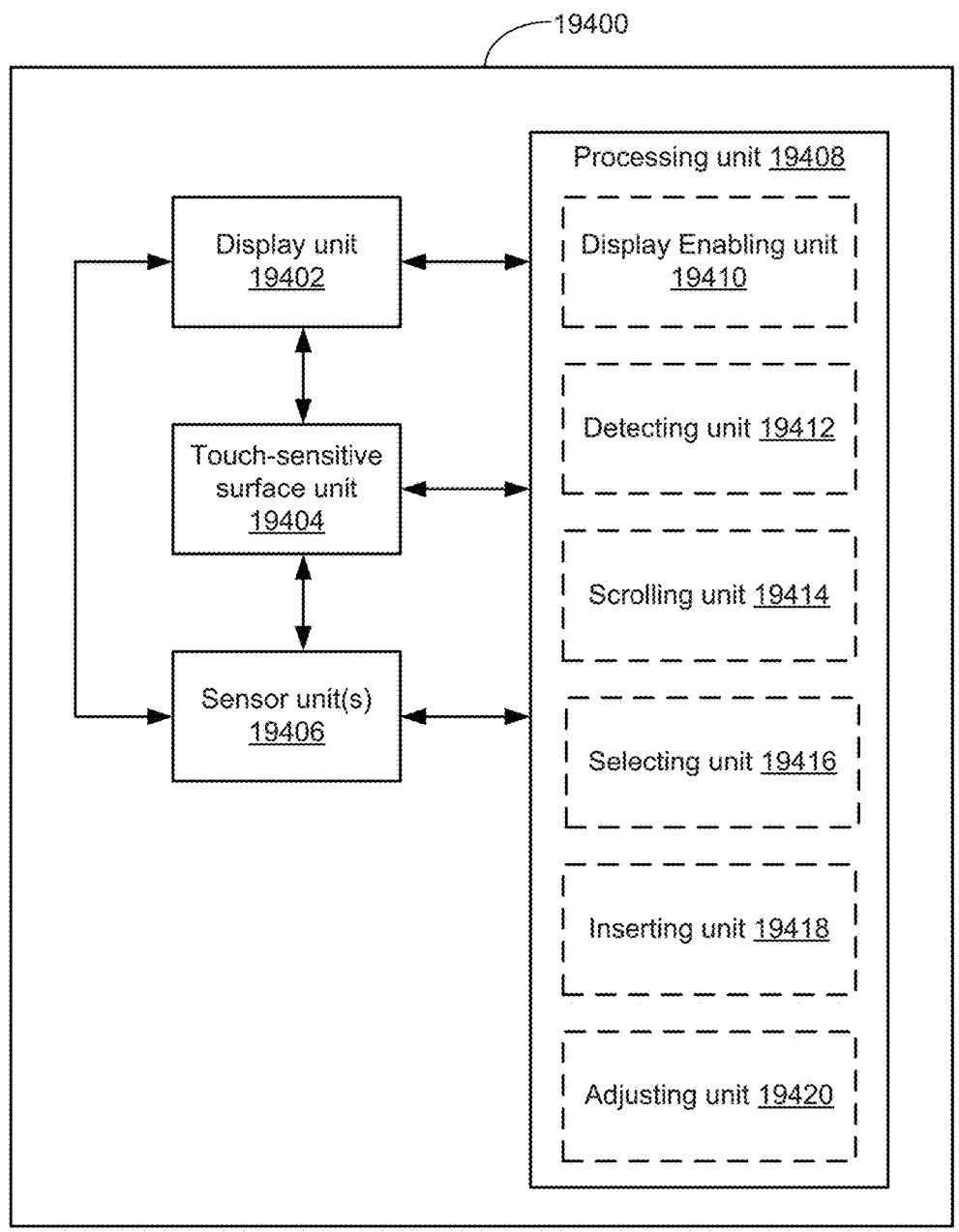
FIG. 10 is a functional block diagram of an electronic device in accordance with some embodiments.

In accordance with some embodiments, FIG. 10 shows a functional block diagram of an electronic device 19400 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, an electronic device 19400 includes a display unit 19402 configured to display content, a touch-sensitive surface unit 19404 configured to receive user contacts, one or more sensor units 19406 configured to detect intensity of contacts with the touch-sensitive surface unit 19404; and a processing unit 19408 coupled to the display unit 19402, the touch-sensitive surface unit 19404 and the one or more sensor units 19406. In some embodiments, the processing unit 19408 includes a display enabling unit 19410, a detecting unit 19412, a scrolling unit 19414, a selecting unit 19416, an inserting unit 19418 and an adjusting unit 19420.

In some embodiments, the processing unit 19408 is configured to enable display (e.g., with the display enabling unit 19410) of content on display unit 19402. In some embodiments, the processing unit 19408 is further configured, while a focus selector is over the content, to detect a gesture on the touch-sensitive surface unit 19404 (e.g., with the detecting unit 19412), the gesture including: a first contact on the touch-sensitive surface unit 19404; and movement of the first contact across the touch-sensitive surface unit 19404 that corresponds to movement of the focus selector on the display unit 19402; and in response to detecting the gesture: in accordance with a determination that the first contact has an intensity below a selection intensity threshold, the processing unit 19408 is configured to scroll the content on the display unit 19402 (e.g., with scrolling unit 19414) in accordance with movement of the focus selector on the display unit 19402 without selecting the content; and in accordance with a determination that the first contact has an intensity above the selection intensity threshold, the processing unit 19408 is configured to select at least a portion of the content (e.g., with the selecting unit 19416) in accordance with the movement of the focus selector over the content.

In some embodiments, the processing unit 19408 is configured to select the portion of the content (e.g., with the selecting unit 19416) without scrolling the content.

In some embodiments, the processing unit 19408 is configured to scroll the content (e.g., with the scrolling unit 19414) while selecting the portion of the content (e.g., with the selecting unit 19416) in accordance with the movement of the focus selector over the content.

In some embodiments, the processing unit 19408 is configured to, prior to selecting the portion of the content (e.g., with the selecting unit 19416), detect an increase in intensity of the first contact (e.g., with the detecting unit 19412) to a first intensity that is lower than the selection intensity threshold; and in response to detecting the increase in intensity of the first contact: in accordance with a determination that the first intensity is above a cursor-preview intensity threshold, the processing unit 19408 is configured to enable display of a preview of a cursor in the content at a respective location proximate to the focus selector (e.g., with the display enabling unit 19410); and in accordance with a determination that the first intensity is below the cursor-preview intensity threshold, the processing unit 19408 is configured to continue to enable display of the content without displaying the preview of the cursor (e.g., with the display enabling unit 19410).

In some embodiments, the processing unit 19408 is configured to, while displaying the preview of the cursor in the content (e.g., with the display enabling unit 19410), to detect an increase in intensity of the first contact from the first intensity to a second intensity (e.g., with the detecting unit 19412); and in response to detecting the increase in intensity of the first contact from the first intensity to the second intensity: in accordance with a determination that the second intensity is above a cursor-insertion intensity threshold, insert a cursor in the content (e.g., with the inserting unit 19418); and in accordance with a determination that the second intensity is below the cursor-insertion intensity threshold, continue to enable display of the preview of the cursor (e.g., with the display enabling unit 19410) without inserting the cursor in the content.

In some embodiments, the processing unit 19408 is configured to, while inserting the cursor in the content (e.g., with the inserting unit 19418), enable display of an animation of the preview of the cursor being replaced with the cursor (e.g., with the display enabling unit 19410).

In some embodiments, the processing unit 19408 is configured to start the selecting the portion of the content (e.g., with selecting unit 19416) at a location in the content that corresponds to a location of the cursor.

In some embodiments, the processing unit 19408 is configured to, after selecting the portion of the content (e.g., with selecting unit 19416), detect a decrease in intensity of the first contact below the selection intensity threshold (e.g., with the detecting unit 19412); and in response to detecting the decrease in intensity of the first contact below the selection intensity threshold: in accordance with a determination that the intensity of the first contact is above a selection-adjustment intensity threshold, the processing unit 19408 is configured to adjust the selection (e.g., with the adjusting unit 19420) in accordance with movement of the first contact on the touch-sensitive surface unit; and in accordance with a determination that the intensity of the first contact is below the selection-adjustment intensity threshold, the processing unit 19408 is configured to forgo adjustment of the selection.

In some embodiments, the processing unit is configured to, while selecting the portion of the content, detect a second contact on the touch-sensitive surface unit 19404 (e.g., with the detecting unit 19412) and detect movement of the second contact across the touch-sensitive surface unit 19404 (e.g., with the detecting unit 19412); and in response to detecting the movement of the second contact across the touch-sensitive surface unit 19404, the processing unit is configured to scroll the content (e.g., with the scrolling unit 19414) in accordance with the movement of the second contact, while continuing to select the content (e.g., with the selecting unit 19416) in accordance with movement of the content relative to the focus selector on the display unit 19402.

In some embodiments, the processing unit 19408 is configured to: determine an intensity of the first contact (e.g., with sensor(s) 19406); select a respective content subunit type of a plurality of content subunit types in accordance with the intensity of the first contact (e.g., with the selecting unit (19416); and adjust the selection by adding whole content subunits of the respective subunit type to the selection (e.g., with the adjusting unit 19420) in accordance with movement of the first contact.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 9A-9E are, optionally, implemented by components depicted in FIGS. 1A-1B or FIG. 10. For example, detection operations 19304, 19322, 19328, 19352 and 19358, scrolling operations 19312, 19318 and 19354, selecting operations 19314 and 19346, inserting operation 19332, and adjusting operations 19348 and 19362 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Determining Whether to Scroll or Enlarge Content

Many electronic devices have graphical user interfaces that display content (e.g., text, images, tables, document icons and/or application shortcut icons) upon which multiple operations are, optionally, performed with the same type of gesture. For example, a word processing application window, optionally, displays editable text that is, optionally, scrolled and/or magnified by a user moving a contact, e.g., on a touch sensitive surface. When this gesture overloading happens within the same application, the different operations (e.g., scrolling and magnifying) are, in some circumstances, associated with different modes of operation. Given the complexity of a user interface environment where a single gesture, optionally, corresponds to multiple operations, there is a need to provide methods and user interfaces that enable the user to more efficiently and conveniently navigate through the user interface environment.

The embodiments described below provide improved methods and user interfaces for interacting with user interface content when navigating a complex user interface environment. More specifically, these methods and user interfaces simplify the process of switching between content scrolling and magnifying modes of operation. According to some embodiments described below, a content scrolling and/or magnifying mode of operation is initiated upon the detection of a gesture including a contact on a touch-sensitive surface and movement of the contact across the touch-sensitive surface corresponding to movement of a focus selector over the content. The user controls whether the gesture initiates the content scrolling and/or magnifying mode of operation through the intensity of the contact. For example, in one embodiment, a user presses down lightly (e.g., with a light press intensity) on the touch-sensitive surface to initiate a scrolling mode of operation and presses down heavily (e.g., with a deep press intensity) on the touch-sensitive surface to initiate a magnifying mode of operation, or vice versa. In some methods, the user switches modes of operation, for example, by selecting a different mode from a menu of options or making a second contact in addition to the gesture for activating the operation. Advantageously, the methods and user interfaces described below simplify the process of switching between modes of operation associated with a same gesture (e.g., scrolling and/or magnifying text) by eliminating the need for additional inputs, such as going through a menu or making an additional contact.

FIGS. 11A-11Y illustrate exemplary user interfaces for determining whether to scroll or enlarge content in accordance with some embodiments. The user interfaces in these figures are used to illustrate the processes described below, including the processes in FIGS. 12A-12C. FIGS. 11A-11Y include intensity diagrams that show the current intensity of the contact on the touch-sensitive surface relative to a plurality of intensity thresholds including a magnification intensity threshold (e.g., light press intensity threshold "$IT_L$") and a cursor-insertion intensity threshold (e.g., deep press intensity threshold "$IT_D$"). These intensity diagrams are typically not part of the displayed user interface, but are provided to aid in the interpretation of the figures.

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 11A-11Y and FIGS. 12A-12C will be discussed with reference to display 450 and a separate touch-sensitive surface 451, however analogous operations are, optionally, performed on a device with a touch-sensitive display system 112 in response to detecting the contacts described in FIGS. 11A-11Y on the touch-sensitive display system 112 while displaying the user interfaces shown in FIGS. 11A-11Y on the touch-sensitive display system 112; in such embodiments, the focus selector is, optionally: a respective contact, a representative point corresponding to a contact (e.g., a centroid of a respective contact or a point associated with a respective contact), or a centroid of two or more contacts detected on the touch-sensitive display system 112, in place of focus cursor 19504 or editing cursor 19512.

FIG. 11A illustrates exemplary user interface 19506 displaying text 19502 and cursor 19504. In FIG. 11A, user interface 19506 is displayed on display 450 of an electronic device that also includes touch-sensitive surface 451 and one or more sensors for detecting intensity of contacts with touch-sensitive surface. In some embodiments, touch-sensitive surface 451 is a touch screen display that is optionally display 450 or a separate display.

FIGS. 11A-11Y illustrate various embodiments where cursor 19504, controlled by contact 19508 on touch-sensitive surface 451 and movement 19510 thereof, moves over at least a portion of text 19502. In response, depending on the intensity of contact 19508 detected on touch-sensitive surface 451, at least a portion of text 19502 is scrolled and/or magnified. For example, when the intensity of contact 19508 exceeds a magnification intensity threshold (e.g., light press intensity threshold "$IT_L$"), the portion of text 19502 is magnified (e.g., a magnification loupe that includes an enlarged copy the portion of text 19502 is displayed). In contrast, when the intensity of contact 19508 does not exceed the magnification intensity threshold (e.g., "$IT_L$"), text 19502 is scrolled without magnifying the portion of text 19502.

Figure 11B:
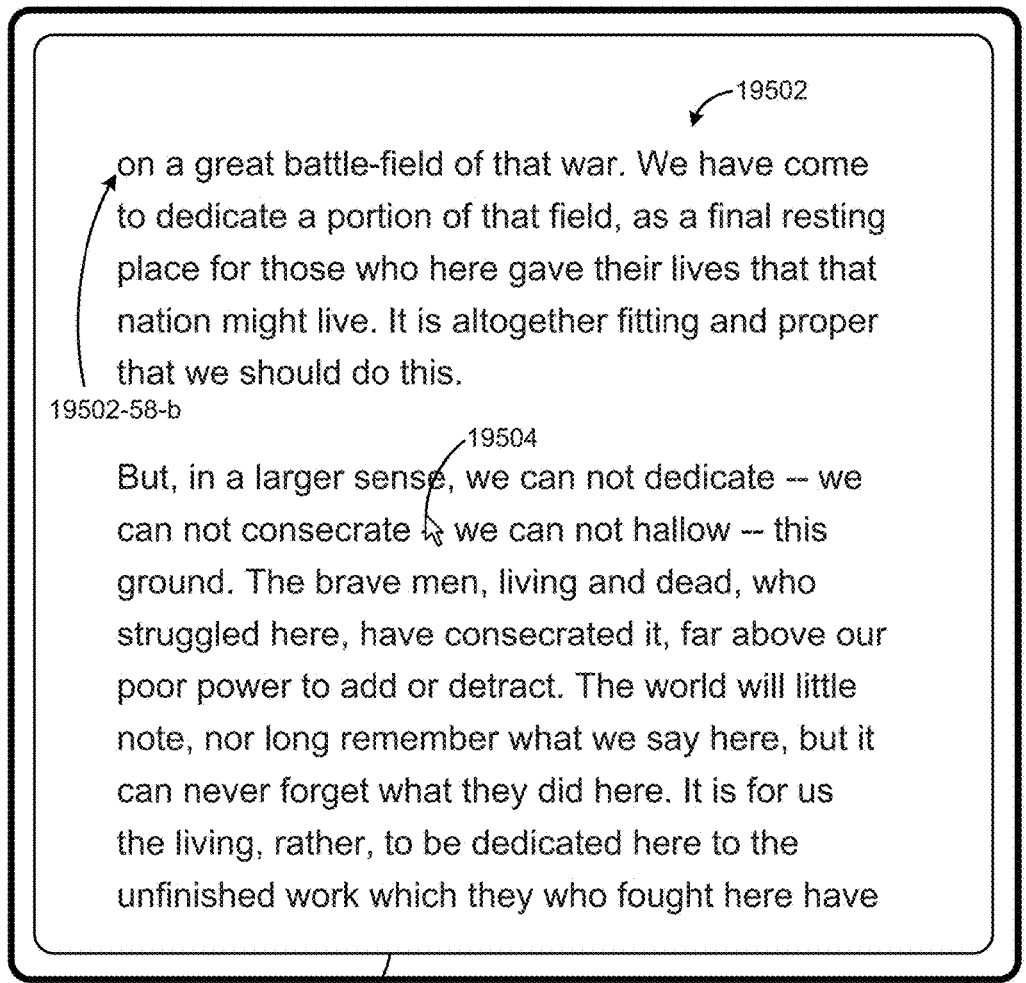
Figure 11B:
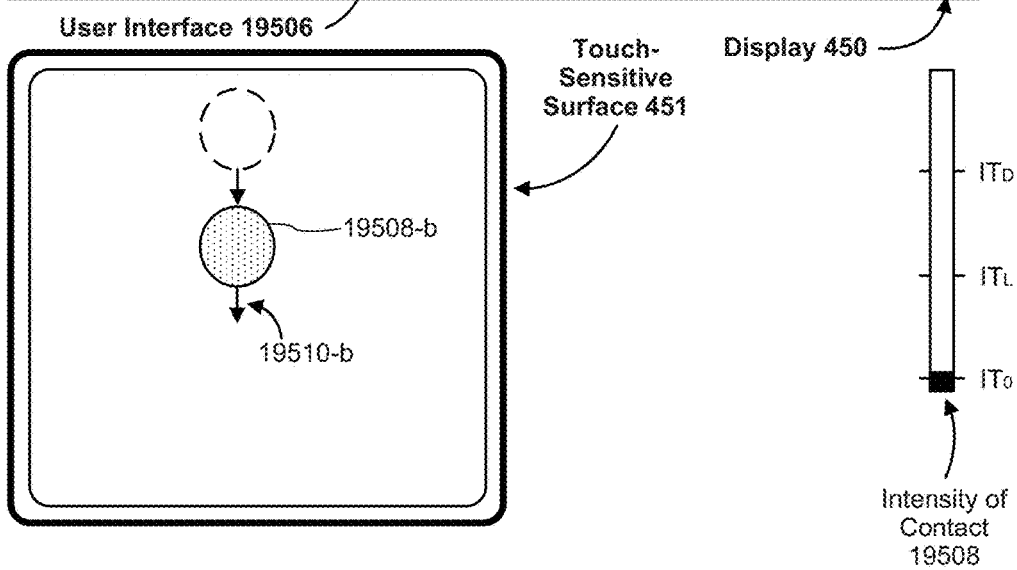
Figure 11C:
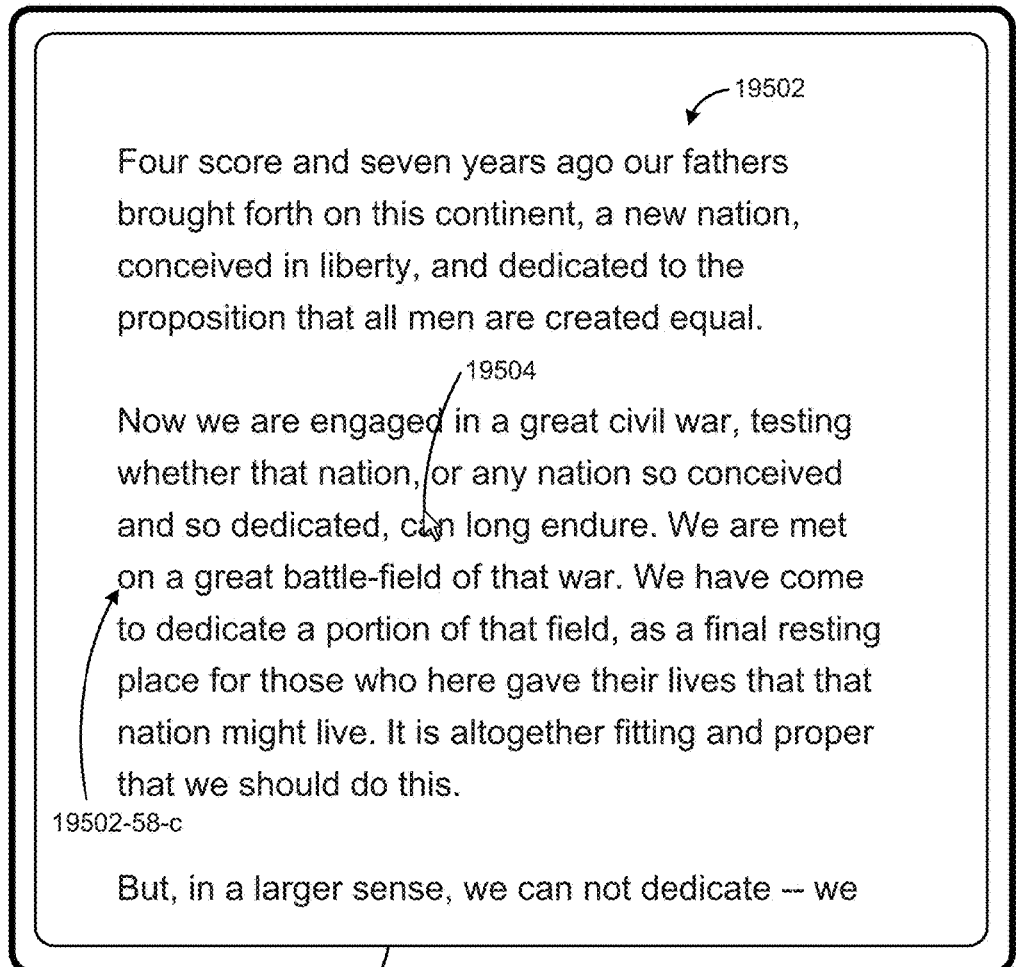
Figure 11C:
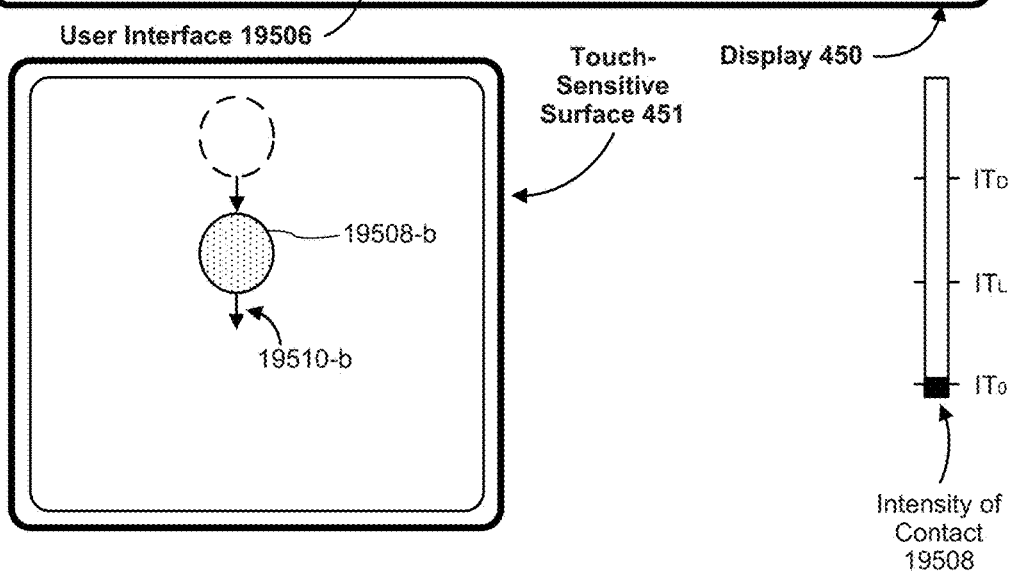
Figure 11D:
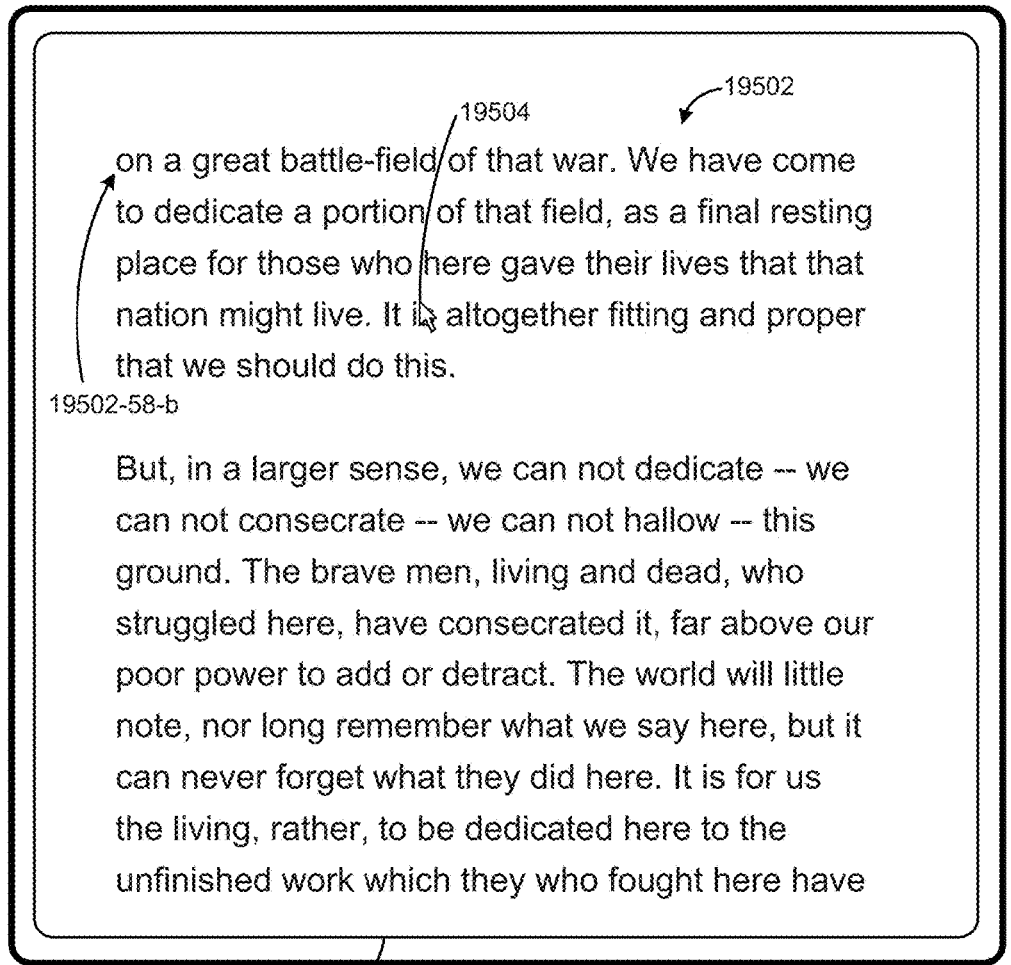
Figure 11D:
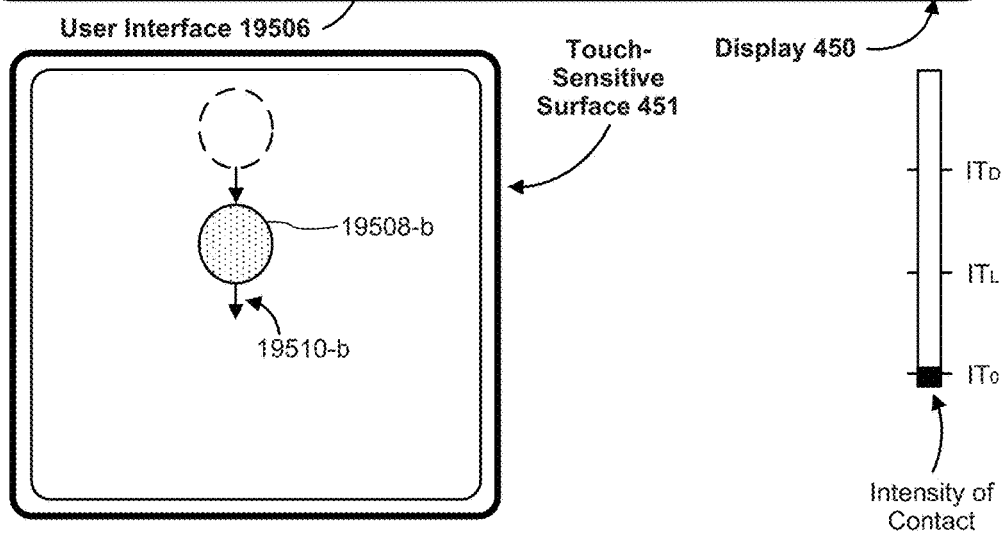
Figure 11E:
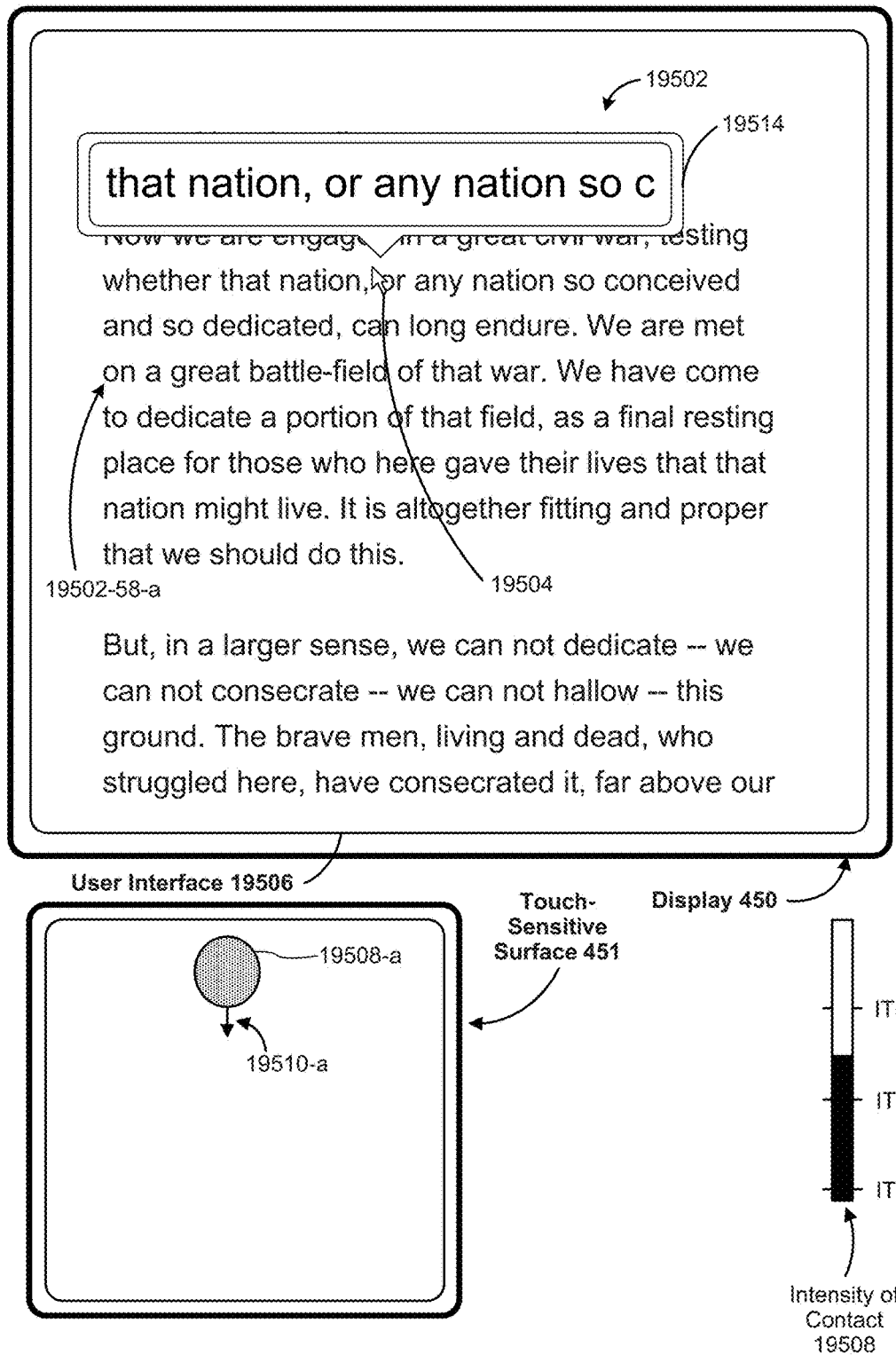
Figure 11F:
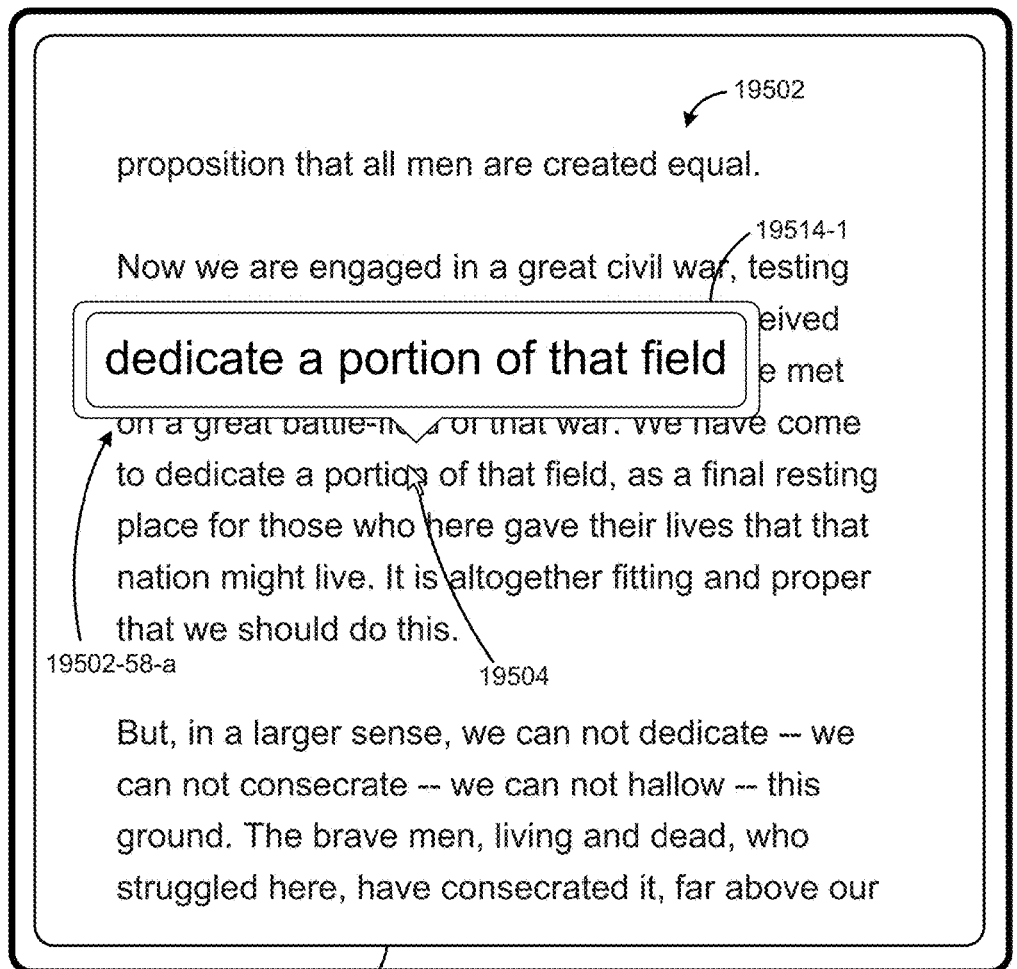
Figure 11F:
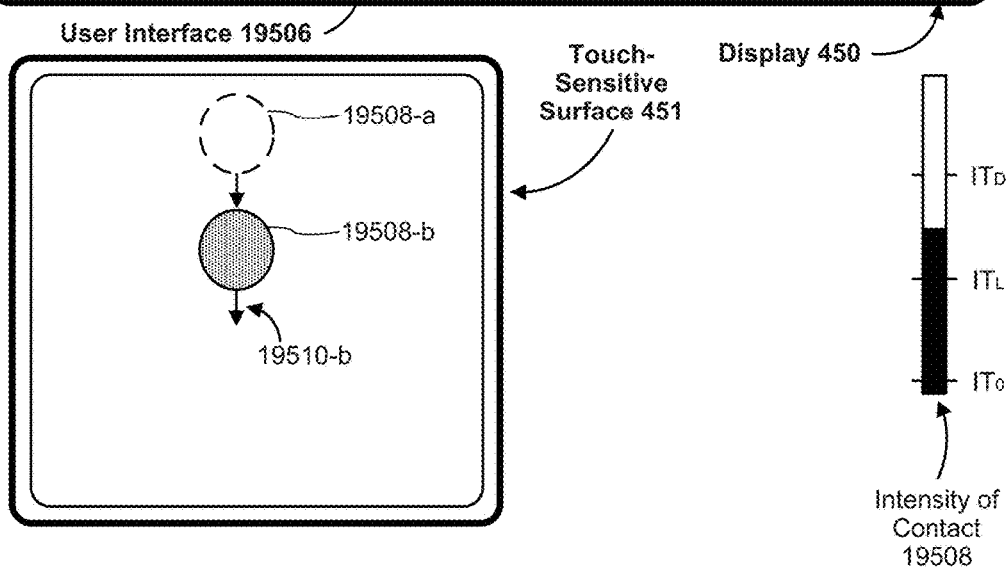
Figure 11G:
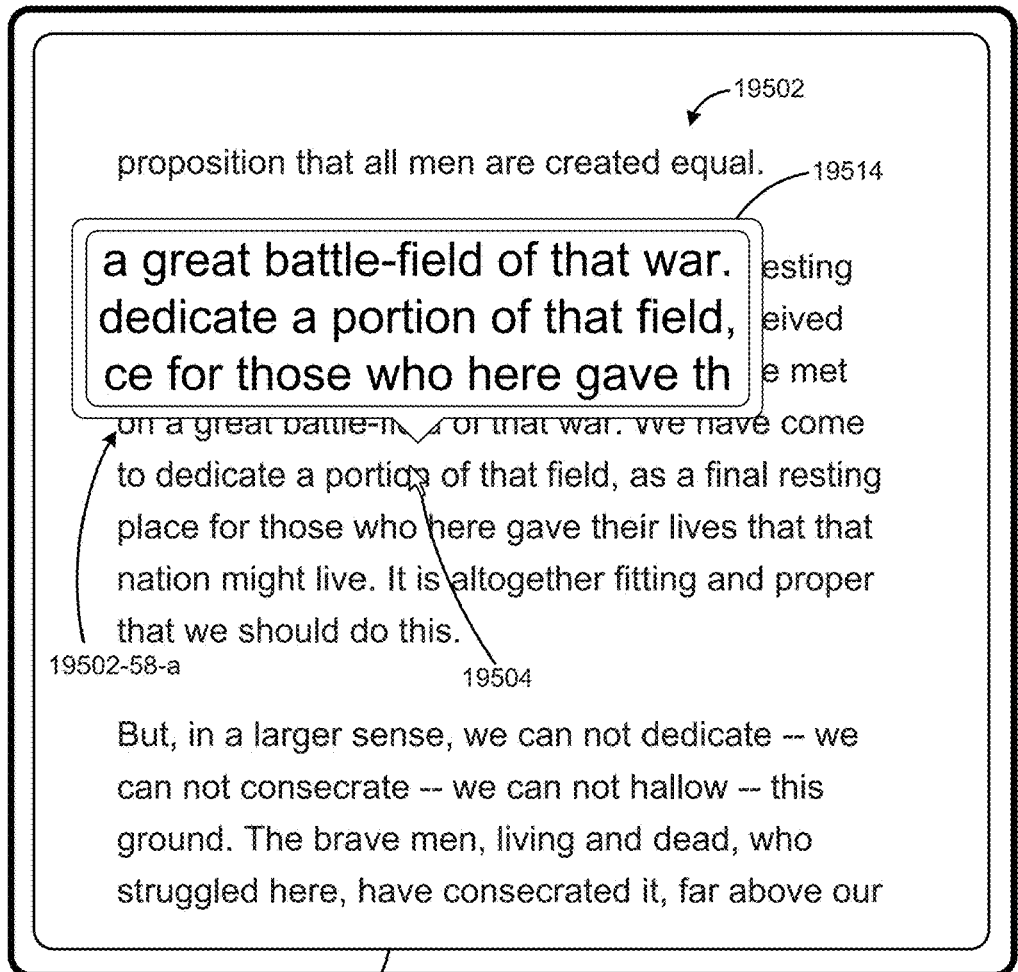
Figure 11G:
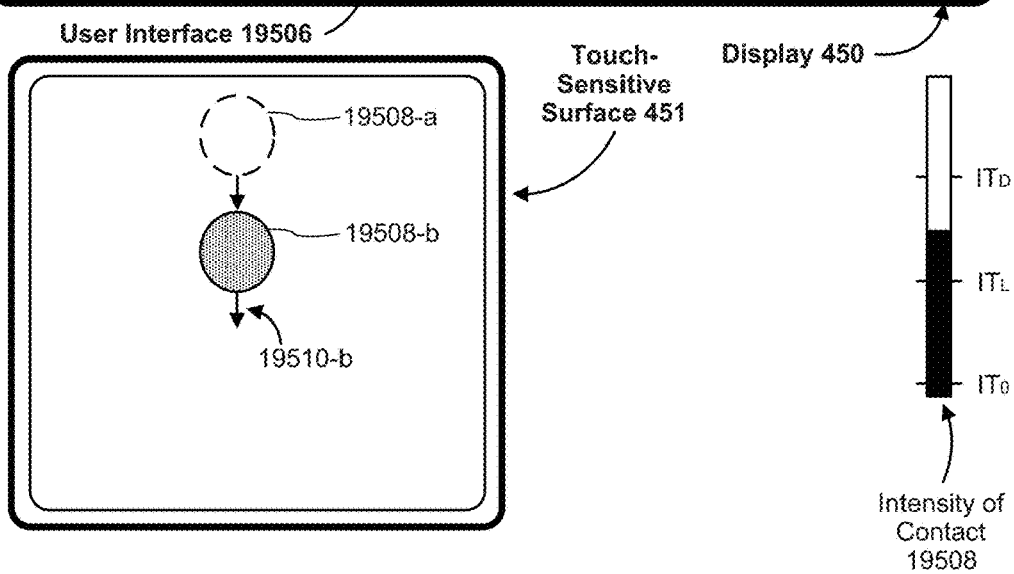
Figure 11H:
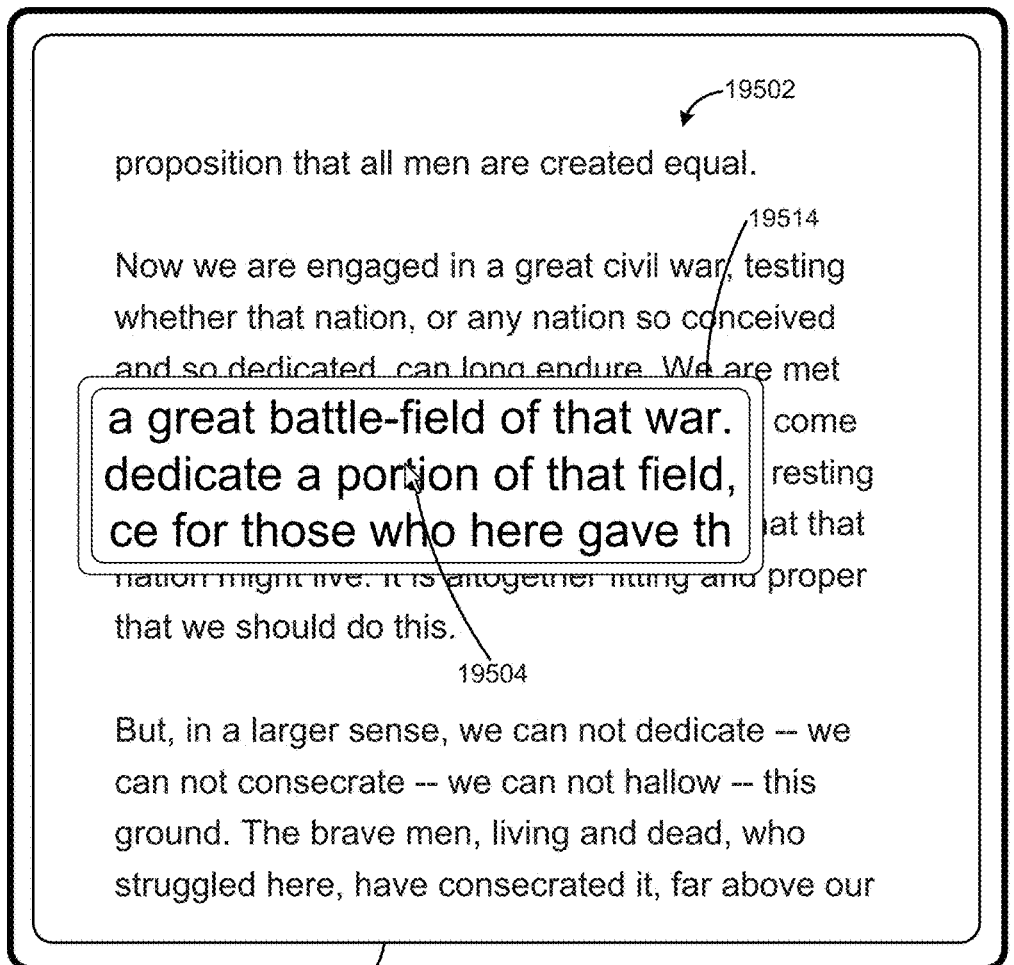
Figure 11H:
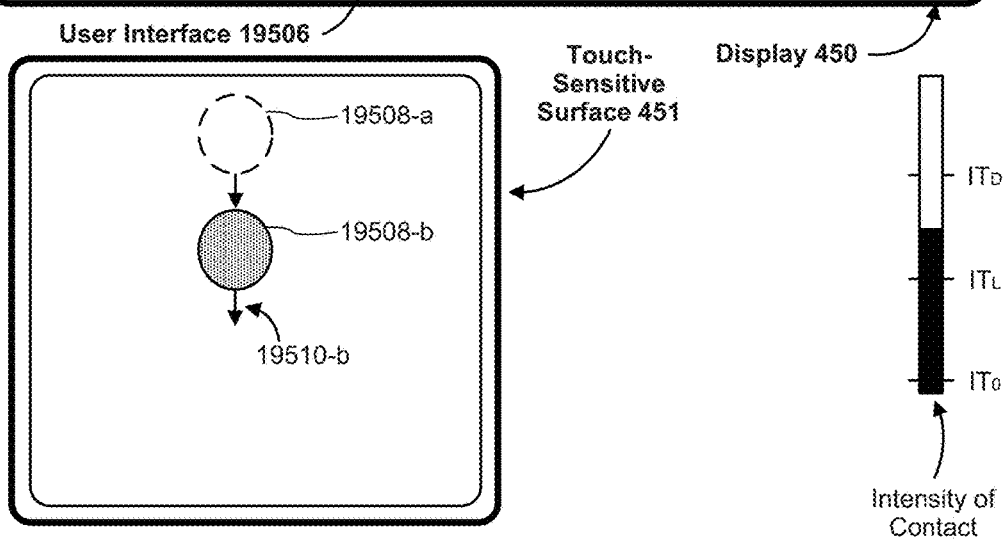
Figure 11I:
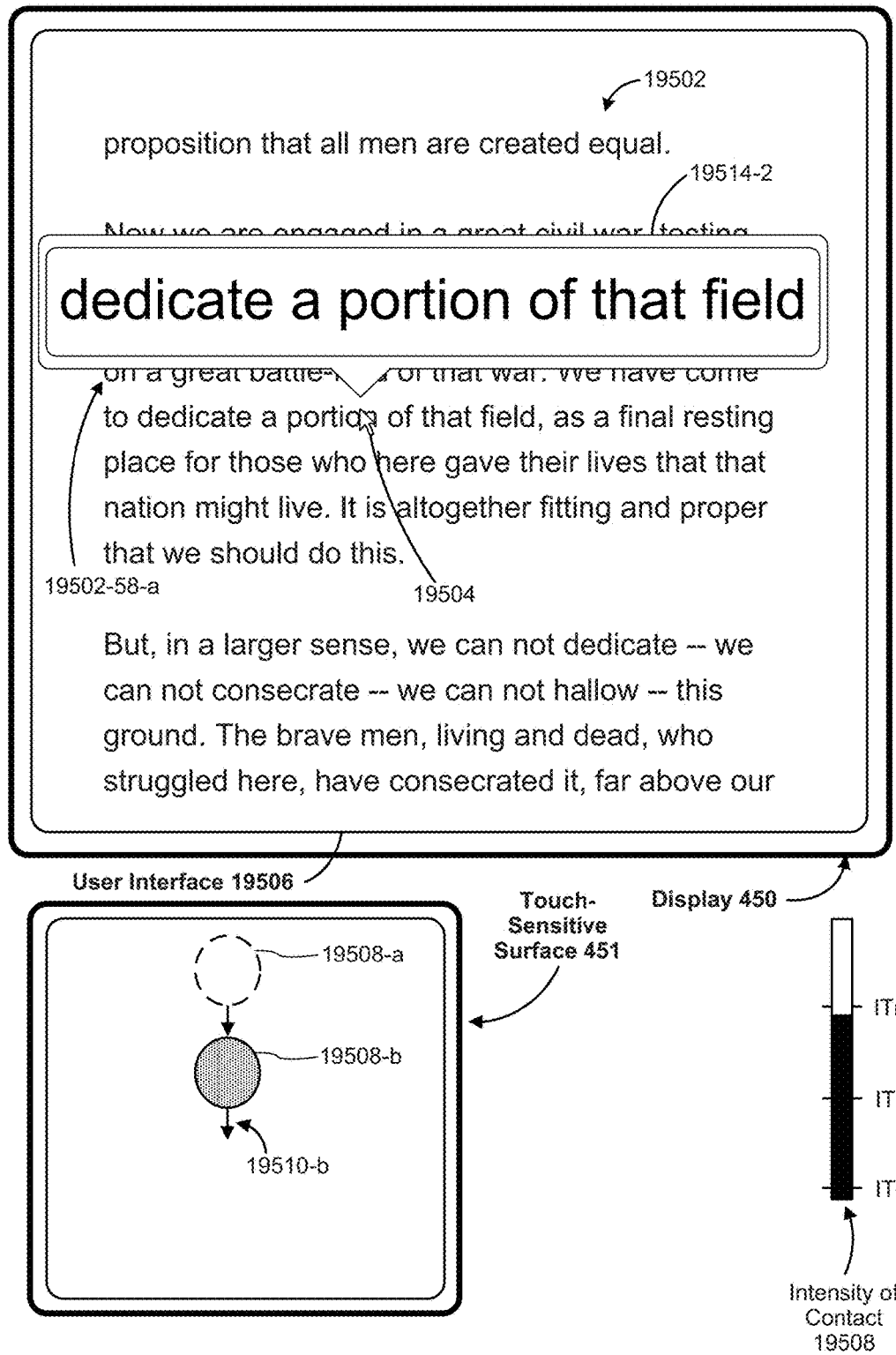
Figure 11J:
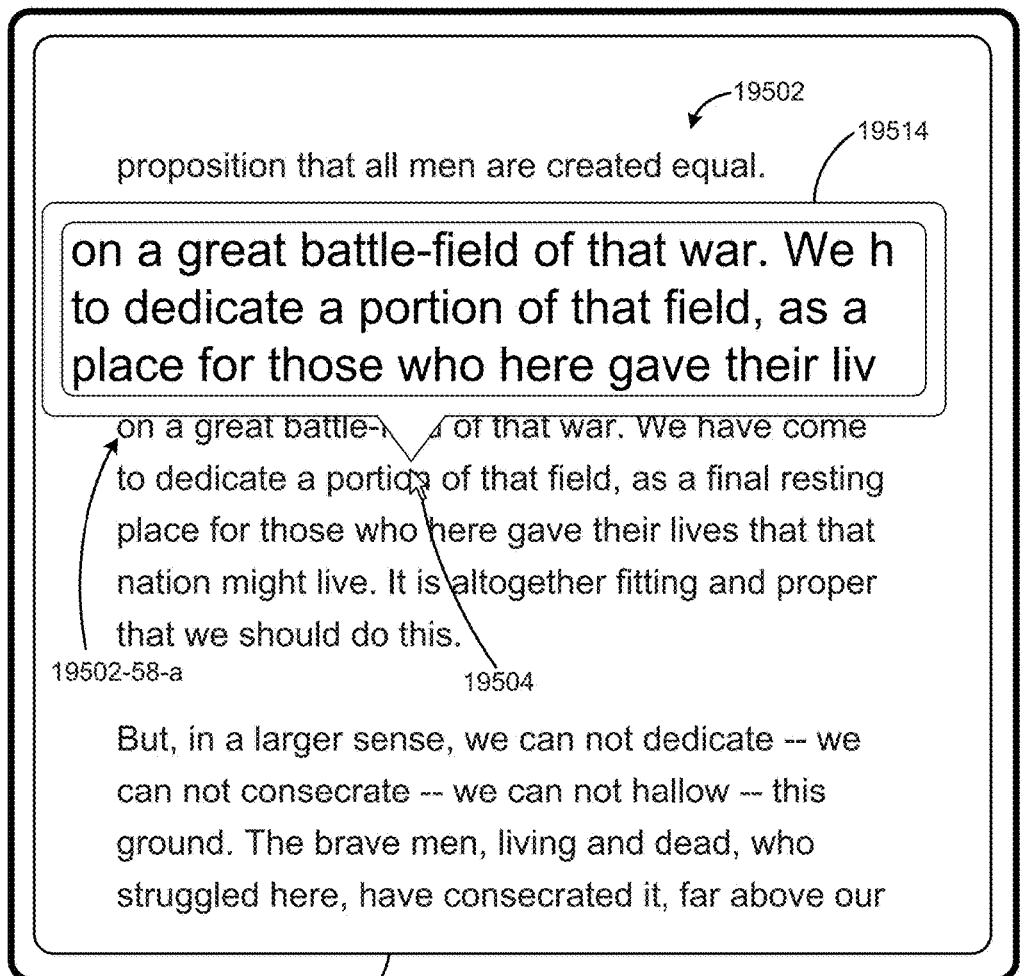
Figure 11J:
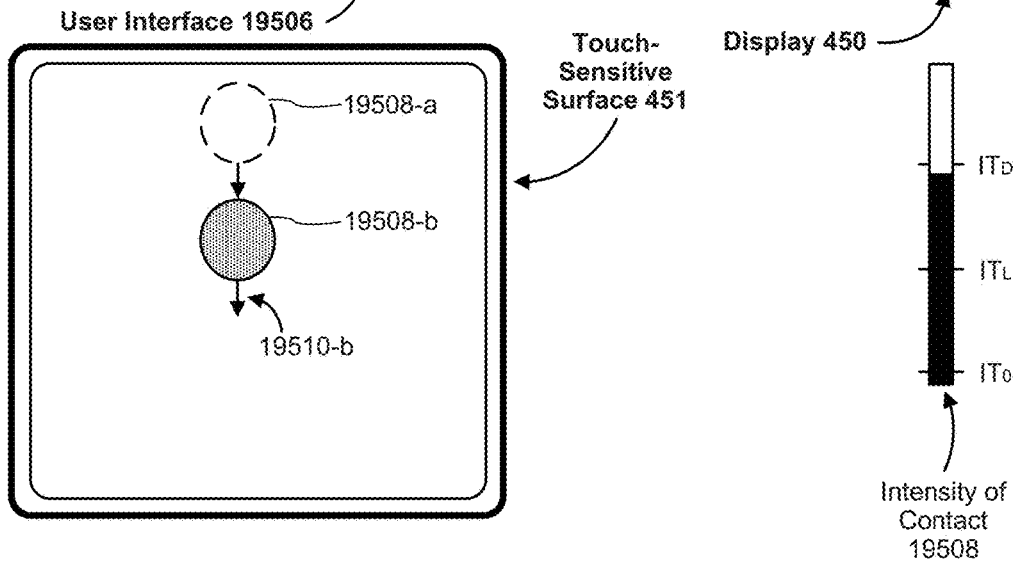
Figure 11K:
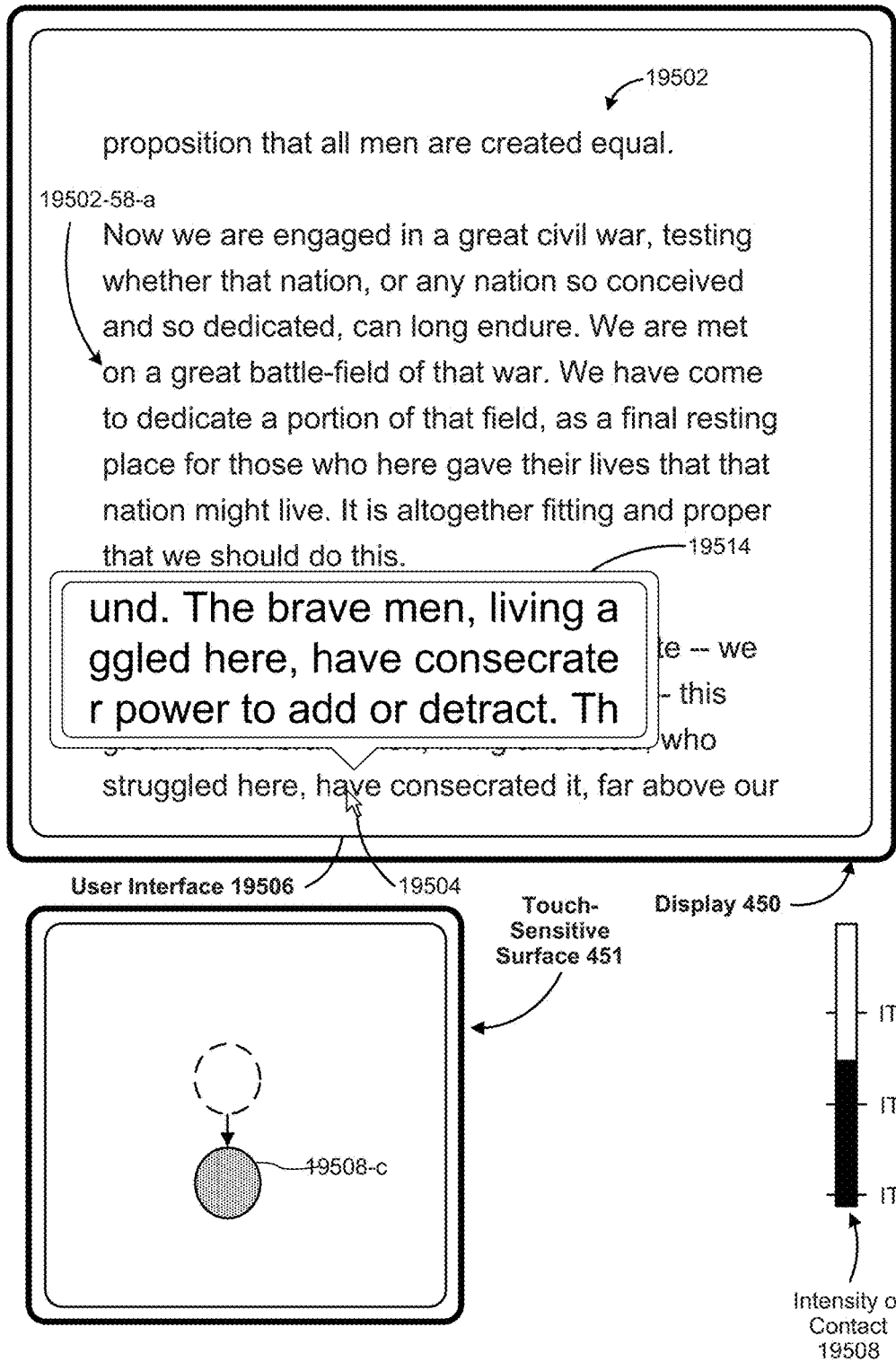
Figure 11L:
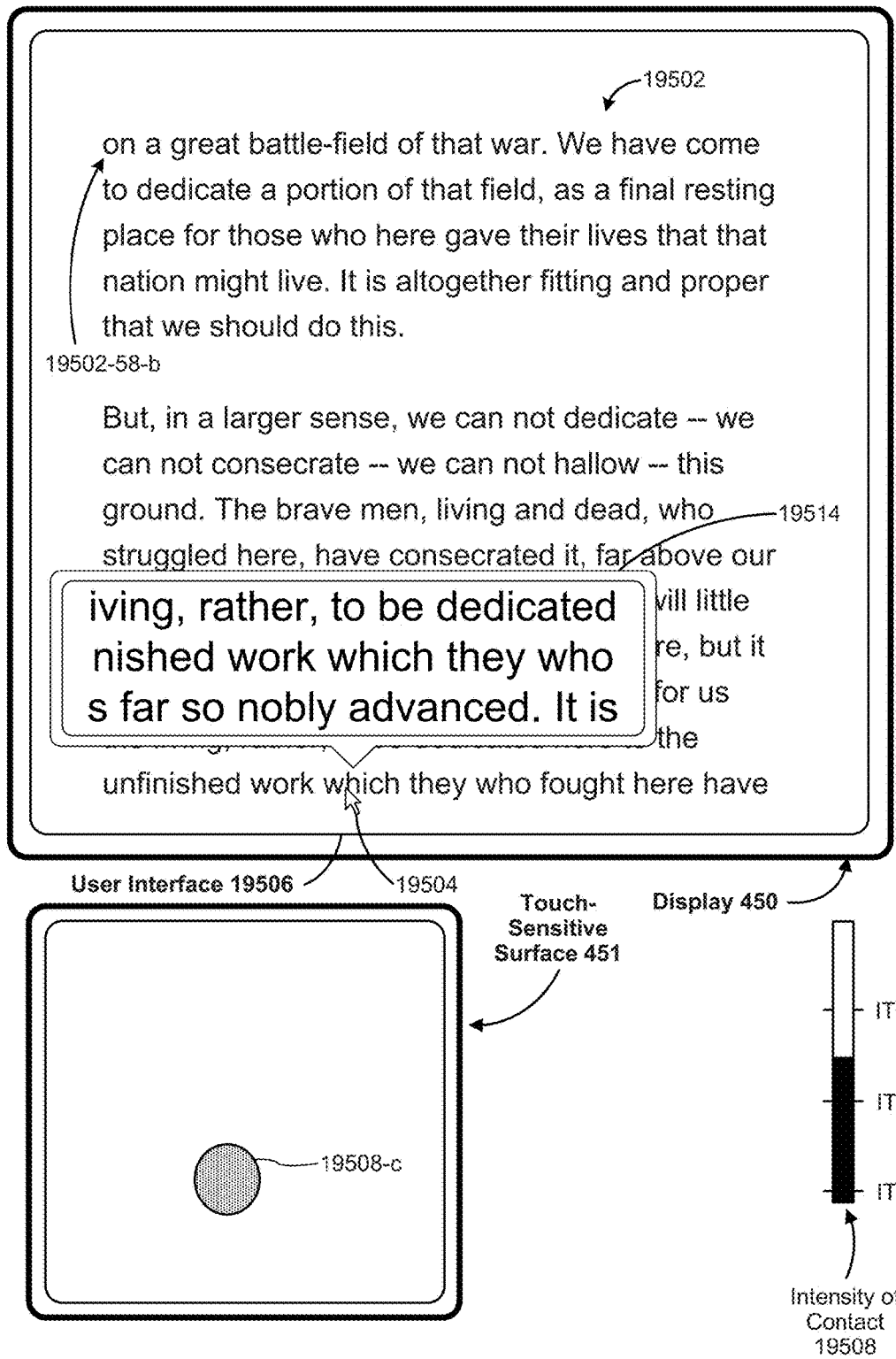
Figure 11M:
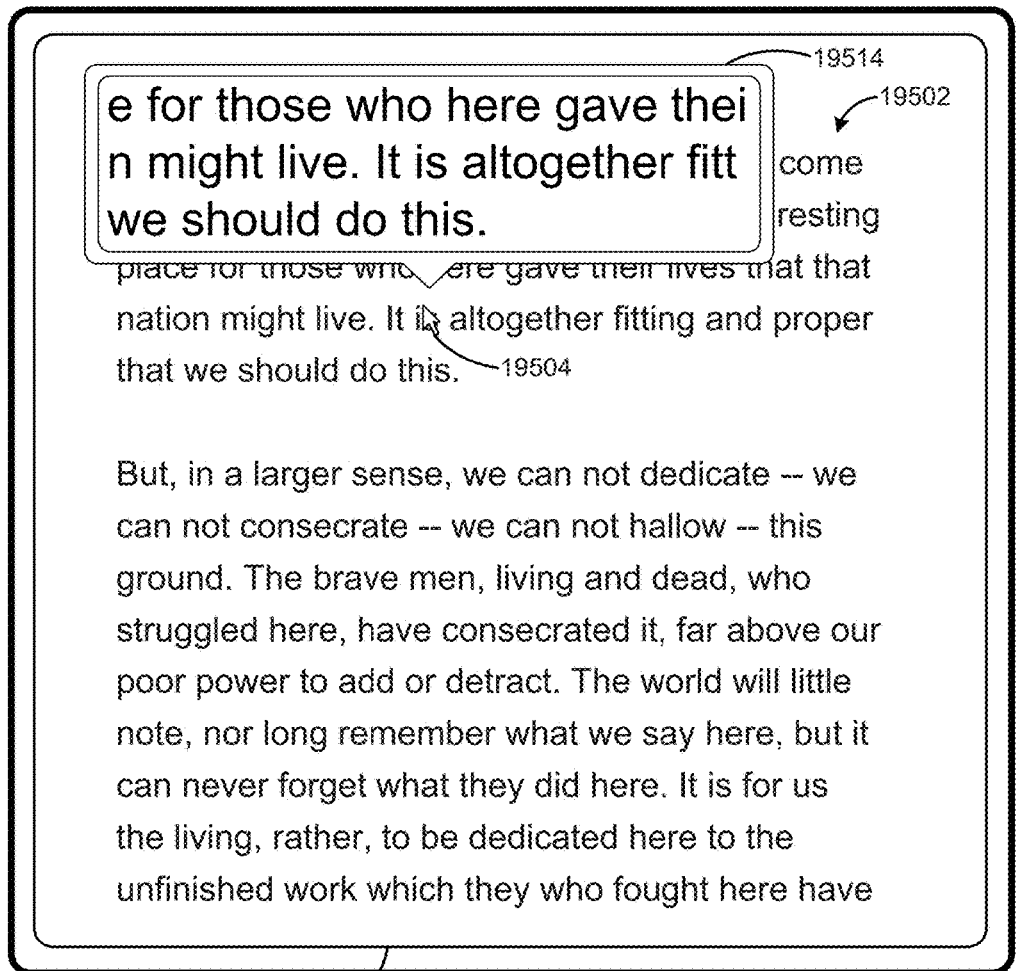
Figure 11M:
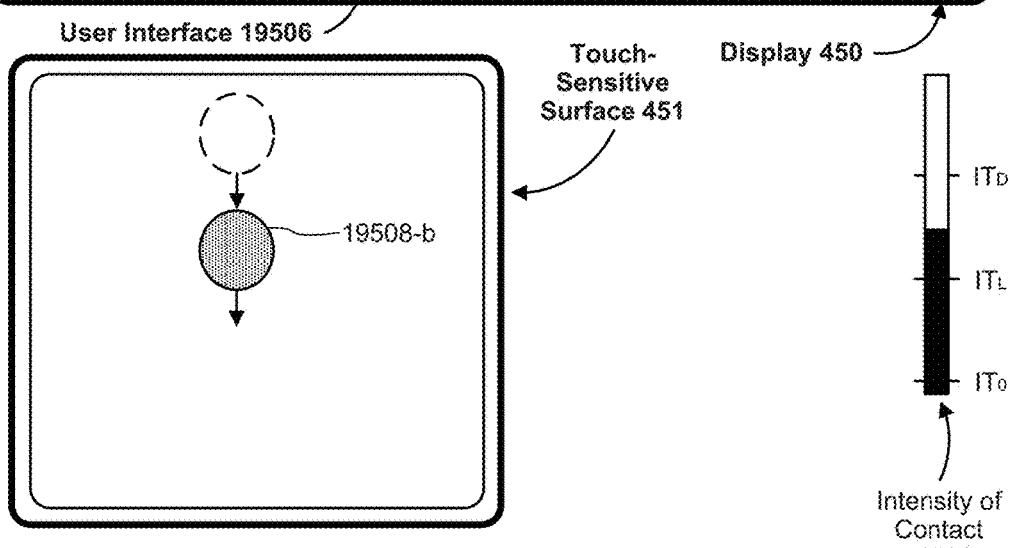
Figure 11N:
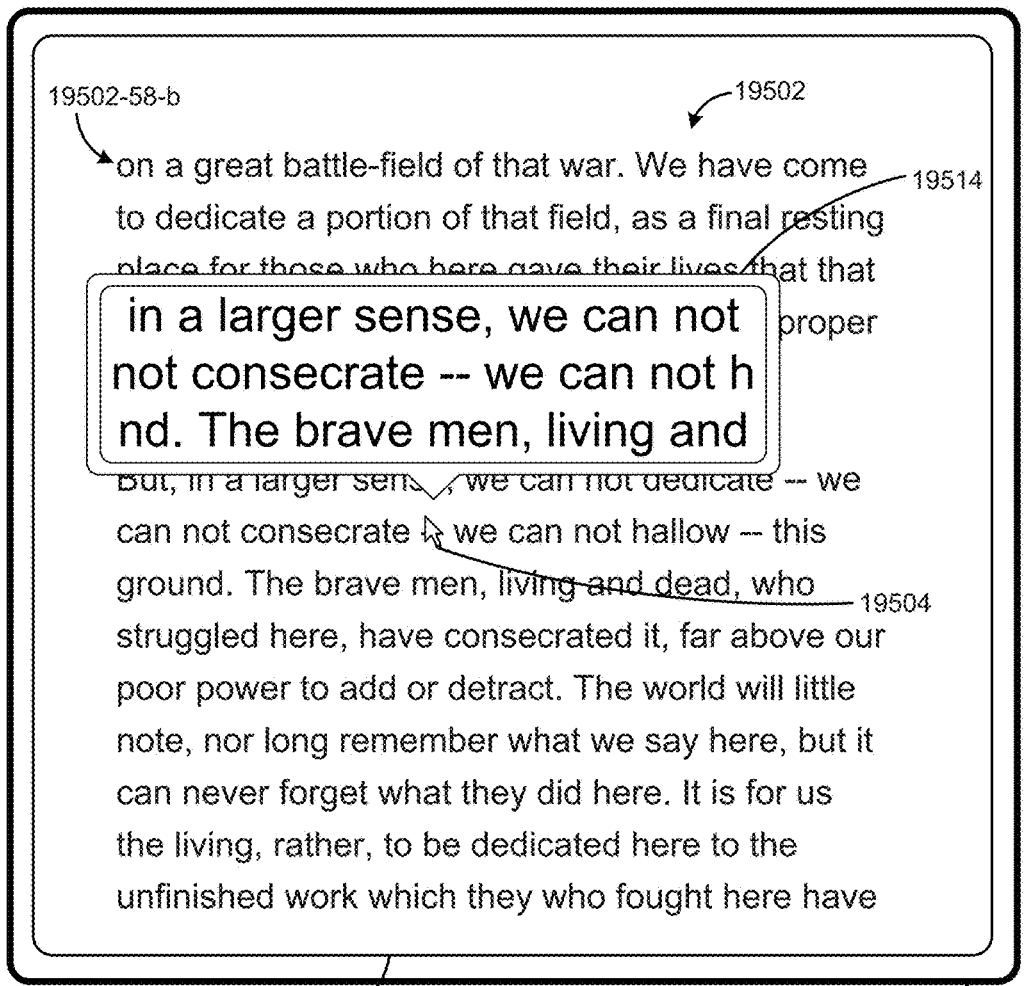
Figure 11N:
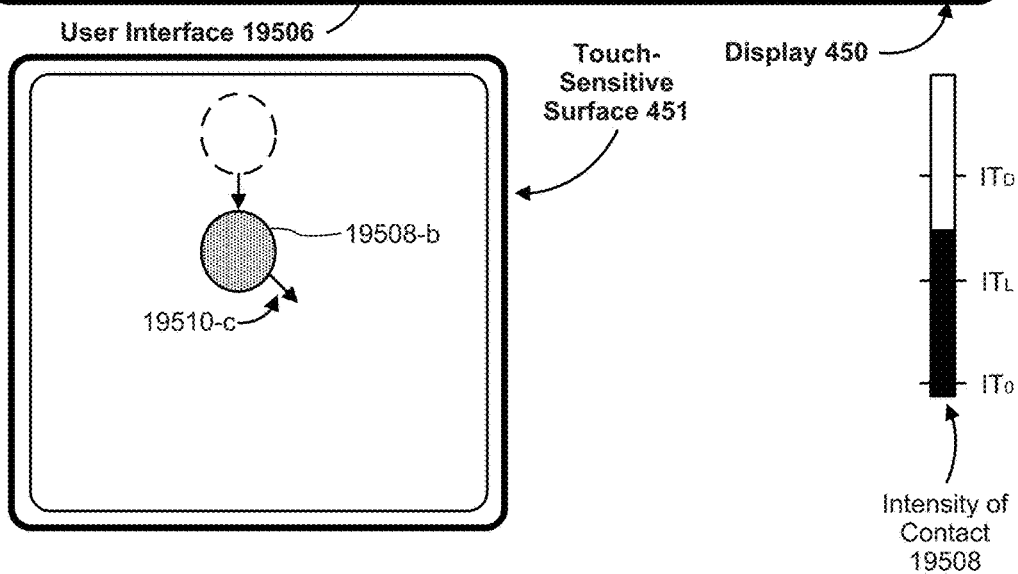
Figure 11O:
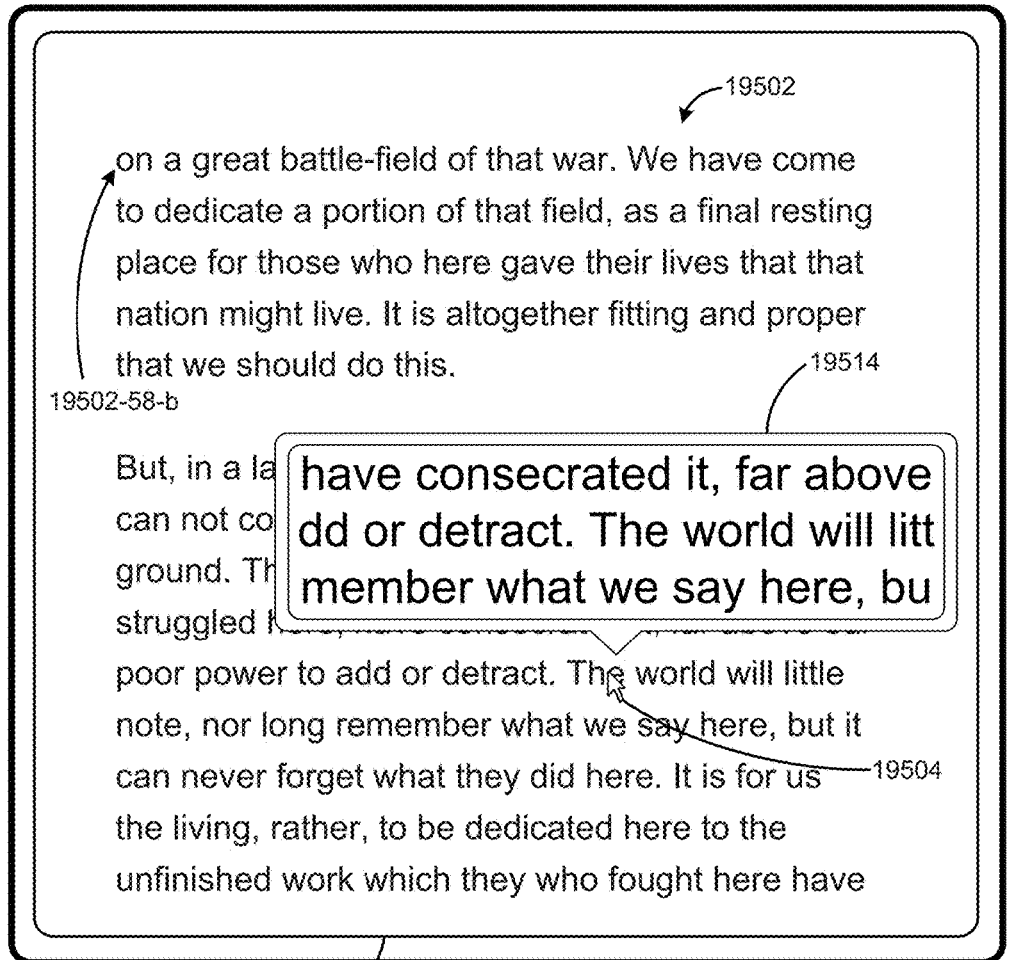
Figure 11O:
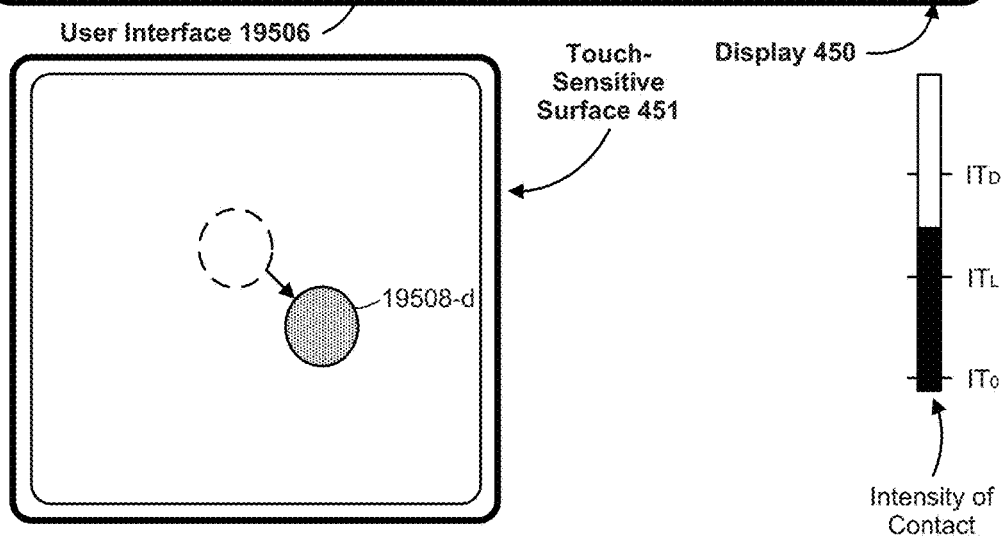
Figure 11P:
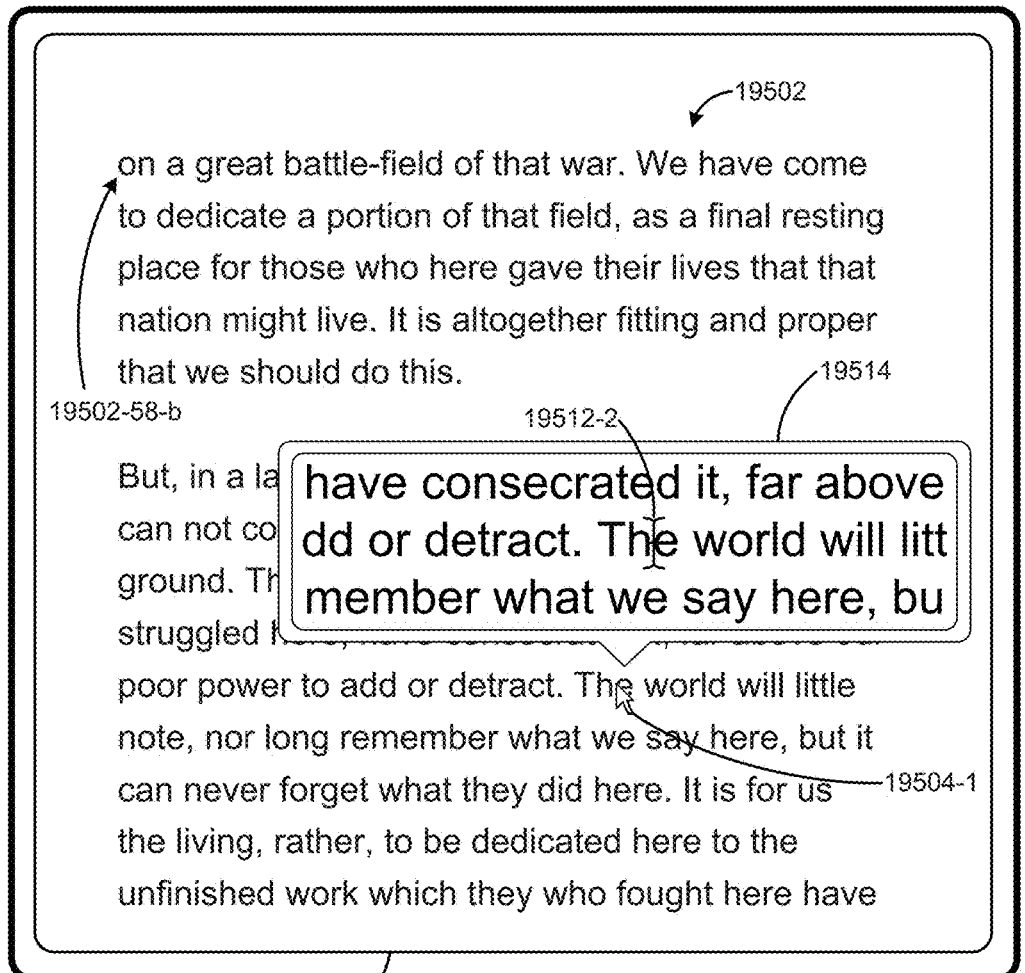
Figure 11P:
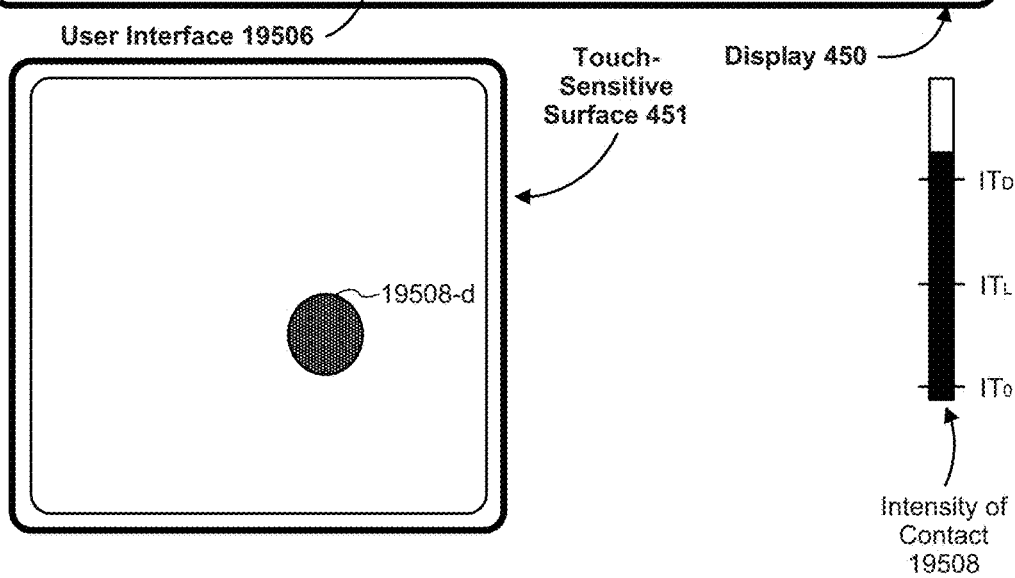
Figure 11Q:
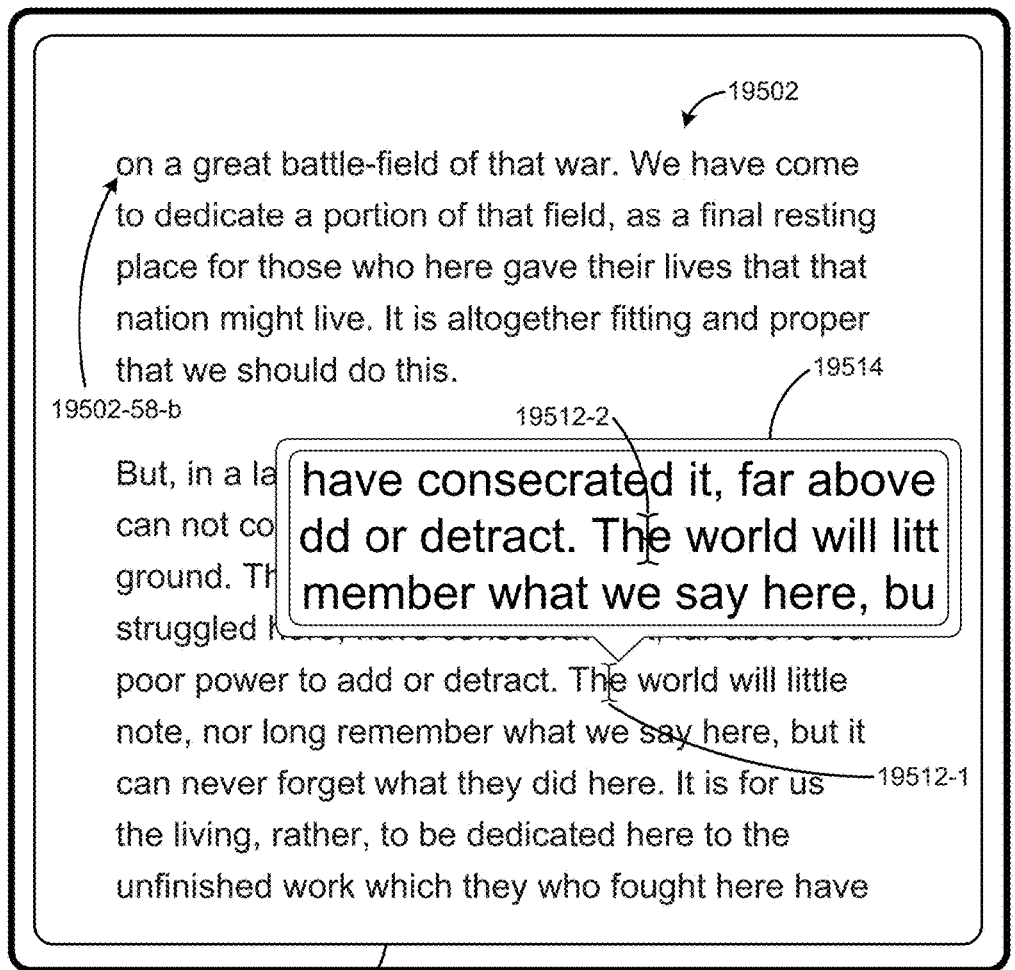
Figure 11Q:
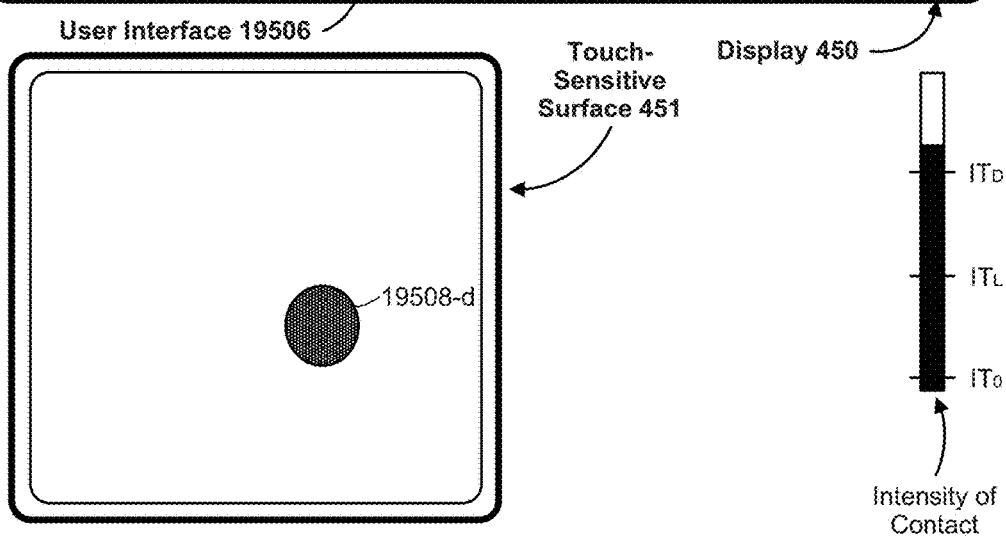
Figure 11R:
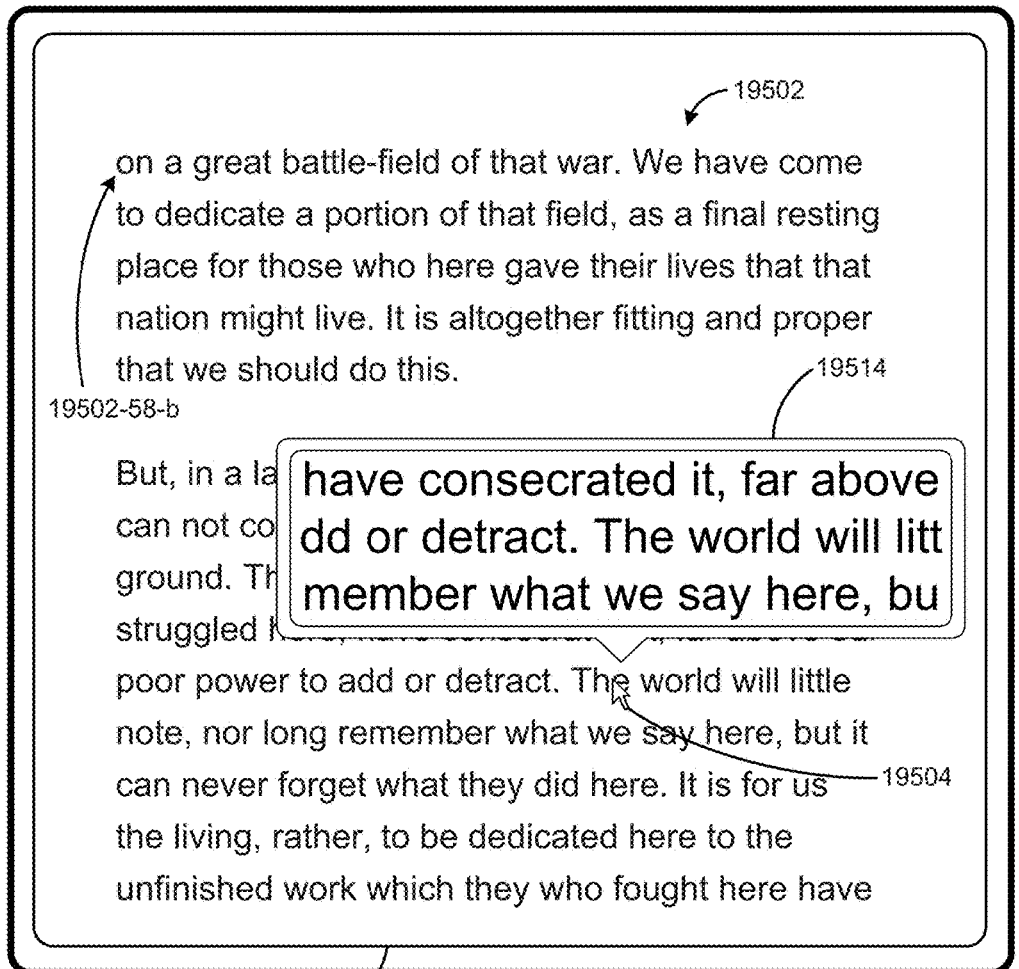
Figure 11R:
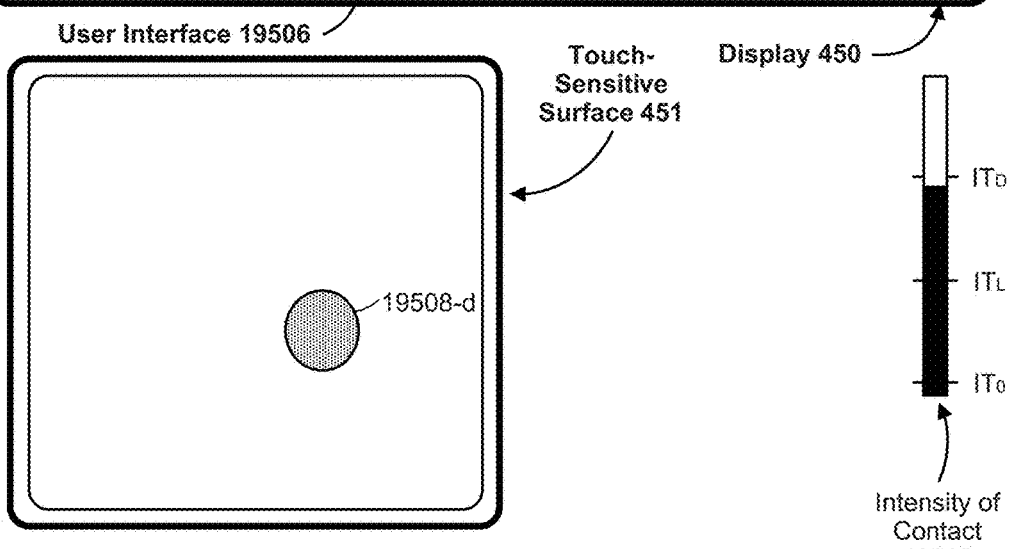
Figure 11S:
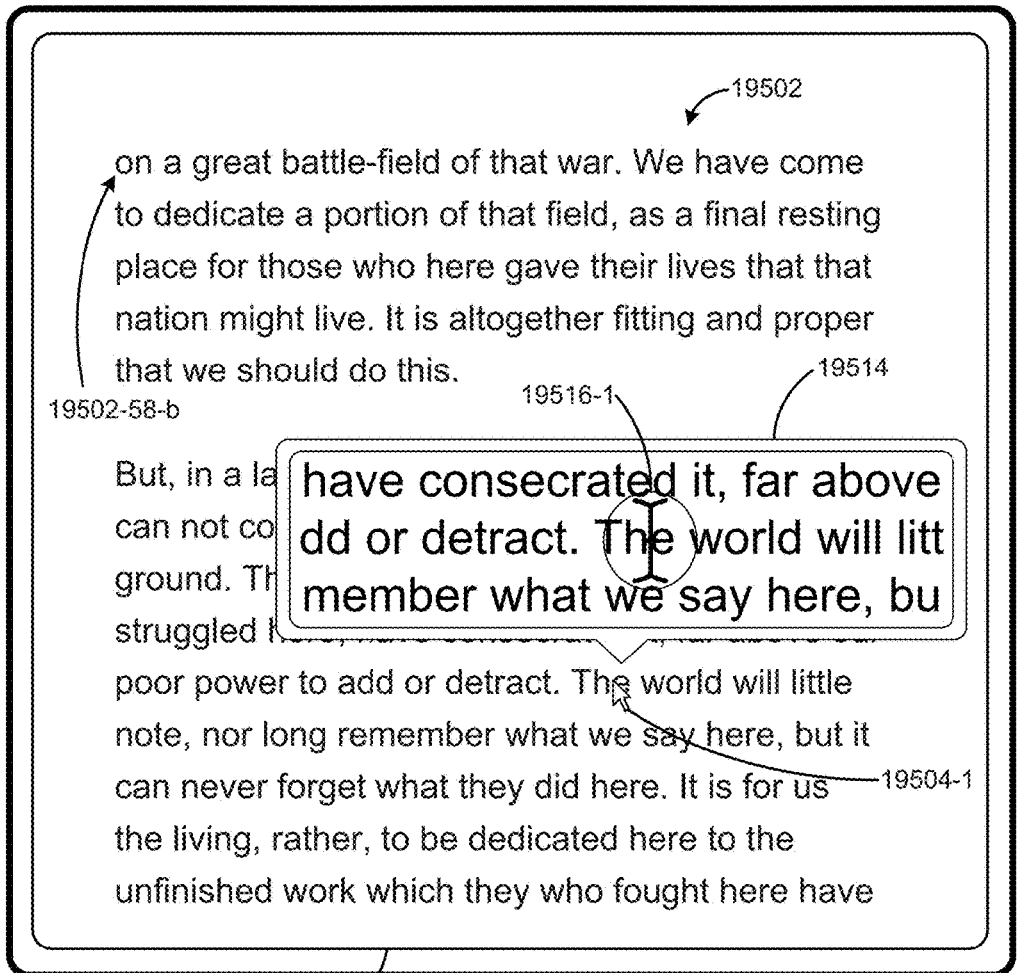
Figure 11S:
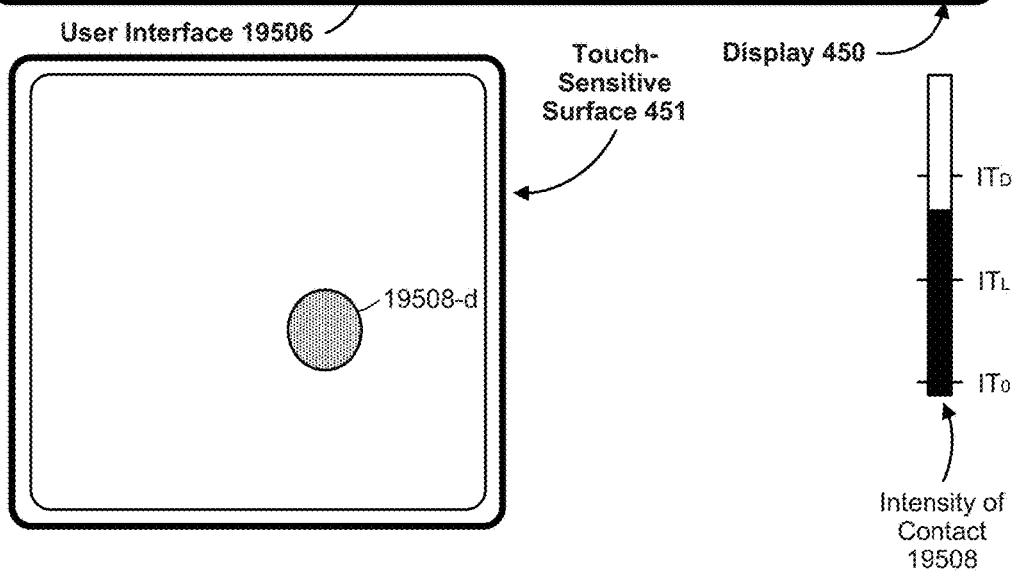
Figure 11T:
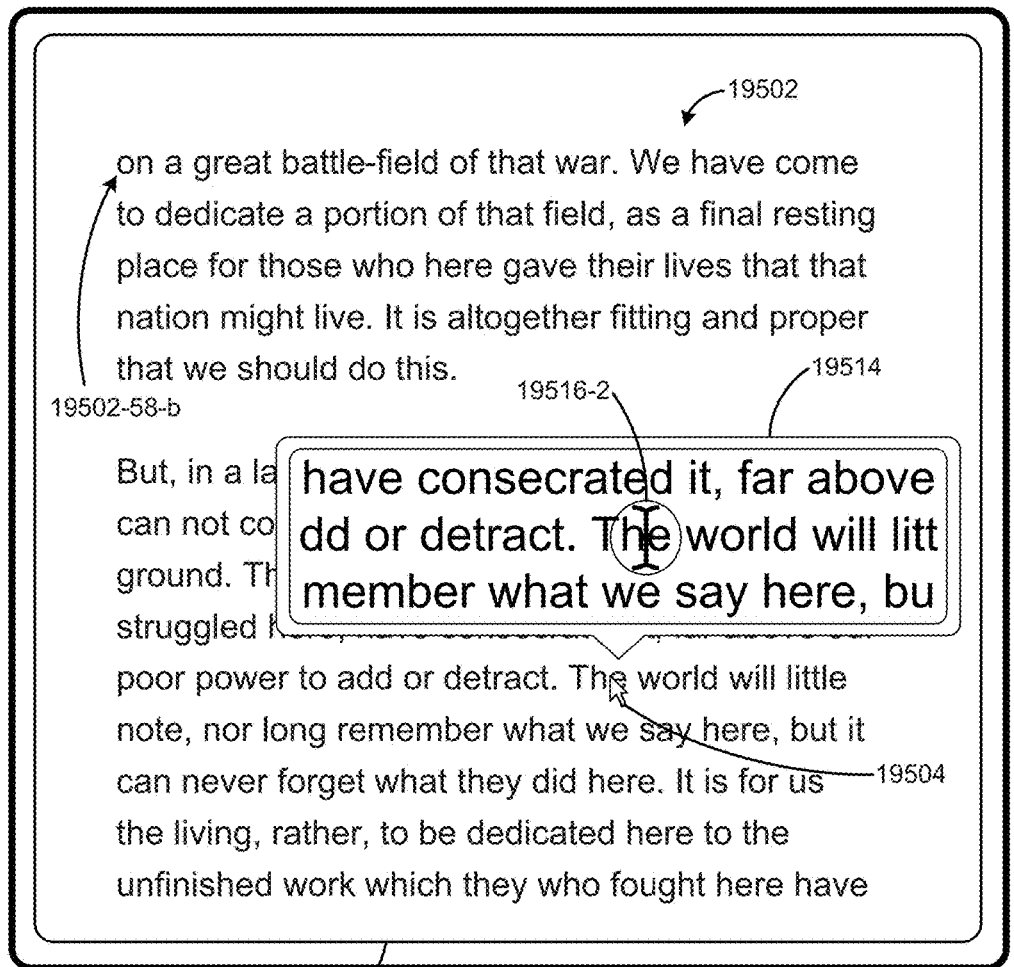
Figure 11T:
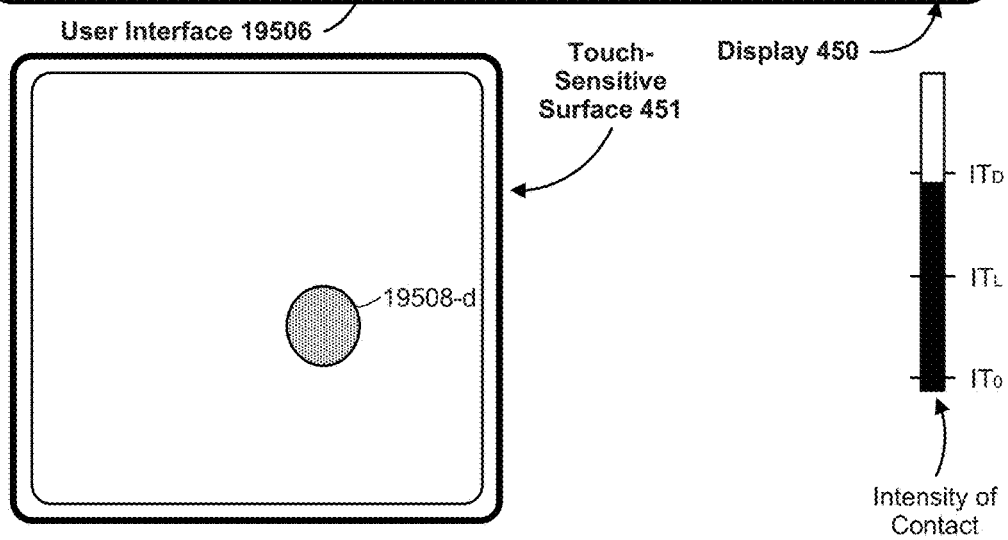
Figure 11U:
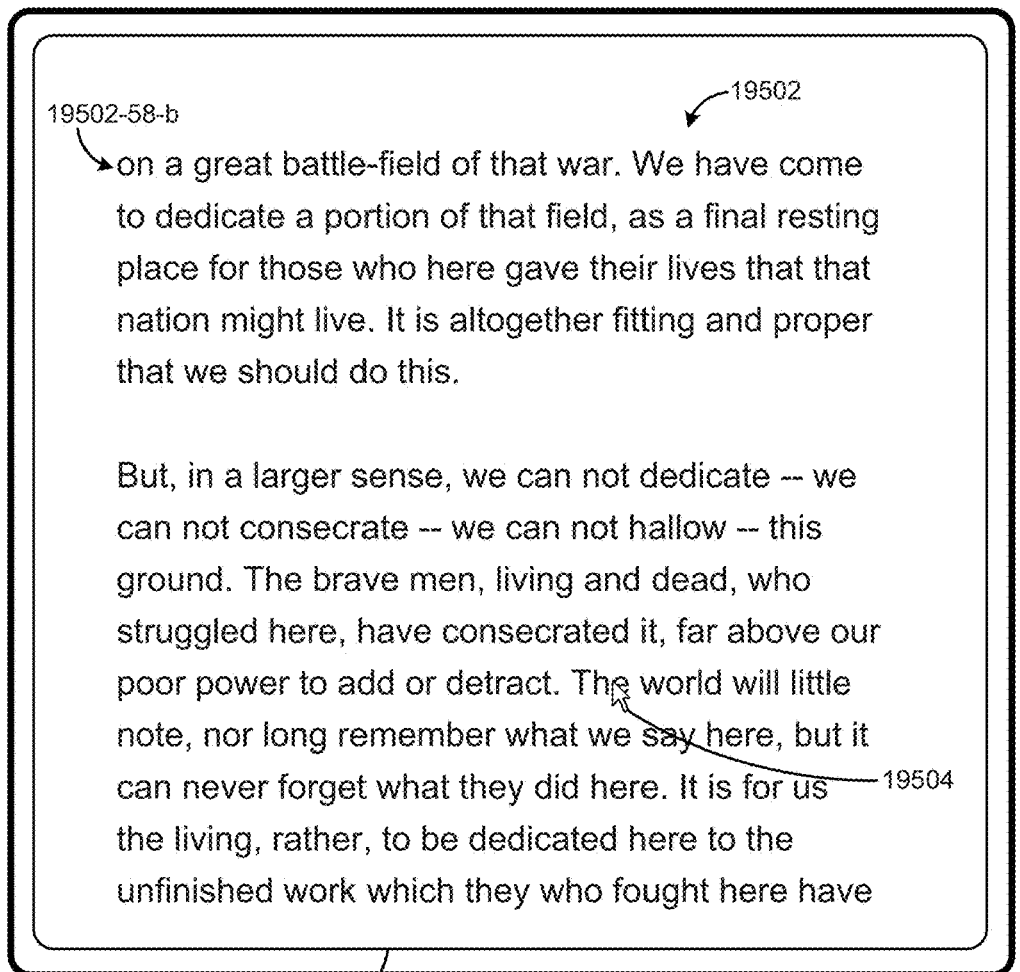
Figure 11U:
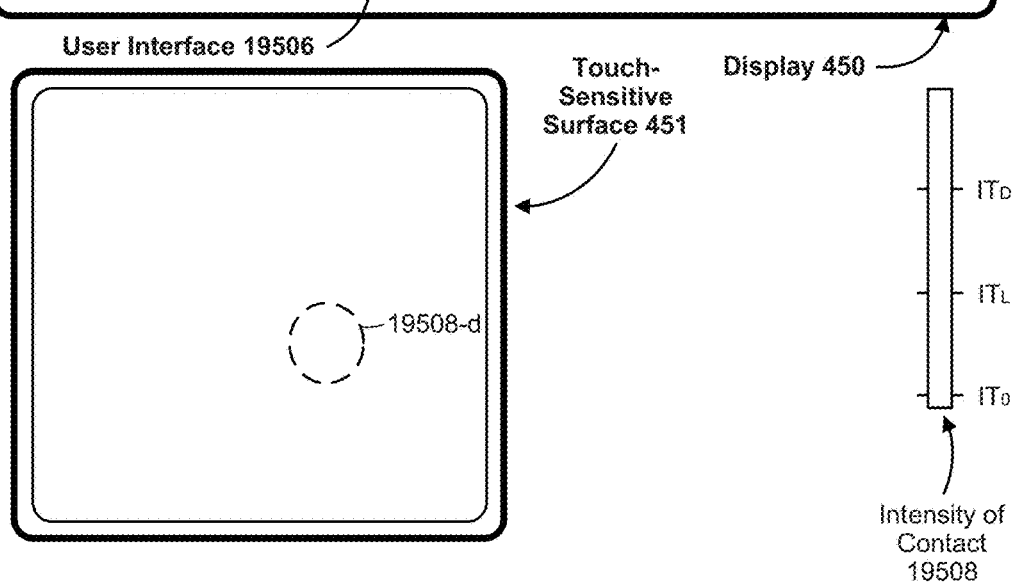
Figure 11V:
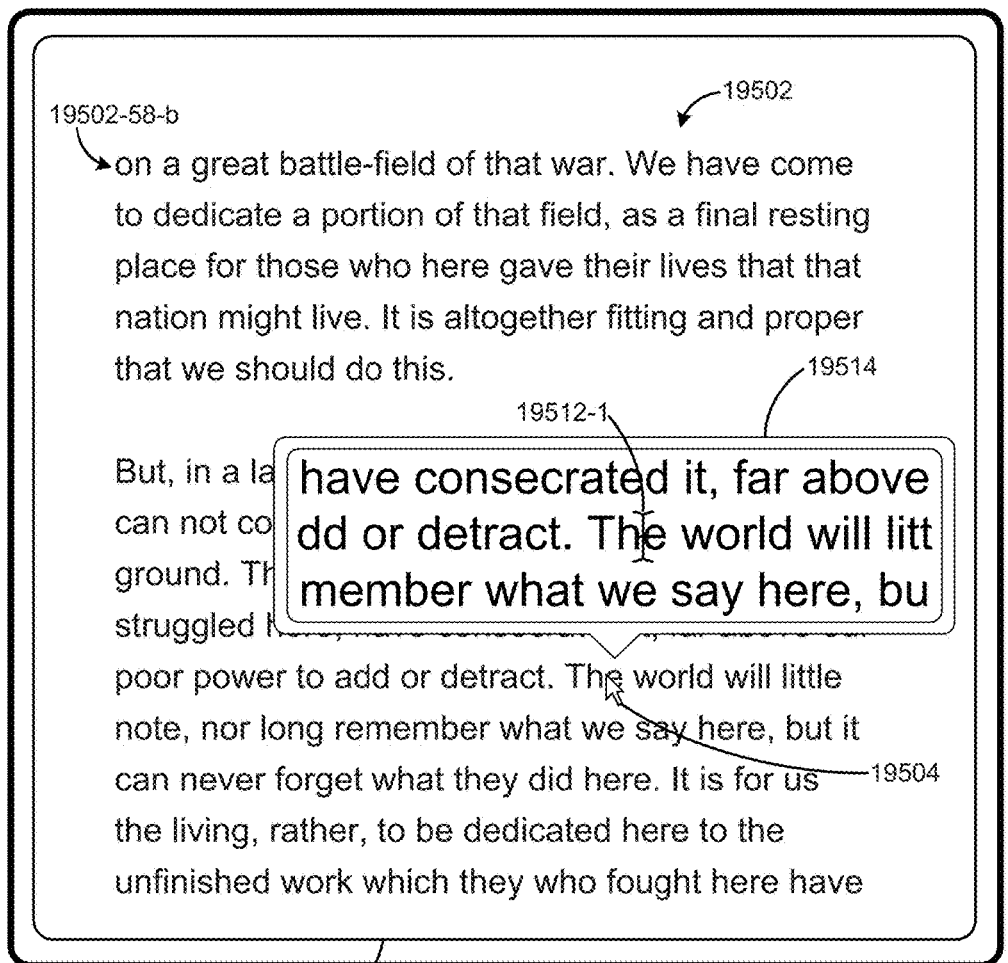
Figure 11V:
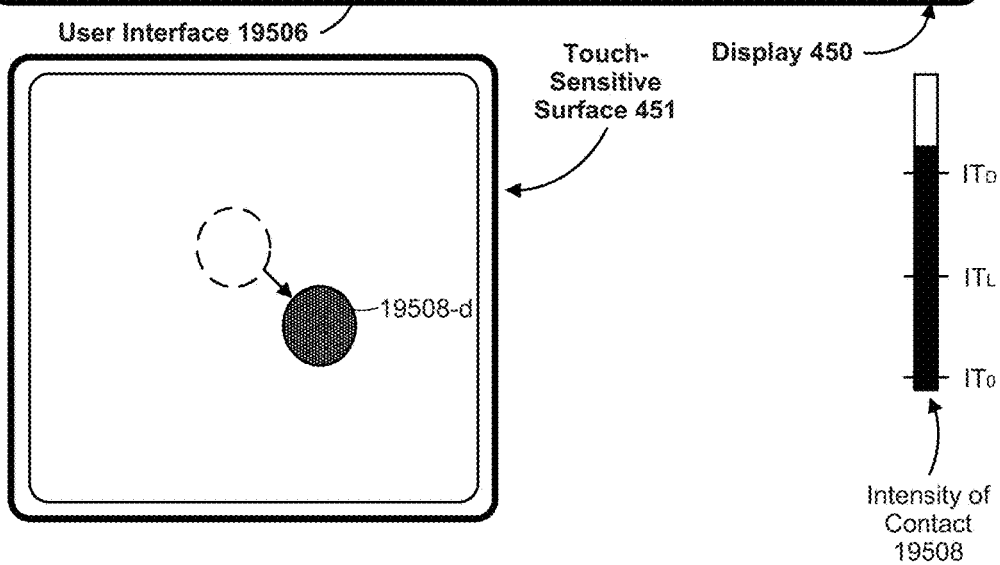
Figure 11W:
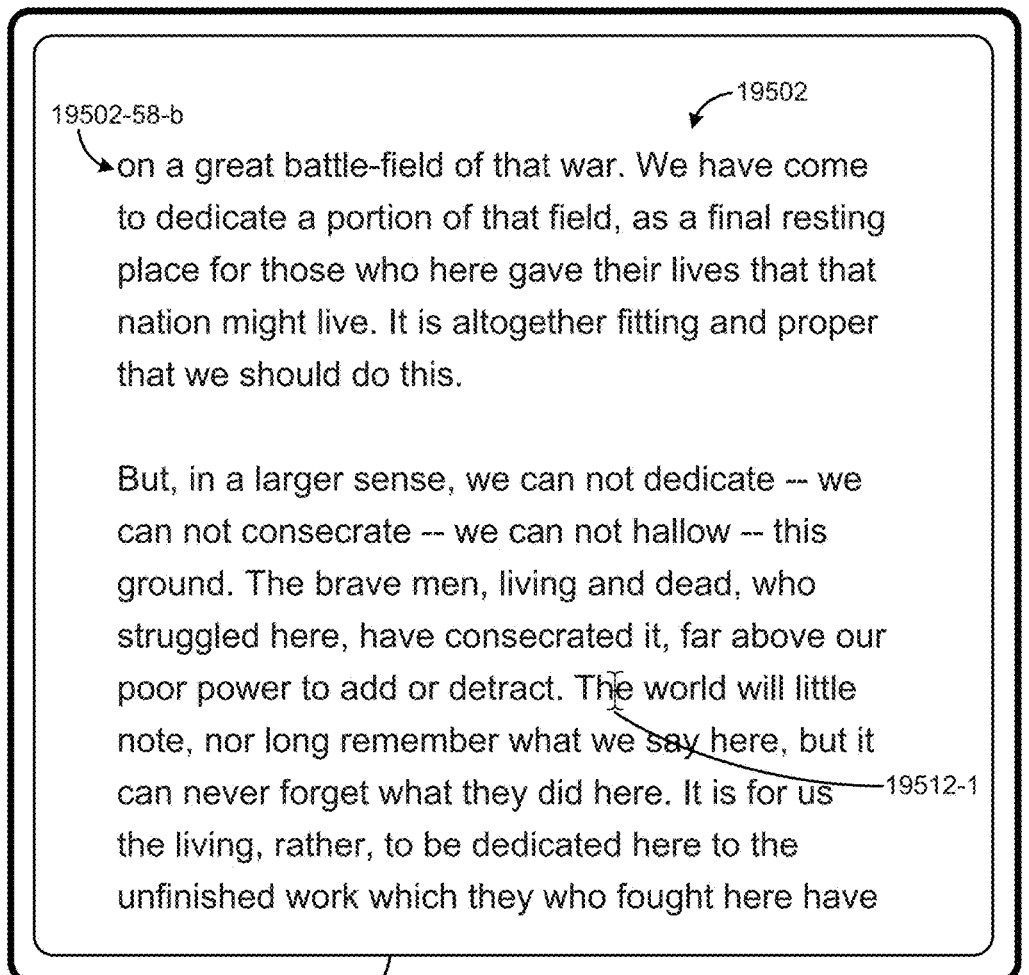
Figure 11W:
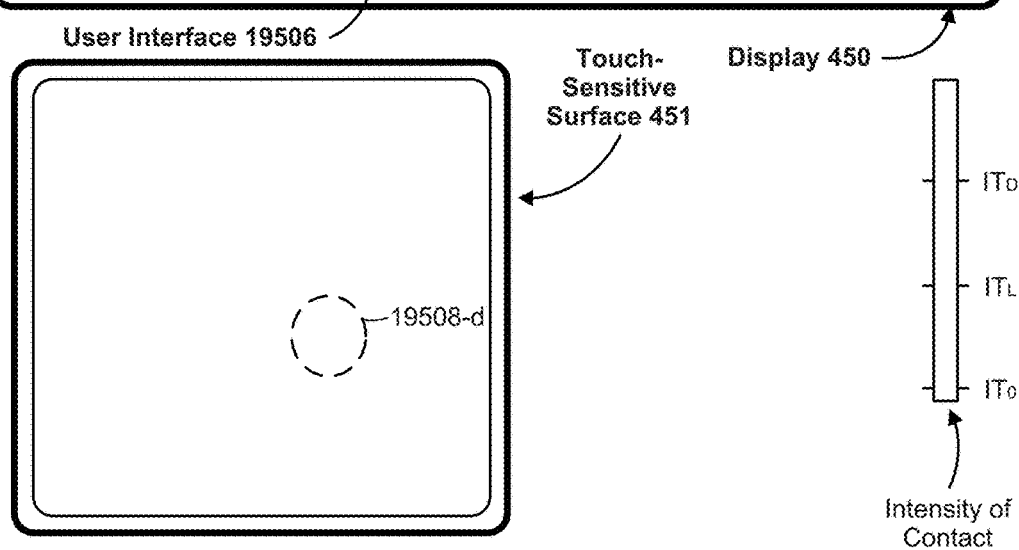
Figure 11X:
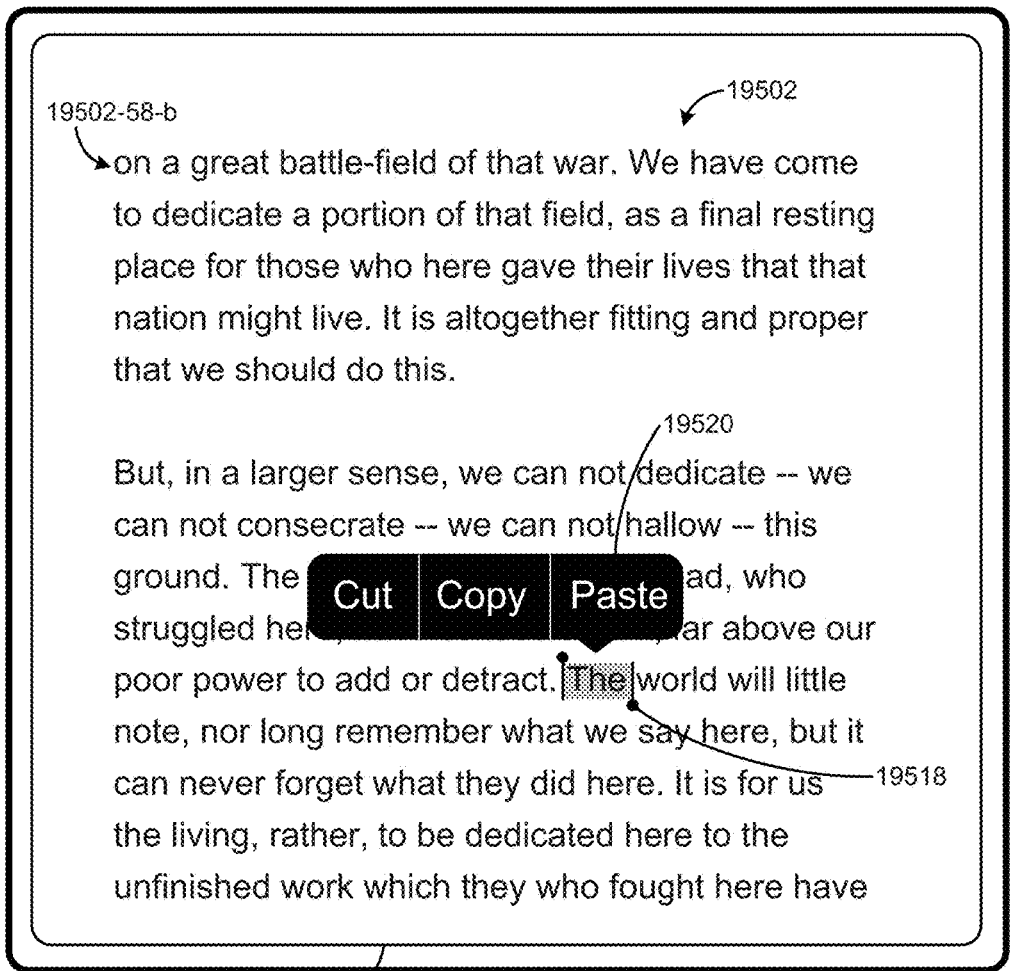
Figure 11X:
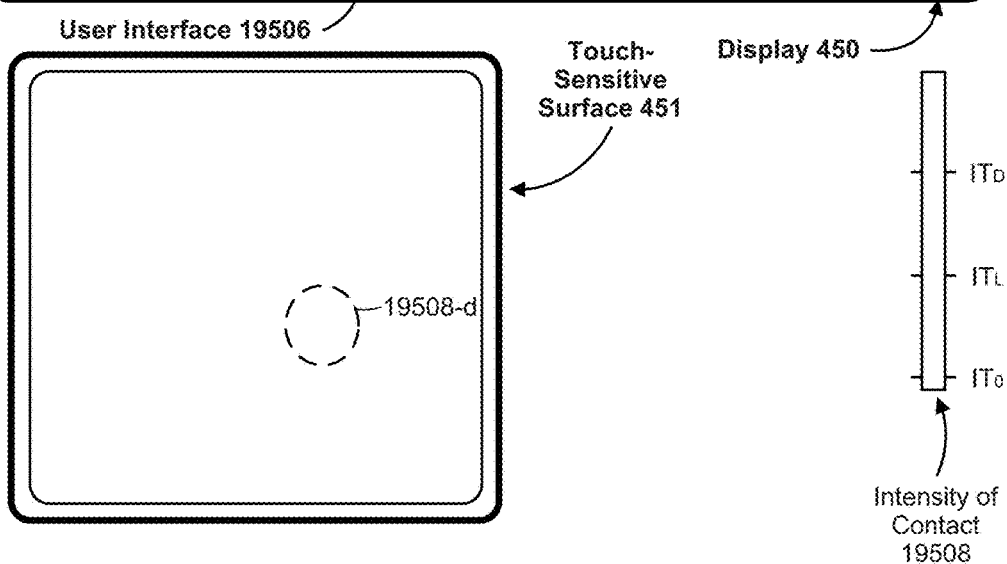
Figure 11Y:
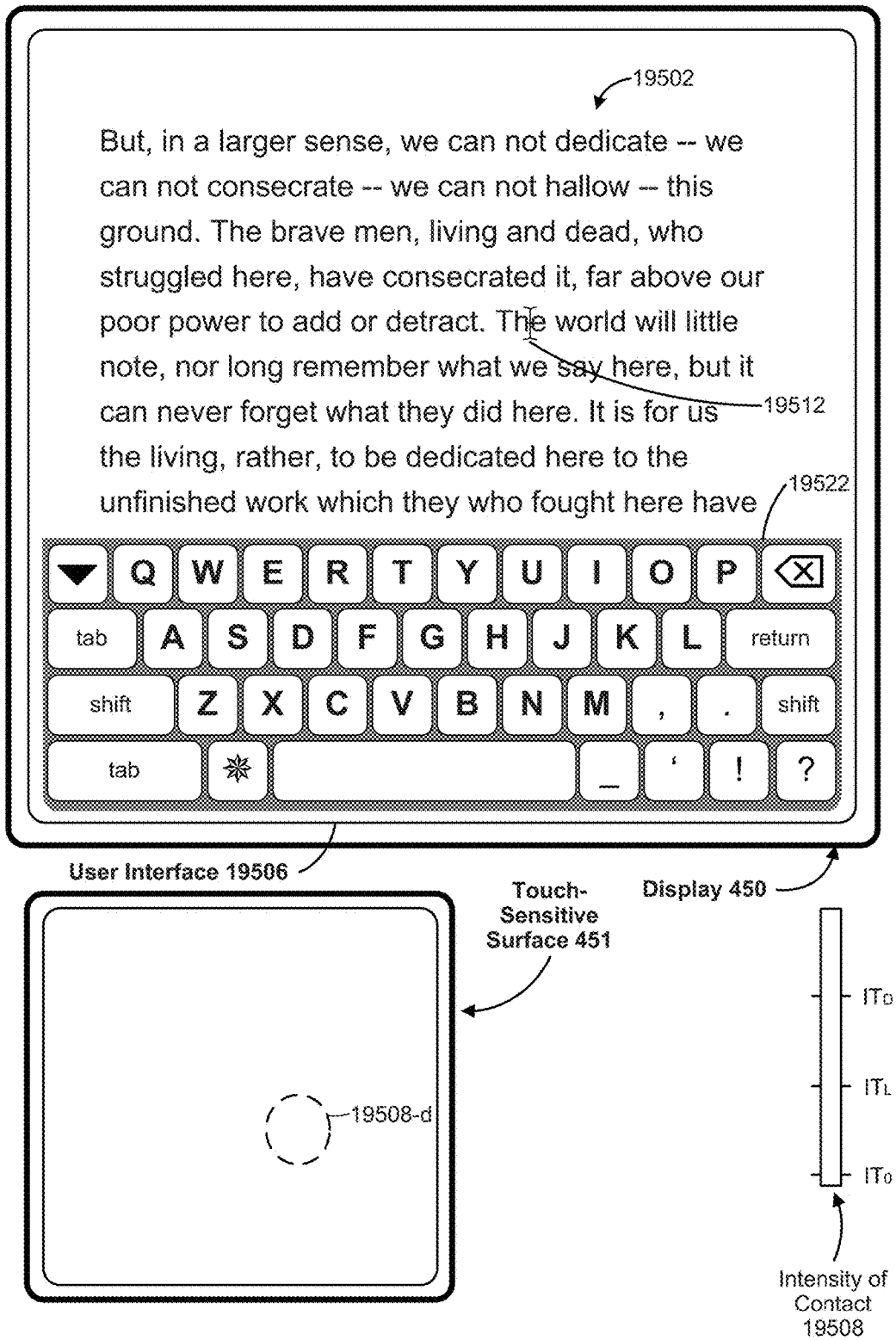
Figure 12A:
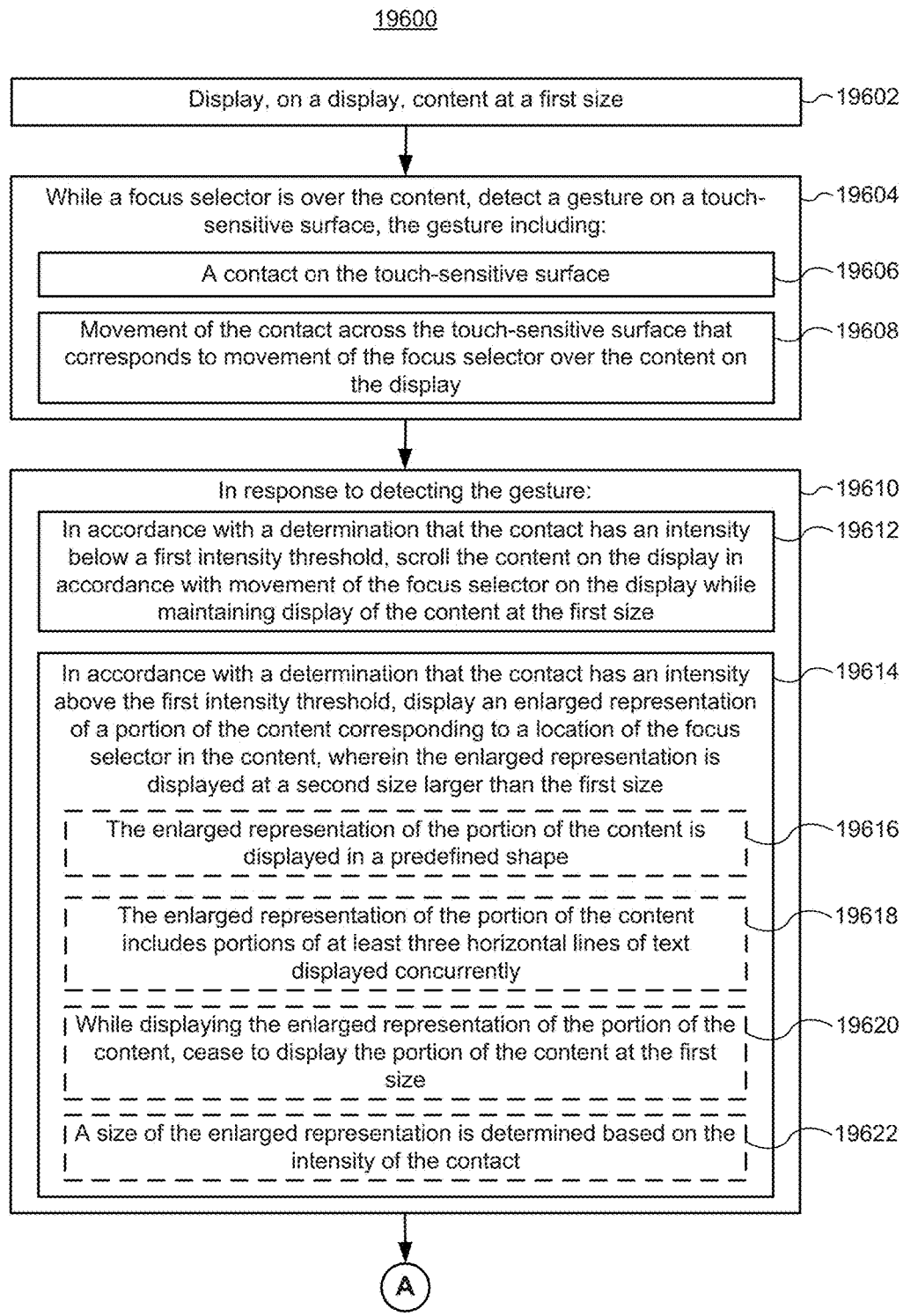
FIGS. 12A-12C are flow diagrams illustrating a method of interacting with user interface content in accordance with some embodiments.
Figure 12B:
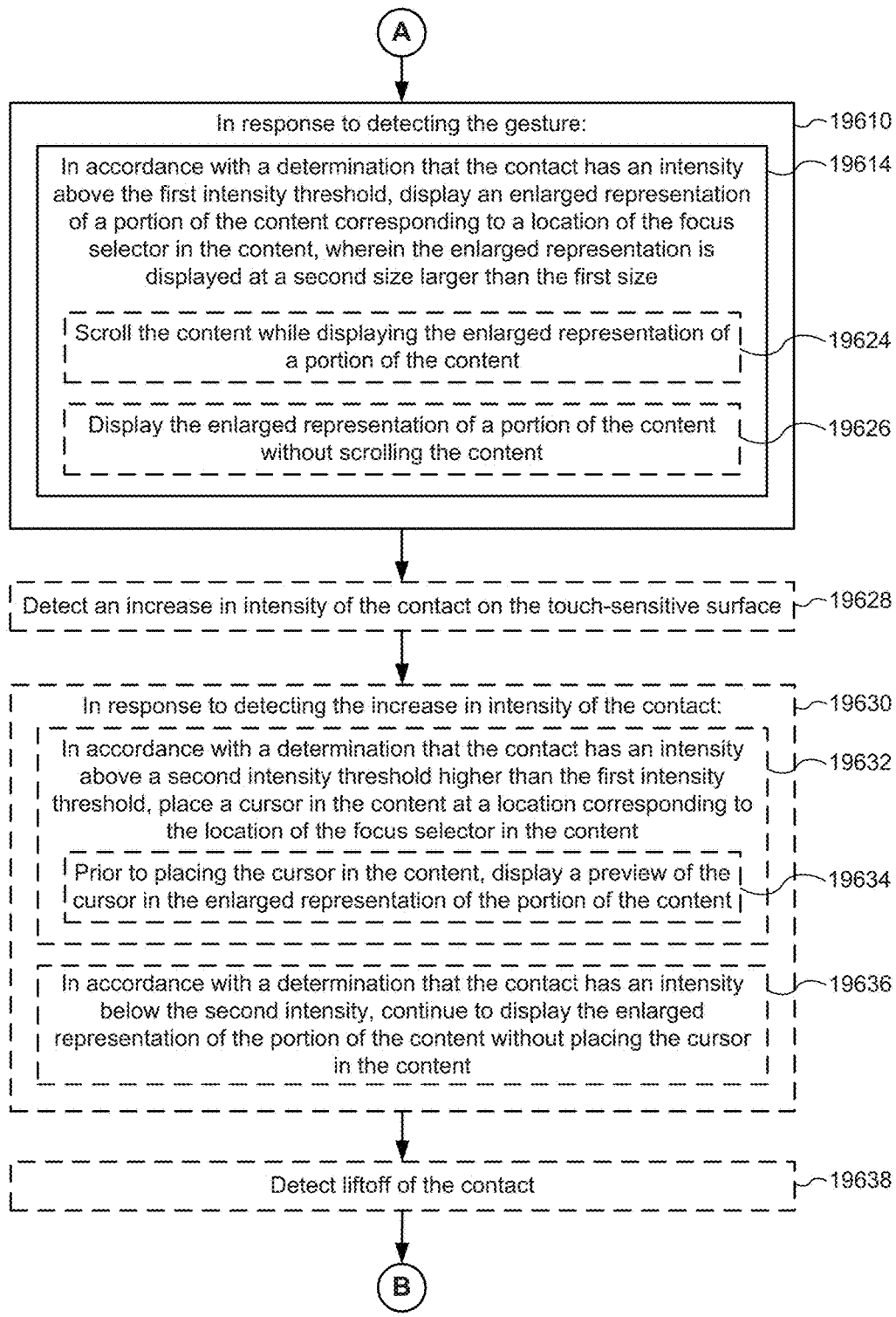
Figure 12C:
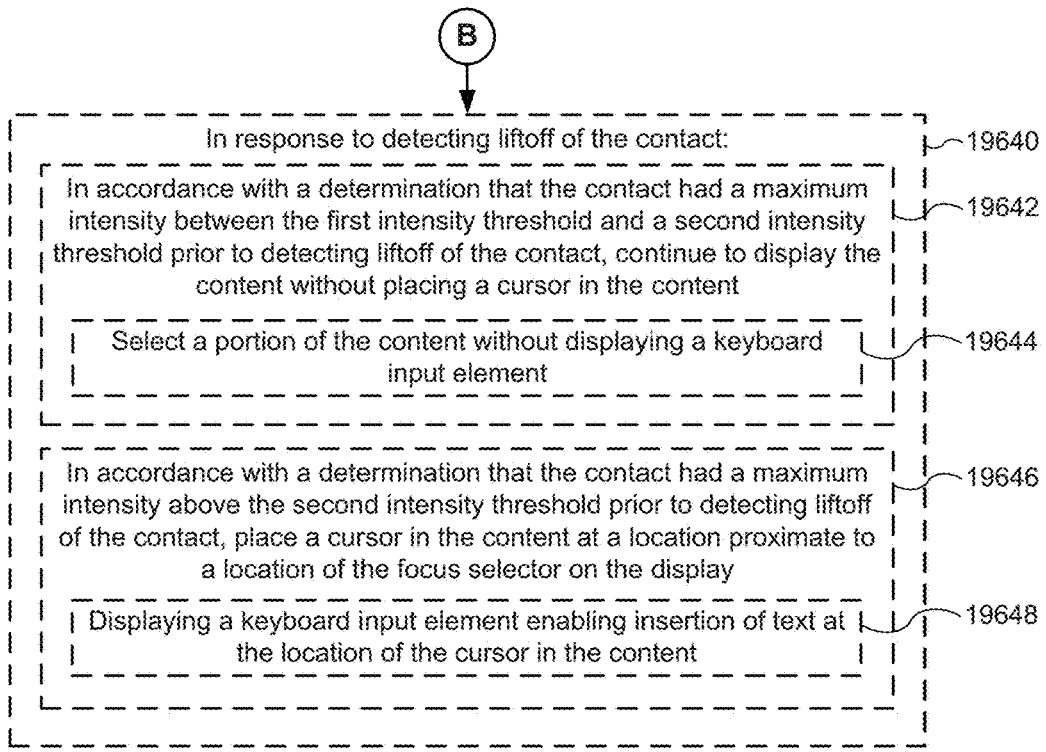

FIGS. 11A-11Y illustrate detection of a contact 19508, that corresponds to focus cursor 19504 or editing cursor 19512 displayed on display 450, and detection of a gesture including movement 19510 of contact 19508 (e.g., movement 19510-*a* of contact 19508 from location 19508-*a* in FIG. 11A to location 19508-*b* in FIGS. 11B-11D and 11N; movement 19510-*a* of contact 19508 from location 19508-*a* in FIG. 11E to location 19508-*b* in FIGS. 11F-11J; movement 19510-*b* of contact 19508 from location 19508-*b* in FIG. 11G to location 19508-*c* in FIG. 11K; and/or movement 19510-*c* of contact 19508 from location 19508-*b* in FIG. 11N to location 19508-*d* in FIGS. 11O and 11V) touch-sensitive surface 451. Contact 19508 is detected at a position on touch-sensitive surface 451 corresponding to an area on display 450 occupied by focus cursor 19504 or editing cursor 19512 (e.g., contact 19508 corresponds to a focus selector on the display which is at or near a location of text 19502). In some embodiments, movement 19510 of contact 19508 on touch-sensitive surface 451 corresponds to movement of focus cursor 19504 or editing cursor 19512 on display 450.

FIGS. 11A-11D illustrate an example of a beginning of a gesture where contact 19508 detected on touch-sensitive surface 451, corresponds to focus cursor 19504 displayed over text 19502 on display 450, and has an intensity below the magnification intensity threshold (e.g., "$IT_L$"). In accordance with movement 19510 of contact 19508 on touch-sensitive surface 451, text 19502 is scrolled, but not magnified, because contact 19508 has an intensity below the magnification intensity threshold (e.g., "$IT_L$").

FIGS. 11A-11C illustrate various embodiments where text 19502 is scrolled, but not magnified, in accordance with movement of focus cursor 19504. In some embodiments, as illustrated in FIG. 11B, text 19502 is scrolled in the opposite direction as the movement of focus cursor 19504 on display 450. For example, in response to movement 19510 of contact 19508, corresponding to movement of focus cursor 19504 on display 450, downward from position 19508-*a* in FIG. 11A to position 19508-*b* in FIG. 11B on touch-sensitive surface 451, word 19502-58 of text 19502 moves upwards from position 19502-58-*a* in FIG. 11A to position 19502-58-*b* in FIG. 11B on display 450. In some embodiments, as illustrated in FIG. 11C, text 19502 is scrolled in the same direction as the movement of focus cursor 19504 on display

450. For example, in response to movement 19510 of contact 19508, corresponding to movement of focus cursor 19504 on display 450, downward from position 19508-*a* in FIG. 11A to position 19508-*b* in FIG. 11C on touch-sensitive surface 451, word 19502-58 of text 19502 moves downward from position 19502-58-*a* in FIG. 11A to position 19502-58-*c* in FIG. 11C on display 450.

The series of FIGS. 11A and 11D illustrates an embodiment where text 19502 scrolls on display 450 in accordance with movement 19510 of contact 19508 on touch-sensitive surface 451, however, focus cursor 19504 does not move. For example, in response to movement 19510 of contact 19508 downward from position 19508-*a* in FIG. 11A to position 19508-*b* in FIG. 11D on touch-sensitive surface 451, word 19502-58 of text 19502 moves upwards from position 19502-58-*a* in FIG. 11A to position 19502-58-*b* in FIG. 11D on display 450, but focus cursor 19504 does not move. As such, the relative position of focus cursor 19504 in text 19502 moves in accordance with movement 19510 of contact 19508 on touch-sensitive surface 451 without cursor 19504 moving on display 450.

FIGS. 11E-11L illustrate an example of a beginning of a gesture where contact 19508 detected on touch-sensitive surface 451, corresponds to focus cursor 19504 displayed over text 19502 on display 450, and has an intensity above the magnification intensity threshold (e.g., "$IT_L$"). In accordance with movement of cursor 19504 over text 19502, a portion of text 19502 is displayed in enlarged representation 19514 (e.g., the portion of text is magnified on the display) because contact 19508 has an intensity above the magnification intensity threshold (e.g., "$IT_L$"). In some embodiments, as illustrated in FIGS. 11E-11L, enlarged representation 19514 of the portion of text 19502 is displayed as or in a predefined shape (e.g., a rectangle). In some embodiments, an enlarged representation that is enclosed in a predefined shape is called a "magnification loupe." In some embodiments, the enlarged representation 19514 is displayed when the intensity of contact 19508 increases to an intensity above the magnification intensity threshold (e.g., "$IT_L$"), even when the contact is stationary on the touch-sensitive surface 451 (e.g., the magnification loupe is displayed in response to a stationary press input), as shown in FIG. 11E.

FIGS. 11E-11K illustrate various embodiments where a portion of text 19502 is displayed in enlarged representation 19514 (e.g., the portion of text is magnified), but text 19502 is not scrolled. For example, in accordance with the movement of focus cursor 19504 on display 450, corresponding to movement 19510 of contact 19508 from position 19508-*a* in FIG. 11E to position 19508-*b* in FIGS. 11E-11J on touch-sensitive surface 451, a portion of text 19502 is displayed in enlarged representation 19514 (e.g., the portion of text is magnified) because the intensity of contact 19508 is above the magnification threshold (e.g., "$IT_L$"). During the selection, word 19502-58 does not move (e.g., is not scrolled) from position 19502-58-*a* in FIG. 11E, despite movement of focus cursor 19504 downward on display 450.

FIG. 11F illustrates an embodiment where enlarged representation 19514-1 of a portion of text 19502 includes a portion of at least the line of text 19502 that focus cursor 19504 is displayed over. For example, as illustrated in FIG. 11F, while focus cursor 19504 is displayed over the word "portion" in text 19502, enlarged representation 19514-1 displays words preceding (e.g., "dedicate" and "a") and following (e.g., "of," "that" and "field") the word "portion." In FIG. 11F, focus cursor 19504 has moved and thus the enlarged text within enlarged representation 19514-1 has changed to represent text at the location of focus cursor 19504 in FIG. 11F.

FIGS. 11G-11H illustrate an embodiment where enlarged representation 19514 of a portion of text 19502 includes portions of at least three horizontal lines of text 19502 displayed concurrently. For example, as illustrated in FIG. 11G, while focus cursor 19504 is displayed over the word "portion" in text 19502, enlarged representation 19514 displays words preceding (e.g., "dedicate" and "a") and following (e.g., "of," "that" and "field") the word "portion," as well as portions of the lines immediately above (e.g., "a great battle-field of that war.") and below (e.g., "ce for those who here gave th") the line of text 19502 in which "portion" is found.

FIG. 11H illustrates an embodiment where enlarged representation 19514 of a portion of text 19502 is displayed over (e.g., covers) the portion of text 19502 magnified from the pre-contact display. For example, as illustrated in FIG. 11G, text 19502 is displayed on display 450 at a first size. Upon magnification of a portion of text 19502 that includes the word "portion" at a second, larger, size (e.g., in enlarged representation 19514), the magnified portion of text 19502 displayed at the first, smaller, size is no longer visible. In contrast, FIG. 11G illustrates an embodiment where enlarged representation 19514 of a portion of text 19502 is not displayed over (e.g., is not covering) the portion of text 19502 magnified from the pre-contact display (e.g., the text shown in FIG. 11A).

FIGS. 11F and 11I-11J illustrate various embodiments where the size of enlarged representation 19514 of a portion of text 19502 is determined based on the intensity of contact 19508. For example, as illustrated in FIG. 11F, when contact 19508 on touch-sensitive surface 451, corresponding to focus cursor 19504 positioned over a portion of text 19502 on display 450, has an intensity above the magnification intensity threshold (e.g., "$IT_L$"), enlarged representation 19514 includes a portion of the line of text 19502 over which focus cursor 19504 is positioned and is displayed at a magnified size 19514-1. In contrast, when contact 19508 in FIG. 11I has a greater intensity than contact 19508 in FIG. 11F, enlarged representation 19514 is displayed at a magnified size 19514-2 that is greater than magnified size 19514-1, as shown in FIG. 11I (e.g., enlarging the magnification loupe includes increasing the size of the text that is included in the magnification loupe). In some embodiments, when contact 19508 in FIG. 11J has a greater intensity than contact 19508 in FIG. 11F, enlarged representation 19514 includes a portion of the line of text 19502 over which focus cursor 19504 is positioned, as well as portions of the lines immediately above and below the line of text 19502 over which focus cursor 19504 is positioned, as shown in FIG. 11J (e.g., enlarging the magnification loupe includes expanding the quantity of text that is included in the magnification loupe).

The series of FIGS. 11E and 11M illustrate an embodiment where a portion of text 19502 is magnified while text 19502 is scrolled, but focus cursor 19504 does not move on display 450. For example, text 19502 scrolls on display 450 in accordance with movement 19510 of contact 19508 from position 19508-*a* in FIG. 11E to position 19508-*b* in FIG. 11M on touch-sensitive surface 451 (e.g., word 19502-58 is scrolled from position 19502-58-*a* in FIG. 11E to position 19502-*b* in FIG. 11M on display 450). In accordance with the change (e.g., movement) of the relative position of focus cursor 19504 in text 19502, despite the lack of movement of focus cursor 19504 on display 450, the portion of text 19502 is displayed in enlarged representation 19514 because contact 19508 has an intensity above the magnification intensity threshold (e.g., "$IT_L$").

The series of FIGS. 11E and 11N illustrate an embodiment where a portion of text 19502 is magnified while text 19502 is scrolled. For example, a portion of text 19502 is displayed in enlarged representation 19514 in accordance with movement of focus cursor 19504 on display 450, corresponding to movement of contact 19508 from position 19508-*a* in FIG. 11E to position 19508-*b* in FIG. 11N, because the intensity of contact 19508 is above the magnification intensity threshold (e.g., "$IT_L$"). During the magnification, word 19502-58 moves (e.g., is scrolled) from position 19502-58-*a* in FIG. 11E to position 19502-*b* in FIG. 11N on display 450, in accordance with movement of focus cursor 19504 downward on display 450.

The series of FIGS. 11E, 11G, 11K and 11L illustrate an embodiment where a portion of text 19502 is magnified, but text 19502 is only scrolled when additional text is prompted to be displayed. For example, in accordance with movement of focus cursor 19504 on display 450, corresponding to movement 19510 of contact 19508 from position 19508-*a* in FIG. 11E, through position 19508-*b* in FIG. 11G, to position 19508-*c* in FIG. 11K on touch-sensitive surface 451, a portion of text 19502 is displayed in enlarged representation 19514 (e.g., is magnified) because the intensity of contact 19508 is above the magnification intensity threshold (e.g., "$IT_L$"), but text 19502 is not scrolled on display 450. In response to focus cursor 19504 reaching an edge of displayed text 19502 in FIG. 11K, text 19502 is scrolled upwards (e.g., word 19502-58 is scrolled from position 19502-58-*a* in FIG. 11K to position 19502-*b* in FIG. 11L on display 450) so that additional text is displayed proximate to focus cursor 19504. In some embodiments, as illustrated in FIG. 11L, when contact 19508 is maintained at an intensity above the magnification intensity threshold (e.g., "$IT_L$") at position 19508-*c* on touch-sensitive surface 451, corresponding to a position proximal to an edge of displayed text 19502, scrolling of text 19502 is continued despite the lack of movement of contact 19508. In some embodiments, the speed at which text 19502 is scrolled is determined in accordance with an intensity of contact 19508 (e.g., as intensity of contact 19508 increases, the speed of scrolling text 19502 increases).

The series of FIGS. 11A-11B and 11N-11O illustrate an embodiment where text 19502 is initially scrolled, but not magnified, in accordance with movement of focus cursor 19504, corresponding to movement of contact 19508 having an intensity below a magnification intensity threshold (e.g., "$IT_L$"), as shown in FIGS. 11A-11B. Following an increase in the intensity of contact 19508 to an intensity above the magnification intensity threshold (e.g., "$IT_L$"), scrolling of text 19502 is stopped and a portion of text 19502 is displayed in enlarged representation 19514 (e.g., is magnified) in accordance with subsequent movement of contact 19508. For example, when the intensity of contact 19508 is increased at position 19508-*b* from an initial intensity below a magnification intensity threshold (e.g., "$IT_L$") in FIG. 11B to a subsequent intensity above the magnification intensity threshold (e.g., "$IT_L$") in FIG. 11N, scrolling of text 19502 is stopped (e.g., word 19502-58 does not move from position 19502-58-*b* in FIGS. 11N-11O, despite continued movement of contact 19508 to position 19508-*c* in FIG. 11O) and a portion of text 19502 is displayed in enlarged representation 19514 in accordance with movement of contact 19508 from position 19508-*b* in FIG. 11N to position 19508-*c* in FIG. 11O on touch-sensitive surface 451.

FIGS. 11O-11R illustrate various embodiments where, in response to detecting an increase in the intensity of the contact, an editing cursor 19512 is placed in text 19502 at a location corresponding to the location of focus cursor 19504. For example, in response to detecting an increase of the intensity of contact 19508 on touch-sensitive surface 451, corresponding to focus cursor 19504 on display 450, from an intensity below a cursor-insertion intensity threshold (e.g., deep press intensity threshold "$IT_D$"), as illustrated in FIG. 11O, to an intensity above the cursor-insertion intensity threshold (e.g., "$IT_D$"), as illustrated in FIG. 11P, editing cursor 19512 is placed in the text displayed within enlarged representation 19514 at location 19512-2 on display 450, corresponding to location 19504-1 of focus cursor 19504 in text 19502 (e.g., between the letters "h" and "e" in the word "The"). FIG. 11Q illustrates an embodiment, where focus cursor 19504 is replaced with an editing cursor 19512 at location 19512-1 on display 450, corresponding to location 19504-1 of focus cursor 19504 in text 19502 (e.g., between the letters "h" and "e" in the word "The") in FIG. 11Q. In contrast, FIG. 11R illustrates an embodiment where, in response to an increase of the intensity of contact 19508 on touch-sensitive surface 451, corresponding to focus cursor 19504 on display 450, from an intensity below a cursor-insertion intensity threshold ("$IT_D$"), as illustrated in FIG. 11O, to a greater intensity that is still below cursor-insertion intensity threshold (e.g., "$IT_D$"), as illustrated in FIG. 11R, a editing cursor is not placed in the text.

FIGS. 11S-11T illustrate various embodiments where, prior to placing an editing cursor into the enlarged representation 19514 of text 19502, preview 19516 of an editing cursor 19512 is displayed. For example, in response to an increase of the intensity of contact 19508 on touch-sensitive surface 451, corresponding to focus cursor 19504 on display 450, from an intensity below the cursor-insertion intensity threshold (e.g., "$IT_D$"), as illustrated in FIG. 11O, to a greater intensity that is still below cursor-insertion intensity threshold (e.g., "$IT_D$"), as illustrated in FIG. 11S, preview 19516 of editing cursor 19512 is placed in the text displayed within enlarged representation 19514 at a location corresponding to location 19504-1 of focus cursor 19504 in text 19502 (e.g., between the letters "h" and "e" in the word "The").

The series of FIGS. 11O, 11S and 11P illustrates an embodiment where editing cursor 19512 is placed in enlarged representation 19514 of text 19502 when the intensity of contact 19508 is further increased. For example, while preview 19516 of editing cursor 19512 is displayed in FIG. 11S, in response to a subsequent increase in the intensity of contact 19508 on touch-sensitive surface 451 to an intensity above a cursor-insertion intensity threshold (e.g., "$IT_D$"), as illustrated in FIG. 11P, editing cursor 19512 is placed in enlarged representation 19514 of text 19502 at a position on display 450 previously occupied by preview 19516 of editing cursor 19512.

The series of FIGS. 11O, 11S, 11T and 11P illustrates an embodiment where an animation is shown during replacement of preview 19516 of editing cursor 19512 with editing cursor 19512. For example, while preview 19516 of editing cursor 19512 is displayed at size 19516-1 on display 450 in FIG. 11S, in response to a subsequent increase in the intensity of contact 19508 on touch-sensitive surface 451 to a greater intensity that is still below the cursor-insertion intensity threshold (e.g., "$IT_D$"), as illustrated in FIG. 11T, preview 19516 of editing cursor 19512 is shrunk to size 19516-2. In response to a further increase in the intensity of contact 19508 on touch-sensitive surface 451 to an intensity above the cursor-insertion intensity threshold (e.g., "$IT_D$"), as illustrated in FIG. 11P, editing cursor 19512 is placed in enlarged representation 19514 of text 19502 at a position on display 450 previously occupied by preview 19516 of editing cursor 19512, giving the impression that preview 19516 of editing cursor 19512 gradually "drops" into representation 19514 of text 19502 in accordance with the increase in intensity of contact 19508 from FIG. 11O to FIG. 11P.

FIGS. 11U-11Y illustrate various embodiments where user interface 19506 is conditionally activated for adjustment of displayed text 19502 upon liftoff of contact 19508 from touch-sensitive surface 451. For example, in response to detection of liftoff of contact 19508 from touch-sensitive surface 451, user interface 19506 is activated to perform one of a plurality of adjustment functionalities, dependent upon the movement intensity profile of contact 19508 prior to liftoff (e.g., immediately prior to detecting liftoff of the contact or at a predefined time prior to detecting liftoff of the contact).

The series of FIGS. 11E, 11N, 11P and 11U illustrates an embodiment where in response to liftoff of contact 19508, where contact 19508 had a maximum intensity prior to liftoff below the cursor-insertion intensity threshold (e.g., "$IT_D$"), text 19502 is displayed on display 450 without placing an editing cursor into the text. For example, in response to detecting liftoff of a gesture including contact 19508, movement 19510-a from position 19508-a in FIG. 11E to position 19508-b in FIG. 11N and movement 19510-c from position 19508-b in FIG. 11N to position 19508-d in FIG. 11O, corresponding to movement of focus cursor 19504 over text 19502 on display 450, having a maximum intensity above the magnification intensity threshold (e.g., "$IT_L$") and below the cursor-insertion intensity threshold (e.g., "$IT_D$"), display of text 19502 on display 450 is continued without inserting a editing cursor into text 19502, as illustrated in FIG. 11U.

The series of FIGS. 11E, 11N, 11V and 11W illustrates an embodiment where in response to liftoff of contact 19508, where contact 19508 had a maximum intensity prior to liftoff above the cursor-insertion intensity threshold (e.g., "$IT_D$"), editing cursor 19512 is placed in text 19502. For example, in response to detecting liftoff of a gesture including contact 19508, movement 19510-a from position 19508-a in FIG. 11E to position 19508-b in FIG. 11N and movement 19510-c from position 19508-b in FIG. 11N to position 19508-d in FIG. 11V, corresponding to movement of focus cursor 19504 over text 19502 on display 450, having a maximum intensity above the magnification intensity threshold (e.g., "$IT_L$") and above the cursor-insertion intensity threshold (e.g., "$IT_D$") as shown in FIG. 11V, editing cursor 19512 is placed in text 19502 at a position on display 450 previously occupied by focus cursor 19504, as illustrated in FIG. 11W.

The series of FIGS. 11E, 11N, 11O and 11X illustrates an embodiment where in response to liftoff of contact 19508, where contact 19508 had a maximum intensity prior to liftoff below the cursor-insertion intensity threshold (e.g., "$IT_D$"), portion 19518 of text 19502 is selected. For example, in response to detecting liftoff of a gesture including contact 19508, movement 19510-a from position 19508-a in FIG. 11E to position 19508-b in FIG. 11N and movement 19510-c from position 19508-b in FIG. 11N to position 19508-d in FIG. 11O, corresponding to movement of focus cursor 19504 over text 19502 on display 450, having a maximum intensity above the magnification intensity threshold (e.g., "$IT_L$") and below the cursor-insertion intensity threshold (e.g., "$IT_D$"), portion 19518 of text 19502 is selected, as illustrated in FIG. 11X. FIG. 11X illustrates an embodiment where, in response to liftoff of contact 19508, a keyboard input element is not displayed. FIG. 11X also illustrates an embodiment where, in response to liftoff of contact 19508, user interface menu 19520, including selectable affordances for cutting, copying and pasting text, is displayed on display 450. In some embodiments user interface menu 19520 enables the user to cut or copy the selected text or replace the selected text with pasted text from a virtual clipboard by activating virtual buttons on the menu (e.g., performing tap inputs or press inputs while a focus selector is over virtual buttons on the menu).

The series of FIGS. 11E, 11N, 11V and 11Y illustrates an embodiment where in response to liftoff of contact 19508, where contact 19508 had a maximum intensity prior to liftoff above the cursor-insertion intensity threshold (e.g., "$IT_D$"), editing cursor 19512 is placed in text 19502 and keyboard input element 19522 is displayed. For example, in response to detecting liftoff of a gesture including contact 19508, movement 19510-a from position 19508-a in FIG. 11E to position 19508-b in FIG. 11N and movement 19510-c from position 19508-b in FIG. 11N to position 19508-d in FIG. 11V, corresponding to movement of focus cursor 19504 over text 19502 on display 450, having a maximum intensity above the magnification intensity threshold (e.g., "$IT_L$") and above the cursor-insertion intensity threshold (e.g., "$IT_D$") as shown in FIG. 11V, editing cursor 19512 is placed in text 19502 at a position on display 450 previously occupied by focus cursor 19504 and keyboard input element 19522 is displayed on display 450, as illustrated in FIG. 11Y. In some embodiments keyboard input element 19522 enables the user to type out text and/or delete text at the location of editing cursor 19512 by activating virtual buttons/keys on the keyboard (e.g., performing tap inputs or press inputs while a focus selector is over virtual buttons/keys on the keyboard).

In some embodiments, the enlarged representation of the portion of the text (e.g., the "magnification loupe") is displayed in accordance with an enlarged-representation mode, where: when the enlarged-representation mode (e.g., "loupe-display mode") is enabled, the enlarged representation of the portion of the text is displayed without regard to a current intensity of the contact; and when the enlarged-representation mode is not enabled, the enlarged representation of the portion of the text is not displayed or is displayed only when the current intensity of the contact is above a enlarged-representation display intensity threshold (e.g., $IT_L$). For example, when not in the enlarged-representation mode, if the user reduces the intensity of the contact corresponding to the enlarged representation below the enlarged-representation display intensity threshold (e.g., $IT_L$), or lifts the contact off of the touch-sensitive surface, and the device will cease to display the enlarged representation of the portion of the text (e.g., as shown in FIGS. 11T and 11U where enlarged representation 19514 ceases to be displayed after detecting liftoff of contact 19508). In contrast, when in the enlarged-representation mode, even if the user reduces the intensity of the contact corresponding to the enlarged-representation below the enlarged-representation display intensity threshold (e.g., $IT_L$), or lifts the contact off of the touch-sensitive surface, the device will continue to display the enlarged representation of the portion of the text (e.g., if the device were in the enlarged-representation mode, in FIG. 11T enlarged representation 19514 would continue to be displayed on display 450 even if the intensity of contact 19508 decreased below $IT_L$ or was lifted off of touch-sensitive surface 451). Thus, in some situations the device displays an enlarged representation and enters the enlarged-representation mode in response to detecting an increase in intensity of a first contact (e.g., above a mode-change intensity threshold such as $IT_D$) and then, after ceasing to detect the first contact, detects a second contact corresponding to a focus selector at or near the location of the enlarged representation and subsequently moves the enlarged representation (e.g., that was displayed in response to the increase in intensity of the first contact) in accordance with movement of the second contact on the touch-sensitive surface.

In some embodiments, the enlarged representation is displayed when the intensity of a contact increases over a enlarged-representation display intensity threshold (e.g., $IT_L$), as shown in FIGS. 11A and 11E, without enabling the enlarged-representation mode and while the enlarged representation continues to be displayed, the device detects an increase in intensity of the contact over a mode-change intensity threshold (e.g., $IT_D$) that is higher than the enlarged-representation display intensity threshold (e.g., $IT_L$) and enters the enlarged-representation mode in response to detecting the increase in intensity of the contact over the mode-change intensity threshold (e.g., $IT_D$). In some embodiments a size of the enlarged representation gradually increases as the intensity of the contact increases from the enlarged-representation display intensity threshold (e.g., $IT_L$) to the mode-change intensity threshold (e.g., $IT_D$). In some embodiments, the enlarged-representation display intensity threshold is different from (and lower than) the mode-change intensity threshold, as described above. In some embodiments, the enlarged-representation display intensity threshold is the same as (or substantially the same as) the mode-change intensity threshold. Thus, in some embodiments, the enlarged representation is displayed and the enlarged-representation mode is enabled in response to detecting an increase in intensity of a contact above a same intensity threshold (e.g., a combined intensity threshold such as either $IT_L$ or $IT_D$).

Thus, in some embodiments, the device enters the enlarged-representation mode in response to detecting a first press input including an increase in intensity of a contact from an intensity below a mode-change intensity threshold (e.g., $IT_D$) to an intensity above the mode-change intensity threshold. In some embodiments, the device exits the enlarged-representation mode in response to detecting a second press input corresponding to a focus selector at or near a location of the enlarged representation on the display, where the second press input includes an increase in intensity of a contact from an intensity below the mode-change intensity threshold to an intensity above the mode-change intensity threshold (e.g., $IT_D$). For example, a user of the device can request semi-permanent display of a magnification loupe by performing a deep press input (e.g., increasing the intensity of a contact above $IT_D$) and can move the magnification loupe on the display by moving one or more contacts, with an intensity below the mode-change intensity threshold (e.g., $IT_D$), on the touch-sensitive surface that have an intensity below the mode-change intensity threshold (e.g., $IT_D$). In this example, when the user performs a second deep press input (e.g., with the same contact or a different contact from the contact that was used to perform the first press input) corresponding to a focus selector at or near a location of the enlarged representation on the display, the device exits the enlarged-representation mode and, when a contact drops below an enlarged-representation display intensity threshold (e.g., $IT_L$), the device ceases to display the enlarged representation.

FIGS. 12A-12C are flow diagrams illustrating a method 19600 of determining whether to scroll or enlarge content in accordance with some embodiments. The method 19600 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 19600 are, optionally, combined and/or the order of some operations is, optionally, changed.

As described below, the method 19600 provides an intuitive way to interact with user interface content. The method reduces the cognitive burden on a user when determining whether to scroll or enlarge content, thereby creating a more efficient human-machine interface. For battery-operated electronic devices, enabling a user to interact with user interface content faster and more efficiently conserves power and increases the time between battery charges.

In some embodiments, the device displays (19602), on a display (e.g., display 450), content at a first size (e.g. text 19502 in FIGS. 11A-11Y). In some embodiments, the content includes text, one or more images and/or more or more tables. In some embodiments, the content is selectable content that is configured to be selected and once selected can be copied, deleted or modified in accordance with input from a user of the device (e.g., text in a word processing application window, numbers in a spreadsheet application window, document icons in a folder application window, images in photography application window, music file icons in an audio player application window, video file icons in a video player application window, application shortcut icons displayed on a desktop).

In some embodiments, while a focus selector (e.g., focus cursor 19504 in FIGS. 11A-11P and 11R-11V or editing cursor 19512 in FIGS. 11Q, 11W and 11Y) is over the content, the device detects (19604) a gesture on a touch-sensitive surface (e.g., touch-sensitive surface 451), the gesture including a contact (e.g., contact 19508 in FIGS. 11A-11Y) on the touch-sensitive surface (19606) and movement (e.g., movement 19510 of contact 19508 in FIGS. 11A-11Y) of the contact across the touch-sensitive surface that corresponds to movement of the focus selector over the content on the display (19608) (e.g., movement of the focus selector over at least a portion of the content).

In some embodiments, in response (19610) to detecting the gesture: in accordance with a determination that the contact has an intensity below a first intensity threshold (e.g., light press intensity threshold "$IT_L$" in FIGS. 11A-11D), the device scrolls (19612) the content on the display (e.g., display 450) in accordance with movement of the focus selector on the display while maintaining display of the content at the first size, as shown in FIGS. 11A-11D. In some embodiments, the first intensity threshold is an intensity threshold that is higher than an input-detection intensity threshold (e.g., contact-detection intensity threshold $IT_0$) at which the contact is initially detected. In some embodiments, scrolling the content in accordance with movement of the focus selector includes scrolling the content so that it moves in a same direction as movement of the focus selector on the display (e.g., display 450) and/or movement of the contact on the touch-sensitive surface (e.g., touch-sensitive surface 451) as shown in FIGS. 11A and 11C. In some embodiments, scrolling the content in accordance with movement of the focus selector includes scrolling the content so that it moves in an opposite direction from movement of the focus selector on the display (e.g., display 450) and/or movement of the contact on the touch-sensitive surface (e.g., touch-sensitive surface 451) as shown in FIGS. 11A-11B.

In response (19610) to detecting the gesture: in accordance with a determination that the contact has an intensity above the first intensity threshold (e.g., light press intensity threshold "$IT_L$" in FIGS. 11E-11T and 11V), the device displays (19614) an enlarged representation (e.g., enlarged representation 19514 in FIGS. 11E-11T and 11V) of a portion of the content (e.g., text 19502) corresponding to a location of the focus selector in the content, where the enlarged representation is displayed at a second size larger than the first size. In some embodiments, the content is text, the first size is a first font size and the second size is a second font size that is larger than the first font size. In some embodiments, the enlarged representation of the portion of the content (e.g., enlarged representation 19514 of portions of text 19502) is displayed (19616) in a predefined shape (e.g., in a virtual loupe shaped like a rectangle, square, oval or circle), as shown in FIG. 11E. In some embodiments, the enlarged representation of the portion of the content (e.g., enlarged representation 19514 of portions of text 19502) includes (19618) portions of at least three horizontal lines of text displayed concurrently (e.g., as illustrated in FIGS. 11G-11H, 11J-11T and 11V).

In some embodiments, while displaying the enlarged representation of the portion of the content (e.g., enlarged representation 19514 of portions of text 19502), the device ceases (19620) to display the portion of the content at the first size (e.g., the virtual loupe covers the portion of the content, as illustrated in FIG. 11H). In some embodiments, a size of the enlarged representation is determined (19622) based on the intensity of the contact (e.g., a harder press input increases a size of the virtual loupe). In some embodiments, as the size of the enlarged representation increases, the font size of the text increases along with the enlarged representation so that the text in the enlarged representation is larger (e.g., as illustrated in FIGS. 11F and 11I). In some embodiments, as the size of the enlarged representation increases, the font size of the text in the enlarged representation stays the same, so that the amount of text shown in the enlarged representation increases (e.g., more characters are displayed in the enlarged representation, as illustrated in FIGS. 11F and 11J).

In some embodiments, the device scrolls (19624) the content (e.g., text 19502) while displaying the enlarged representation (e.g., enlarged representation 19514) of a portion of the content. For example, when the focus selector reaches an edge of a displayed portion of the content or the first contact reaches an edge of the touch-sensitive surface, the device scrolls the content so that additional content is displayed proximate to the first contact (e.g., by scrolling the content up if the first contact is near a bottom edge of the displayed content, as illustrated in the series of FIGS. 11K-11L, or scrolling the content down if the first contact is near a top edge of the displayed content).

In some embodiments, the device displays (19626) the enlarged representation of a portion of the content (e.g., enlarged representation 19514 of text 19502) without scrolling the content. For example, when the contact has an intensity above the first intensity threshold (e.g., "$IT_L$"), the device stops scrolling the content in accordance with movement of the focus selector and begins displaying an enlarged portion of the content that changes in accordance with movement of the focus selector (e.g., as illustrated in the series of FIGS. 11A-11B and 11N-11O).

In some embodiments, the device detects (19628) an increase in intensity of the contact on the touch-sensitive surface. In some embodiments, in response (19630) to detecting the increase in intensity of the contact, in accordance with a determination that the contact has an intensity above a second intensity threshold (e.g., a cursor-insertion intensity threshold corresponding to deep press intensity threshold "$IT_D$" in FIGS. 11P-11Q and 11V) higher than the first intensity threshold (e.g., magnification intensity threshold corresponding to light press intensity threshold "$IT_L$"), the device places (19632) a cursor (e.g., editing cursor 19512 in FIGS. 11P-11Q, 11V-11W and 11Y) in the content at a location corresponding to the location of the focus selector (e.g., focus cursor 19504) in the content.

In some embodiments, prior to placing the cursor (e.g., editing cursor 19512 in FIGS. 11P-11Q, 11V-11W and 11Y) in the content, the device displays (19634) a preview of the cursor (e.g., preview 19516 of editing cursor 19512 in FIGS. 11S-11T) in the enlarged representation of the portion of the content (e.g., enlarged representation 19514 of a portion of text 19502). In some embodiments, the preview of the cursor is displayed when the contact has intensity between a cursor-preview intensity threshold (e.g., "$IT_L$" or a hysteresis intensity threshold associated with and below $IT_D$) and a cursor-insertion intensity threshold (e.g., "$IT_D$").

In some embodiments, in response (19630) to detecting the increase in intensity of the contact, in accordance with a determination that the contact has an intensity below the second intensity (e.g., cursor-insertion intensity "$IT_D$"), the device continues (19636) to display the enlarged representation of the portion of the content (e.g., enlarged representation 19514 of a portion of text 19502) without placing the cursor in the content.

In some embodiments, the device detects (19638) liftoff of the contact (e.g., contact 19508 on touch-sensitive surface 451, as illustrated in FIGS. 11U and 11W-11Y). For example, in some embodiments, liftoff of the contact is detected after displaying a preview of a cursor (e.g., preview 19516 of editing cursor 19512) in the content (e.g., text 19502) or enlarged representation of the portion of the content (e.g., enlarged representation 19514 of text 19502) on the display.

In some embodiments, in response (19640) to detecting liftoff of the contact (e.g., contact 19508), in accordance with a determination that the contact had a maximum intensity between the first intensity threshold (e.g., magnification intensity threshold "$IT_L$" or a cursor-preview intensity threshold) and a second intensity threshold (e.g., cursor-insertion intensity threshold "$IT_D$") prior to detecting liftoff of the contact, the device continues (19642) to display the content (e.g., text 19502) without placing a cursor in the content, as shown in FIG. 11U. In some embodiments, in response (19640) to detecting liftoff of the contact, in accordance with a determination that the contact had a maximum intensity between the first intensity threshold (e.g., magnification intensity threshold "$IT_L$" or a cursor-preview intensity threshold) and the second intensity threshold (e.g., cursor-insertion intensity threshold "$IT_D$") prior to detecting liftoff of the contact, the device selects (19644) a portion of the content without displaying a keyboard input element (e.g., selects a word closest to the focus selector upon liftoff, such as word "The," selection 19518, and displays a cut/copy/paste user interface 19520, as illustrated in FIG. 11X).

In response (19640) to detecting liftoff of the contact (e.g., contact 19508), in accordance with a determination that the contact had a maximum intensity above the second intensity threshold (e.g., cursor-insertion intensity threshold "$IT_D$") prior to detecting liftoff of the contact, the device places (19646) a cursor (e.g., editing cursor 19512) in the content at a location proximate to a location of the focus selector (e.g., focus cursor 19504) on the display (e.g., display 450). In some embodiments, in response (19640) to detecting liftoff of the contact, in accordance with a determination that the contact had a maximum intensity above the second intensity threshold (e.g., cursor-insertion intensity threshold "$IT_D$") prior to detecting liftoff of the contact, the device displays (19648) a keyboard input element (e.g., keyboard input element 19524 in FIG. 11Y) enabling insertion and/or deletion of text at the location of the cursor (e.g., editing cursor 19512) in the content (e.g., text 19502).

It should be understood that the particular order in which the operations in FIGS. 12A-12C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 19600 described above with respect to FIGS. 12A-12C. For example the contacts, gestures, user interface objects, intensity thresholds, focus selectors and animations described above with reference to method 19600 optionally have one or more of the characteristics of the contacts, gestures, user interface objects, intensity thresholds, focus selectors and animations described herein with reference to other methods described herein (e.g., those listed in the fifth paragraph of the Description of Embodiments). For brevity, these details are not repeated here.

Figure 13:
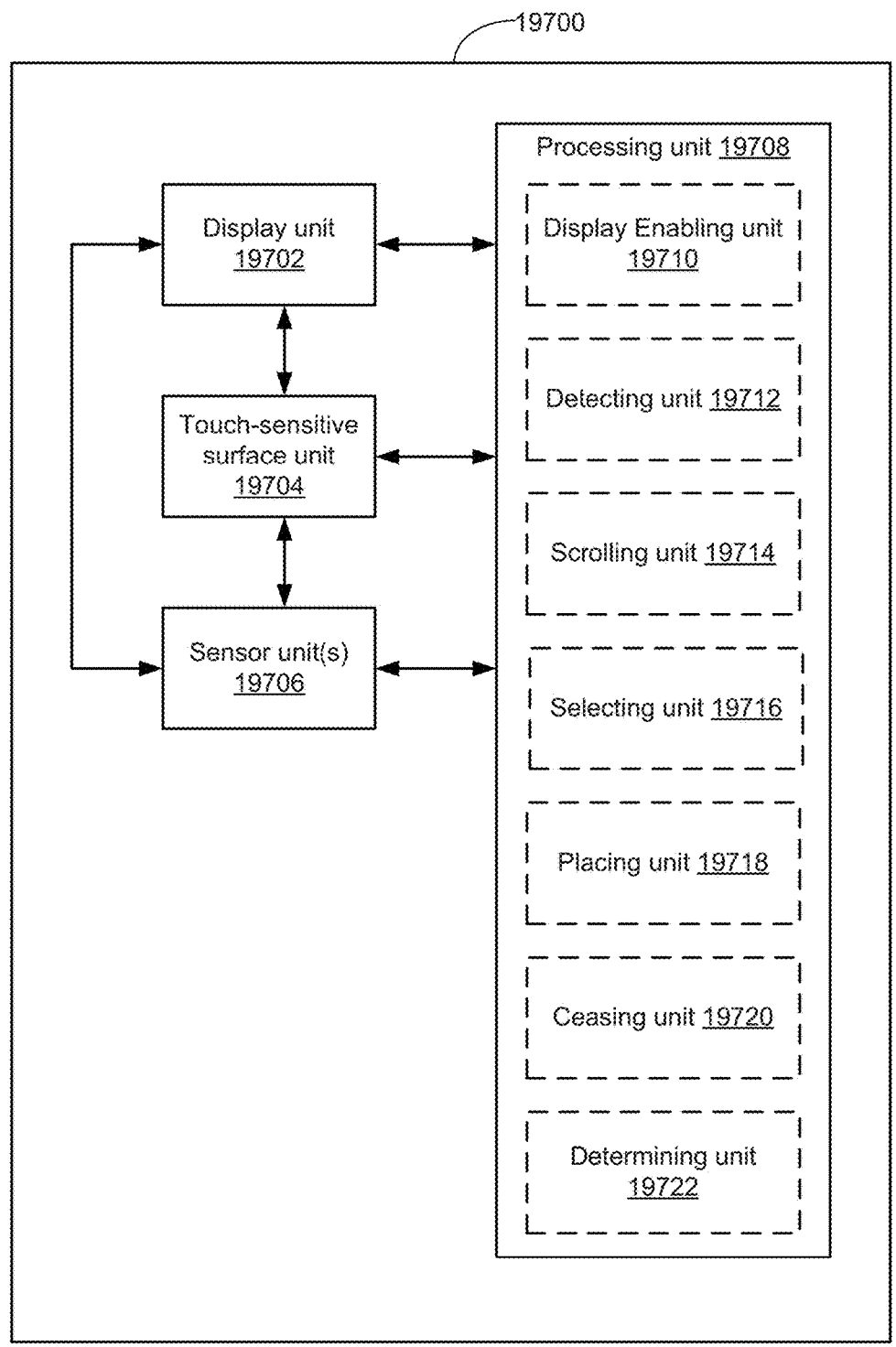
FIG. 13 is a functional block diagram of an electronic device in accordance with some embodiments.

In accordance with some embodiments, FIG. 13 shows a functional block diagram of an electronic device 19700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 19700 includes a display unit 19702 configured to display content, a touch-sensitive surface unit 19704 configured to receive user contacts, one or more sensor units 19706 configured to detect intensity of contacts with the touch-sensitive surface unit 19704; and a processing unit 19708 coupled to the display unit 19702, the touch-sensitive surface unit 19704 and the one or more sensor units 19706. In some embodiments, the processing unit 19708 includes a display enabling unit 19710, a detecting unit 19712, a scrolling unit 19714, a selecting unit 19716, a placing unit 19718, and a ceasing unit 19720, and a determining unit 19722.

In some embodiments, the processing unit 19708 is configured to enable display (e.g., with the display enabling unit 19710) of content at a first size on the display unit 19702. In some embodiments, the processing unit 19708 is further configured, while a focus selector is over the content, to detect a gesture on a touch-sensitive surface unit 19704 (e.g., with the detecting unit 19712), the gesture including: a contact on the touch-sensitive surface unit 19704 and movement of the contact across the touch-sensitive surface unit 19704 that corresponds to movement of the focus selector over the content on the display unit 19702; and in response to detecting the gesture: in accordance with a determination (e.g., with the determining unit 19722) that the contact has an intensity below a first intensity threshold (e.g., "$IT_L$"), the processing unit 19708 is configured to scroll the content on the display unit 19702 (e.g., with the scrolling unit 19714) in accordance with movement of the focus selector on the display unit 19702 while maintaining display of the content at the first size (e.g., with the display enabling unit 19710); and in accordance with a determination that the contact has an intensity above the first intensity threshold, the processing unit 19708 is configured to display an enlarged representation of a portion of the content corresponding to a location of the focus selector in the content (e.g., with the display enabling unit 19710), where the enlarged representation is displayed at a second size larger than the first size.

In some embodiments, the processing unit 19708 is configured to enable display of the enlarged representation of the portion of the content in a predefined shape (e.g., with the display enabling unit 19710).

In some embodiments, the enlarged representation of the portion of the content includes portions of at least three horizontal lines of text displayed concurrently.

In some embodiments, the processing unit 19708 is configured to, while enabling display of the enlarged representation of the portion of the content (e.g., with the display enabling unit 19710), cease to enable display of the portion of the content at the first size (e.g., with the ceasing unit 19720).

In some embodiments, the processing unit 19708 is configured to determine a size of the enlarged representation based on the intensity of the contact (e.g., with the determining unit 19722).

In some embodiments, the processing unit 19708 is configured to scroll the content (e.g., with the scrolling unit 19714) while enabling display of the enlarged representation of a portion of the content (e.g., with the display enabling unit 19710).

In some embodiments, the processing unit 19708 is configured to enable display of the enlarged representation of a portion of the content (e.g., with the display enabling unit 19710) without scrolling the content.

In some embodiments, the processing unit is further configured to detect an increase in intensity of the contact (e.g., with the detecting unit 19712) on the touch-sensitive surface unit 19704; and in response to detecting the increase in intensity of the contact: in accordance with a determination (e.g., with the determining unit 19722) that the contact has an intensity above a second intensity threshold (e.g., "$IT_D$") higher than the first intensity threshold, the processing unit 19708 is configured to place a cursor in the content at a location corresponding to the location of the focus selector in the content (e.g., with the placing unit 19718); and in accordance with a determination that the contact has an intensity below the second intensity, the processing unit is configured to continue enabling display of the enlarged representation of the portion of the content (e.g., with the display enabling unit 19710) without placing the cursor in the content.

In some embodiments, the processing unit 19708 is configured to, prior to placing the cursor in the content (e.g., with the placing unit 19718), enable display of a preview of the cursor in the enlarged representation of the portion of the content (e.g., with the display enabling unit).

In some embodiments, the processing unit 19708 is further configured to detect liftoff of the contact (e.g., with the detecting unit 19712) and in response to detecting liftoff of the contact: in accordance with a determination (e.g., with the determining unit 19722) that the contact had a maximum intensity between the first intensity threshold and a second intensity threshold prior to detecting liftoff of the contact, the processing unit is configured to continue enabling display of the content without placing a cursor in the content (e.g., with the display enabling unit 19710); and in accordance with a determination that the contact had a maximum intensity above the second intensity threshold prior to detecting liftoff of the contact, the processing unit 19708 is configured to place a cursor in the content at a location proximate to a location of the focus selector on the display unit 19702 (e.g., with the placing unit 19718).

In some embodiments, in response to detecting liftoff of the contact (e.g., with the detecting unit 19712), in accordance with a determination (e.g., with the determining unit 19722) that the contact had a maximum intensity between the first intensity threshold and the second intensity threshold prior to detecting liftoff of the contact, the processing unit 19708 is configured to select a portion of the content without displaying a keyboard input element (e.g., with the selecting unit 19716).

In some embodiments, in response to detecting liftoff of the contact (e.g., with the detecting unit 19712), in accordance with a determination (e.g., with the determining unit 19722) that the contact had a maximum intensity above the second intensity threshold prior to detecting liftoff of the contact, the processing unit 19708 is configured to enable display of a keyboard input element (e.g., with the display enabling unit 19710) enabling insertion of text at the location of the cursor in the content.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 12A-12C are, optionally, implemented by components depicted in FIGS. 1A-1B or FIG. 13. For example, detecting operations 19604, 19628 and 19638, scrolling operations 19612 and 19624, ceasing operation 19620, placing operations 19632 and 19646 and selecting operation 19642 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

It should be understood that the particular order in which the operations have been described above is merely exemplary and is not intended to indicate that the described order is the only order in which the operations could be performed. One of ordinary skill in the art would recognize various ways to reorder the operations described herein. Additionally, it should be noted that the various processes separately described herein (e.g., those listed in the fifth paragraph of the Description of Embodiments) can be combined with each other in different arrangements. For example, the contacts, user interface objects, tactile sensations, intensity thresholds, and/or focus selectors described above with reference to any one of the various processes separately described herein (e.g., those listed in the fifth paragraph of the Description of Embodiments) optionally have one or more of the characteristics of the contacts, gestures, user interface objects, tactile sensations, intensity thresholds, and focus selectors described herein with reference to one or more of the other methods described herein (e.g., those listed in the fifth paragraph of the Description of Embodiments). For brevity, all of the various possible combinations are not specifically enumerated here, but it should be understood that the claims described above may be combined in any way that is not precluded by mutually exclusive claim features.

The foregoing description, for purpose of explanation, has been described with reference to specific embodiments. However, the illustrative discussions above are not intended to be exhaustive or to limit the various described embodiments to the precise forms disclosed. Many modifications and variations are possible in view of the above teachings. The embodiments were chosen and described in order to best explain the principles of the various described embodiments and their practical applications, to thereby enable others skilled in the art to best utilize the various described embodiments with various modifications as are suited to the particular use contemplated.

What is claimed is:

1. A non-transitory computer readable storage medium storing one or more programs, the one or more programs comprising instructions, which when executed by an electronic device with a display, a touch-sensitive surface and one or more sensors to detect intensities of contacts with the touch-sensitive surface, cause the device to:

display a user interface on the display, wherein the user interface includes content;

while a focus selector is over the content, detect a first portion of a gesture on the touch-sensitive surface, the first portion of the gesture including:

a first contact on the touch-sensitive surface; and movement of the first contact across the touch-sensitive surface that corresponds to movement of the focus selector on the display;

in response to detecting the first portion of the gesture, update the user interface in accordance with the first portion of the gesture, including:

in accordance with a determination that the first contact has an intensity below a selection intensity threshold during the first portion of the gesture, scroll the content on the display in accordance with movement of the focus selector on the display during the first portion of the gesture without selecting the content; and in accordance with a determination that the first contact has an intensity above the selection intensity threshold during the first portion of the gesture, select at least a portion of the content in accordance with the movement of the focus selector over the content during the first portion of the gesture; and after updating user interface in accordance with the first portion of the gesture, detect a second portion of the gesture that includes detecting movement of the first contact on the touch-sensitive surface while the first contact has an intensity below the selection intensity threshold; and, in response to detecting the second portion of the gesture:
in accordance with a determination that the first contact had an intensity that remained below the selection intensity threshold during the first portion of the gesture, scroll the content on the display in accordance with movement of the first contact on the touch-sensitive surface during the second portion of the gesture without selecting the content; and
in accordance with a determination that the first contact had an intensity above the selection intensity threshold during the first portion of the gesture, adjust the selection in accordance with movement of the first contact on the touch-sensitive surface during the second portion of the gesture.

2. The computer readable storage medium of claim 1, wherein selecting the portion of the content in accordance with the movement of the focus selector over the content includes selecting the portion of the content without scrolling the content.

3. The computer readable storage medium of claim 1, including instructions which cause the device to scroll the content while selecting the portion of the content in accordance with the movement of the focus selector over the content.

4. The computer readable storage medium of claim 1, wherein the instructions which cause the device to select the portion of the content in accordance with the movement of the focus selector over the content include instructions which cause the device to:
determine an intensity of the first contact;
select a respective content subunit type of a plurality of content subunit types in accordance with the intensity of the first contact; and
adjust the selection by adding whole content subunits of the respective subunit type to the selection in accordance with movement of the first contact.

5. An electronic device, comprising:
a display;
a touch-sensitive surface;
one or more sensors to detect intensities of contacts with the touch-sensitive surface;
one or more processors;
memory; and
one or more programs, wherein the one or more programs are stored in the memory and configured to be executed by the one or more processors, the one or more programs including instructions for:
displaying a user interface on the display, wherein the user interface includes content;
while a focus selector is over the content, detecting a first portion of a gesture on the touch-sensitive surface, the first portion of the gesture including:
a first contact on the touch-sensitive surface; and
movement of the first contact across the touch-sensitive surface that corresponds to movement of the focus selector on the display;
in response to detecting the first portion of the gesture, updating the user interface in accordance with the first portion of the gesture, including:
in accordance with a determination that the first contact has an intensity below a selection intensity threshold during the first portion of the gesture, scrolling the content on the display in accordance with movement of the focus selector on the display during the first portion of the gesture without selecting the content; and
in accordance with a determination that the first contact has an intensity above the selection intensity threshold during the first portion of the gesture, selecting at least a portion of the content in accordance with the movement of the focus selector over the content during the first portion of the gesture; and
after updating user interface in accordance with the first portion of the gesture, detecting a second portion of the gesture that includes detecting movement of the first contact on the touch-sensitive surface while the first contact has an intensity below the selection intensity threshold; and,
in response to detecting the second portion of the gesture:
in accordance with a determination that the first contact had an intensity that remained below the selection intensity threshold during the first portion of the gesture, scrolling the content on the display in accordance with movement of the first contact on the touch-sensitive surface during the second portion of the gesture without selecting the content; and
in accordance with a determination that the first contact had an intensity above the selection intensity threshold during the first portion of the gesture, adjusting the selection in accordance with movement of the first contact on the touch-sensitive surface during the second portion of the gesture.

6. The electronic device of claim 5, wherein selecting the portion of the content in accordance with the movement of the focus selector over the content includes selecting the portion of the content without scrolling the content.

7. The electronic device of claim 5, including instructions for scrolling the content while selecting the portion of the content in accordance with the movement of the focus selector over the content.

8. The electronic device of claim 5, wherein the instructions for selecting the portion of the content in accordance with the movement of the focus selector over the content include instructions for:
determining an intensity of the first contact;
selecting a respective content subunit type of a plurality of content subunit types in accordance with the intensity of the first contact; and
adjusting the selection by adding whole content subunits of the respective subunit type to the selection in accordance with movement of the first contact.

9. A method, comprising:
at an electronic device with a touch-sensitive surface and a display, wherein the device includes one or more sensors to detect intensities of contacts with the touch-sensitive surface:
displaying user interface on the display, wherein the user interface includes content;
while a focus selector is over the content, detecting a first portion of a gesture on the touch-sensitive surface, the first portion of the gesture including:
a first contact on the touch-sensitive surface; and movement of the first contact across the touch-sensitive surface that corresponds to movement of the focus selector on the display;
in response to detecting first portion of the gesture, updating the user interface in accordance with the first portion of the gesture, including:
in accordance with a determination that the first contact has an intensity below a selection intensity threshold during the first portion of the gesture, scrolling the content on the display in accordance with movement of the focus selector on the display during the first portion of the gesture without selecting the content; and
in accordance with a determination that the first contact has an intensity above the selection intensity threshold during the first portion of the gesture, selecting at least a portion of the content in accordance with the movement of the focus selector over the content during the first portion of the gesture; and,
after updating user interface in accordance with the first portion of the gesture, detecting a second portion of the gesture that includes detecting movement of the first contact on the touch-sensitive surface while the first contact has an intensity below the selection intensity threshold; and
in response to detecting the second portion of the gesture:
in accordance with a determination that the first contact had an intensity that remained below the selection intensity threshold during the first portion of the gesture, scrolling the content on the display in accordance with movement of the first contact on the touch-sensitive surface during the second portion of the gesture without selecting the content; and
in accordance with a determination that the first contact had an intensity above the selection intensity threshold during the first portion of the gesture, adjusting the selection in accordance with movement of the first contact on the touch-sensitive surface during the second portion of the gesture.

10. The method of claim 9, wherein selecting the portion of the content in accordance with the movement of the focus selector over the content includes selecting the portion of the content without scrolling the content.

11. The method of claim 9, including scrolling the content while selecting the portion of the content in accordance with the movement of the focus selector over the content.

12. The method of claim 9, wherein selecting the portion of the content in accordance with the movement of the focus selector over the content include:
determining an intensity of the first contact;
selecting a respective content subunit type of a plurality of content subunit types in accordance with the intensity of the first contact; and
adjusting the selection by adding whole content subunits of the respective subunit type to the selection in accordance with movement of the first contact.

13. A non-transitory computer readable storage medium storing one or more programs, the one or more programs comprising instructions, which when executed by an electronic device with a display, a touch-sensitive surface and one or more sensors to detect intensities of contacts with the touch-sensitive surface, cause the device to:

display a user interface on the display, wherein the user interface includes content;
while a focus selector is over the content, detect a gesture on the touch-sensitive surface, the gesture including:
a first contact on the touch-sensitive surface; and
movement of the first contact across the touch-sensitive surface that corresponds to movement of the focus selector on the display;
in response to detecting the gesture:
in accordance with a determination that the first contact has an intensity below a selection intensity threshold, scroll the content on the display in accordance with movement of the focus selector on the display without selecting the content; and
in accordance with a determination that the first contact has an intensity above the selection intensity threshold, select at least a portion of the content in accordance with the movement of the focus selector over the content; and
prior to selecting the portion of the content:
detect an increase in intensity of the first contact to a first intensity that is lower than the selection intensity threshold; and
in response to detecting the increase in intensity of the first contact:
in accordance with a determination that the first intensity is above a cursor-preview intensity threshold, display a preview of a cursor in the content at a respective location proximate to the focus selector; and
in accordance with a determination that the first intensity is below the cursor-preview intensity threshold, continue to display the content without displaying the preview of the cursor.

14. The computer readable storage medium of claim 13, including instructions which cause the device to:
while displaying the preview of the cursor in the content, detect an increase in intensity of the first contact from the first intensity to a second intensity; and
in response to detecting the increase in intensity of the first contact from the first intensity to the second intensity:
in accordance with a determination that the second intensity is above a cursor-insertion intensity threshold, insert a cursor in the content; and
in accordance with a determination that the second intensity is below the cursor-insertion intensity threshold, continue to display the preview of the cursor without inserting the cursor in the content.

15. The computer readable storage medium of claim 14, wherein inserting the cursor in the content includes displaying an animation of the preview of the cursor being replaced with the cursor.

16. The computer readable storage medium of claim 14, wherein selecting the portion of the content in accordance with movement of the focus selector over the content includes starting the selecting at a location in the content that corresponds to a location of the cursor.

17. The computer readable storage medium of claim 13, including instructions which cause the device to, after selecting the portion of the content:
detect a decrease in intensity of the first contact below the selection intensity threshold; and
in response to detecting the decrease in intensity of the first contact below the selection intensity threshold:
in accordance with a determination that the intensity of the first contact is above a selection-adjustment intensity threshold, adjust the selection in accordance with movement of the first contact on the touch-sensitive surface; and in accordance with a determination that the intensity of the first contact is below the selection-adjustment intensity threshold, forgo adjustment of the selection.

18. The computer readable storage medium of claim 13, including instructions which cause the device to:

while selecting the portion of the content, detect a second contact on the touch-sensitive surface and detect movement of the second contact across the touch-sensitive surface; and in response to detecting the movement of the second contact across the touch-sensitive surface, scroll the content in accordance with the movement of the second contact, while continuing to select the content in accordance with movement of the content relative to the focus selector on the display.

19. An electronic device, comprising:
a display;
a touch-sensitive surface;
one or more sensors to detect intensities of contacts with the touch-sensitive surface;
one or more processors;
memory; and
one or more programs, wherein the one or more programs are stored in the memory and configured to be executed by the one or more processors, the one or more programs including instructions for:
displaying a user interface on the display, wherein the user interface includes content;
while a focus selector is over the content, detecting a gesture on the touch-sensitive surface, the gesture including:
a first contact on the touch-sensitive surface; and
movement of the first contact across the touch-sensitive surface that corresponds to movement of the focus selector on the display; and
in response to detecting the gesture:
in accordance with a determination that the first contact has an intensity below a selection intensity threshold, scrolling the content on the display in accordance with movement of the focus selector on the display without selecting the content; and
in accordance with a determination that the first contact has an intensity above the selection intensity threshold, selecting at least a portion of the content in accordance with the movement of the focus selector over the content; and
prior to selecting the portion of the content:
detecting an increase in intensity of the first contact to a first intensity that is lower than the selection intensity threshold; and,
in response to detecting the increase in intensity of the first contact:
in accordance with a determination that the first intensity is above a cursor-preview intensity threshold, displaying a preview of a cursor in the content at a respective location proximate to the focus selector; and
in accordance with a determination that the first intensity is below the cursor-preview intensity threshold, continuing to display the content without displaying the preview of the cursor.

20. The electronic device of claim 19, including instructions for:

while displaying the preview of the cursor in the content, detecting an increase in intensity of the first contact from the first intensity to a second intensity; and in response to detecting the increase in intensity of the first contact from the first intensity to the second intensity:
in accordance with a determination that the second intensity is above a cursor-insertion intensity threshold, inserting a cursor in the content; and
in accordance with a determination that the second intensity is below the cursor-insertion intensity threshold, continuing to display the preview of the cursor without inserting the cursor in the content.

21. The electronic device of claim 20, wherein inserting the cursor in the content includes displaying an animation of the preview of the cursor being replaced with the cursor.

22. The electronic device of claim 20, wherein selecting the portion of the content in accordance with movement of the focus selector over the content includes starting the selecting at a location in the content that corresponds to a location of the cursor.

23. The electronic device of claim 19, including instructions for:
detect a decrease in intensity of the first contact below the selection intensity threshold; and
in response to detecting the decrease in intensity of the first contact below the selection intensity threshold:
in accordance with a determination that the intensity of the first contact is above a selection-adjustment intensity threshold, adjust the selection in accordance with movement of the first contact on the touch-sensitive surface; and
in accordance with a determination that the intensity of the first contact is below the selection-adjustment intensity threshold, forgo adjustment of the selection.

24. The electronic device of claim 19, including instructions for:
while selecting the portion of the content, detect a second contact on the touch-sensitive surface and detect movement of the second contact across the touch-sensitive surface; and
in response to detecting the movement of the second contact across the touch-sensitive surface, scroll the content in accordance with the movement of the second contact, while continuing to select the content in accordance with movement of the content relative to the focus selector on the display.

25. A method, comprising:
at an electronic device with a touch-sensitive surface and a display, wherein the device includes one or more sensors to detect intensities of contacts with the touch-sensitive surface:
displaying user interface on the display, wherein the user interface includes content;
while a focus selector is over the content, detecting of a gesture on the touch-sensitive surface, the gesture including:
a first contact on the touch-sensitive surface; and
movement of the first contact across the touch-sensitive surface that corresponds to movement of the focus selector on the display;
in response to detecting the gesture:
in accordance with a determination that the first contact has an intensity below a selection intensity threshold, scrolling the content on the display in accordance with movement of the focus selector on the display without selecting the content; and in accordance with a determination that the first contact has an intensity above the selection intensity threshold, selecting at least a portion of the content in accordance with the movement of the focus selector over the content; and, prior to selecting the portion of the content:

detecting an increase in intensity of the first contact to a first intensity that is lower than the selection intensity threshold; and, in response to detecting the increase in intensity of the first contact:

in accordance with a determination that the first intensity is above a cursor-preview intensity threshold, displaying a preview of a cursor in the content at a respective location proximate to the focus selector; and in accordance with a determination that the first intensity is below the cursor-preview intensity threshold, continuing to display the content without displaying the preview of the cursor.

26. The method of claim 25, including, while displaying the preview of the cursor in the content, detecting an increase in intensity of the first contact from the first intensity to a second intensity; and, in response to detecting the increase in intensity of the first contact from the first intensity to the second intensity:

in accordance with a determination that the second intensity is above a cursor-insertion intensity threshold, inserting a cursor in the content; and in accordance with a determination that the second intensity is below the cursor-insertion intensity threshold, continuing to display the preview of the cursor without inserting the cursor in the content.

27. The method of claim 26, wherein inserting the cursor in the content includes displaying an animation of the preview of the cursor being replaced with the cursor.

28. The method of claim 26, wherein selecting the portion of the content in accordance with movement of the focus selector over the content includes starting the selecting at a location in the content that corresponds to a location of the cursor.

29. The method of claim 25, including:

detecting a decrease in intensity of the first contact below the selection intensity threshold; and in response to detecting the decrease in intensity of the first contact below the selection intensity threshold:

in accordance with a determination that the intensity of the first contact is above a selection-adjustment intensity threshold, adjusting the selection in accordance with movement of the first contact on the touch-sensitive surface; and in accordance with a determination that the intensity of the first contact is below the selection-adjustment intensity threshold, forgoing adjustment of the selection.

30. The method of claim 25, including:

while selecting the portion of the content, detecting a second contact on the touch-sensitive surface and detecting movement of the second contact across the touch-sensitive surface; and in response to detecting the movement of the second contact across the touch-sensitive surface, scrolling the content in accordance with the movement of the second contact, while continuing to select the content in accordance with movement of the content relative to the focus selector on the display.

* * * * *

UNITED STATES PATENT AND TRADEMARK OFFICE
CERTIFICATE OF CORRECTION

PATENT NO. : 10,078,442 B2
APPLICATION NO. : 14/608985
DATED : September 18, 2018
INVENTOR(S) : Bernstein et al.

Page 1 of 1

It is certified that error appears in the above-identified patent and that said Letters Patent is hereby corrected as shown below:

In the Specification

Item (54) and in the Specification, Column 1, Line 5, Title, please delete "AN INTENSITY THESHOLD" and insert --AN INTENSITY THRESHOLD--;

In the Claims

Claim 23, Column 78, Line 24, please delete "detect a decrease" and insert --detecting a decrease--.

Signed and Sealed this
Twenty-seventh Day of November, 2018

Andrei Iancu
*Director of the United States Patent and Trademark Office*